US012749839B2

(12) United States Patent
Degen et al.

(10) Patent No.: US 12,749,839 B2
(45) Date of Patent: Sep. 29, 2026

(54) CONNECTOR SYSTEM FOR USE IN A POWER DISTRIBUTION SYSTEM

(71) Applicant: EATON INTELLIGENT POWER LIMITED, Dublin (IE)

(72) Inventors: Jason Degen, Carol Stream, IL (US); James Dawson, Carol Stream, IL (US); Jeffrey Chojnacki, Carol Stream, IL (US); Michael Gniewek, Carol Stream, IL (US); Eric Ammon, Carol Stream, IL (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 257 days.

(21) Appl. No.: 18/579,204

(22) PCT Filed: Jul. 18, 2022

(86) PCT No.: PCT/US2022/037508
§ 371 (c)(1),
(2) Date: Jan. 12, 2024

(87) PCT Pub. No.: WO2023/288138
PCT Pub. Date: Jan. 19, 2023

(65) Prior Publication Data

US 2024/0322476 A1 Sep. 26, 2024

Related U.S. Application Data

(63) Continuation-in-part of application No. PCT/US2021/043686, filed on Jul. 29, 2021.
(Continued)

(51) Int. Cl.
*H01R 13/187* (2006.01)
*H01R 13/11* (2006.01)
(Continued)

(52) U.S. Cl.
CPC ......... *H01R 13/187* (2013.01); *H01R 13/112* (2013.01); *H01R 13/44* (2013.01); *H01R 2103/00* (2013.01); *H01R 2201/26* (2013.01)

(58) Field of Classification Search
CPC .... H01R 13/187; H01R 13/112; H01R 13/44; H01R 2103/00; H01R 2201/26
(Continued)

(56) References Cited

U.S. PATENT DOCUMENTS 9,300,069 B2 3/2016 Morello et al.
9,444,205 B2 * 9/2016 Rangi .................... H01R 24/86
(Continued)

FOREIGN PATENT DOCUMENTS

CN 206180192 U 5/2017
DE 102019121284 A1 2/2021
(Continued)

OTHER PUBLICATIONS

PCT/US2022/037508, International Search Report mailed Feb. 24, 2023, 4 pages.
(Continued)

*Primary Examiner* — Gary F Paumen
(74) *Attorney, Agent, or Firm* — Meunier Carlin & Curfman LLC

(57) ABSTRACT

The invention provides a connector system for use in a power distribution system, which can be found in a motor vehicle, and includes features that increase the safety, durability and reliability of the connector system and the power distribution system. The connector system includes a female connector assembly with a female housing, a female terminal assembly that is inserted into the female housing using a first force, and a touchproof member inserted into the female terminal assembly using a second force oriented opposite the first force. The touch-proof member prevents
(Continued)

insertion of a foreign object into the female terminal assembly. The connector system also includes a male connector assembly with a male terminal assembly, and a male housing assembly with a touch-proof element opening that receives an extent of the touch-proof member. The male terminal assembly includes a male terminal body with contact arms having a neck portion with a neck width and a body portion with a body width that is greater than the neck width. The male terminal assembly also includes a spring member that resides within a receiver of the male terminal body, wherein during operation of the power distribution system, spring arms of the spring member apply an outwardly directed biasing force on the contact arms.

21 Claims, 76 Drawing Sheets

Related U.S. Application Data

(60) Provisional application No. 63/222,859, filed on Jul. 16, 2021.

(51) Int. Cl.
*H01R 13/44* (2006.01)
*H01R 103/00* (2006.01)

(58) Field of Classification Search
USPC .......................................................... 439/186
See application file for complete search history.

(56) References Cited

U.S. PATENT DOCUMENTS

| | | | | |
|---|---|---|---|---|
| 9,559,467 | B1 * | 1/2017 | Khorrami | H01R 13/6581 |
| 11,398,696 | B2 * | 7/2022 | Pavlovic | H01R 13/057 |
| 11,476,609 | B2 * | 10/2022 | Pavlovic | H01R 13/187 |
| 11,715,899 | B2 * | 8/2023 | Pavlovic | H01R 13/057<br>439/733.1 |
| 11,715,900 | B2 * | 8/2023 | Pavlovic | H01R 13/10<br>439/843 |
| 2003/0032338 | A1 | 2/2003 | Chevassus-More | |
| 2015/0280381 | A1 | 10/2015 | Rangi et al. | |
| 2017/0054254 | A1 | 2/2017 | Khorrami et al. | |
| 2021/0167538 | A1 | 6/2021 | Pavlovic et al. | |

FOREIGN PATENT DOCUMENTS

| | | | |
|---|---|---|---|
| TW | M544135 | U | 6/2017 |
| WO | 2021/050499 | A1 | 3/2021 |
| WO | 2023/288138 | A2 | 1/2023 |

OTHER PUBLICATIONS

PCT/US2022/037508, Written Opinion of the International Searching Authority mailed Feb. 24, 2023, 11 pages.

Extended European Search Report issued on Jul. 24, 2025, in European Patent Application No. 22842981.7.

* cited by examiner

CONNECTOR SYSTEM FOR USE IN A POWER DISTRIBUTION SYSTEM

FIELD OF DISCLOSURE

The present disclosure relates to a connector system for use in a power distribution system which can be found in a motor vehicle, such as an automobile, bus or truck. In particular, the connector system includes features that increase the safety, durability and reliability of the connector system, while reducing the time needed to install the connector system in the power distribution system and the motor vehicle.

CROSS-REFERENCE TO RELATED APPLICATIONS

This application is a U.S. National Stage application filed under 35 U.S.C. 371 of PCT/US2022/037508 filed Jul. 18, 2022, which is a continuation-in-part of PCT/US2021/043686 filed Jul. 29, 2021, and claims priority from U.S. Provisional Patent No. 63/222,859, filed Jul. 16, 2021, and PCT/US2021/043686, filed Jul. 29, 2021, which are incorporated herein by reference in their entirety and made a part hereof.

BACKGROUND

Over the past several decades, the number of electrical components used in automobiles, and other on-road and off-road vehicles such as pick-up trucks, commercial vans and trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creates comforts to the occupants of the motor vehicles. Considerable time, resources, and energy have been expended to develop power distribution components that meet the varied needs and complexities of the motor vehicle market; however, conventional power distribution components suffer from a variety of shortcomings.

Motor vehicles are challenging electrical environments for both the electrical components and the connector assemblies due to a number of conditions, including but not limited to, space constraints that make initial installation difficult, harsh operating conditions, large ambient temperature ranges, prolonged vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes leads to significant repair and warranty costs. For example, the combined annual accrual for warranty by all of the automotive manufacturers and their direct suppliers is estimated to be between $50 billion and $150 billion, worldwide.

SUMMARY

The present disclosure relates to a connector system that provides a sealed and grounded electrical connection for a component of the power distribution system, such as a battery pack, that is compliant with industry standards and/or specifications set by a regulatory body, those required for a motor vehicle. The connector system is suitable for use with mechanically and electrically connecting components or devices in a power distribution system found in an airplane, motor vehicle, a military vehicle, a bus, a locomotive, a tractor, marine applications, or telecommunications hardware. Accordingly, the connector system is well-suited to electrically and mechanically connect components or devices that are installed in these high-stress applications vehicles to ensure reliable, long-term performance and operation of the components, devices and vehicles.

The connector system includes a female connector assembly with a female housing, a female terminal assembly that is inserted into the female housing using a first force, and a touch-proof member inserted into the female terminal assembly using a second force oriented opposite the first force. The touch-proof member prevents insertion of a foreign object into the female terminal assembly. In one version, the touch-proof member has a base and a touch-proof securing assembly with an arrangement of deformable retaining members that elastically deform from an original state to a deformed state during insertion of the touch-proof member within the female terminal assembly. The touch-proof member also has a touch-proof element with a first end wall, a second end wall, and a connecting wall extending between said first and second end walls. In another version, the touch-proof member includes an elastically deformable base having a first base portion and a second base portion that are separated by a recess, wherein the first base portion includes at least one retaining member that depends from said base portion and wherein the second base portion includes at least one retaining member that depends from said base portion. The touch-proof element extends from the elastically deformable base and has a first extent with a slot that is aligned with the recess that separates the first and second base portions. When the touch-proof member is inserted within the female terminal assembly, a foreign object distance of 5 mm or less is defined between the touch-proof element and a first wall of the female terminal assembly.

The connector system also includes a male connector assembly with a male terminal assembly, and a male housing assembly with a touch-proof element opening that receives an extent of the touch-proof member. The male terminal assembly includes a male terminal body with contact arms having a neck portion with a neck width and a body portion with a body width that is greater than the neck width. The male terminal assembly also includes a spring member that resides within a receiver of the male terminal body, wherein during operation of the power distribution system, spring arms of the spring member apply an outwardly directed biasing force on the contact arms to retain the male terminal assembly within the female terminal assembly.

The spring member also includes an arrangement of spring arms, wherein a first spring arm has a positioning projection extending from a free end of the first spring arm and a second spring arm lacks the positioning projection. In a seated state, the spring member resides within the spring receiver whereby the positioning projection of the first spring arm overlaps or wraps around an interior corner region of the first contact arm. The spring member further includes a third spring arm with a positioning projection extending from a free end of the third spring arm. In the seated state, the positioning projection of the third spring arm overlaps or wraps around an interior corner region of a third contact arm of the male terminal body. In the seated state, the engagement of the first and third spring arms with the first and third contact beams retains the spring member in the male terminal body and centers the spring member within the contact arms by limiting the amount the spring member can rotate within the male terminal body during operation of the power distribution system.

Additional structural and functional aspects and benefits of the connector system are disclosed in the Detailed Description section and the Figures.

BRIEF DESCRIPTION OF THE DRAWINGS

The accompanying drawings or figures, which are included to provide further understanding and are incorporated in and constitute a part of this specification, illustrate disclosed embodiments and together with the description serve to explain the principles of the disclosed embodiments. In the Figures, like reference numerals refer to the same or similar elements throughout the Figures. In the drawings:

FIG. 110 is a perspective view of the female connector assembly of FIG. 109 in a first partially assembled state, where a second embodiment of the touch-proof assembly is in an uninstalled position;

FIG. 111 is a top perspective view of the touch-proof assembly of FIG. 110;

FIG. 112 is a bottom perspective view of the touch-proof assembly of FIG. 111;

FIG. 113 is a perspective view of the touch-proof assembly of FIG. 111;

FIG. 114 is an end view of the touch-proof assembly of FIG. 111;

FIG. 115 is a bottom view of the touch-proof assembly of FIG. 111;

FIG. 116 is a top view of the touch-proof assembly of FIG. 111;

FIG. 117 is an end view of the female terminal assembly and the touch-proof assembly of FIG. 110 in an unengaged position;

FIG. 118 is a cross-sectional view of the female terminal assembly and the touch-proof assembly taken along line 118-118 of FIG. 117;

FIG. 119 is an end view of the female connector assembly of FIG. 109 in the second partially assembled state, where the touch-proof assembly is in partially installed position;

FIG. 120 is a cross-sectional view of the female connector assembly taken along line 120-120 of FIG. 119;

FIG. 121 is a top view of the female connector assembly of FIG. 109 in an assembled state;

Figure 106:
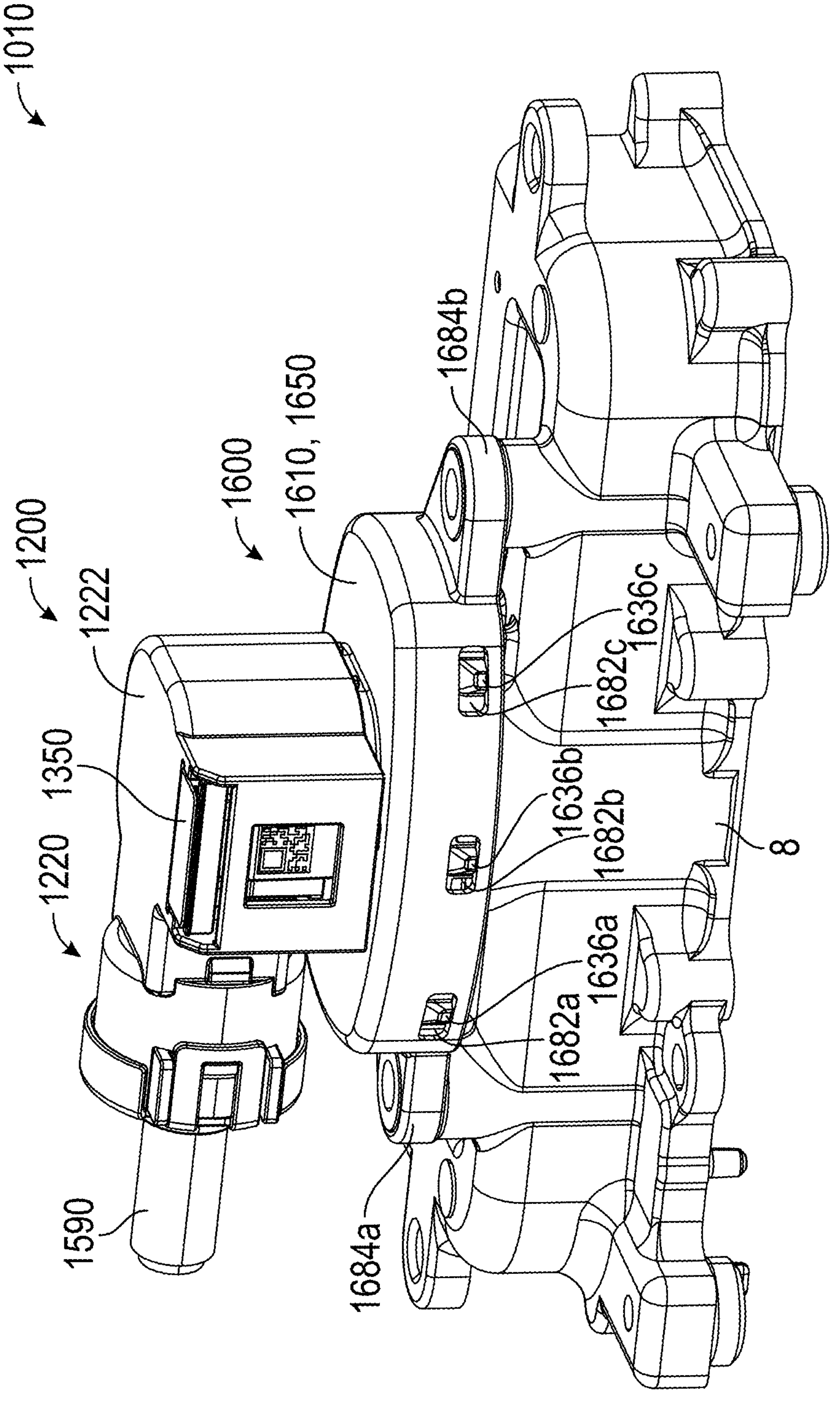
FIG. 106 is a perspective view of a second embodiment of a connector system for use in a power distribution system.
Figure 122:
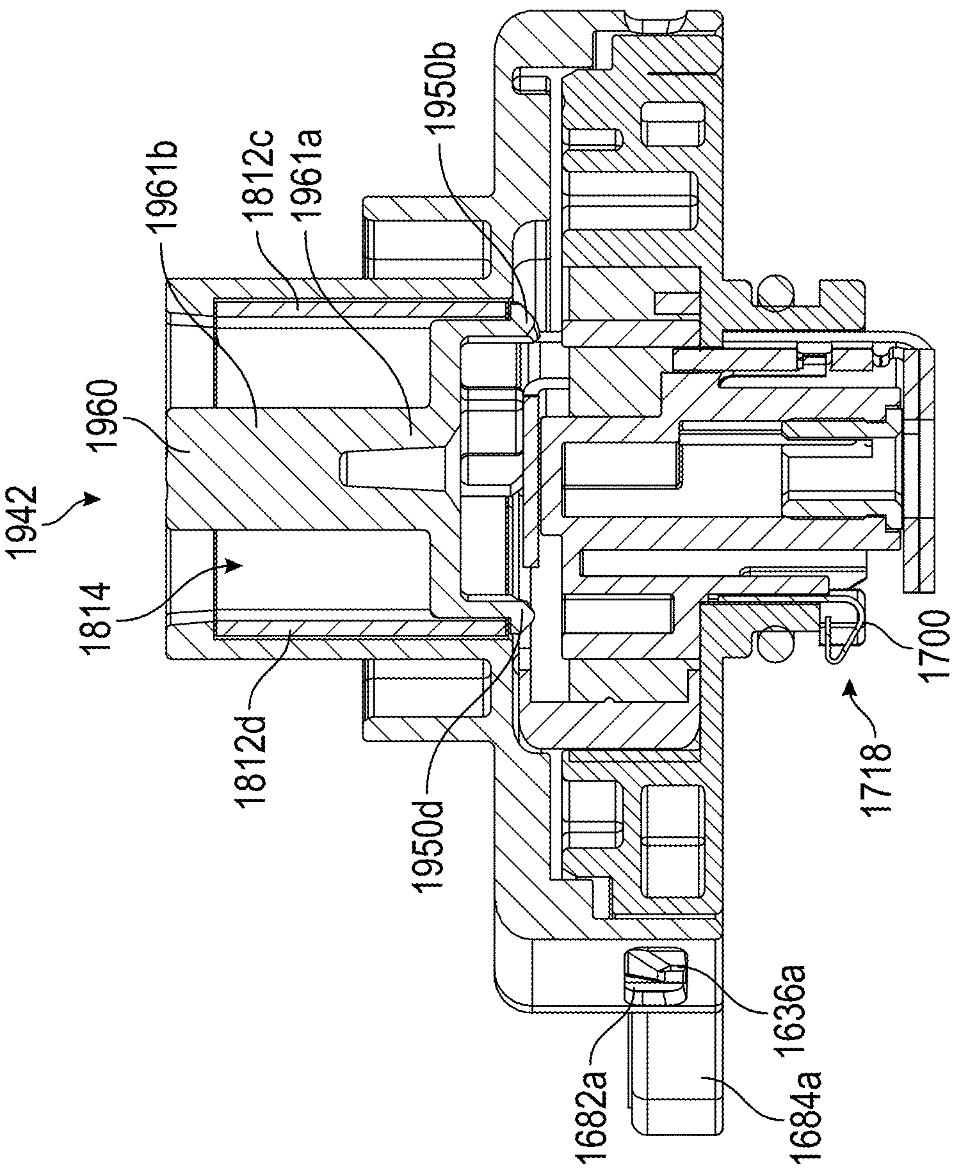
Figure 121:
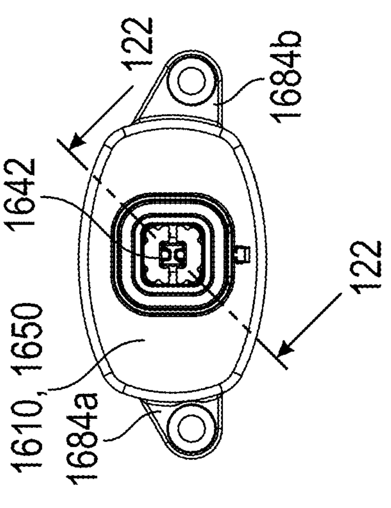
Figure 123:
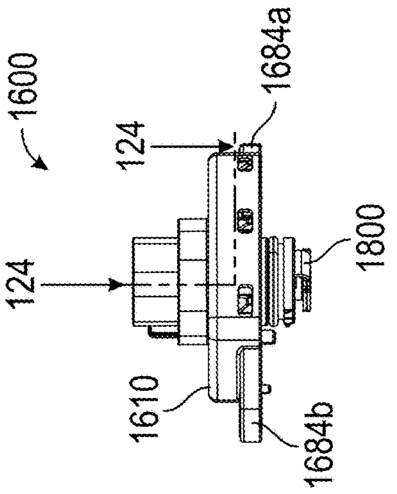
Figure 124:
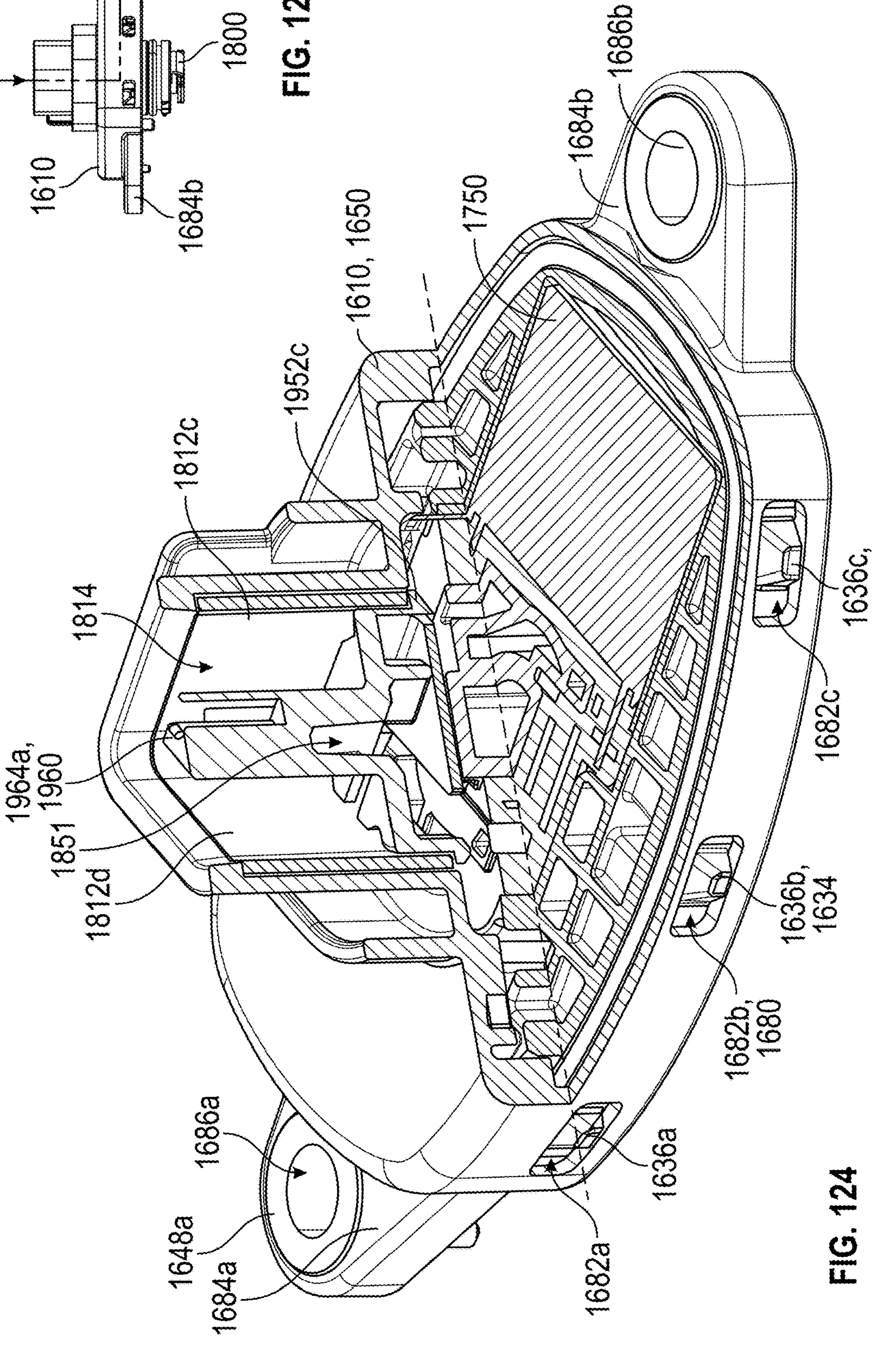
Figure 126:
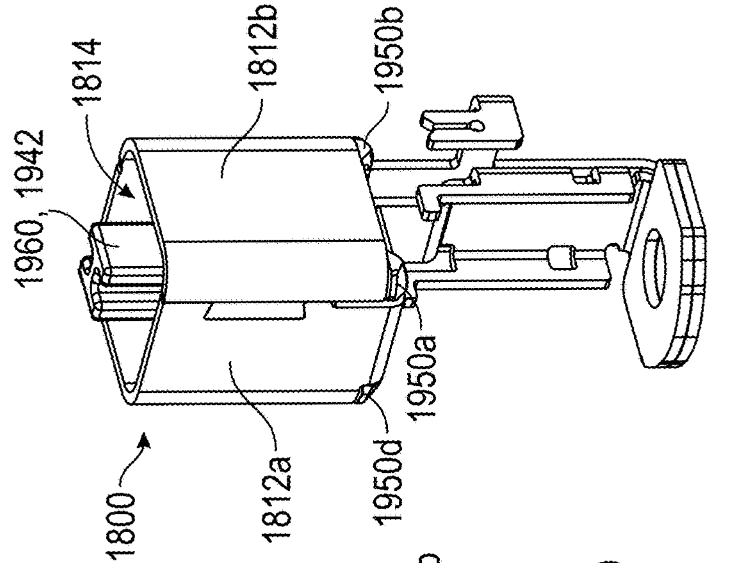
Figure 127:
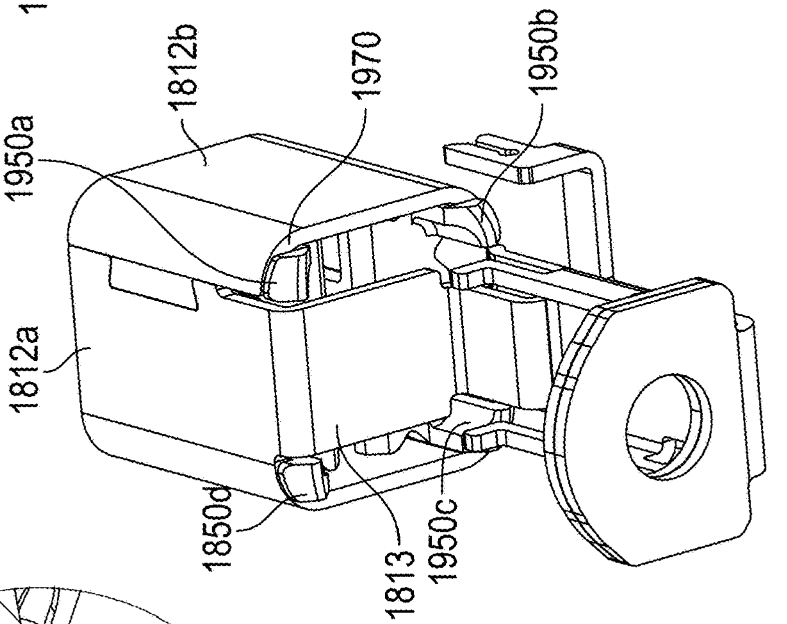
Figure 125:
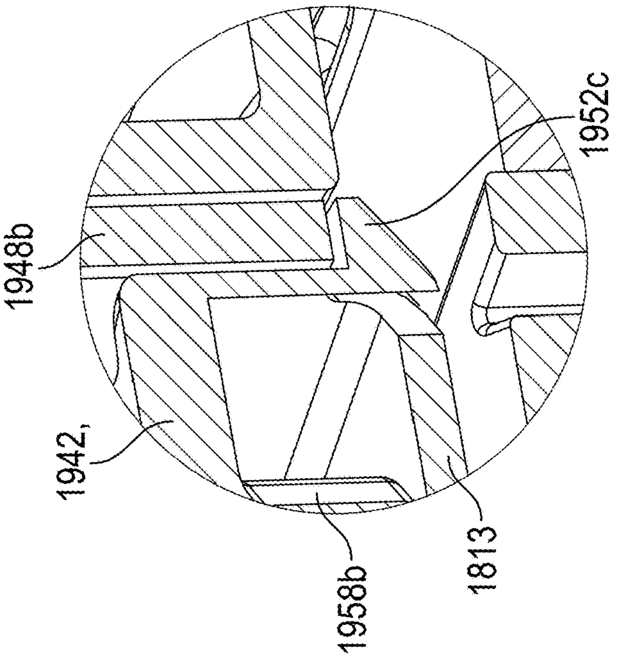
Figure 128:
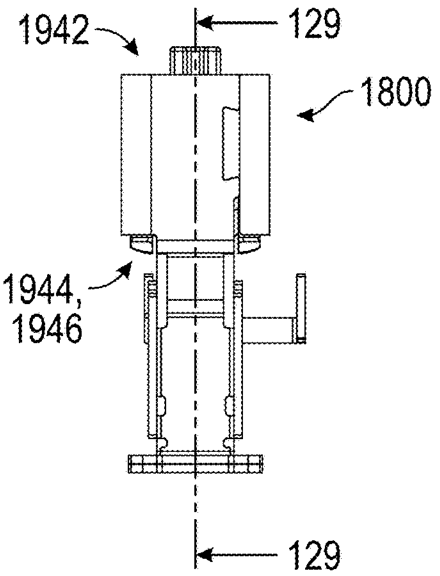
Figure 129:
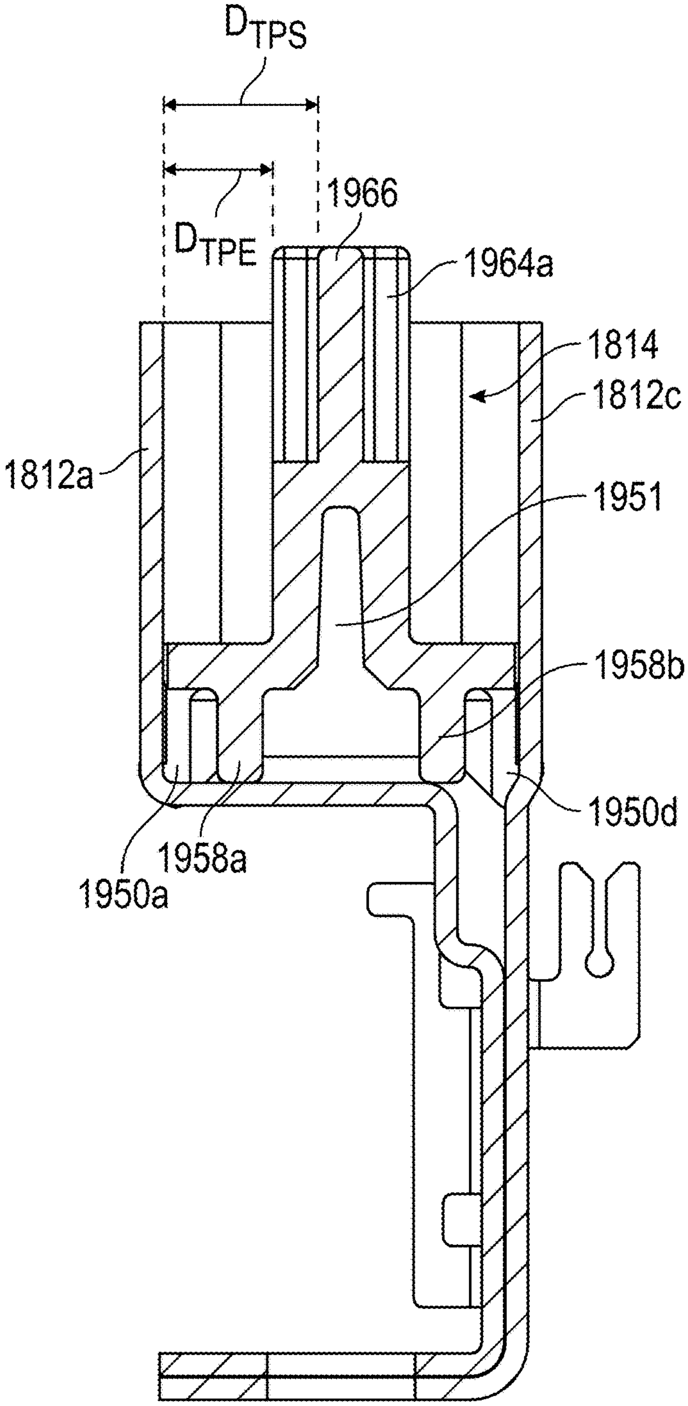
Figure 131:
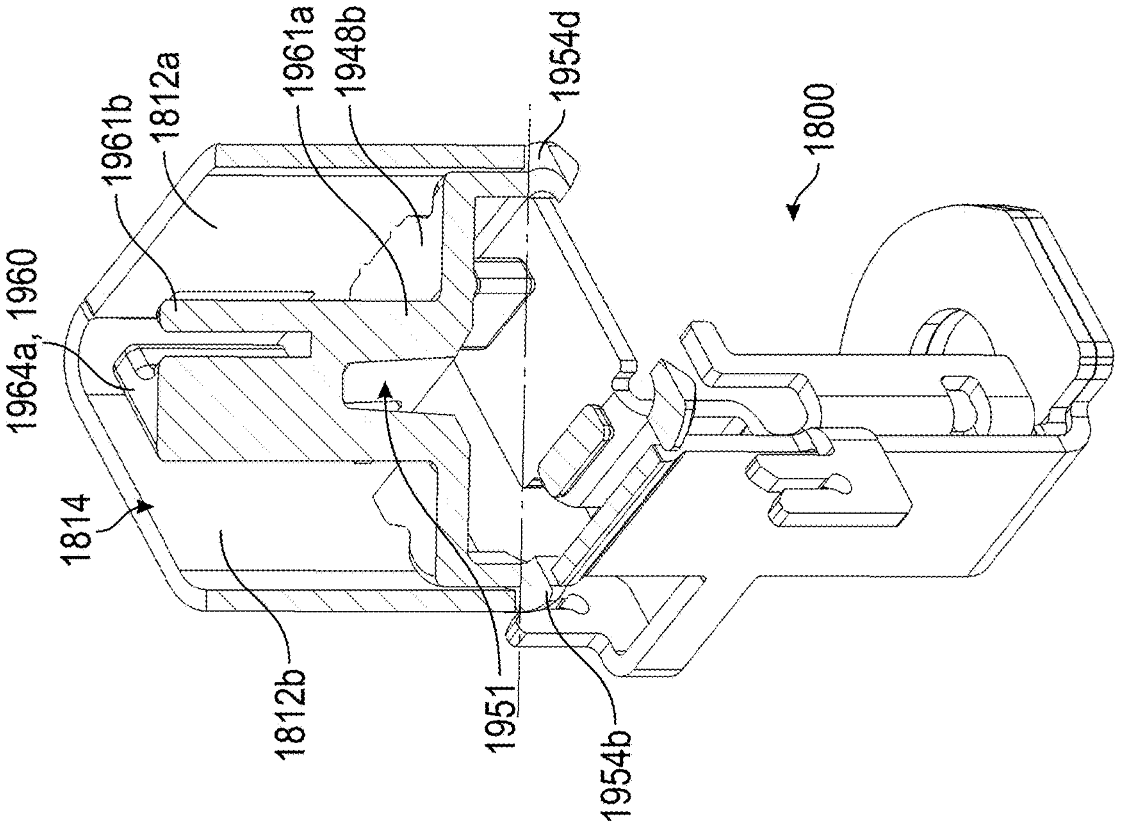
Figure 130:
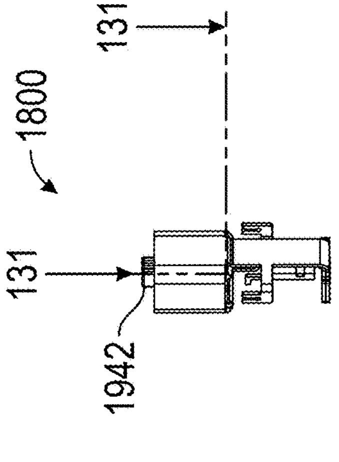
Figure 133:
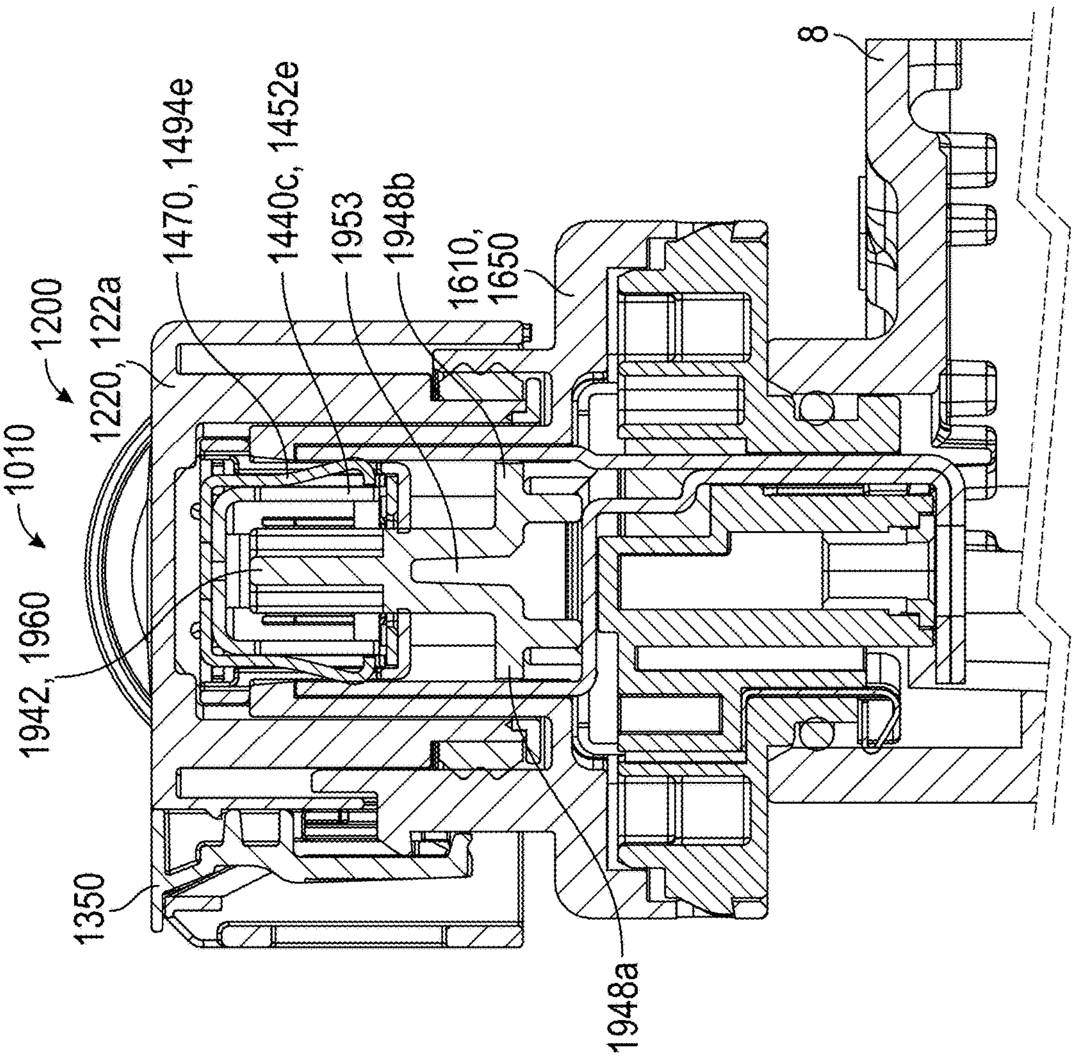
Figure 132:
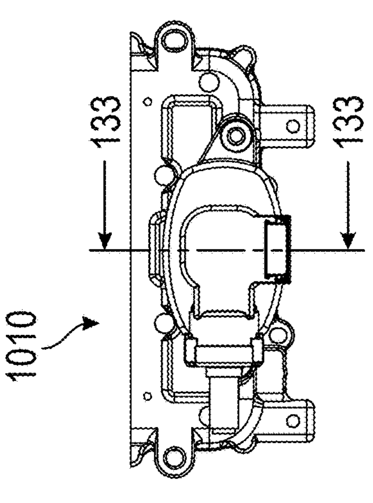
Figure 134:
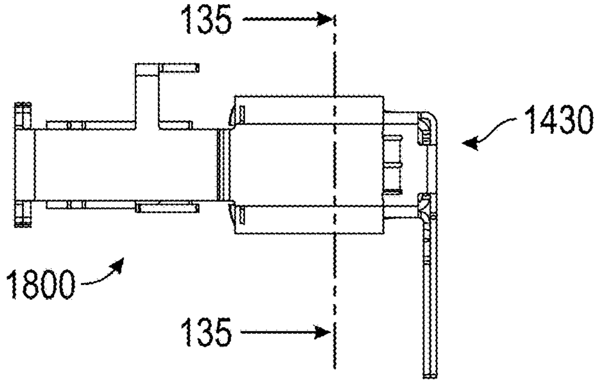
Figure 135:
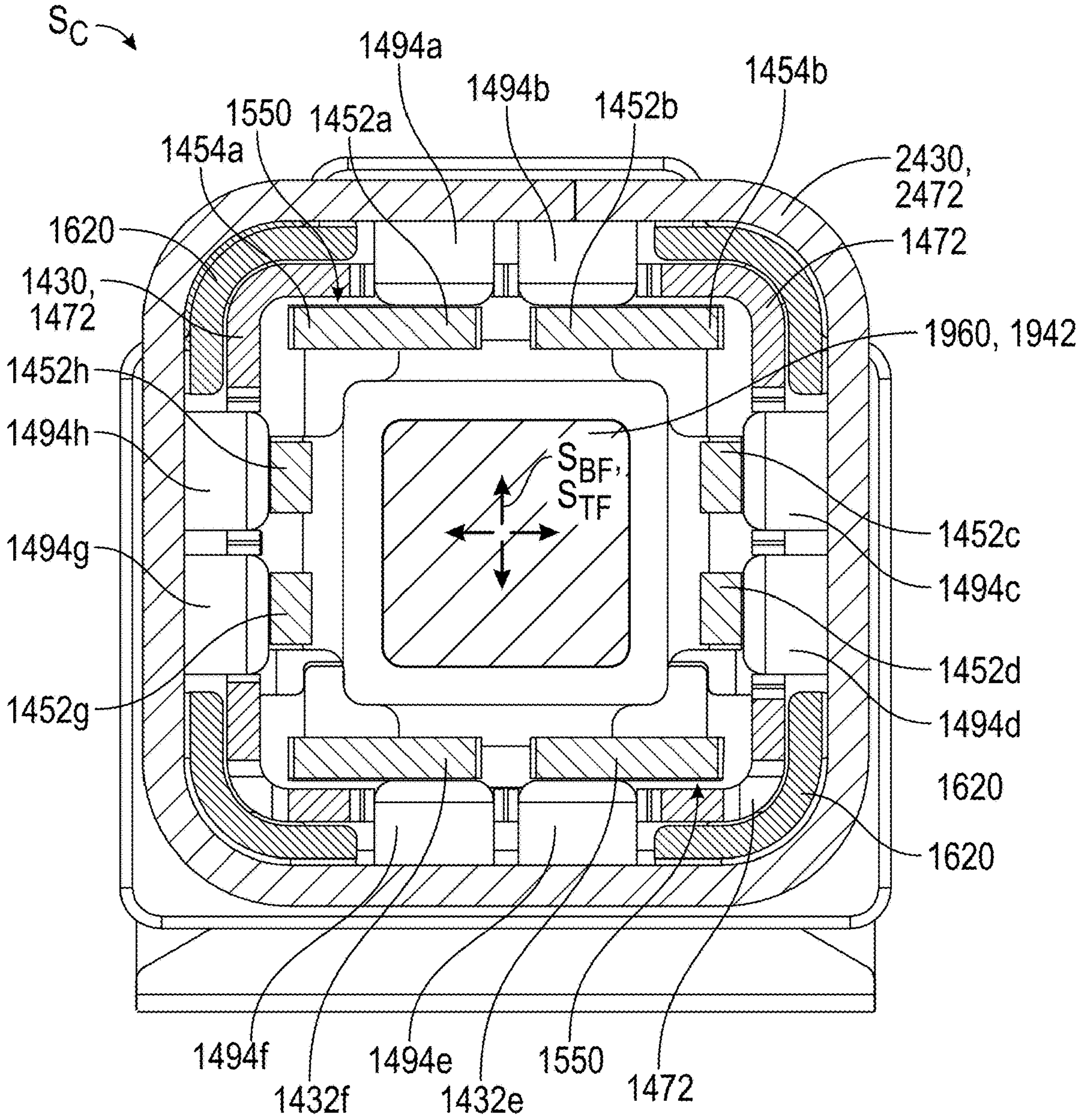
Figure 137:
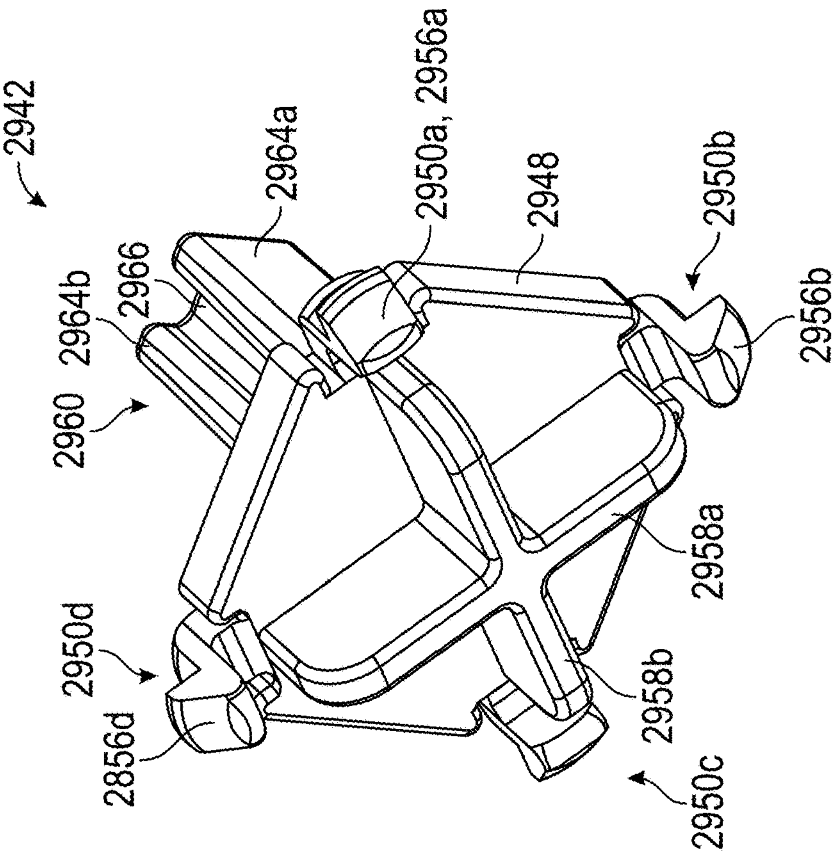
Figure 136:
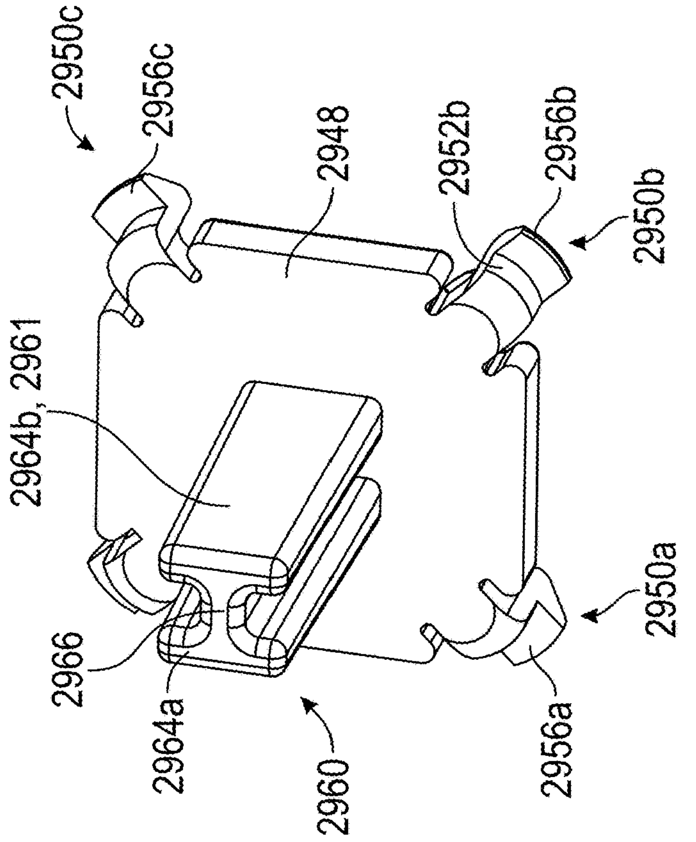
Figure 139:
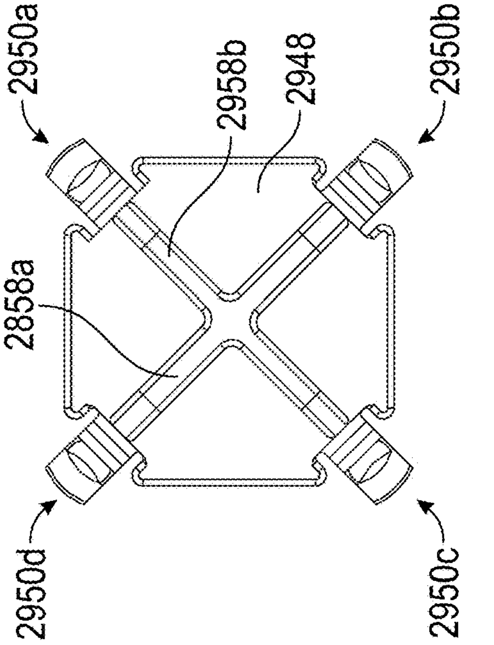
Figure 140:
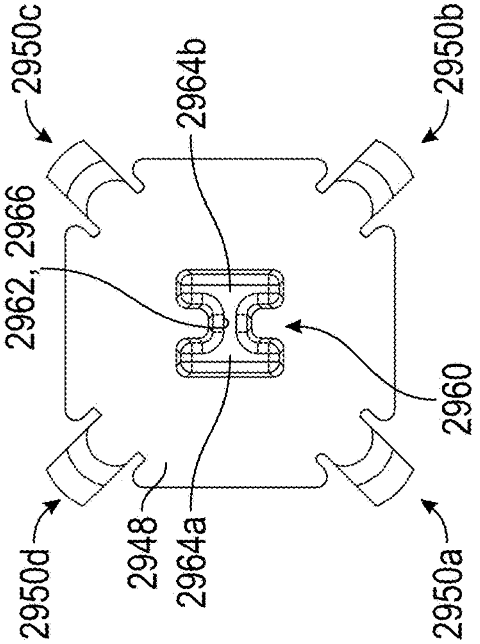
Figure 138:
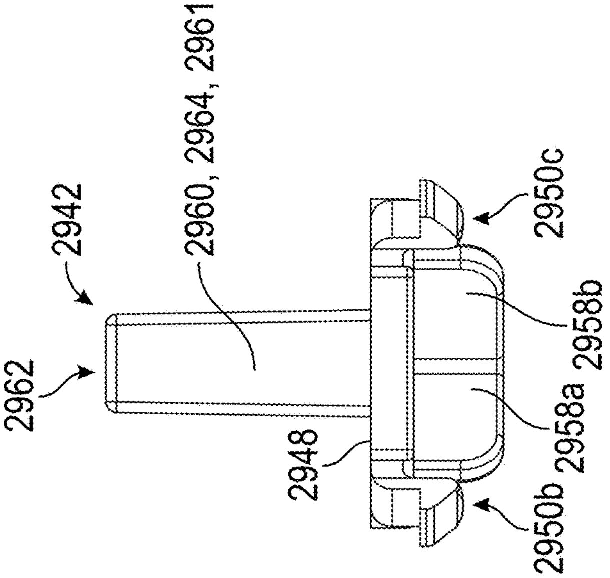

FIG. 122 is a cross-sectional view of the female connector assembly taken along line 122-122 of FIG. 121;

FIG. 123 is an angled side view of the female connector assembly of FIG. 121;

FIG. 124 is a cross-sectional view of the female connector assembly taken along line 124-124 of FIG. 123;

FIG. 125 is a zoomed-in view of area P of the connector system of FIG. 124 showing the;

FIG. 126 is a perspective view of the female terminal assembly and the touch-proof assembly, where the touch-proof assembly is in a engaged position;

FIG. 127 is a bottom perspective view of the female terminal assembly and the touch-proof assembly of FIG. 126;

FIG. 128 is an end view of the female terminal assembly and the touch-proof assembly of FIG. 126;

FIG. 129 is a cross-sectional view of the female terminal assembly and the touch-proof assembly taken along line 129-129 of FIG. 128;

FIG. 130 is an angled side view of the female terminal assembly and the touch-proof assembly of FIG. 126;

FIG. 131 is a cross-sectional view of the female terminal assembly and the touch-proof assembly taken along line 131-131 of FIG. 130;

FIG. 132 is a top view of the connector system of FIG. 106 in a ready to use state;

FIG. 133 is a cross-sectional view of the connector system taken along line 133-133 of FIG. 132;

FIG. 134 is a side view of the connector system of FIG. 106 in a ready to use state, where all components have been omitted except for the male terminal assembly and female terminal assembly;

FIG. 135 is a cross-sectional view of the male terminal assembly and female terminal assembly taken along line 135-135 of FIG. 134;

FIG. 136 is a top perspective view of a third embodiment of a touch-proof assembly, which is configured for use with the second embodiment of the connector system;

FIG. 137 is a bottom perspective view of the touch-proof assembly of FIG. 136;

FIG. 138 is an end view of the touch-proof assembly of FIG. 136;

FIG. 139 is a bottom view of the touch-proof assembly of FIG. 136;

FIG. 140 is a top view of the touch-proof assembly of FIG. 136.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings. In the Figures, like reference numerals refer to the same or similar elements throughout the Figures.

The Figures show two embodiments of a connector system 10, 1010 that includes a harness connector assembly or male connector assembly 200, 1200 and a component/device connector assembly or female connector assembly 600, 1600. Both versions of the connector system 10, 1010 include features integrated into both the male connector assembly 200, 1200 and the female connector assembly 600, 1600. In particular, the first embodiment of the connector system 10 generally includes the following features: (i) a retaining assembly 20 with a connector position assurance ("CPA") assembly 80, (ii) an optional touch-proof assembly 40, (iii) an optional shielding assembly 60, and (iv) an optional interlock ("IL") assembly 100. These features structurally and functionally interact to enable the connector system 10 to meet a variety of industry performance standards and regulations including: (a) certain aspects of USCAR (e.g., USCAR 12, USCAR 25, USCAR 38), (b) certain aspects of ISO (e.g., ISO 20076:2019 and ISO 20653:2013), (c) certain aspects of IEC (e.g., IEC 60529-2020), and (d) performance and installation requirements including T4/V4/S3/D2/M2, and Push-Click-Tug-Scan (PCTS).

The retaining assembly 20 of the connector system 10 is formed from a plurality of recesses and projections that structurally and functionally interact whereby the system 10 is secured and requires a predefined high force threshold (e.g., 500 Newtons of force): (a) move the male connector assembly 200 from a "ready to engage state" to an "restrictive engagement state" via an accidental engagement force $F_{AE}$, (b) move the system 10 from a "ready to use state" to a "connected" via an accidental disengagement force $F_{AD}$, and (c) remove the male connector assembly 200 from the female connector assembly 600 when the system 10 is in the "ready to use state" via an accidental engagement force $F_{DIS}$. The primary components of the retaining assembly 20 are: (i) a male retaining assembly 222, which includes a male accidental engagement assembly 336, an accidental disengagement assembly 347, a male bracing assembly 351, and a male CPA assembly 400, and (ii) female retaining assembly 622, which includes a female accidental engagement assembly 652, a female bracing assembly 648, and a female CPA assembly 700. While the CPA assembly 20 is part of the retaining assembly 20, the CPA assembly 80 also enables the system 10 to be PCTS compliant, which eliminates the need for air-assist tools (e.g, air guns) to connect the male terminal assembly 430 to the female terminal assembly 800 and enables the generation of a record showing proper installation of the system 10 for accounting and system management purposes. Overall, the retaining assembly 20 is beneficial because it: (i) reduces installation time by reducing the need for additional tools and ensuring the male connector assembly 200 is in a state that can be coupled to the female connector assembly 600, (ii) increases durability by reducing inadvertent disengagements of the system 10, and (iii) provides for accurate record keeping showing that a proper connection was made and when and where such connection was made in the assembly process.

The optional touch-proof assembly 40 enables the connector system 10 to meet industry regulations (e.g., USCAR 12, ISO 20076:2019 and ISO 20653:2013) because it protects against the inadvertent insertion of foreign objects into the female terminal assembly 800 that have a diameter over a predetermined size (e.g., 6 mm). These foreign objects can cause damage to the connector system 10 and/or the installer/operator and machines involved in the assembly of the power distribution system 5. The optional touch-proof assembly 40 includes a male touch-proof element opening 242 and a female touch-proof member 720. Unlike conventional connector systems that may have components that allow them to meet industry regulations, the touch-proof assembly 40 allows an installer or operator to add the female touch-proof member 720 after the female connector assembly 600 is installed within the environment, application, system, component, or device. This subsequent addition of the female touch-proof member 720 enables the touch-proof assembly 40 to provide significant benefits for the inventive connector system 10 over conventional connectors because: (i) the female touch-proof member 720 does not add weight to the system 10, if this component is not desired, (ii) the female touch-proof member 720 can be removed and/or replaced without tools or requiring the installer/operator to spend valuable time disassembling the entire system 10, (iii) the female touch-proof member 720 reduces maintenance cost, as it component can be easily removed and to provide access to the female terminal body 800, (iv) components of the system 10 can be manufactured at different times, shipped at different times and installed at different times, which may be beneficial if there is a shortage or delay in the supply chain manufacturing the touch-proof assembly 40, including the female touch-proof member 720, and (v) other benefits that are obvious to one of skill in the art based on the below disclosure and figures.

The optional shielding assembly 60 enables the connector system 10 to reduce electromagnetic noise that may otherwise be introduced into the motor vehicle and operating environment where the system 10 is installed. Reduction of the electromagnetic noise allows for additional mounting locations for the system 10 near or adjacent other electronics or components that are sensitive to electromagnetic noise, such as those under the hood of a motor vehicle. Finally, the optional interlock ("IL") assembly 100 insures that current is not applied to the connector system 10 prior to the full engagement of the male connector assembly 200 with the female connector assembly 600. Additionally, unlike conventional connector systems that may have configurations that may provide an interlock assembly, the disclosed connector system 10 allows for an installer/operator to optionally add or remove the IL assembly 100 from the system 10. This selective addition or removal of the IL assembly 100 is beneficial over other disclosed system because: (i) it does not add weight to the system, if this component is not desired, (ii) reduces part numbers/stock keeping units ("SKU") that a manufacturer defines and maintains, and (iii) other benefits that are obvious to one of skill in the art based on the below disclosure and figures.

The second embodiment of the connector system 1010 includes the following features: (i) CPA assembly 80, and (ii) optional touch-proof assembly 1040. These features structurally and functionally interact to enable the connector system 1010 to meet a variety of industry performance standards and regulations including: (a) certain aspects of USCAR (e.g., USCAR 12, USCAR 25, USCAR 38, ISO20653), (b) certain aspects of ISO (e.g., ISO20653), and (c) performance and installation requirements including T4/V4/S3/D2/M2, and Push-Click-Tug-Scan (PCTS). For the sake of brevity, features and functions of the second embodiment of the connector system 1010 that are similar to the features and functions of the first embodiment of the connector system 10. It should be understood that these omissions should not limit the disclosure of this application and instead the reader shall refer to the disclosure of similar structures that may be discussed within another section of this application or other applications that are incorporated herein by reference.

Unlike conventional connector systems that rely on ultrasonically welding portions of the female housing to one another in order to form an electrical connection between the female terminal assembly and the housing of a power distribution component with a capacitor assembly, the disclosed connector system 1010 provides a combination of projections, recesses, and openings that function together to mechanically join and seal the portions of the female housing 620 to one another. This is beneficial because it substantially increases the durability, operating performance and longevity of the system 1010. Additionally, the CPA assembly 80 and the optional touch-proof assembly 1040 enable the connector system 1010 to provide the same benefits that are provide by and discussed above in connection with the first embodiment of the connector system 10.

As depicted in the Figures, the connector systems 10, 1010 are designed to provide mechanical and electrical coupling of a conductor, lead or busbar to a component contained in a power distribution system 5. The connector system 10, 1010 and the power distribution system 5 may be installed within an application. As used herein, the term "application" means an airplane, motor vehicle (e.g., an automobile, bus, van, truck, or motorcycle), a military vehicle (e.g., tank, personnel carrier, heavy-duty truck, and troop transporter), a locomotive, a tractor, a boat, a submarine, a battery pack, a computer server, a 24-48 volt system, or applications or products that require high power, high current or high voltage. It should be understood that multiple connector systems 10, 1010 could be used in a single installation environment, application, product, component, or device. For example, multiple connector systems 10, 1010 may be used with a single component of the power distribution system 5. As another example, multiple connector systems 10, 1010 may be used within a first component of the power distribution system 5 and multiple connector systems 10, 1010 may be used within a second component of the same power distribution system 5, where that power distribution system 5 is installed in a single application, such as a motor vehicle.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistently with the disclosed methods and systems. Accordingly, the drawings and detailed descriptions are to be regarded as illustrative in nature, not restrictive or limiting.

First Embodiment

Figure 1:
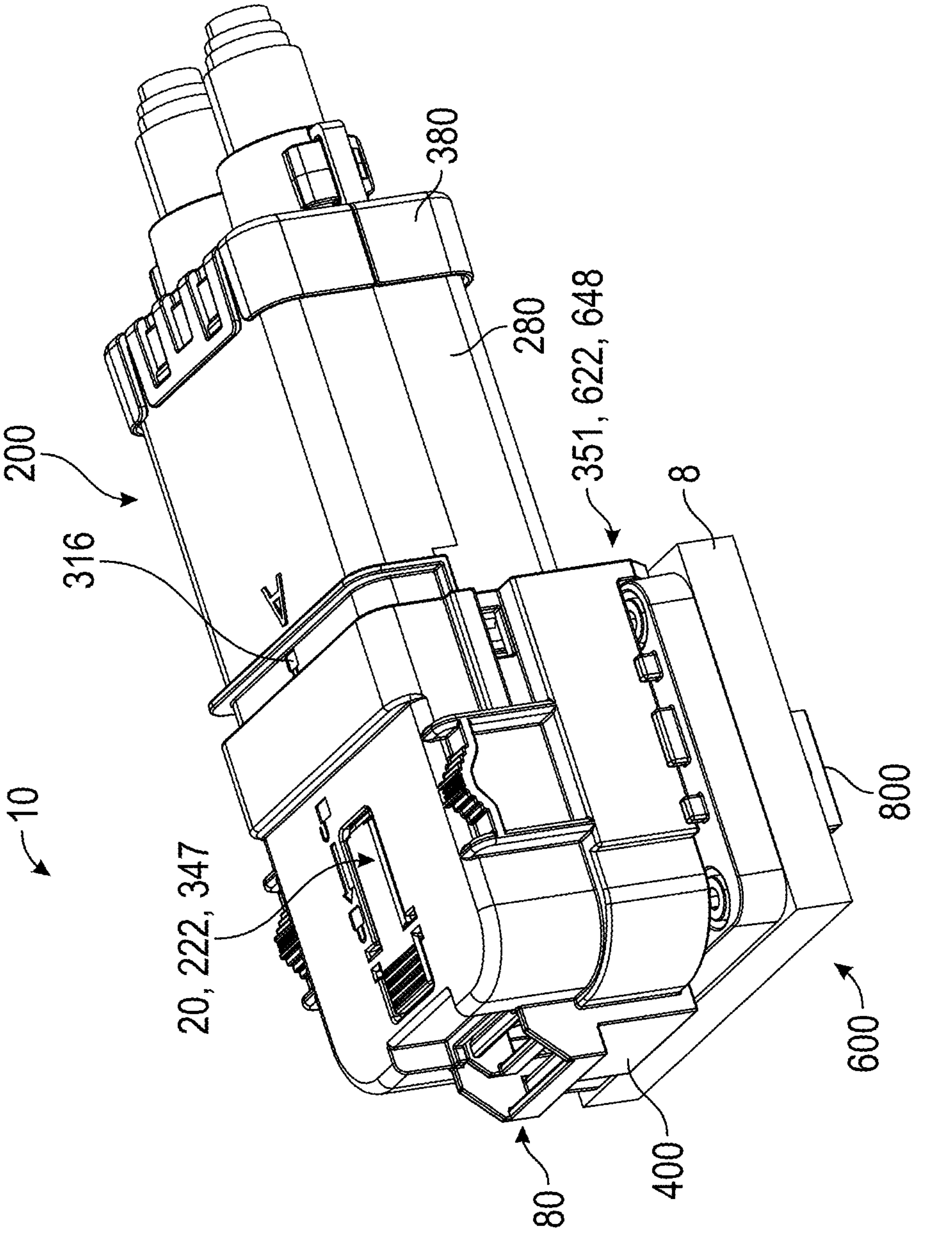
FIG. 1 is a perspective view of a first embodiment of a connector system for use in a power distribution system.
Figure 2:
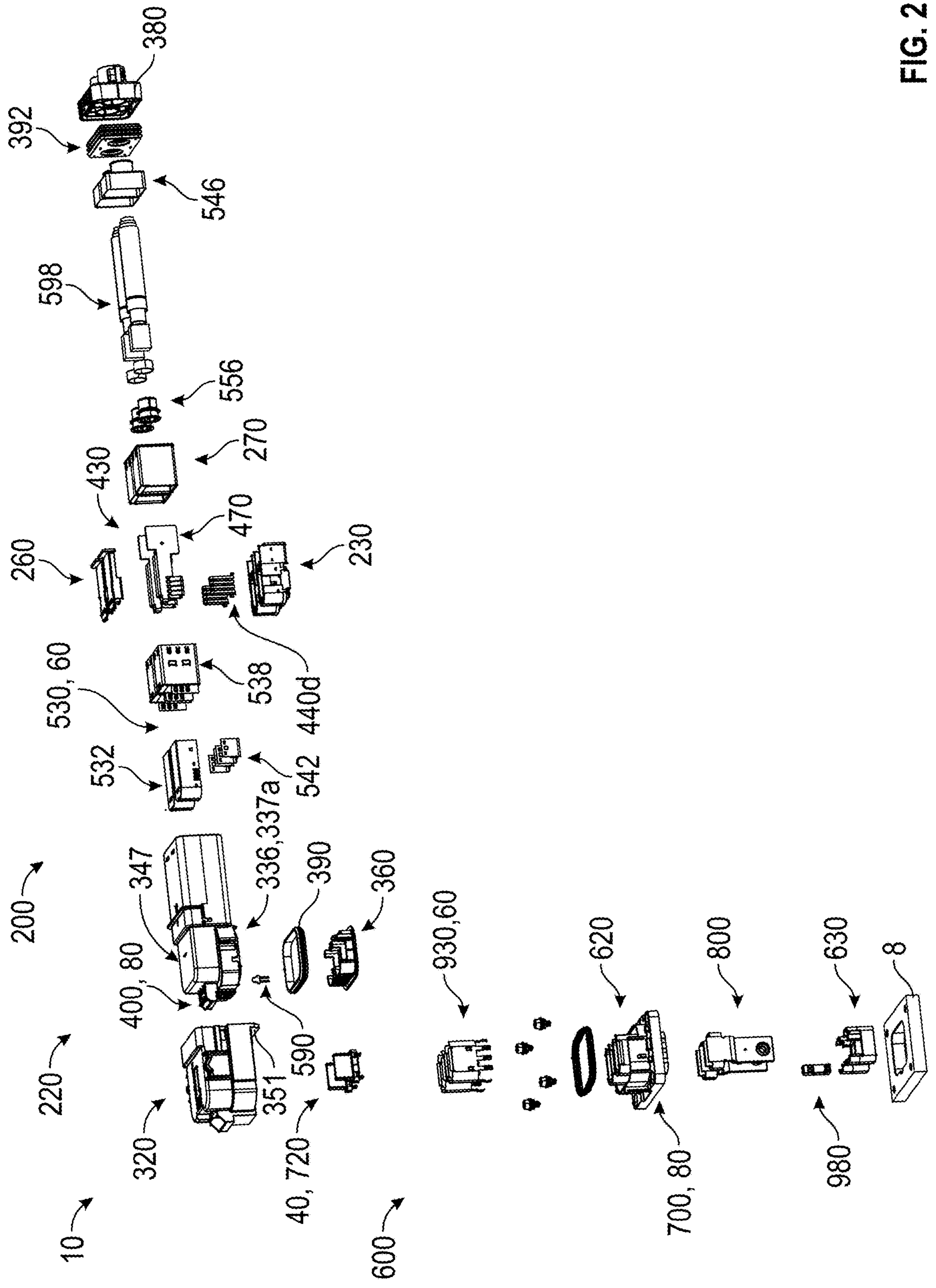
FIG. 2 is an exploded view of the connector system of FIG. 1, where the connector system includes a male connector assembly and a female connector assembly.
Figure 98:
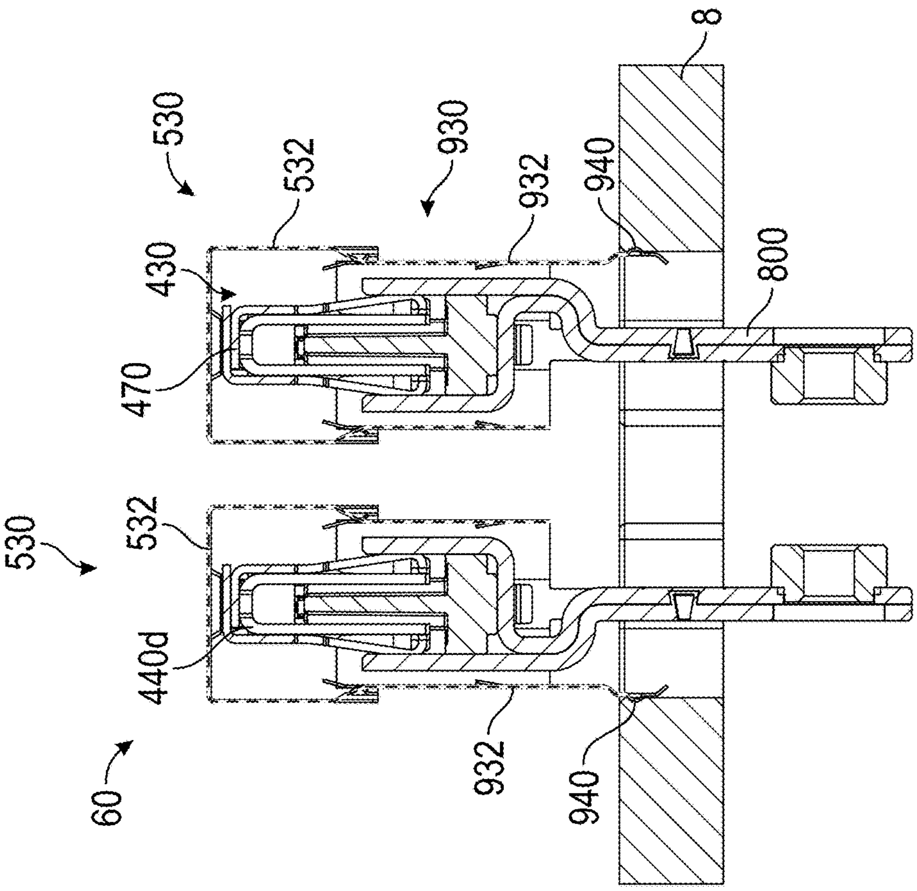
FIG. 98 is a cross-sectional view of the connector system taken along line 98-98 of FIG. 97.
Figure 97:
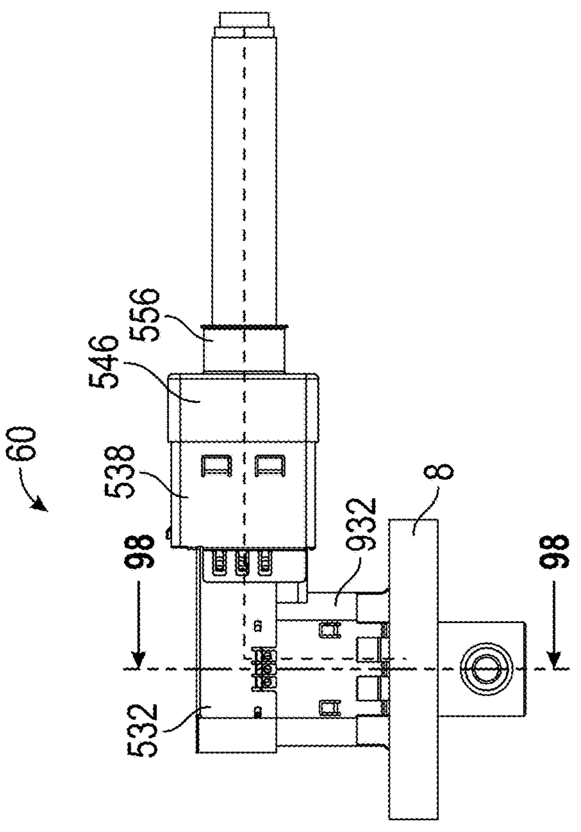
FIG. 97 is a side view of the connector system of FIG. 1 in a connected state, where the non-conductive components have been removed.

As shown in FIGS. 1-98, the first embodiment of the connector system 10 includes male connector assembly 200 and a female connector assembly 600. Said male and female connector assemblies 200, 600 include the following features that are integrated in the assemblies 200, 600: (i) retaining assembly 20 that includes a male retaining assembly 222 and a female retaining assembly 622, (ii) connector position assurance ("CPA") assembly 80 that includes a male CPA assembly 400 and a female CPA assembly 700, (iii) touch-proof assembly 40 that includes a male touch-proof receiver 242 and a female touch-proof member 720, (iv) shielding assembly 60 that includes a male shielding assembly 530 and a female shielding assembly 930, and (v) interlock ("IL") assembly 100 that includes a male IL assembly 590 and a female IL assembly 980.

1. Male Connector Assembly

As shown in FIGS. 1-27, 55, 57-98, the connector system 10 includes male connector assembly 200. Said male connector assembly 200 includes: (i) a male housing assembly 220 with the male retaining assembly 222 having the male CPA assembly 400, (ii) the male terminal assembly 430, (iii) a male shielding assembly 530, and (iv) the male IL assembly 590. The male retaining assembly 222, which includes: (i) male accidental engagement assembly 336, which is formed from two accidental engagement portions **337*a*, 337*b*, (ii) accidental disengagement assembly 347, (iii) male bracing assembly 351, and male CPA assembly 400. As described below: (i) a first portion of the male accidental engagement assembly 377*a* includes: (a) an accidental engagement slots 294*a*, 294*b*, and (b) an accidental engagement depression 300*a*, 300*b*, (ii) a second portion of the male accidental engagement assembly 377*b* includes: (a) an accidental engagement recesses 331*a*, 331*b*, (b) an accidental engagement retainer 332*a*, 332*b*, and (c) an accidental engagement members 338*a*, 338*b*, (iii) an accidental disengagement assembly 347 includes a first disengagement projection 287 and a disengagement member 348 with a second disengagement projection 342, (iv) male bracing assembly 351 with bracing apertures 354, and (v) male CPA assembly 400 includes a deformable male CPA member 406**.

A. Male Housing Assembly

Figure 13A:
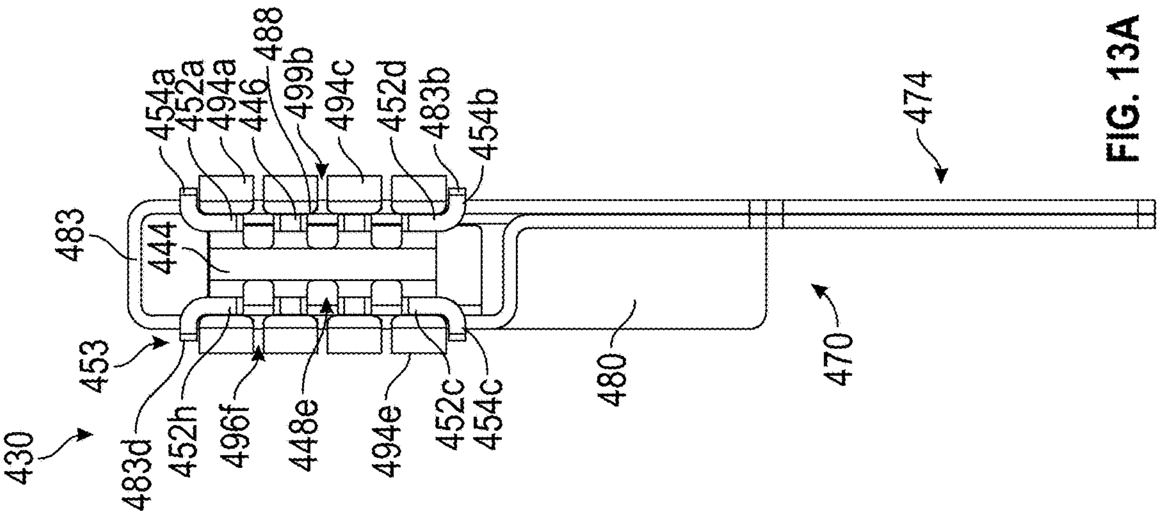
FIG. 13A is a bottom view of one of the male terminal assemblies of FIG. 3 in a seated state.
Figure 12:
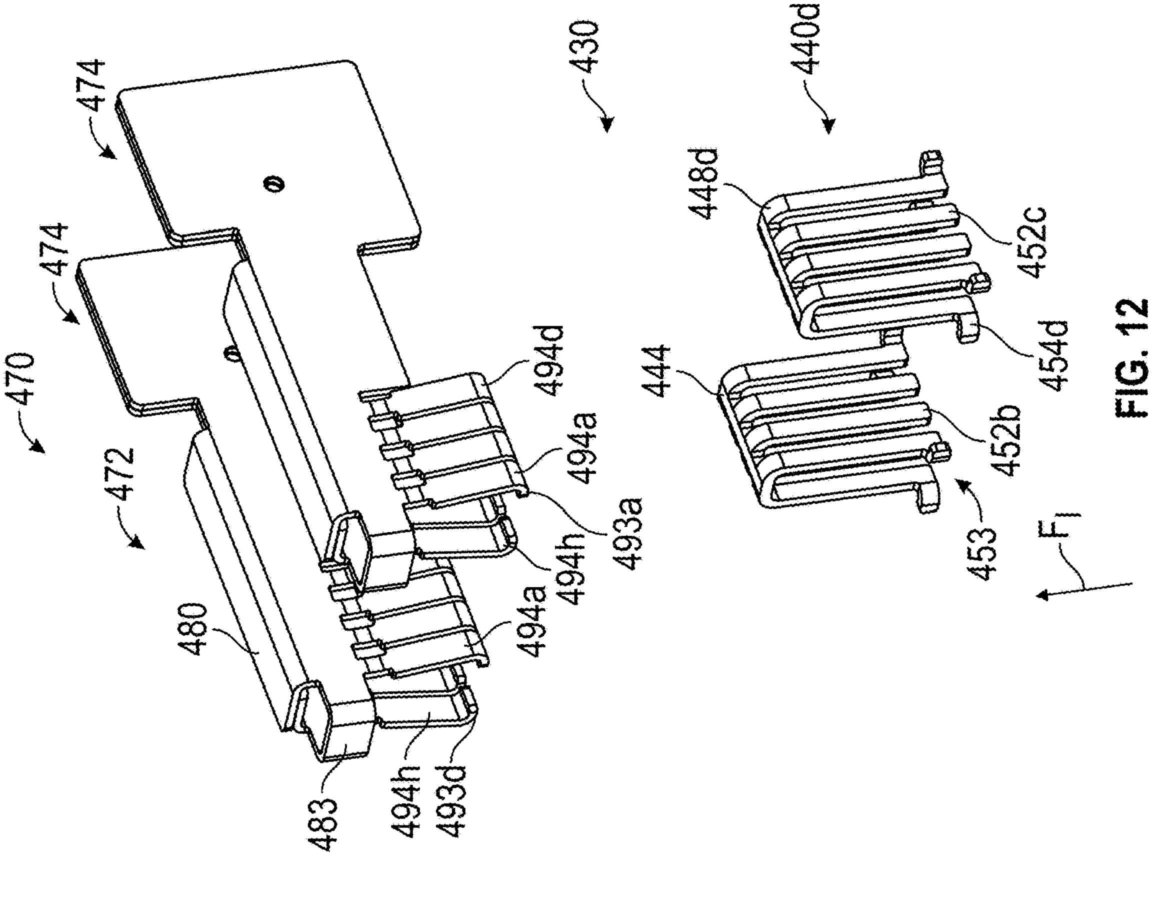
FIG. 12 is a perspective view of the male terminal assemblies of FIG. 3 in a unseated state.
Figure 14A:
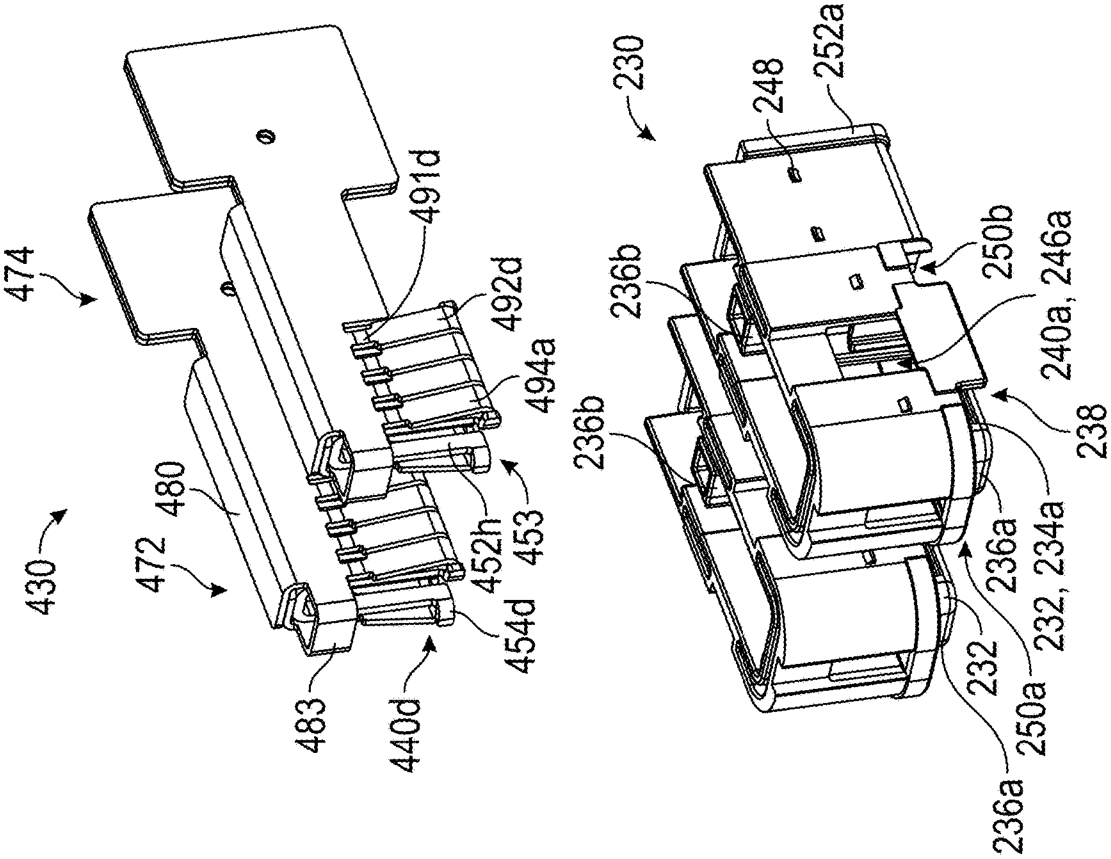
FIG. 14A is a perspective view of the male terminal assemblies and male terminal holders of FIG. 3 in an uncoupled state.
Figure 13B:
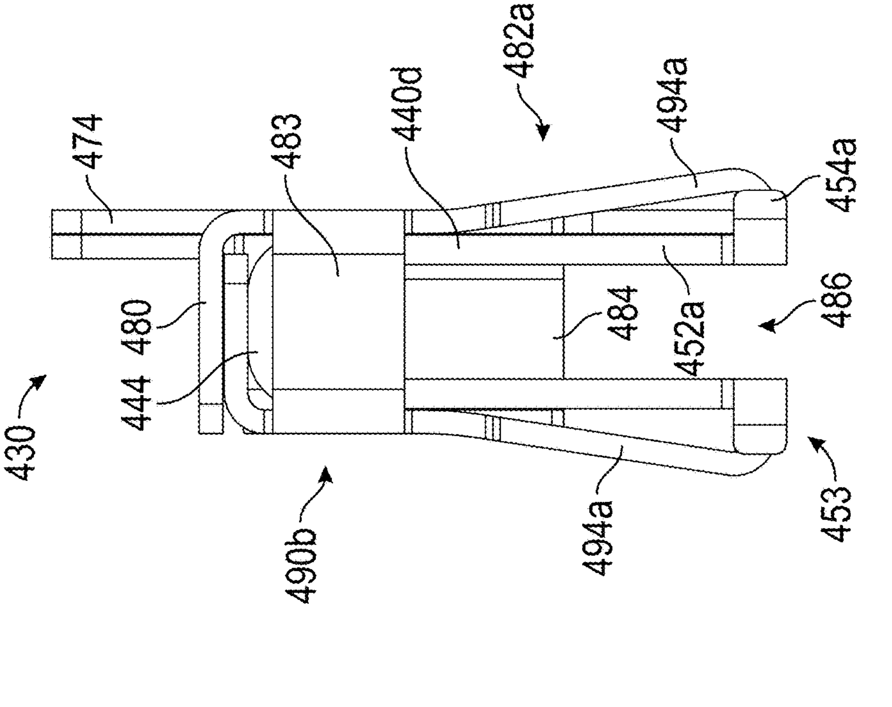
FIG. 13B is an end view of the male terminal assembly of FIG. 11.
Figure 14B:
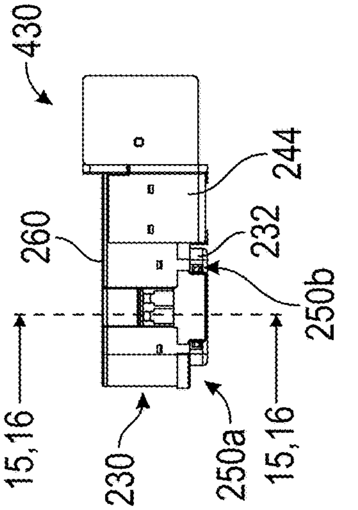
FIG. 14B is a side view of the male terminal assembly and the male terminal holder of FIG. 13 in a coupled state.
Figure 15:
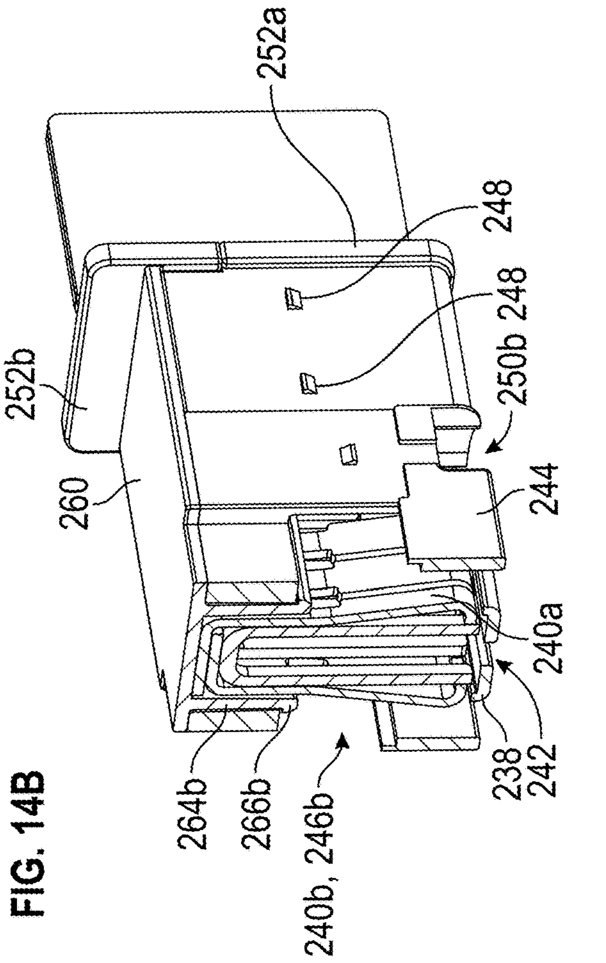
FIG. 15 is a perspective cross-sectional view of the male terminal assembly and the male terminal holder taken along line 15-15 of FIG. 14B.
Figure 16:
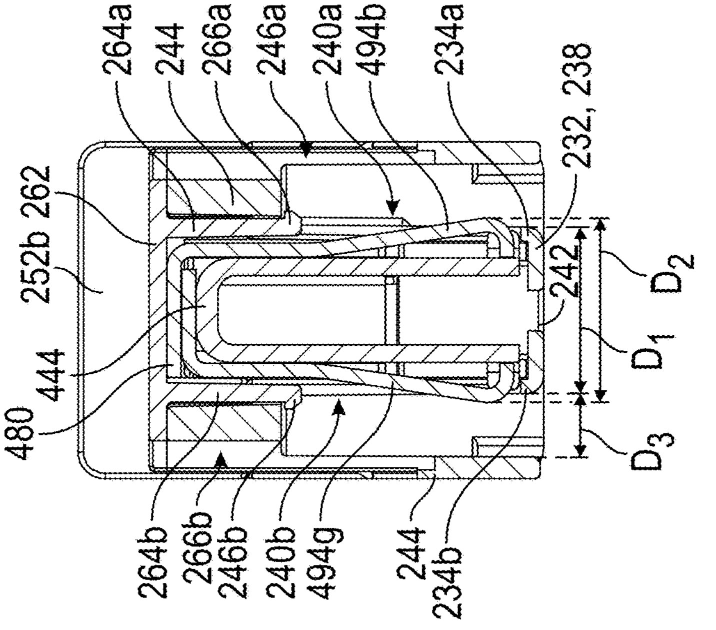
FIG. 16 is a cross-sectional view of the male terminal assembly and the male terminal holder taken along line 16-16 of FIG. 14B.
Figure 17:
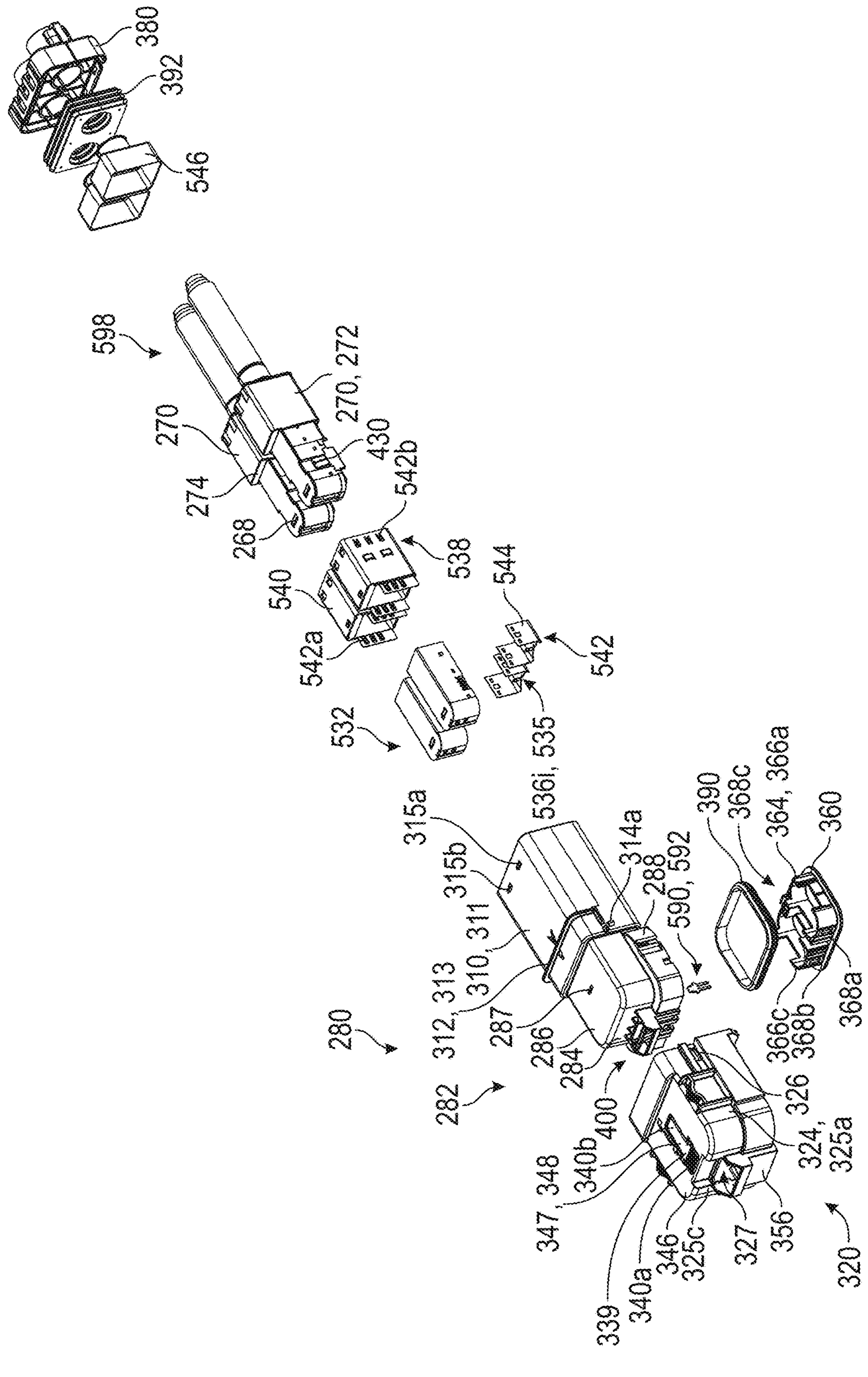
FIG. 17 is a perspective view of the male connector assembly of FIG. 3 in a first partially assembled state, where are separated from the male terminal assemblies, male terminal holders, and conductor leads.
Figure 18:
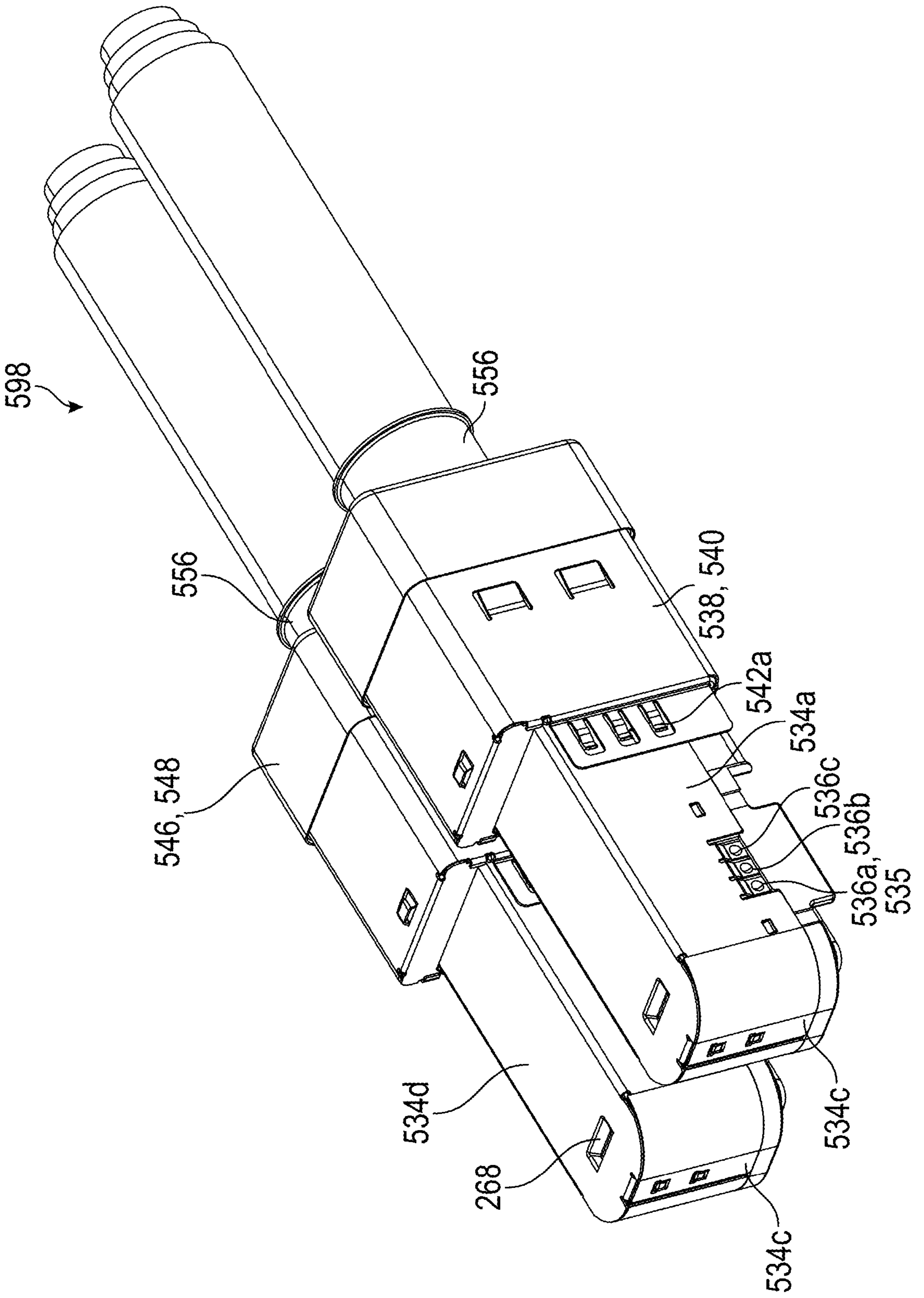
FIG. 18 is a perspective view of the male shielding assemblies are not separated from and partially surround the male terminal assembly, the male terminal holder, and the conductor lead.

As best shown in FIGS. 3 and 13-17, the male housing assembly 220 includes: (i) male terminal holder 230, (ii) shield insulator 260, (iii) main housing 280, (iv) a primary locking member 320, (v) a secondary locking member 360, (vi) an end cap 380, and (vii) seals 390, 392. Referring to FIGS. 13-15, the male terminal holder 230 is configured to receive the male terminal assembly 430, isolate the male shielding assembly 530 from the male terminal assembly 430, facilitate positioning and retaining the male terminal assembly 430 in the male connector assembly 200, and other functions that are obvious to one of skill in the art based on the below disclosure and figures. The male terminal holder 230 has an interior wall arrangement 232 that is bowl shaped and configured to snugly receive the male terminal assembly 430. Specifically, the interior wall arrangement 232 includes two side walls **234*a*, 234*b*, two end walls 236*a*, 236*b*, and a bottom wall 238. Contact arm apertures 240*a*, 240*b* are formed in an intermediate portion of the two side wall in order to allow the male terminal assembly 430 to make contact with the female terminal assembly 800, when the connector system 10 is in the connected state. As best shown in FIG. 16, the distance $D_2$ between opposed outermost extents of the contact arms 494*a*-494*h* is greater than the distance $D_1$ between opposed outermost surfaces of the side walls 234*a*, 234*b*. This configuration allows the contact arms 494*a*-494*h* to make contact with the female terminal assembly 800 without be obstructed by the side walls 234*a*, 234*b*. This configuration provides additional rigidity to the male terminal assembly 430 and limits the exposed amount of the male terminal assembly 430. However, due in part to the contact arm apertures 240***a*, 240*b* the entire male terminal assembly 430 is not encased by the male terminal holder 230.

It should be understood that the further the male terminal assembly 430 extends past the outer surface of the side walls 234*a*, 234*b*, there is a greater chance that male terminal assembly 430 will accidentally come into contact within a foreign object. Thus, the extent of the male terminal assembly 430 that extends past the outer surface of the side walls 234*a*, 234*b* needs to balance the ability to form a proper connection with the female terminal assembly 800. The design disclosed herein balances these factors and the extent of the male terminal assembly 430 extends beyond the outer surface of the side walls 234*a*, 234*b* by less than 2 mm and preferably less than 0.5 mm. In comparison to the length of the contact arm apertures 240*a*, 240*b*, the extent of the male terminal assembly 430 extends beyond the outer surface of the side walls 234*a*, 234*b* is less than 5% of the length and preferably less than 3% of the length. The bottom wall 238 of the interior wall arrangement 232 includes a touch-proof element opening 242, which is designed to receive an extent of the female touch-proof member 720, when the connector system 10 is in the connected state. In particular, the touch-proof element opening 242 mirrors the shape of the touch-proof element 720. Here, the touch-proof element 720 has an "I-shape" and thus the touch-proof element opening 242 also has an "I-shape." As discussed below, other shapes of the touch-proof element 720 are contemplated by this disclosure and accordingly other shapes of the touch-proof element opening 242 are also contemplated by this disclosure.

The male terminal holder 230 also includes exterior wall arrangement 244 that: (i) surrounds the side and end walls 234*a*, 234*b*, 236*a*, 236*b*, (ii) is spaced away a receiver distance $D_3$ away from the interior wall arrangement 232, and (iii) separates the male shielding assembly 530 from the male terminal assembly 430. Specifically, the receiver distance $D_3$ is designed to receive an extent of the female terminal assembly 800, when the connector is in the connected state. However, receiver distance $D_3$ is configured such that it are not large enough to accept the insertion of an assembler's finger, a probe, or another foreign object. For example, the receiver distance $D_3$ may be less than 10 mm, preferably less than 6 mm, and most preferably less than 3.5 mm. The exterior wall arrangement 244 includes: (i) coupling openings 246*a*, 246*b* that are designed to receive an extent of the shield insulator 260, (ii) a plurality of projections 248 that secure an extent of the male shielding assembly 530 to the male terminal holder 230, (iii) an arrangement of recesses 250*a*-250*d* that are designed to receive an extent of the secondary locking member 360, and (iv) a first extent of a retaining lip 252*a* is positioned adjacent to the frontal edge of the male terminal connection plate 474. Each of these features will be discussed below in connection with other components of the connector system 10.

The male terminal holder 230 is configured to be placed in contact with both the shielding assembly 60 and the male terminal assembly 430; thus, it is desirable to form the male terminal holder 230 from a non-conductive material. It should be understood that the non-conductive material that is chosen should be able to sufficiently isolate the terminal assembly 430, even when a high current load is flowing through the terminal assembly 430. As discussed in other parts of this application, the male terminal holder 230 may be formed using any suitable method, such as injection molding techniques, 3D printing, cast, thermoformed, or any other similar technique. In other embodiments, the configuration of the interior wall arrangement 232 and the exterior wall arrangement 244 may have a different configuration to accommodate a different shaped male terminal assembly 430. For example, the interior wall arrangement 232 may be modified to include openings formed in the end walls 236*a*, 236*b* to accommodate a male terminal assembly 430 that includes contact arms 494*a*-494*h* that are positioned on all sides of the assembly 430 in order to be 360 degree compliant. Alternatively, the interior wall arrangement 232 may have a substantially circular, triangular, hexagonal configuration.

Still referring to FIGS. 13-17, the shield insulator 260 includes a cap 262 and a shroud 270, which are designed to mechanically interact with or engage with the male terminal holder 230. In particular, the cap 262 includes: (i) a horizontal portion, (ii) two vertical deformable projections 264*a*, 264*b* that extend downward from the horizontal portion, (iii) two securing elements 266*a*, 266*b* that extend from the vertical deformable projections 264*a*, 264*b*, (iv) a second extent of a retaining lip 252*b*, and (v) a securing recess 268. When the cap 262 is secured to the male terminal holder 230: (i) the securing elements 266*a*, 266*b* are positioned in the coupling openings 246*a*, 246*b*, and (ii) the vertical deformable projections 264*a*, 264*b* are removable positioned between the male terminal assembly 430 and the exterior wall arrangement 244. In this secured position, the male terminal assembly 430 is mechanically secured in the male terminal holder 230 and isolated from the shielding assembly 60.

The shroud 270 includes: (i) a rectangular arrangement of walls 272 that are designed to surround the male terminal connection plate 474 and an extent of the conductor 598, and (ii) coupling features 274 that secure the shroud 270 to the male terminal holder 230. Specifically, the coupling features 274 are designed to interact with the first and second extents of the retaining lip 252*a*, 252*b* in order to ensure that the cap 262 does not accidently become dislodged from the male terminal holder 230 and to separate the shielding assembly 60 from the male terminal connection plate 474. Like the male terminal holder 230, the shield insulator 260 is designed to be placed in contact with both the male terminal assembly 430 and the shielding assembly 60. Therefore, like the male terminal holder 230, it is desirable to form the shield insulator 260 from a non-conductive material. It should be understood that the non-conductive material that is chosen should be able to sufficiently isolate the terminal assembly 430, even when a high current load is flowing through the terminal assembly 430. As discussed in other parts of this application, the shield insulator 260 may be formed using any suitable method, such as injection molding techniques, 3D printing, cast, thermoformed, or any other similar technique.

Figure 85:
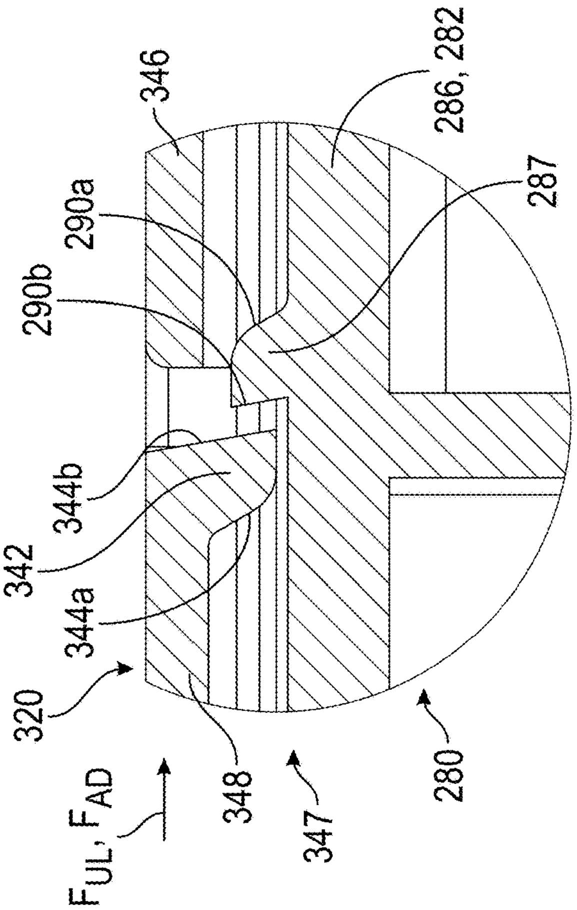
FIG. 85 is a zoomed-in view of area M of the connector system of FIG. 84 showing the accidental disengagement assembly.
Figure 65:
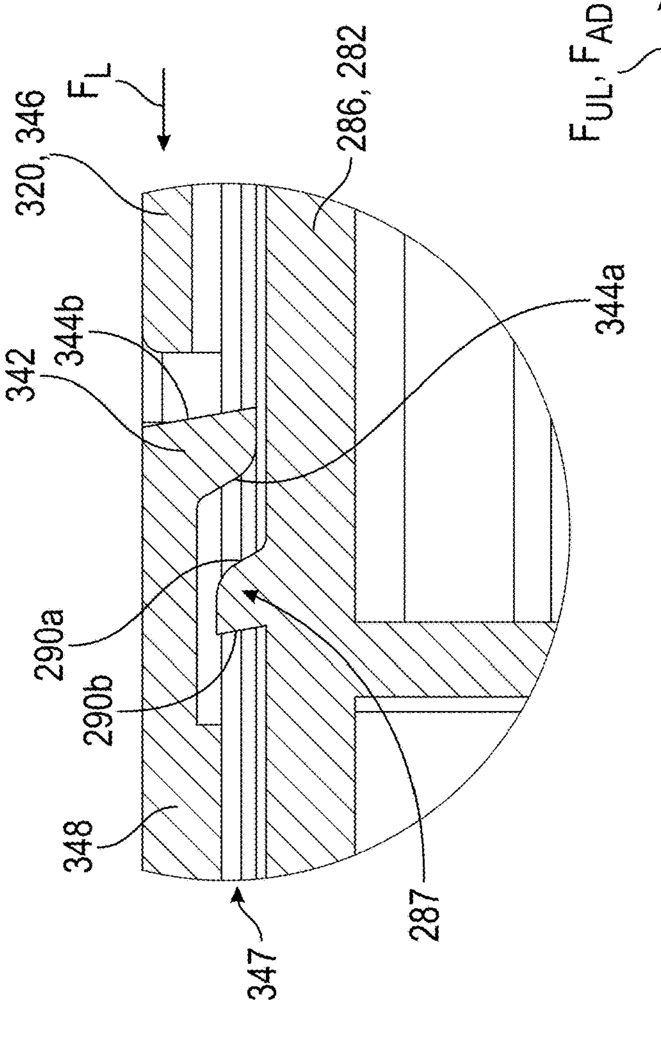
FIG. 65 is a zoomed-in view of area E of the connector system of FIG. 64 showing the accidental disengagement assembly.
Figure 76:
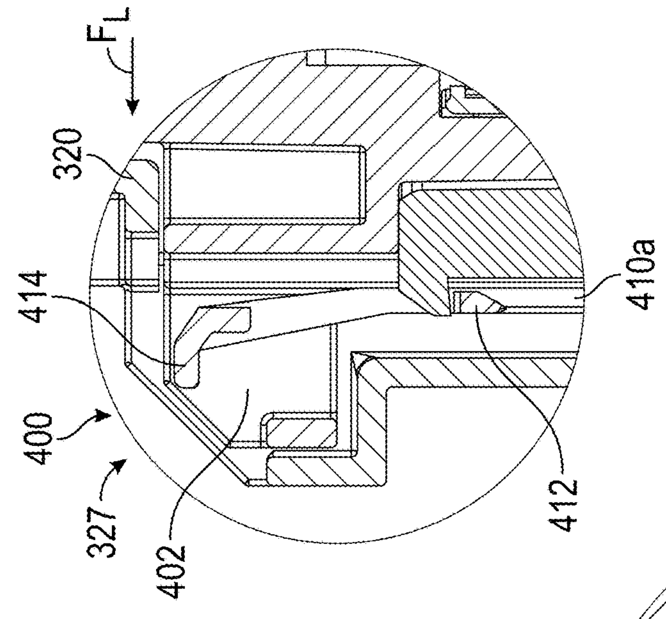
FIG. 76 is a zoomed-in view of area J of the connector system of FIG. 64 showing the CPA assembly.
Figure 86:
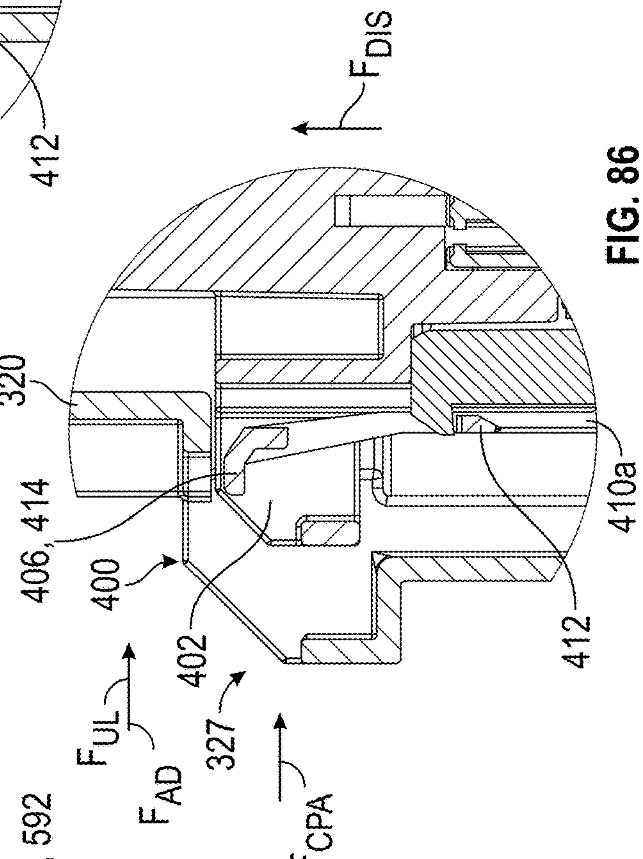
FIG. 86 is a zoomed-in view of area N of the connector system of FIG. 84 showing the CPA assembly.
Figure 66:
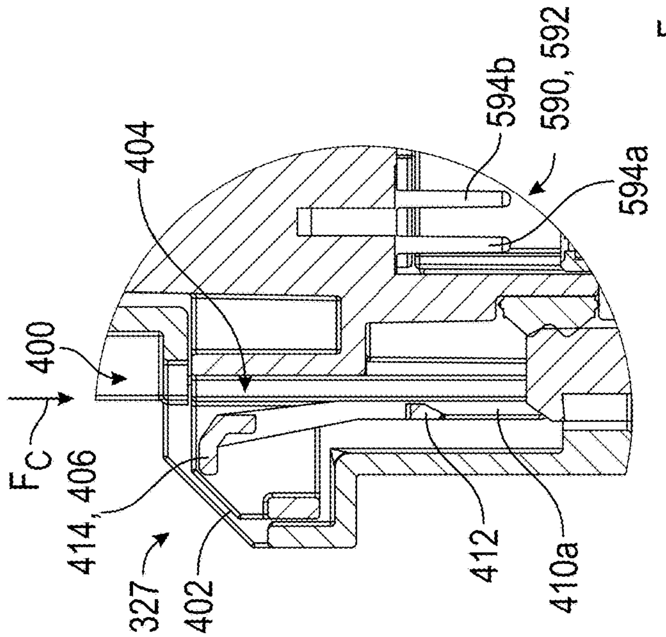
FIG. 66 is a zoomed-in view of area F of the connector system of FIG. 64 showing the CPA assembly.
Figure 68:
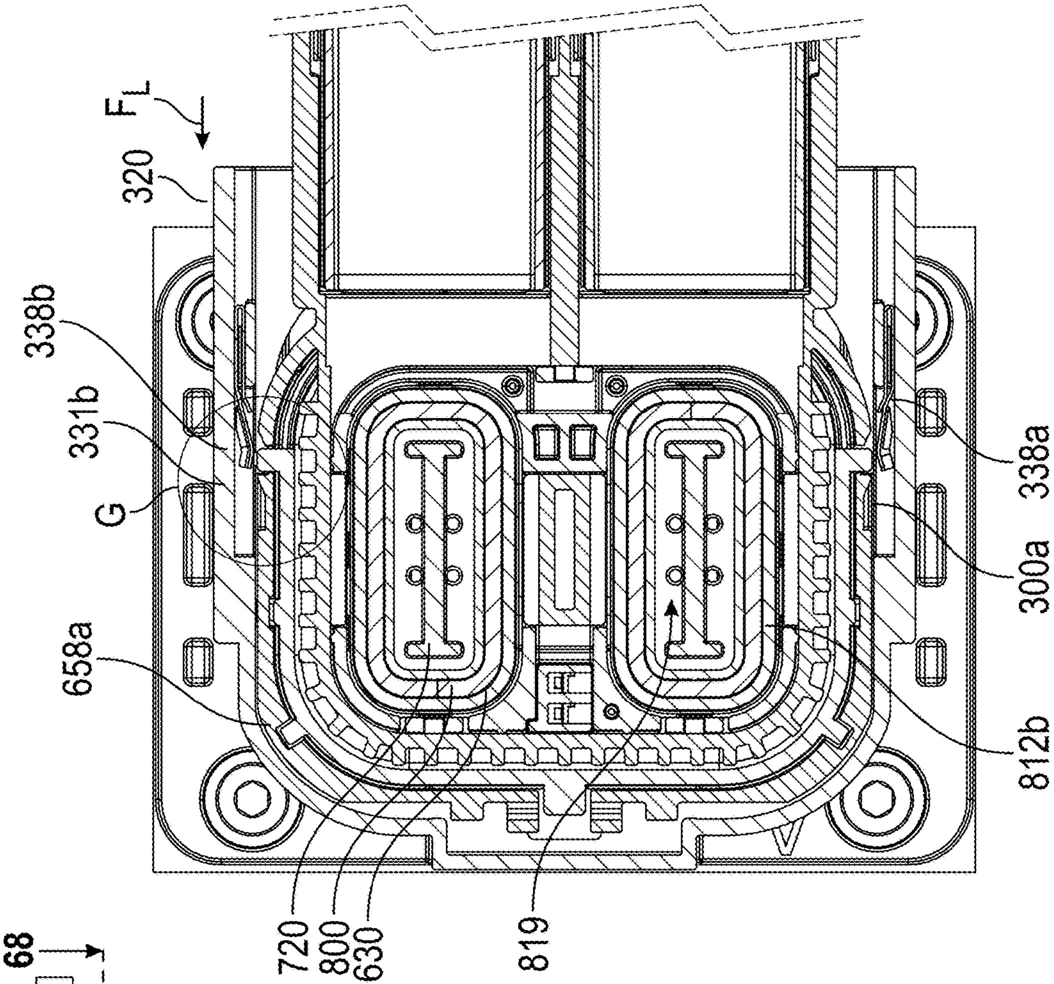
FIG. 68 is a cross-sectional view of the connector system taken along line 68-68 of FIG. 67.
Figure 67:
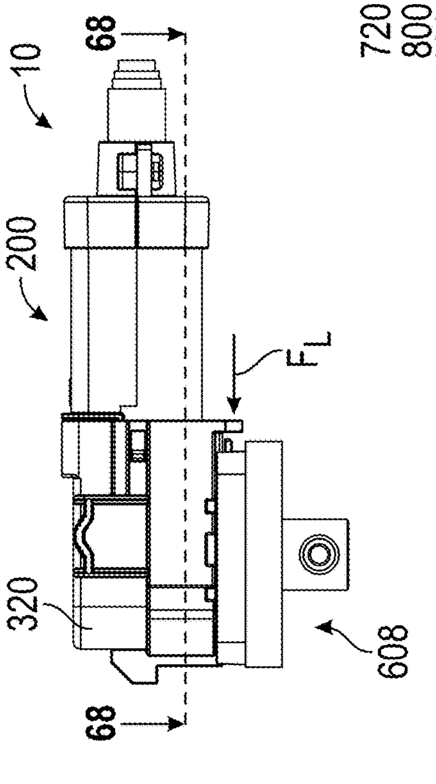
FIG. 67 is a side view of the connector system of FIG. 1 in a connected state, where the male connector assemblies are fully seated in the female connector assemblies and the primary locking member is in an unlocked state.
Figure 71:
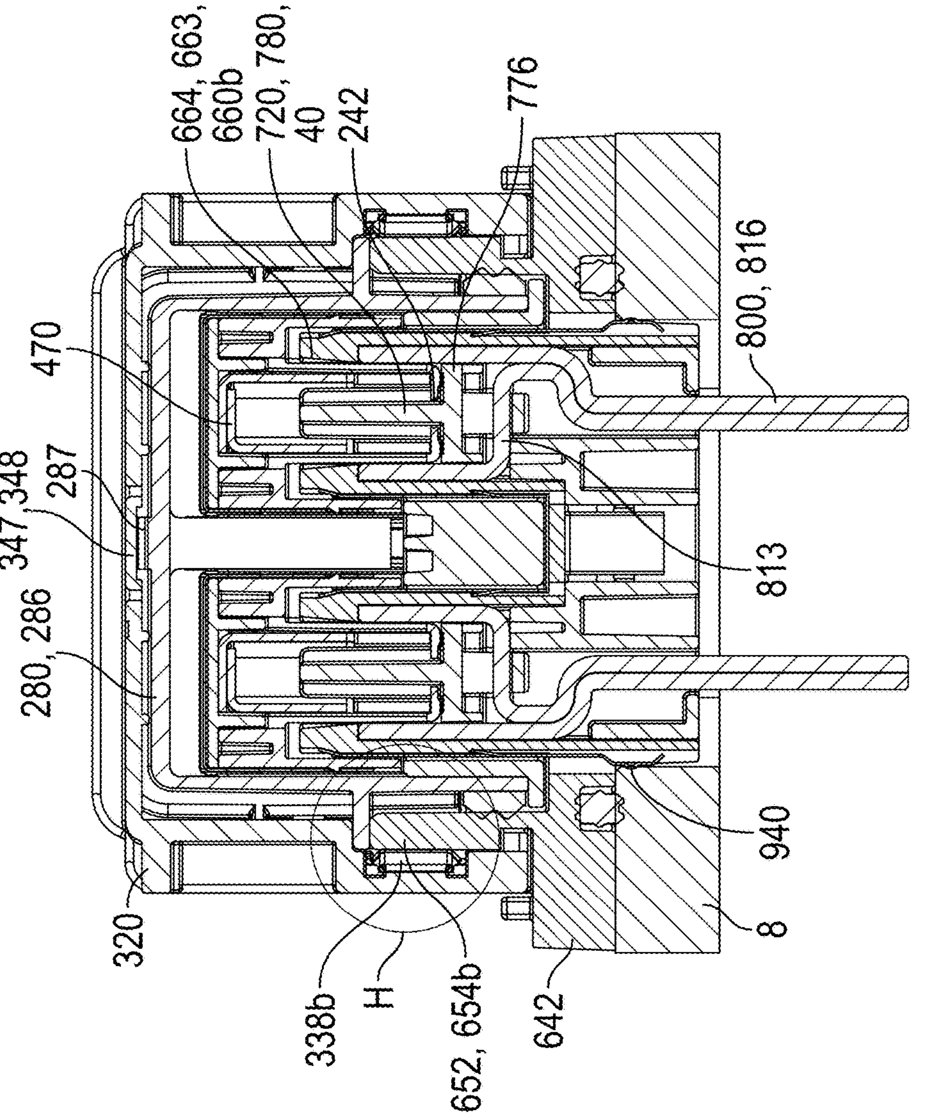
FIG. 71 is a cross-sectional view of the connector system taken along line 71-71 of FIG. 70.
Figure 70:
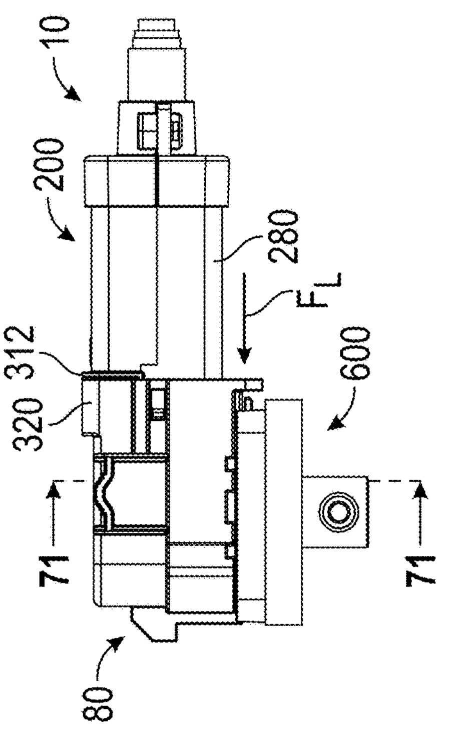
FIG. 70 is a side view of the connector system of FIG. 1 in the connected state.
Figure 74:
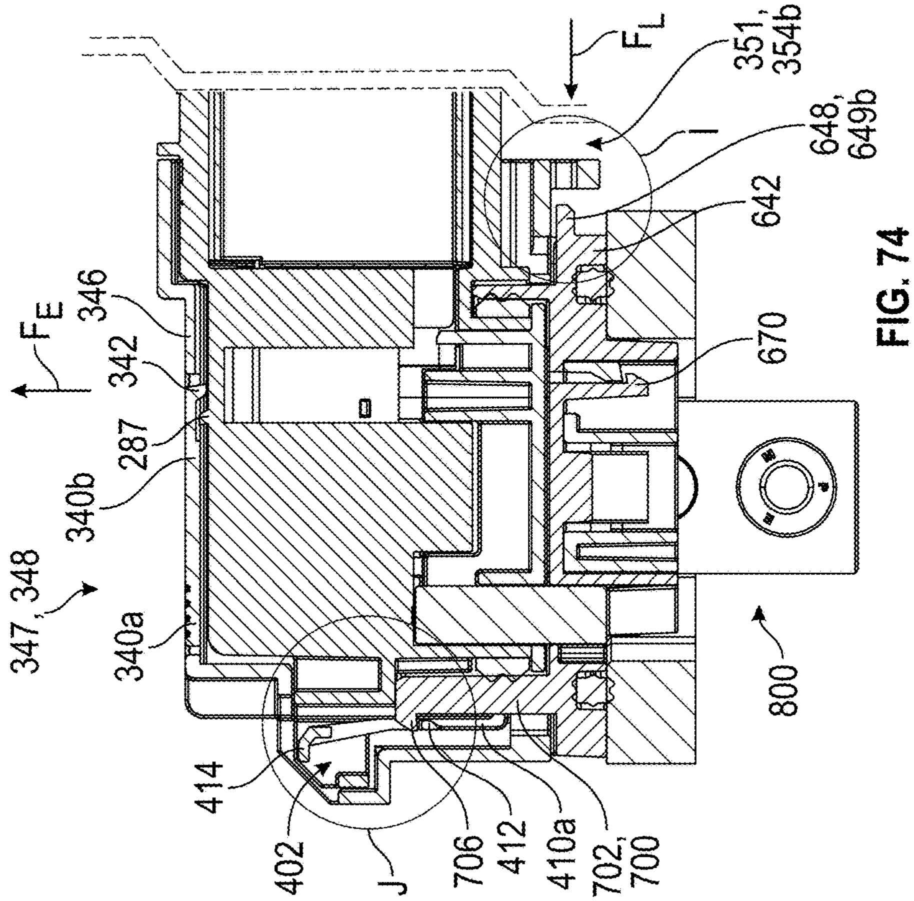
FIG. 74 is a cross-sectional view of the connector system taken along line 74-74 of FIG. 73.
Figure 73:
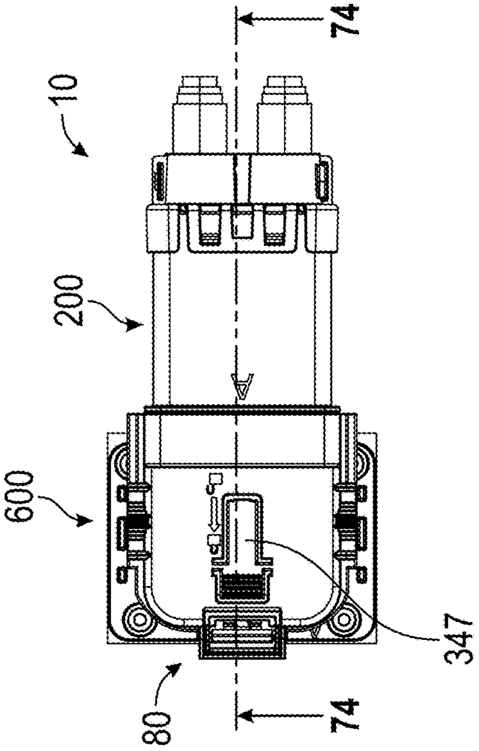
FIG. 73 is a top view of the connector system of FIG. 1 in the connected state.
Figure 87:
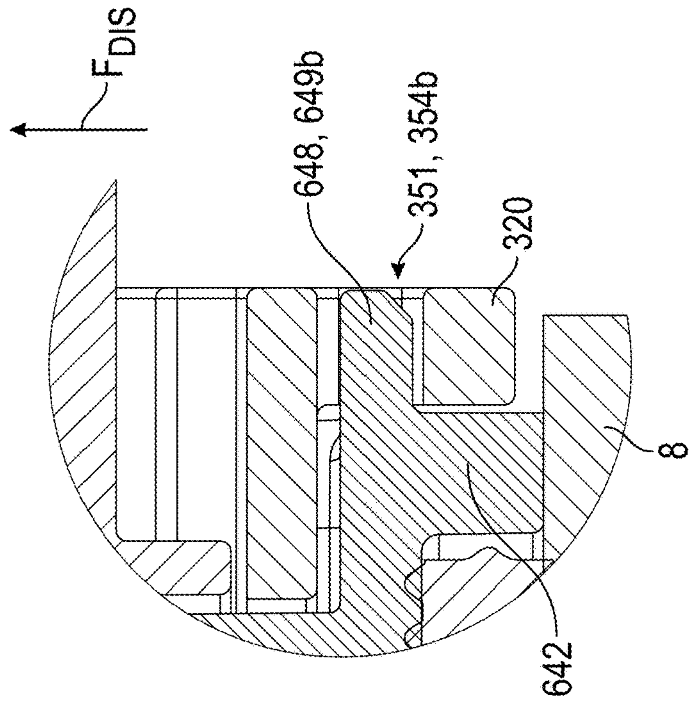
FIG. 87 is a zoomed-in view of area O of the connector system of FIG. 84 showing the bracing assembly.
Figure 75:
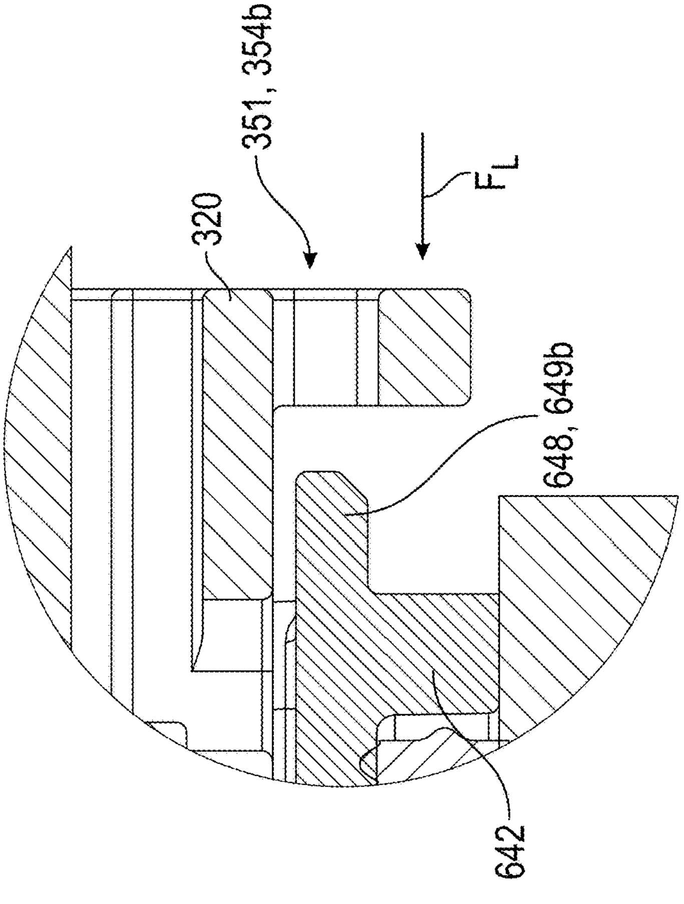
FIG. 75 is a zoomed-in view of area I of the connector system of FIG. 64 showing the bracing assembly.
Figure 78:
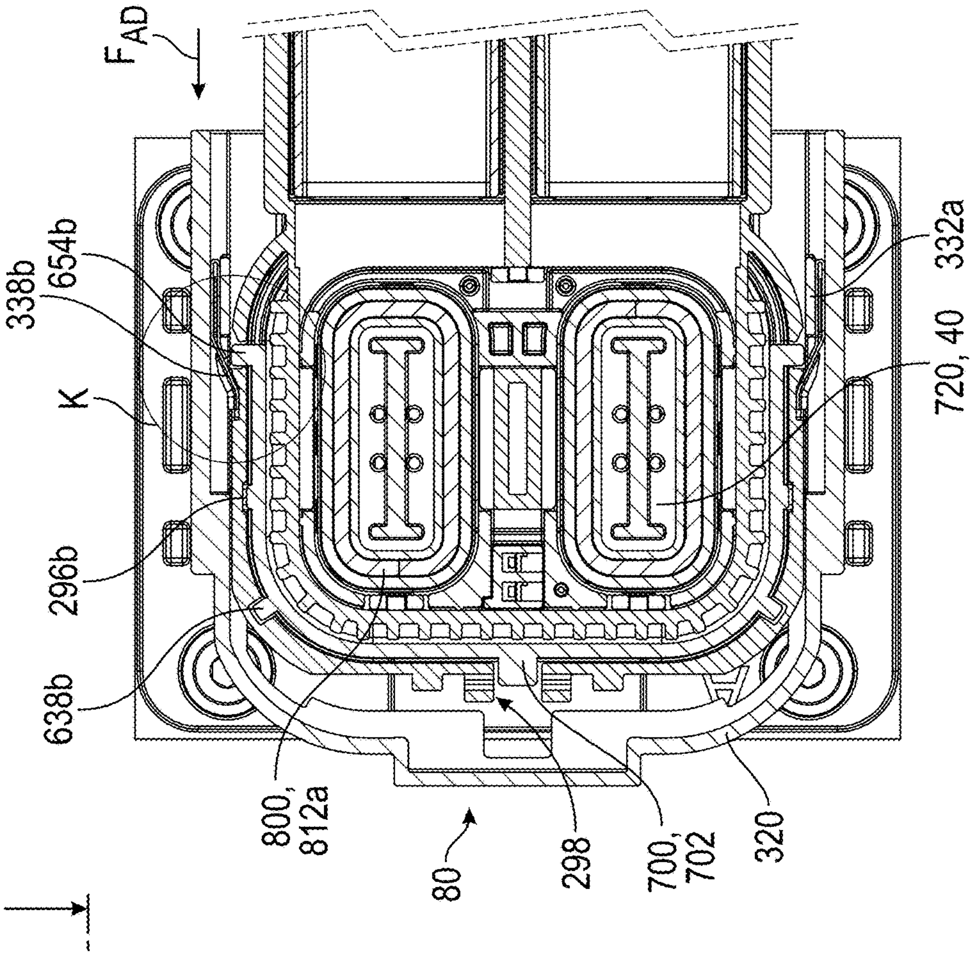
FIG. 78 is a cross-sectional view of the connector system taken along line 78-78 of FIG. 77.
Figure 77:
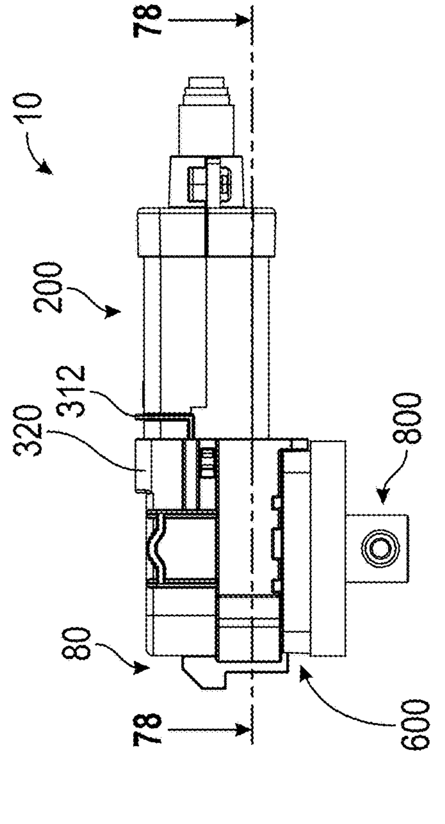
FIG. 77 is a side view of the connector system of FIG. 1 in a ready to use state, where the male connector assemblies are fully seated in the female connector assemblies and the primary locking member is in a locked state.
Figure 81:
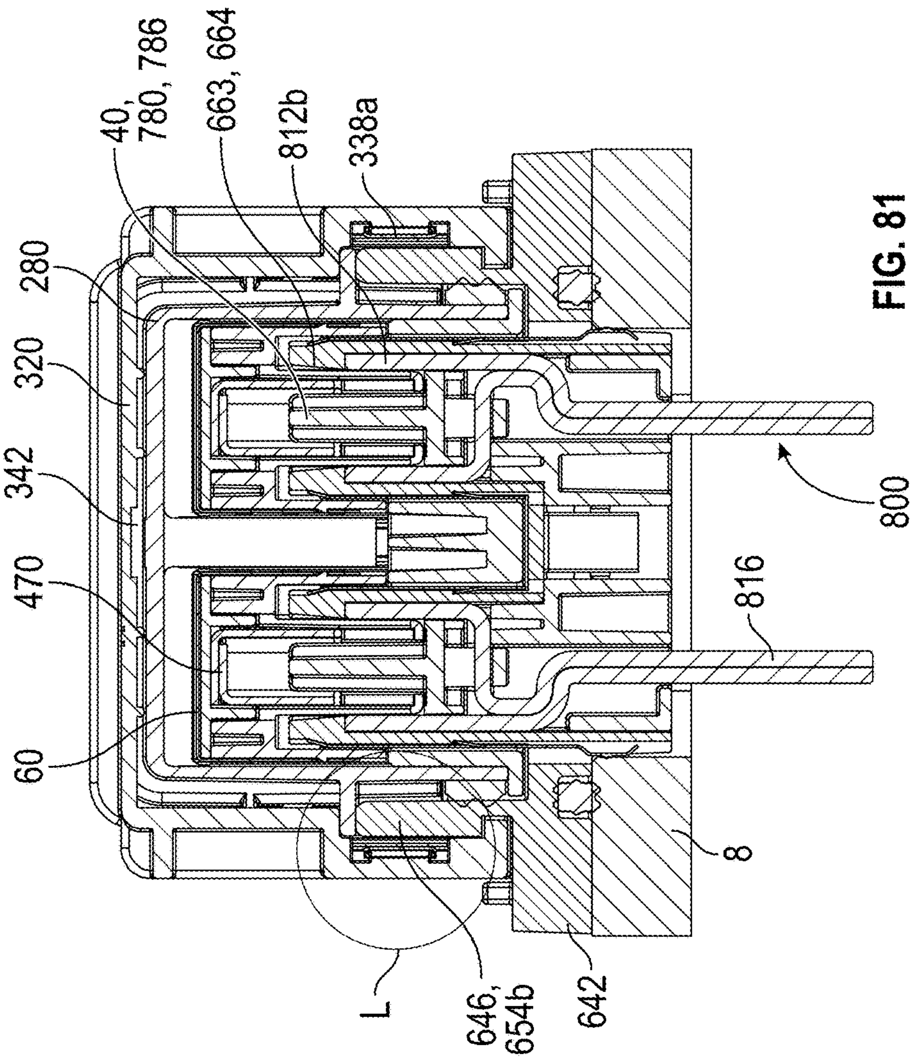
FIG. 81 is a cross-sectional view of the connector system taken along line 81-81 of FIG. 80.
Figure 80:
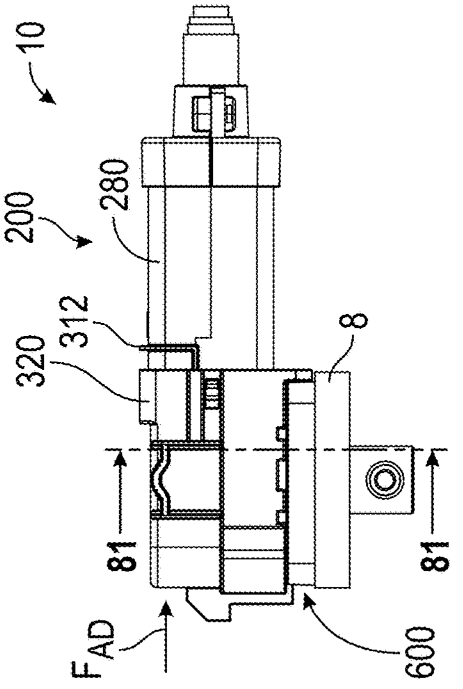
FIG. 80 is a side view of the connector system of FIG. 1 in the ready to use state.
Figure 84:
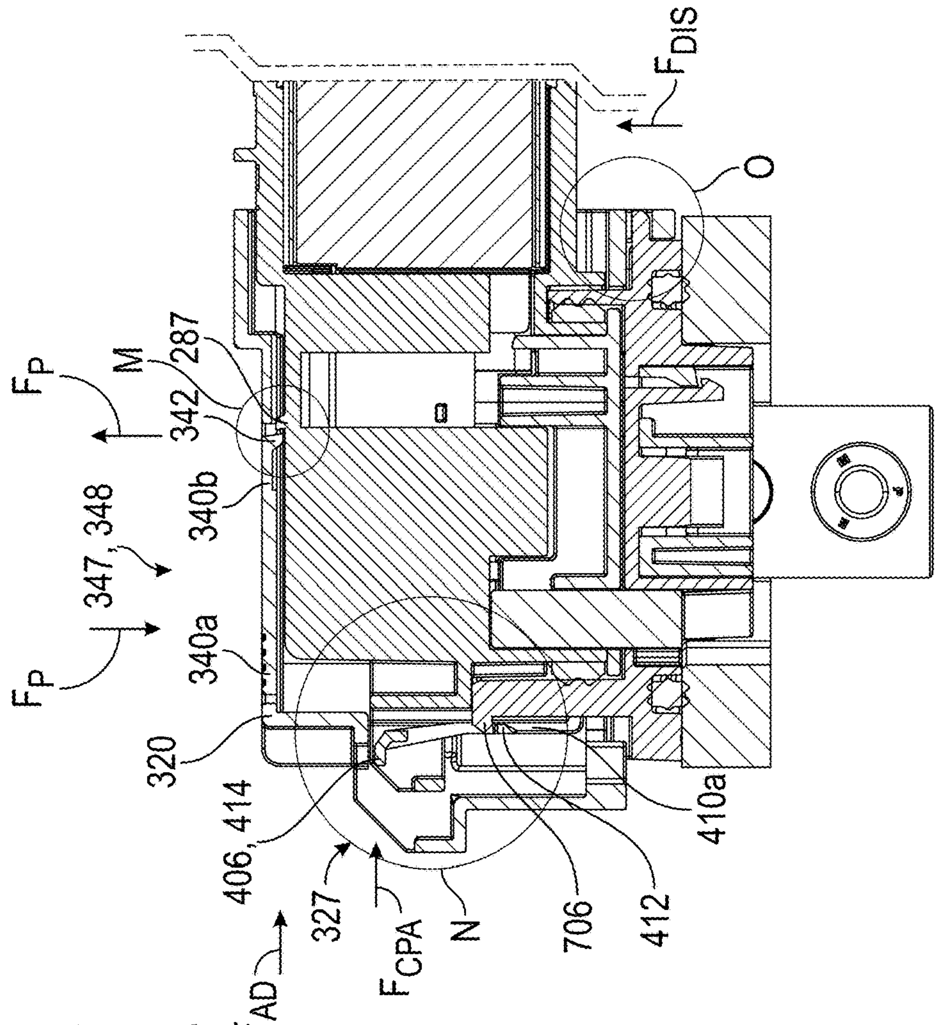
FIG. 84 is a cross-sectional view of the connector system taken along line 84-84 of FIG. 83.
Figure 83:
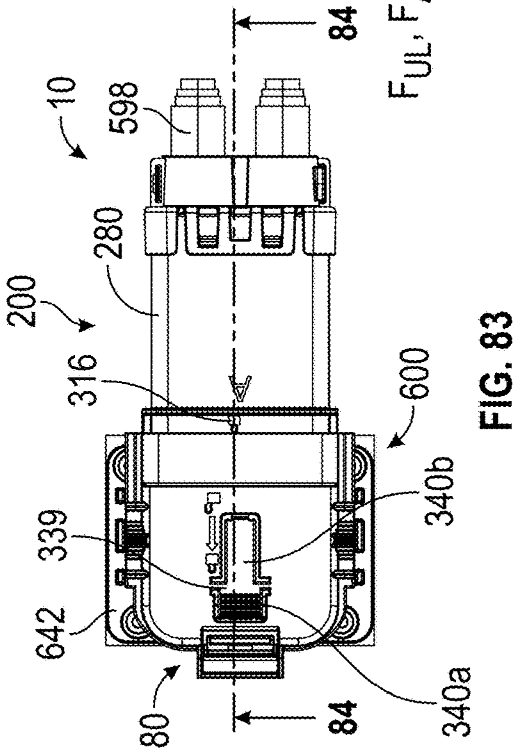
FIG. 83 is a top view of the connector system of FIG. 1 in the ready to use state.
Figure 89:
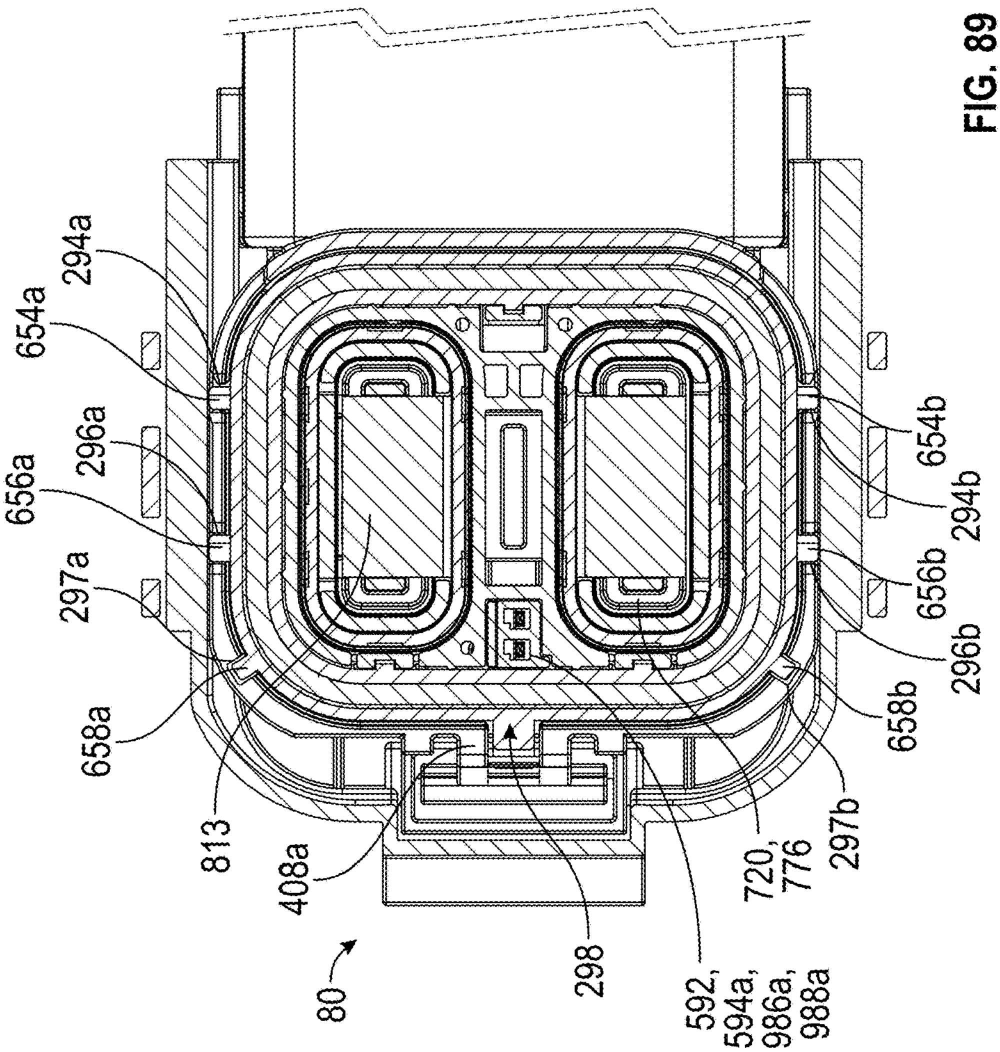
FIG. 89 is a cross-sectional view of the connector system taken along line 89-89 of FIG. 88.
Figure 88:
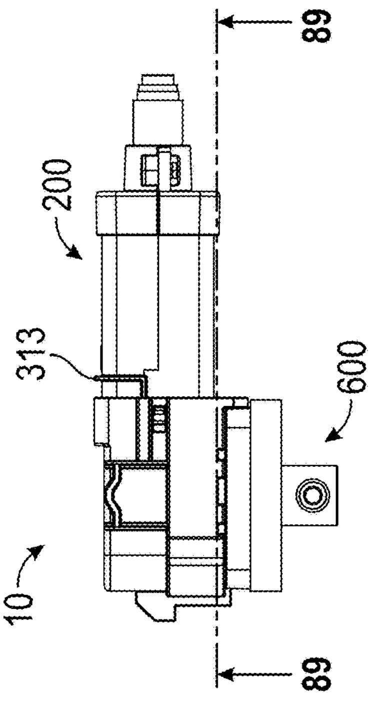
FIG. 88 is a side view of the connector system of FIG. 1 in the ready to use state.
Figure 91:
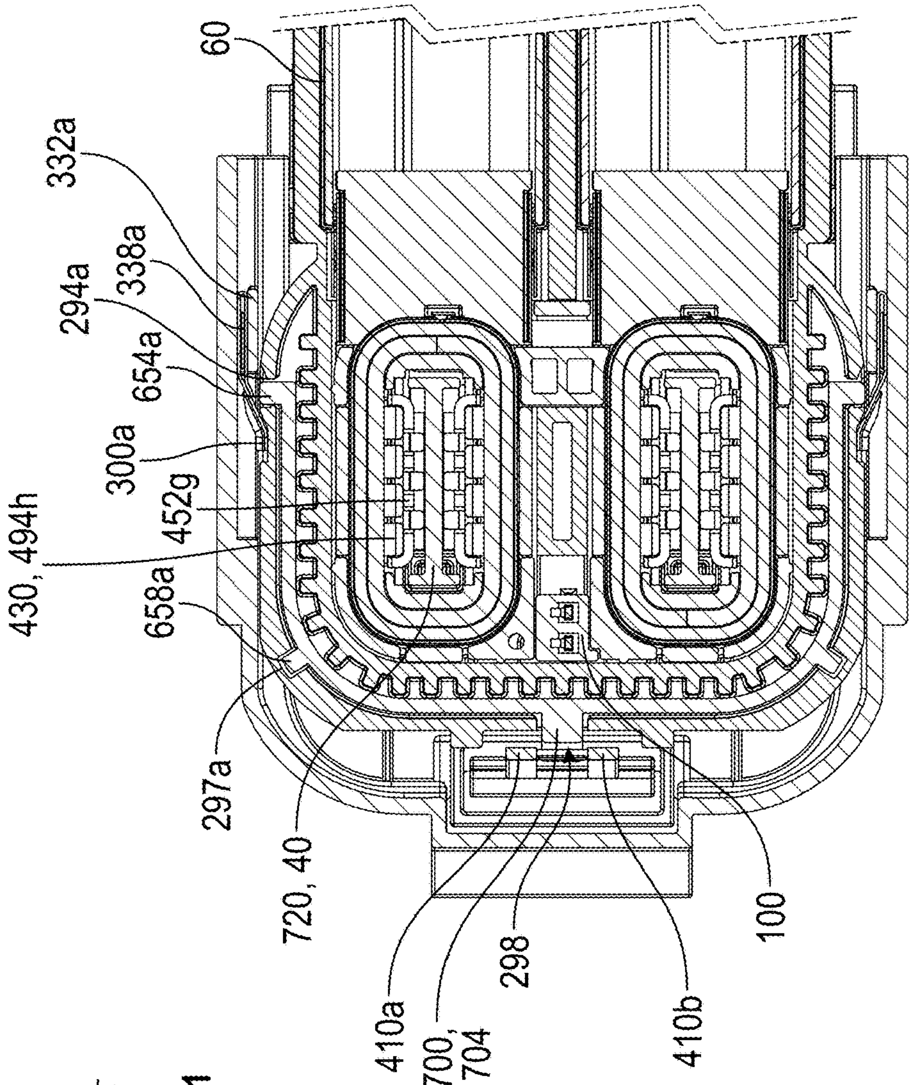
FIG. 91 is a cross-sectional view of the connector system taken along line 91-91 of FIG. 90.
Figure 90:
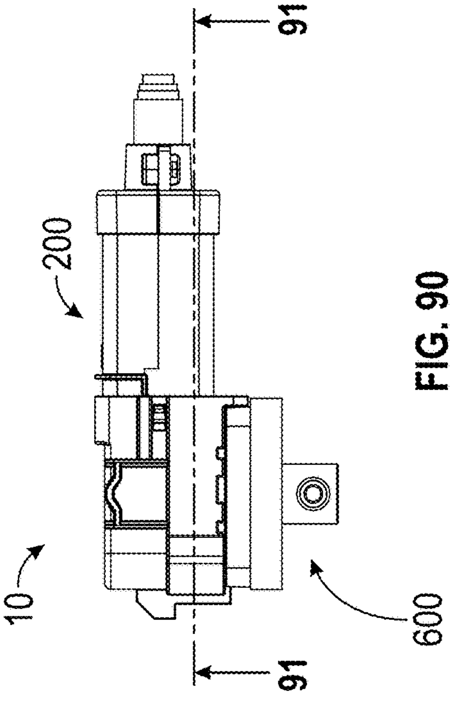
FIG. 90 is a side view of the connector system of FIG. 1 in the ready to use state.
Figure 92:
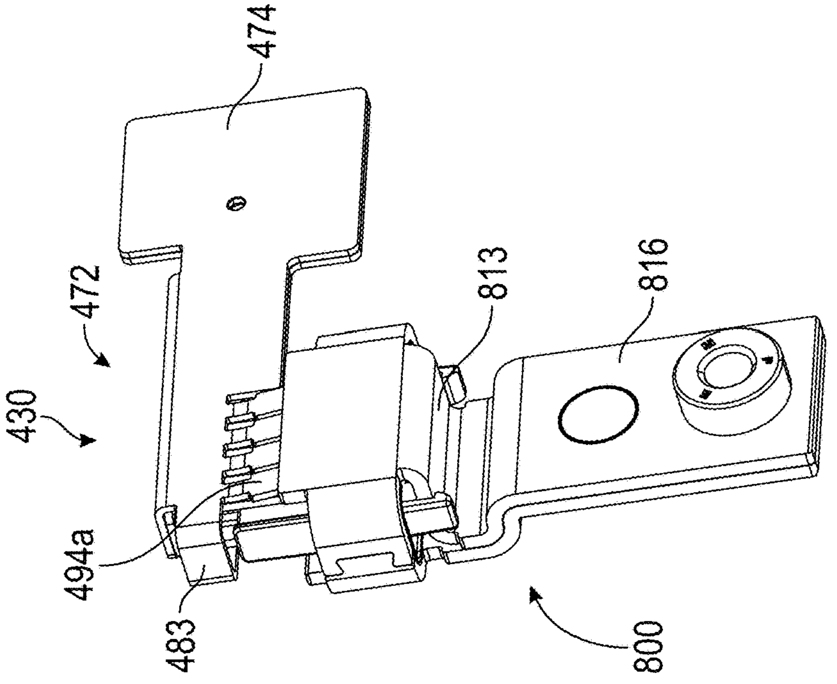
FIG. 92 is a bottom perspective view of the connector system of FIG. 1 in a connected state, where all components have been omitted except the male terminal assembly, female terminal assembly and the touch-proof assembly.
Figure 94:
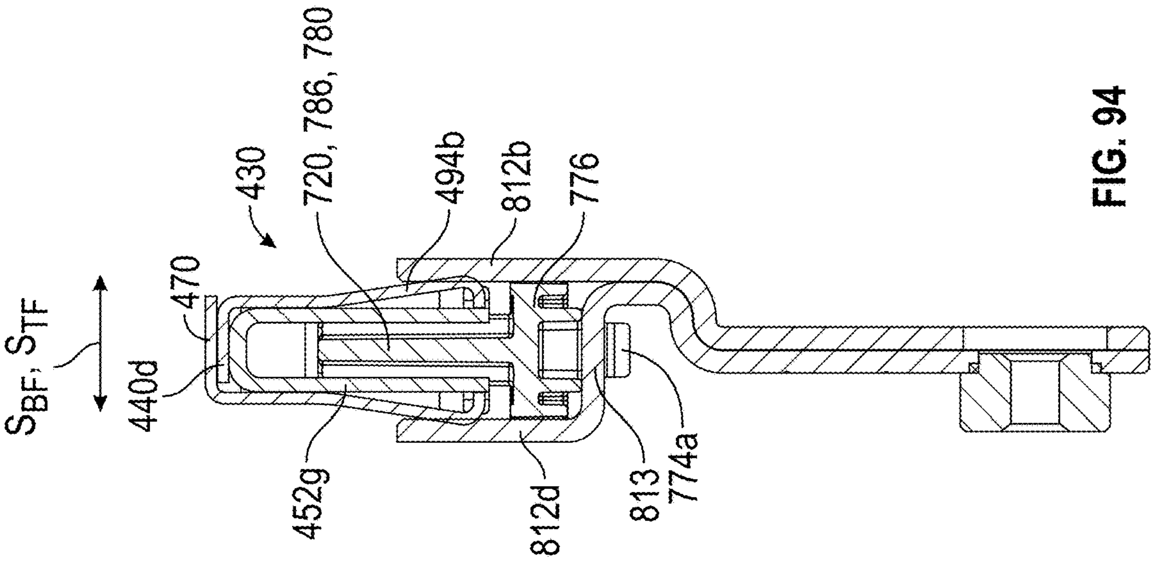
FIG. 94 is a cross-sectional view of the male terminal assembly, female terminal assembly and the touch-proof assembly taken along line 94-94 of FIG. 93.
Figure 93:
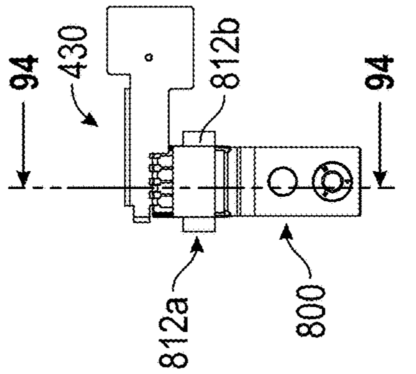
FIG. 93 is a side view of the male terminal assembly, female terminal assembly and the touch-proof assembly of FIG. 92.
Figure 96:
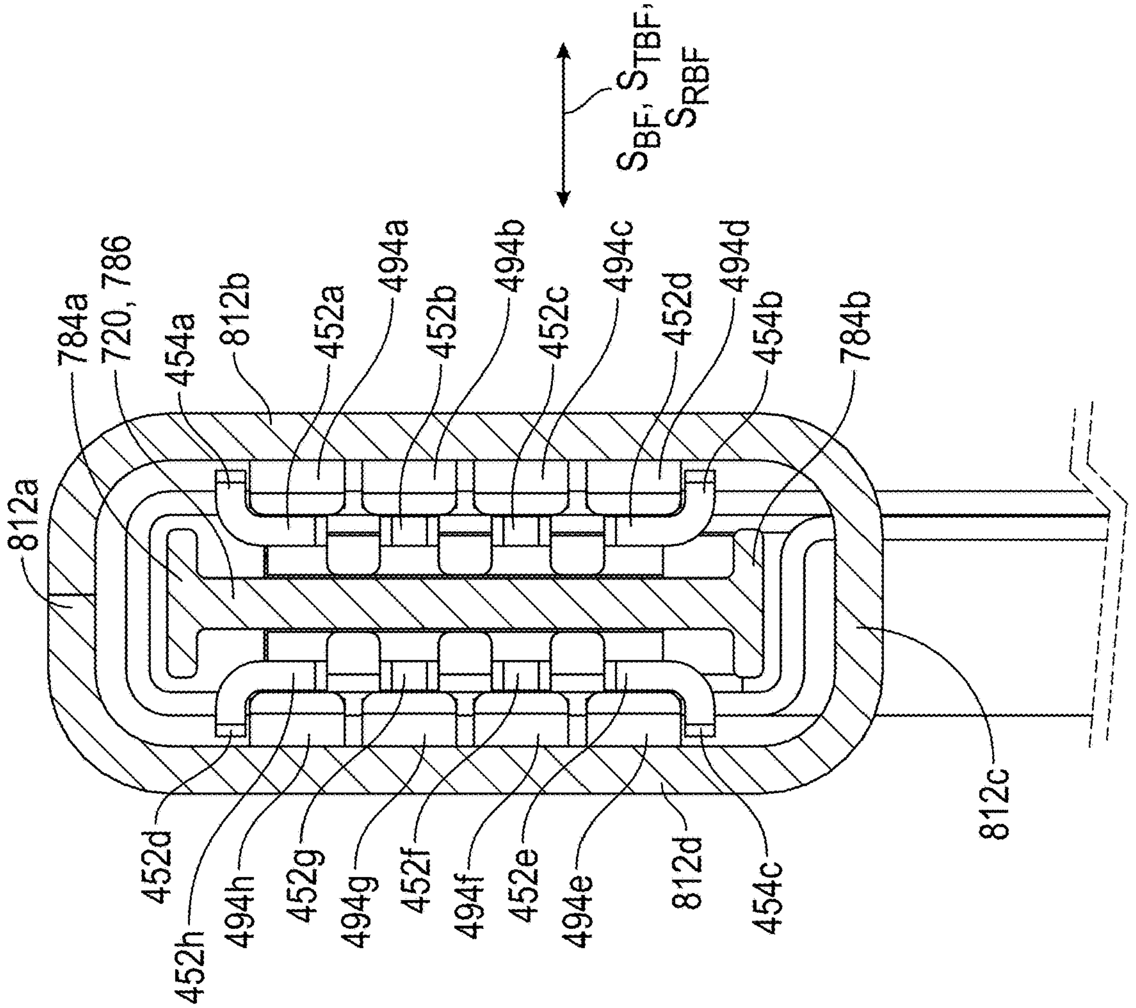
FIG. 96 is a cross-sectional view of the male terminal assembly, female terminal assembly and the touch-proof assembly taken along line 96-96 of FIG. 95.
Figure 95:
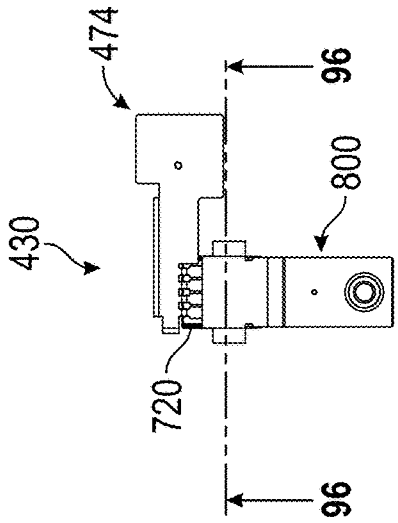
FIG. 95 is a side view of the male terminal assembly, female terminal assembly and the touch-proof assembly of FIG. 92.
Figure 99B:
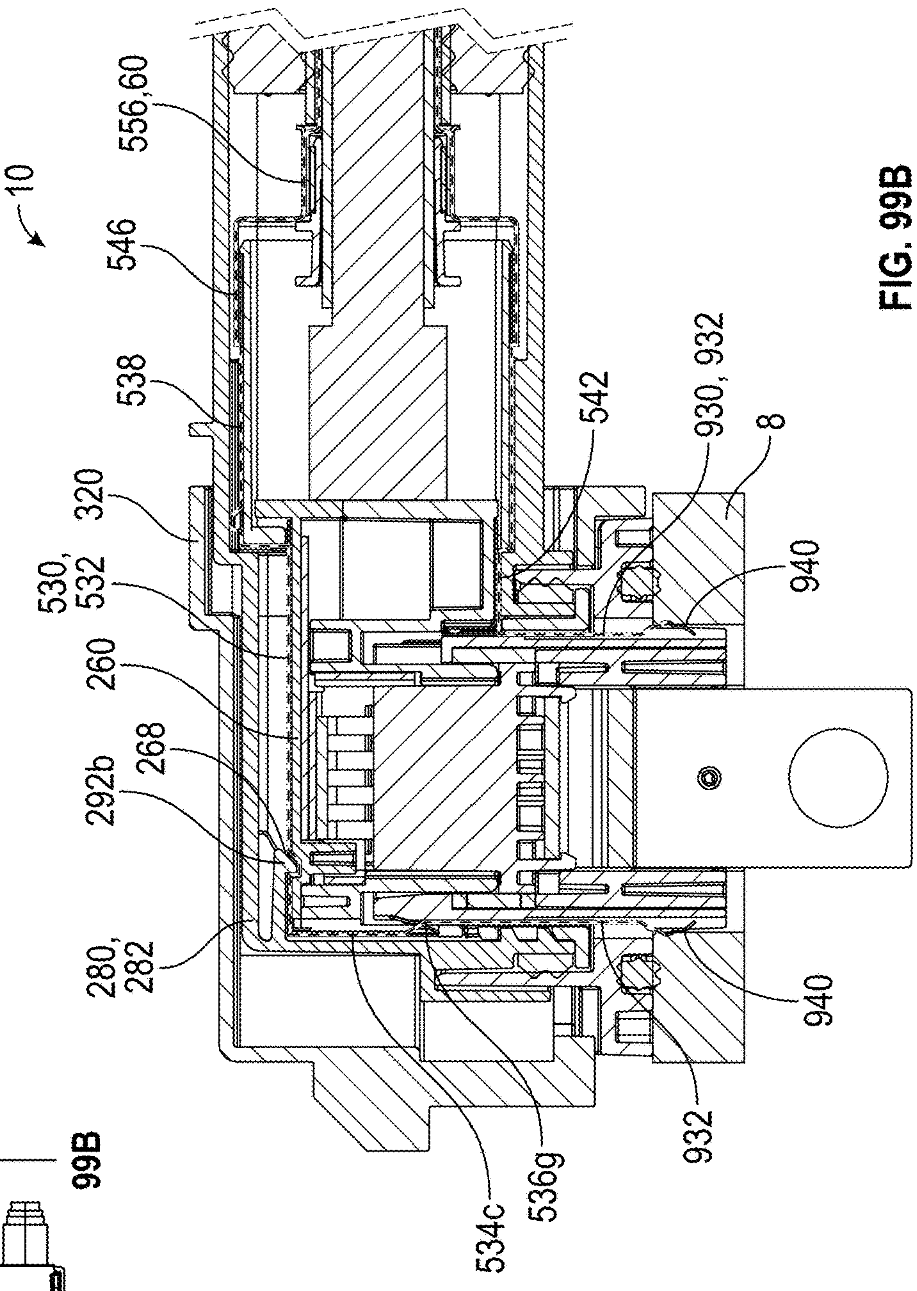
FIG. 99B is a cross-sectional view of the connector system taken along line 99B-99B of FIG. 99A.
Figure 99A:
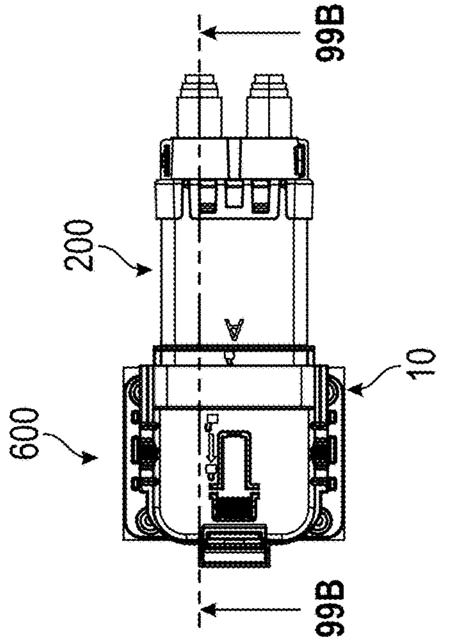
FIG. 99A is a top view of the connector system of FIG. 1 in the ready to use state.
Figure 100:
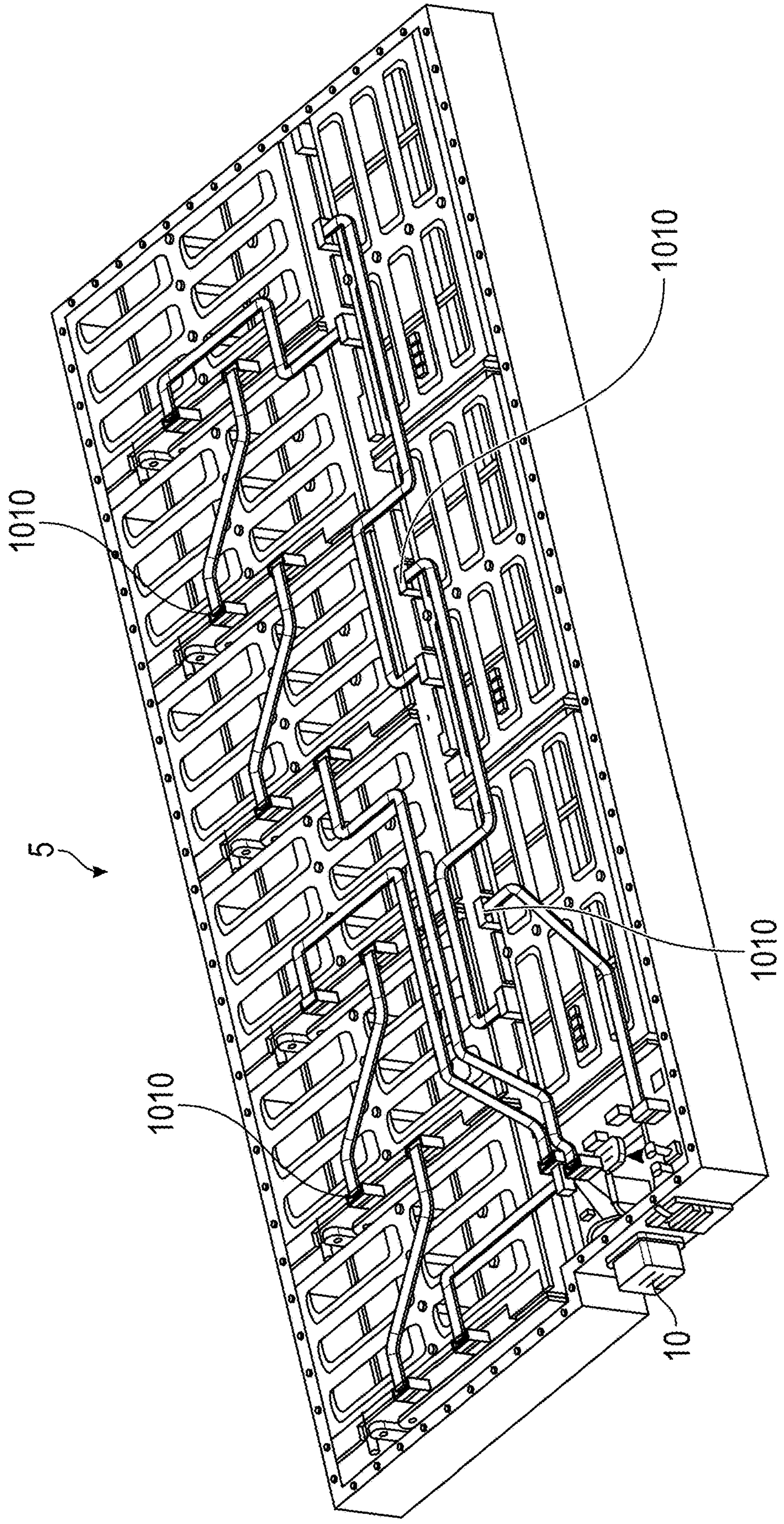
FIG. 100 is a perspective view of a first embodiment of a power distribution system with a battery pack having at least one connector system.
Figure 101:
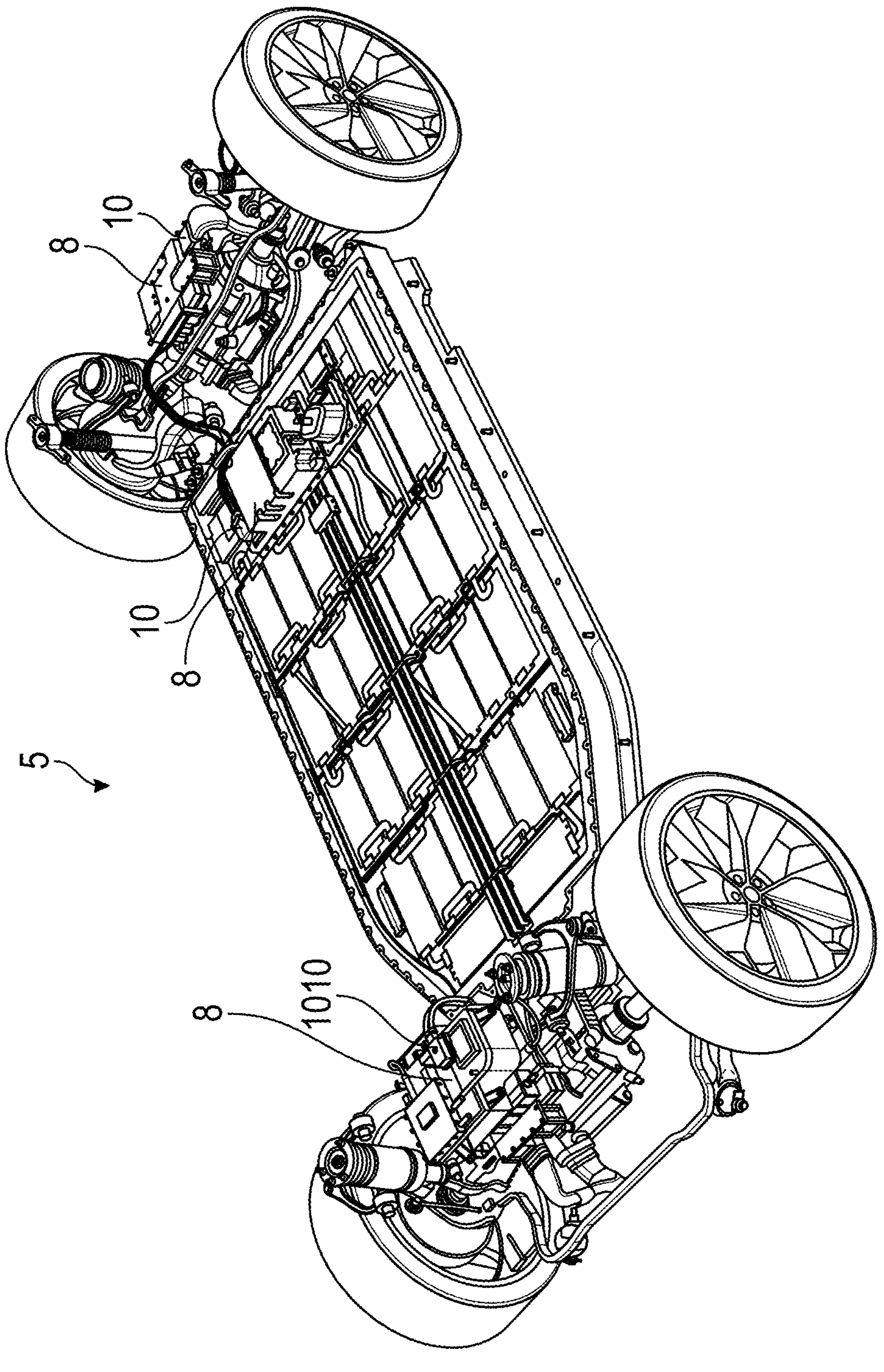
FIG. 101 is a perspective view of a battery pack of FIG. 100 installed within a skateboard mounting platform of a vehicle.
Figure 102:
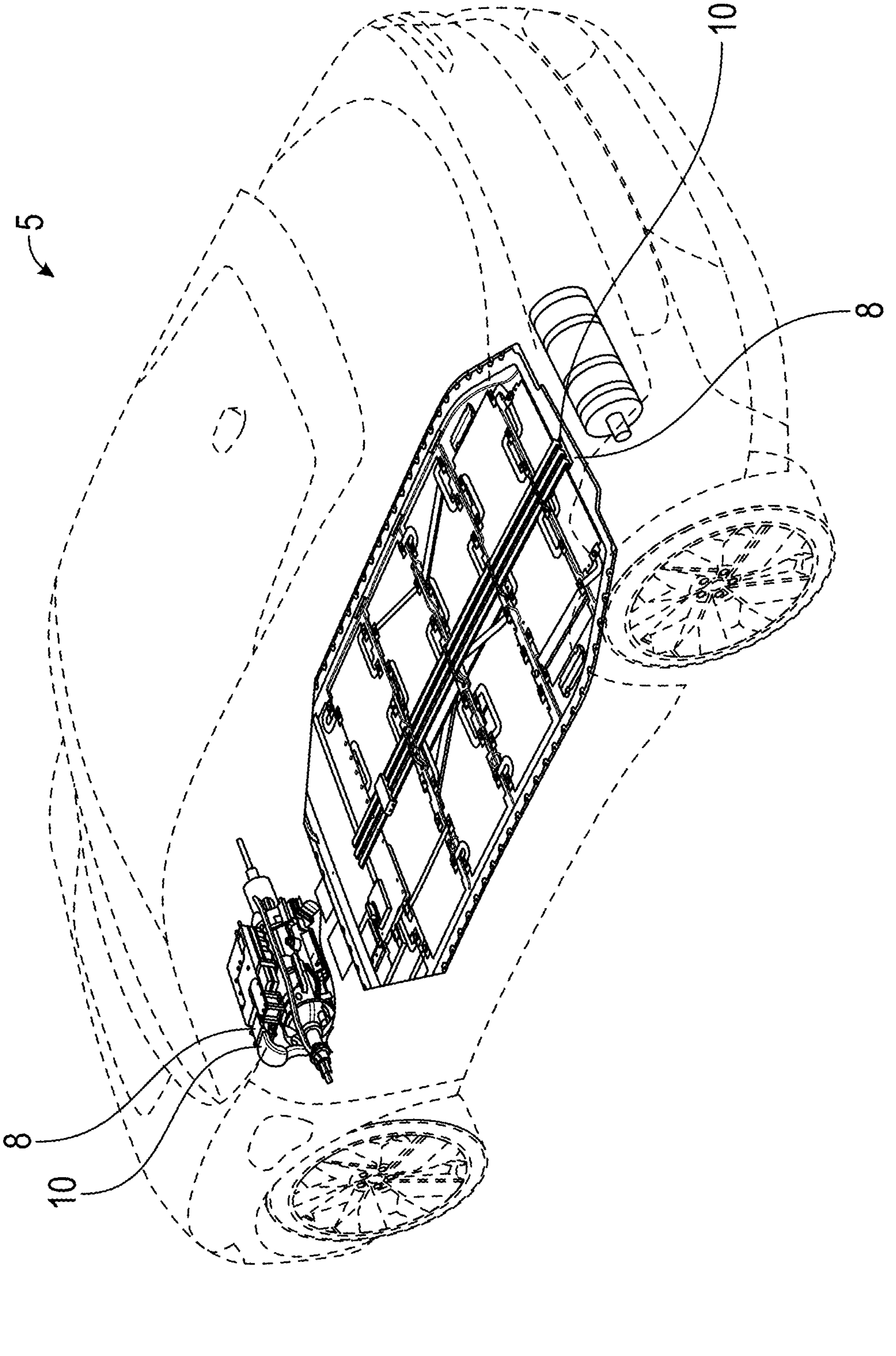
FIG. 102 is a perspective view of a vehicle that includes the skateboard mounting platform of FIG. 101.
Figure 104:
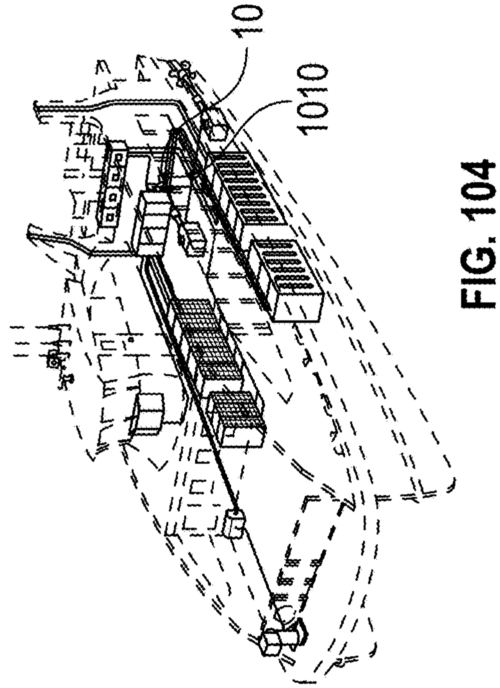
FIG. 104 is a perspective view of a ship including a power distribution system having at least one connector system.
Figure 103:
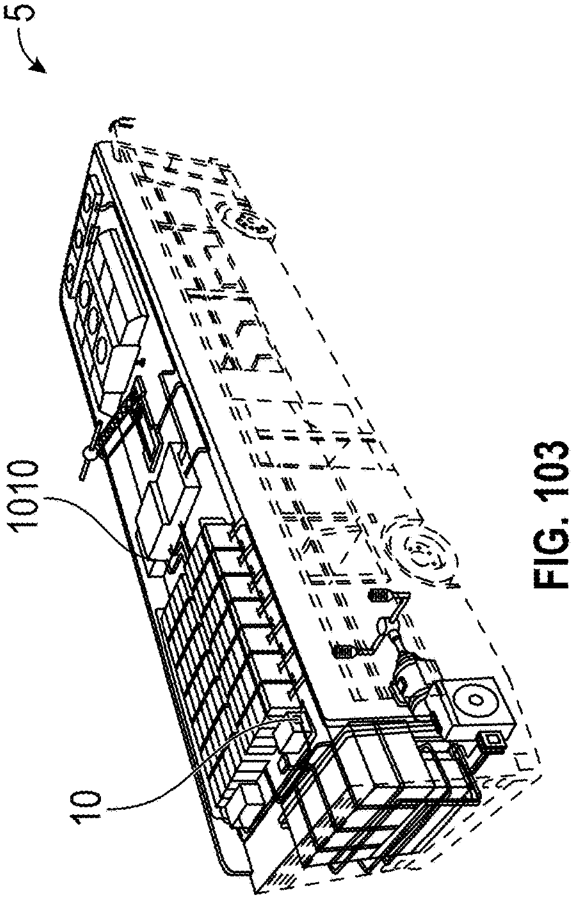
FIG. 103 is a perspective view of a passenger bus including a power distribution system having at least one connector system.
Figure 105:
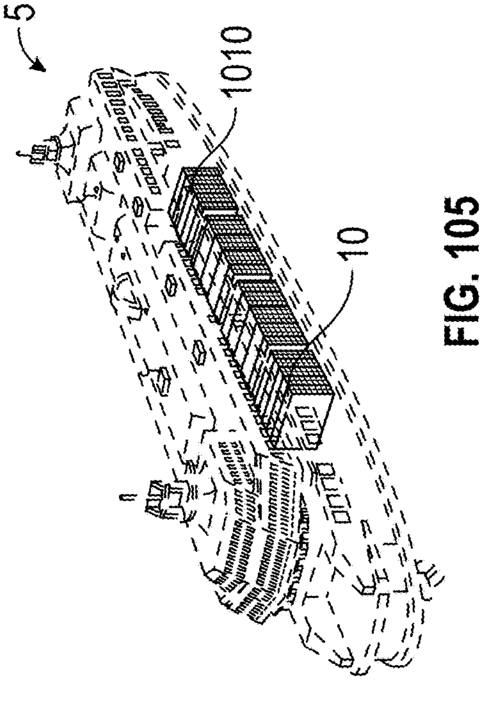
FIG. 105 is a perspective view of a large ship including a power distribution system having at least one connector system.

The main or primary housing 280 is a complex structure that includes a number of projections, recesses, and openings to facilitate to functionalities associated with the male connector assembly 200. In particular, the main housing 280 can be broken down into two main parts, where: (i) the first part is a head or engaging portion 282, which is configured to receive a major extent of the male terminal assembly 430, and male terminal holder 230, and (ii) a second part is a body or supporting portion 310, which is configured to receive a minor extent of the male terminal assembly 430 and the conductor 598. The engaging portion 282 includes: (i) an upper arrangement of side walls 284, (ii) a top wall 286, (iii) a lower arrangement of side walls 288 that depend from the upper arrangement of side walls 284, (iv) a male CPA assembly 400. As best shown in FIGS. 65 and 85, the top wall 286 of the engaging portion 282 extends between the upper arrangement of side walls 284 and includes a first disengagement projection 287 that extends upward from the outer surface of the top wall 286. Said first disengagement projection 287 has a ramped or sloped curvilinear surface 290*a* and a forward angled flat surface 290*b* that forms an acute angle with the outer surface of the top wall 286, which function together to help ensure that the primary locking member 320 is not accidently unlocked. As best shown in FIG. 99B, the engaging portion 282 also includes two deformable male coupling projections 292*a*, 292*b* that extend rearward from the front wall of the upper arrangement of side walls 284. Said deformable male coupling projections 292*a*, 292*b* interact with the securing recess 268 formed in shield insulator 260 to secure the male terminal holder 230 and thereby securing the male terminal assembly 430 in the main housing 280.

The outer surface of the lower arrangement of side walls 288 are positioned outside or beyond the outer surface of the upper arrangement of side wall 284. In other words, the distance between opposed outer surfaces of the lower arrangement of side walls 288 is greater than the distance between opposed outer surfaces of the upper arrangement of side wall 284. This arrangement increase the cross-sectional area of the lower arrangement of side walls 288 over the cross-sectional area of the upper arrangement of side wall 284. Specifically, the cross-sectional area of the lower arrangement of side walls 288 is at least 5 percent larger, preferably 15% larger, and most preferably 25% larger than the cross-sectional area of the upper arrangement of side wall 284. This is beneficial because the upper arrangement of side wall 284 primarily only receives the male terminal assembly 430, the male terminal holder 230, and shield insulator 260, while the lower arrangement of side walls 288 receives the sealing member 390, secondary locking member 360. It should be understood that other configurations are contemplated by this disclosure including where the lower arrangement of side walls 288 are aligned with the upper arrangement of side walls 283.

The lower arrangement of side walls 288 includes: (i) two accidental engagement slots or engagement slots 294*a*, 294*b*, which are a part of the first portion 337*a* of the accidental engagement assembly 336, (ii) two positioning slots 296*a*, 296*b*, (iii) two stabilization slots 297*a*, 297*b*, (iv) a CPA slot 298, (v) accidental engagement depression or engagement depression 300*a*, 300*b*, which are a part of the first portion 337*a* of the accidental engagement assembly 336, and (iv) a rear lip 301. The accidental engagement slots 294*a*, 294*b* are formed in the side walls of the lower arrangement of side walls 288, extend along a majority if the height of the side walls 288, and are positioned between the rear wall of the lower arrangement of side walls 288 and the accidental engagement depression 300*a*, 300*b*. As will be described in great detail below, the accidental engagement slots 294*a*, 294*b* are configured to help secure the male connector assembly 200 to the female connector assembly 600, facilitate the movement of the locking member 320 from an unlocking state to a locked state, and prevent the male connector assembly from accidently moving from a ready to engage/disengage state to a restrictive engagement state. The accidental engagement depression 300*a*, 300*b* extends downward from the top edge of the side walls of the lower arrangement of side walls 288 and does not extend completely though the side walls of the lower arrangement of side walls 288. In particular, the accidental engagement depression 300*a*, 300*b* includes two extends, where: (i) the first extent is a sloped wall 302*a*, 302*b* extends forward from the frontal edge of the accidental engagement depression 300*a*, 300*b*, and (ii) the second extent is a flat wall 303*a*, 303*b*, offset or recessed from the side walls of the lower arrangement of side walls 288 more than 0.1 mm and preferably 0.75 mm, and is substantially parallel with the side walls of the lower arrangement of side walls 288. The accidental engagement depression 300*a*, 300*b* are configured to receive an extent of the primary locking member 320, when the primary locking member 320 is in a locked state.

The positioning slots 296*a*, 296*b* and stabilization slots 297*a*, 297*b* are positioned between the accidental engagement depression 300*a*, 300*b* and the CPA slot 298 and are designed to receive a substantial projection that helps stabilize the connection between the male connector assembly 200 and the female connector assembly 600. The CPA slot 298, which is included in the male CPA assembly 400, is formed in the front wall of the lower arrangement of side walls 288 and is designed to receive an extent of the female CPA assembly 700, when the system 10 is in the ready to use state. Surrounding the CPA slot 298 is a CPA sidewall arrangement 402, wherein said CPA sidewall arrangement 402 and the front wall of the lower arrangement of side walls 288 and upper arrangement of side walls 284 form the CPA receiver 404. The CPA receiver 404 is designed to house a deformable male CPA member 406. Said male CPA member 406 includes: (i) two lateral connecting members 408*a*, 408*b*, (ii) two vertical supporting member 410*a*, 410*b* that are coupled to the lateral connecting members 408*a*, 408*b*, (iii) a horizontal engaging member 412 that extends between the two lateral connecting members 408*a*, 408*b*, and (iv) a head or top user interaction structure 414. The lateral connecting members 408*a*, 408*b* extend away from the front wall of the lower arrangement of side walls 288 and towards the forwardmost point of the CPA sidewall arrangement 402. As such, the lateral connecting members 408*a*, 408*b* allow the male CPA member 406 to deform from a first or original positon to a second or deformed positon when the system 10 is being coupled together.

As will be herein and in PCT/US2020/049870, which is hereby incorporated by reference for all purposes, the head, top or user interaction structure 414 is designed such that the primary locking member 320 can interact with it to place the CPA assembly 80 in a locked position. In addition, the user interaction structure 414 is also designed to be accessible by the installer such that they can apply a force on the user interaction structure 414 to cause the elastically deformable male CPA member 406 to disengage with an extent of the female CPA assembly 700. The horizontal engaging member 412 is designed to interact with the extent of the female CPA assembly 700. Specifically, when the CPA assembly is in a locked position, the horizontal engaging member 412 prevents: (i) the male connector assembly 200 from being able to be coupled with the female connector assembly 600 or (ii) the male connector assembly 200 from accidently being disconnected from the female connector assembly 600. Finally, the CPA sidewall arrangement 402 protects the deformable male CPA member 406 and prevents said male CPA member 406 from accidently being damaged or disengaged from the female connector 600. It should also be understood that the configuration of the male CPA assembly 400, and in turn the CPA assembly 80, may include a different arrangement, combination, or number of components. For example, the CPA assembly 80 use magnetic forces, spring forces, require partial rotation, or require full rotation forces or a combination of these forces to place the CPA assembly 80 in a locked or unlocked position.

The rear lip 301 extends downward from the rearmost extent of the head or engaging portion 282. Thus, any structure that is positioned forward of the rear surface of said rear lip is contained in the engaging portion 282 of the main housing 280 and everything that is positioned rearward of the rear surface of said rear lip is contained in the supporting portion 310 of the main housing 280. The supporting portion 310 includes: (i) a wall arrangement 311 that forms a substantially rectangular body, (ii) a securing assembly 312 formed from a raised lip 313 and a plurality of locking projections 314*a*, 314*b*, and (iii) end cap coupling projections 315*a*-315*d*. The securing assembly 312 is designed to prevent the primary locking member 320 from being slid too far rearward or too far forward. In particular, the raised lip 312 prevents the primary locking member 320 from being slid too far rearward and the plurality of locking projections 314*a*, 314*b* from being slid too far forward. The supporting portion 310 of the main housing 280 includes a readable indicia 316 that is positioned adjacent to and forward form the raised lip 312. The indicia 316 is configured to be placed into two different configurations depending on the configuration of the connector system 10 and the CPA assembly 80, wherein one configuration the indicia 316 is unreadable by the recording system and the other configuration the indicia 316 is readable by the recording system. The indicia 316 may contain a serial number, part number, application information (e.g., vehicle identification number), component information (e.g., power distribution system) or device information (e.g., alternator). The indicia 316 may be a barcode (e.g., single or multi-dimensional barcode), quick response (QR) code, SnapTags, Microsoft Tags, Blipper, MaciCode, Data Matrix, Bokode, Aztec Code, CueCat, PDF417, Semacode, ShotCode, Touchatag, SPARQCode, SQR codes, RFID, NFC, Bluetooth, collection of shapes that can be read by the recording system, radio based device that can be read by the recording system, a collection of projections that can be read by the recording system, a collection of different color shapes, or a combination of the above. In other words, the indicia 316 may be any pattern, any color, have any texture, have a 2 dimensional configuration, or 3 dimensional configuration.

The primary locking member or first locking member or locking member 320 is positioned external to the main housing 280 and is configured to overlie: (i) the entire engaging portion 282, and (ii) a portion of the supporting portion 310. The primary locking member 320 is designed to be slidely engage with the main housing 280. This sliding engagement is designed to help prevent the connector system 10 from accidently: (a) move the male connector assembly 200 from the "ready to engage state" to the "restrictive engagement state," (b) move the system 10 from the "ready to use state" to the "connected," and (c) remove the male connector assembly 200 from the female connector assembly 600 when the system 10 is in the "ready to use state." Specifically, the primary locking member 320 is designed to slide forward and back upon the application of a first force in a first plane, while the connector is designed to be coupled to the female connector assembly 600 upon the application of a second force in a second plane that is substantially perpendicular to the first plane. In other words, the first and second forces are not parallel to one another and instead are substantially perpendicular to each other. Stated another way, the first plane may be the X-Y plane and the second plane may be the Y-Z plane that is substantially perpendicular to the X-Y plane.

The primary locking member 320 includes: (i) an arrangement of side walls 322 that include an upper wall arrangement 324 and a lower wall arrangement 330, (ii) a second portion 337*b* of the accidental engagement assembly 336, (iii) a top wall 346 that is integrally formed with the upper wall arrangement 324, (iv) a bottom rail 350, (v) a rear connector coupling projection 352, and (vi) a locking CPA assembly 356. The upper wall arrangement 324 includes: (i) two side walls 325*a*, 325*b* with locking apertures 326, (ii) a front wall 325*c* with a CPA opening 327 formed there through. The locking apertures 326 interact with the locking projections 314*a*, 314*b* to ensure that the primary locking member 320 cannot be easily removed from the main housing 280. The CPA opening 327 is included in locking CPA assembly 356 and provides access to the male CPA member 406 and specifically the user interaction structure 414 of the male CPA assembly 400. As will be discussed below, the CPA opening 327 provides access to allow the user to depress the user interaction structure 414 forward and down in order to cause the horizontal engaging member 412 to move far enough forward from an extent of the female CPA assembly 700 to permit disengagement of the male CPA assembly 400 from the female CPA assembly 700.

Like the main housing 280, the outer surface of the lower wall arrangement 330 are positioned outside or beyond the outer surface of the upper wall arrangement 324. In other words, the distance between opposed outer surfaces of the lower wall arrangement 330 is greater than the distance between opposed outer surfaces of the upper wall arrangement 324. This arrangement substantially matches the arrangement of the lower arrangement of side walls 288 and upper arrangement of side wall 284. The lower wall arrangement 330 includes: (i) accidental engagement recesses or engagement recesses 331*a*, 331*b*, (ii) accidental engagement retainer or engagement retainer 332*a*, 332*b*, (iii) a locking CPA wall arrangement 333, (iv) a stabilization projections 334, and (v) a plurality of locking depressions 335 that are configured to align with the accidental engagement slots 294*a*, 294*b*, the positioning slots 296*a*, 296*b*, and the CPA slot 298. The locking CPA wall arrangement 333 is included in the locking CPA assembly 356 extends forward from the front wall of the lower wall arrangement 330 and is designed to interact with the CPA sidewall arrangement 402 to protect the male deformable male CPA member 406. As such, the locking CPA wall arrangement 333 is configured to be positioned outside of CPA sidewall arrangement 402 in certain operating positions. The stabilization projections 334 are received by an extent of the female connector assembly 600 and is designed to further enhance the connection between the male and female connector assemblies 200, 600, when the system 10 is in the ready to use state. Finally, like the accidental engagement slots 294*a*, 294*b*, the positioning slots 296*a*, 296*b*, and the CPA slot 298, the locking depressions 335 are configured to help secure the male connector assembly 200 to the female connector assembly 600 and facilitate the movement of the primary locking member 320 from an unlocking state to a locked state.

The accidental engagement recesses 331*a*, 331*b* and the accidental engagement retainer 332*a*, 332*b* are a part of the second portion 337*b* of the accidental engagement assembly 336 and are formed on the inner surface of the lower wall arrangement 330. The accidental engagement recesses 331*a*, 331*b* allows the accidental engagement member or engagement members 338*a*, 338*b*: (i) to be positioned between an extent of the male and female housings 220, 620, and (ii) to elastically deform under certain operating conditions (which will be discussed in greater detail below). Meanwhile, the accidental engagement retainer 332*a*, 332*b* is positioned in the accidental engagement recesses 331*a*, 331*b* and retains the accidental engagement members 338*a*, 338*b* within the lower wall arrangement 330. It should be understood that other configurations of the accidental engagement assembly 336 are contemplated by this disclosure, wherein these structures help ensure that the primary locking member 320 is not accidently engaged, locked, or moved forward prior to insuring the male terminal assemblies 430 into the female terminal assemblies 800.

The top wall 346 of the locking member 320 is integrally formed with and extends between the upper wall arrangement 324. The top wall 346 includes accidental disengagement member 348, which is a part of the accidental disengagement assembly 347 and is configured to prevent the locking member 320 from accidently being disengaged, unlocked, or moved rearward. In particular, the disengagement member 348 has been formed in the top wall 336 by removing material from said top wall 336 to form a pivot strip 339, a rear or locking cantilever segment 340*b*, and a forward or unlocking cantilever segment 340*a*. A second disengagement projection 342 is formed on the inside of the rear or unlocking cantilever segment 340*b*, where said disengagement projection 342 includes a ramped or sloped curvilinear surface 344*a* and a forward angled flat surface 344*b* that forms an acute angle with the inner surface of the top wall 346, which function together to help ensure that the locking member 320 is not accidently unlocked. As discussed in greater detail below, the pivot strip 339 allows the unlocking and locking cantilever segments 340*a*, 340*b* to angularly displaced inward or outward about a pivot point 346 formed at or near the pivot strip 339. It should be understood that other configurations of the accidental disengagement assembly 347 are contemplated by this disclosure, wherein these structures help ensure that the primary locking member 320 is not accidently disengaged, unlocked, or moved rearward after the connector system 10 is in a ready to use state.

The bottom rail 350 of the locking member 320 extends downward from a lower surface of the lower wall arrangement 330 and provides additional rigidity to the male connector assembly 200 and to help secure/stabilize the male connector assembly 200, when connected with the female connector assembly 600. The rear connector coupling projection 352 is positioned adjacent to the bottom rail 350, extends downward from the lower wall arrangement 330, includes a lower surface that is positioned below the bottom rail 350, and includes at least one and preferably two bracing apertures 354*a*, 354*b* that are a part of the male bracing assembly 351. Said bracing apertures 354*a*, 354*b* of the male bracing assembly 351 are configured to receive an extent of the female connector assembly 600, where the connector system 10 is under certain operating conditions (e.g., in the ready to use state).

As best shown in FIGS. 2-3, 17, and 22-23, the secondary locking member or terminal locking member 360 is designed to: (i) secure the male terminal holders 230 in the main housing 280, and (ii) prevent the locking member 320 from moving before the secondary locking member 360 is secured in a locked position. The secondary locking member 360 includes: (i) an IL assembly opening 362, (ii) an arrangement of projections 364 that are designed to interact with the arrangement of recesses 250*a*-250*d* of the male terminal holder 230, and (iii) at least one and preferably more than two deformable securing members 368*a*-368*c* that are configured to secure the secondary locking member 360 to the main housing 230. The IL assembly opening 362 is an opening that is formed in the secondary locking member 360 and is designed to receive an extent of the female IL assembly 980, when the connector system 10 is in a ready to use state. The arrangement of projections 364 includes at least one and preferably four projections 366*a*-366*d*, wherein each projection substantially surrounds a corner of the male terminal holder 230. Finally, the deformable securing members 368*a*-368*c* are positioned between the arrangement of projections 364 and are designed to interact with projections that are formed in the main housing 230 to secure the secondary locking member 360 to said housing 230. The securement of the secondary locking member 360 to the housing 230 helps support and secure the male terminal assemblies 430 in the proper position to facilitate their mating with the female terminal assemblies 800, when the connector system 10 is in the connected or ready to use state.

B. Male Terminal Assembly

Figure 107:
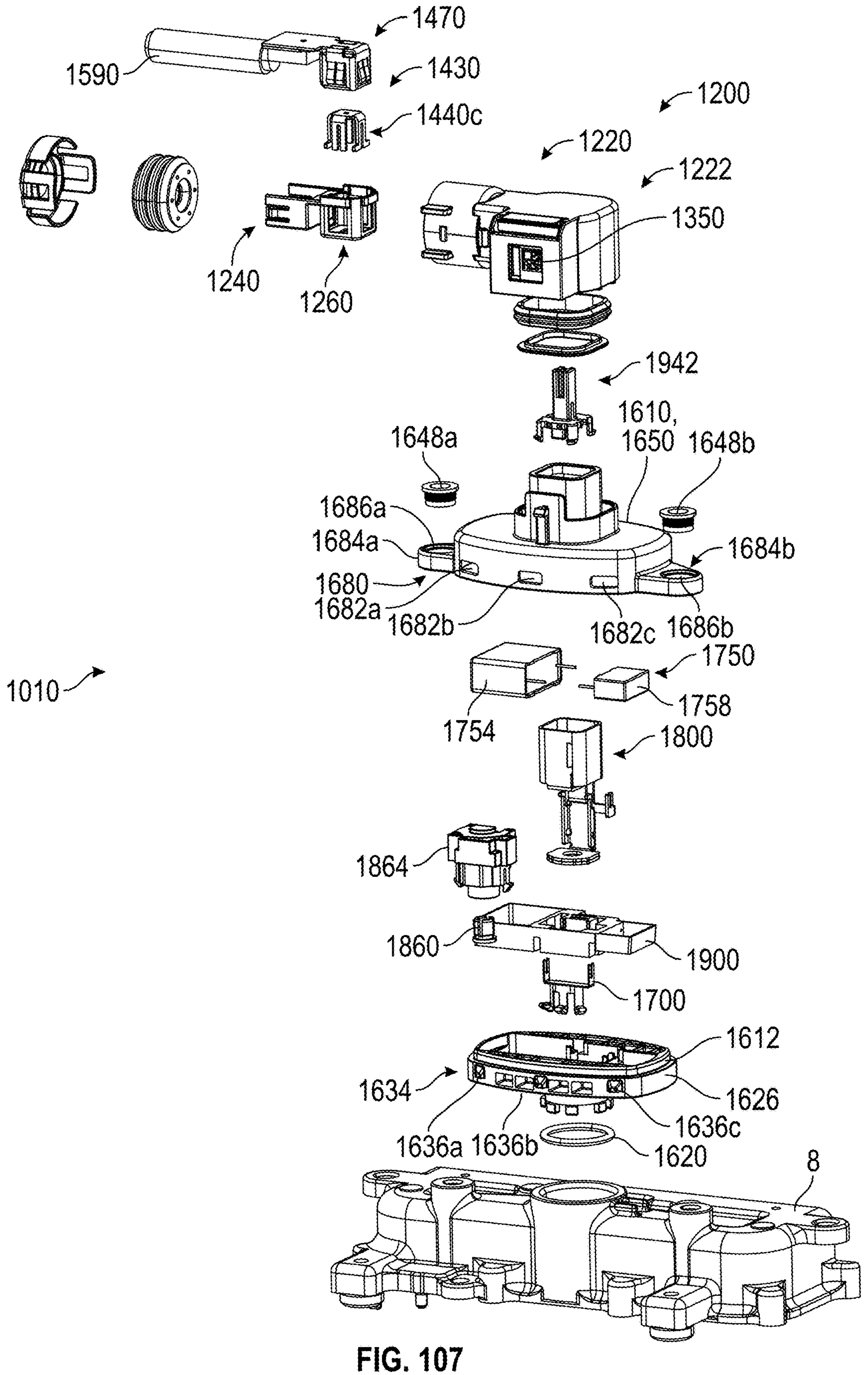
FIG. 107 is an exploded view of the connector system of FIG. 106, where the connector system includes: (i) a male connector assembly with a male terminal assembly, and (ii) a female connector system.
Figure 108:
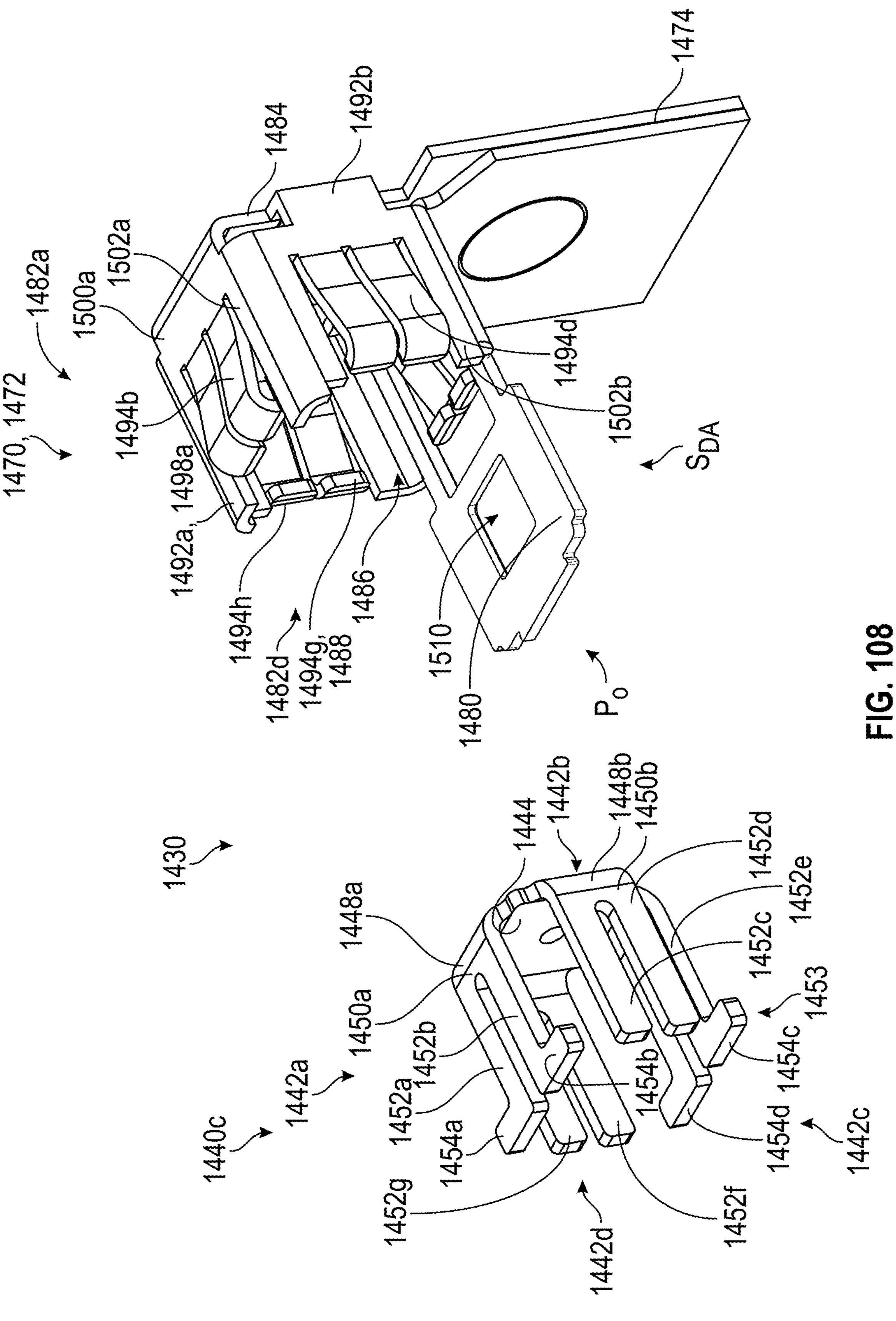
FIG. 108 is an perspective view of the male terminal assembly of FIG. 107 in an unseated state.
Figure 109:
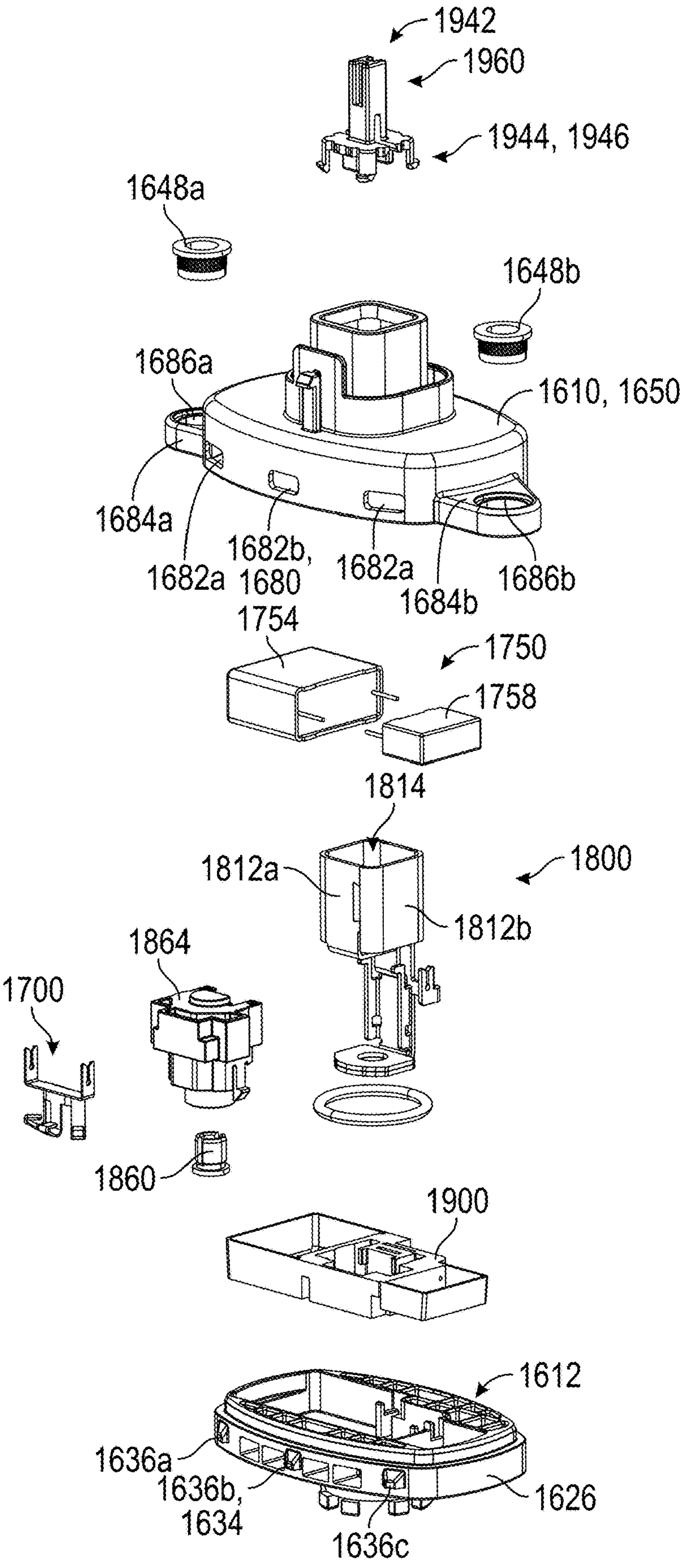
FIG. 109 is a perspective view of the female connector assembly of FIG. 107 in a dissembled state.
Figure 110:
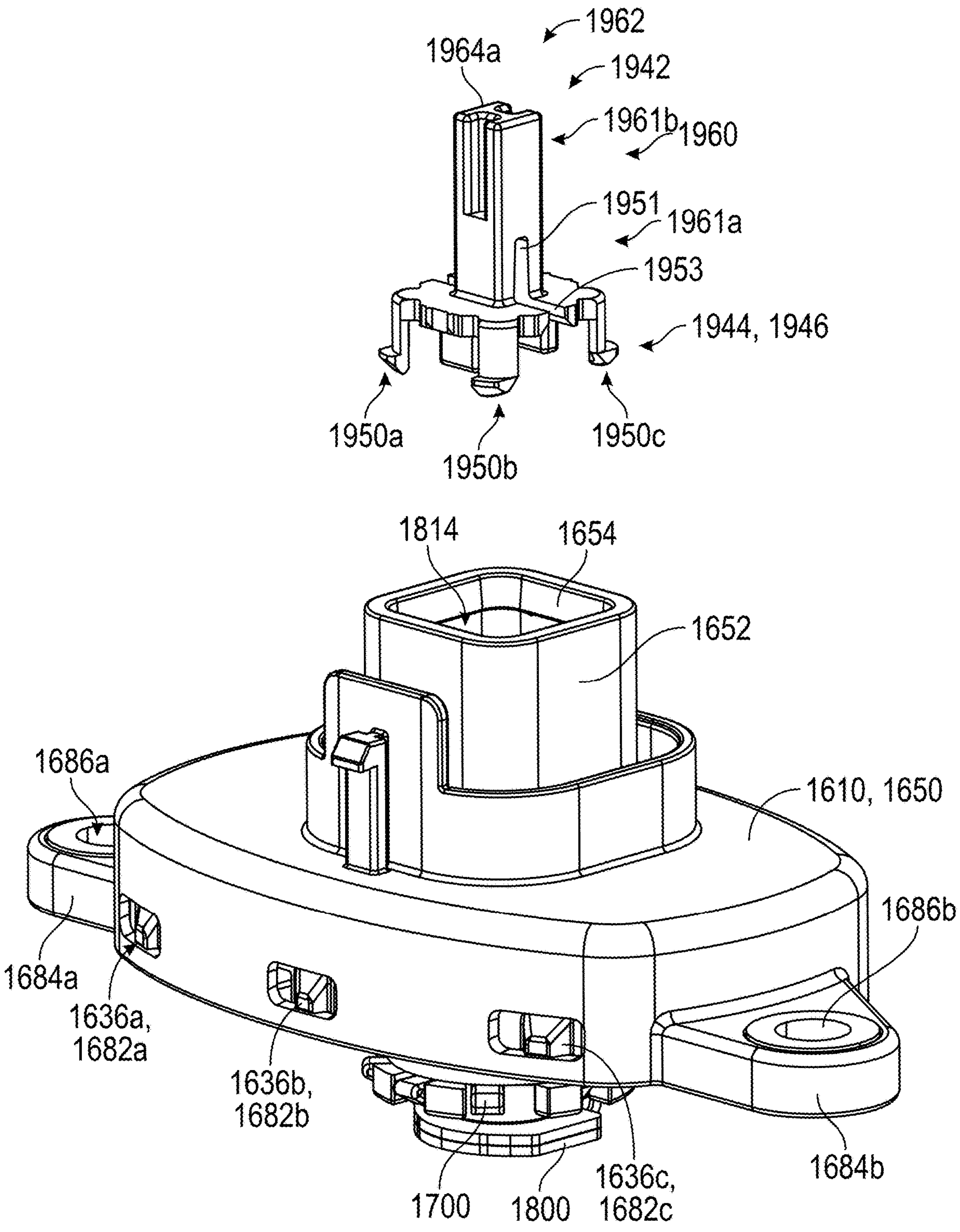
Figure 112:
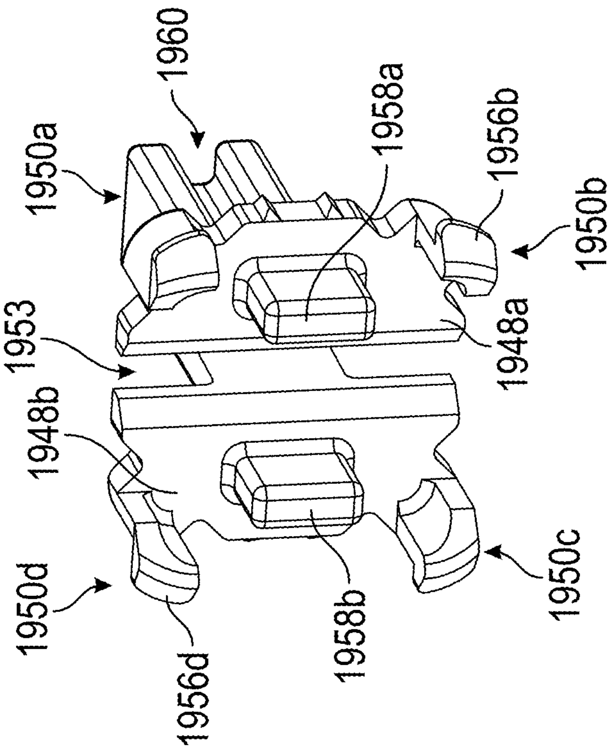
Figure 111:
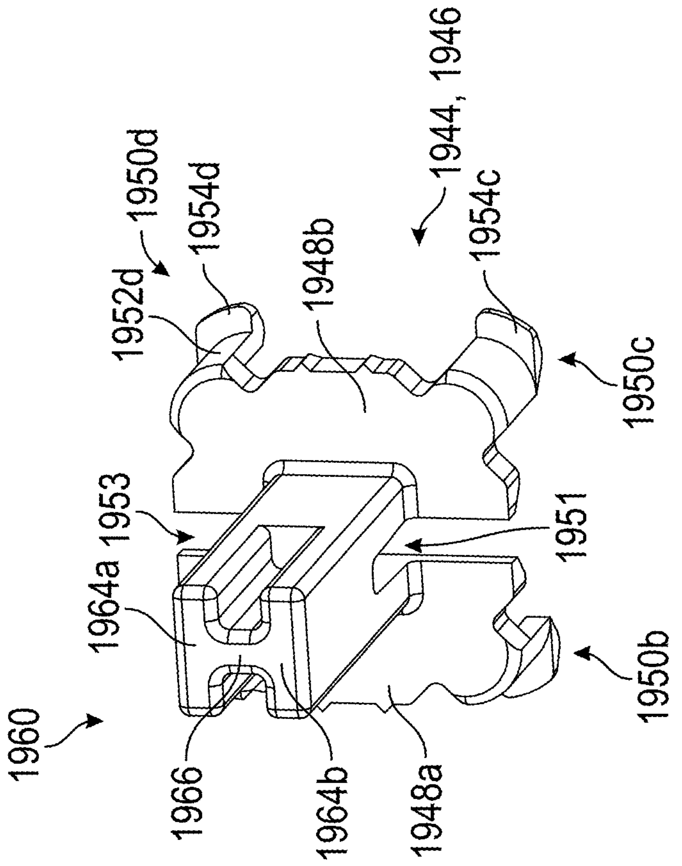
Figure 114:
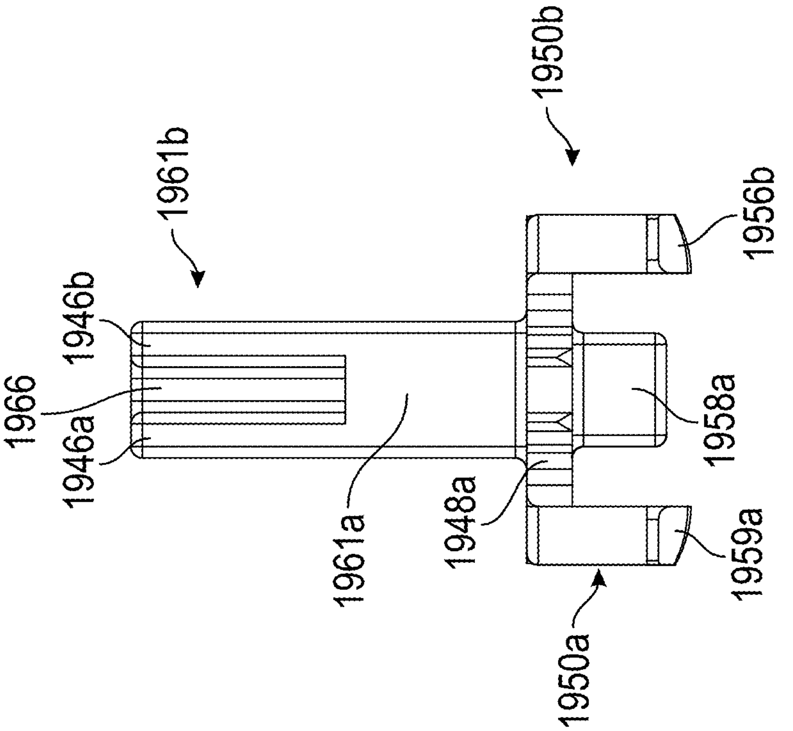
Figure 113:
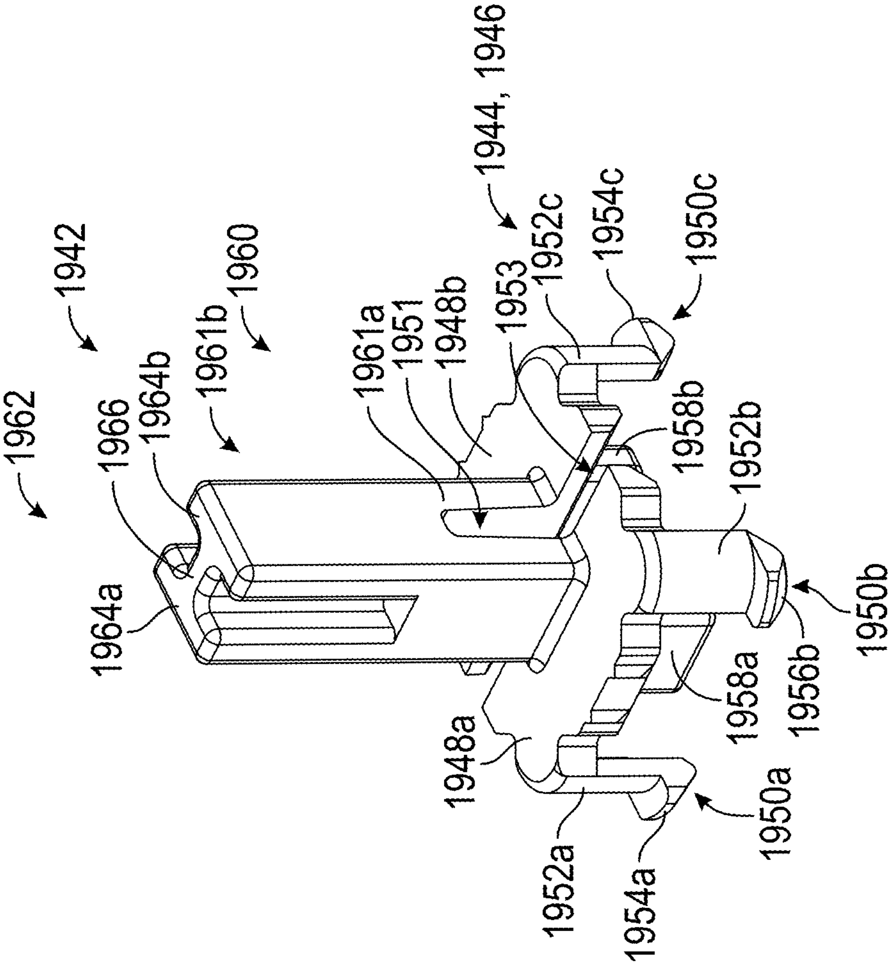
Figure 116:
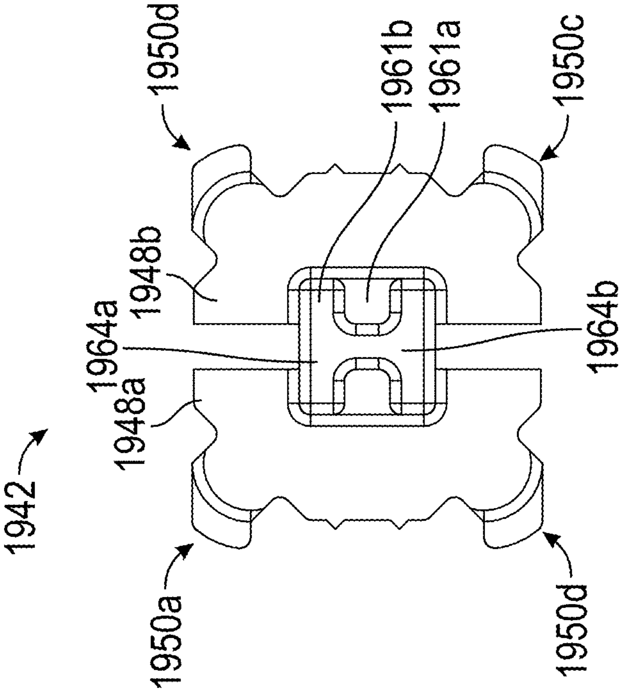
Figure 115:
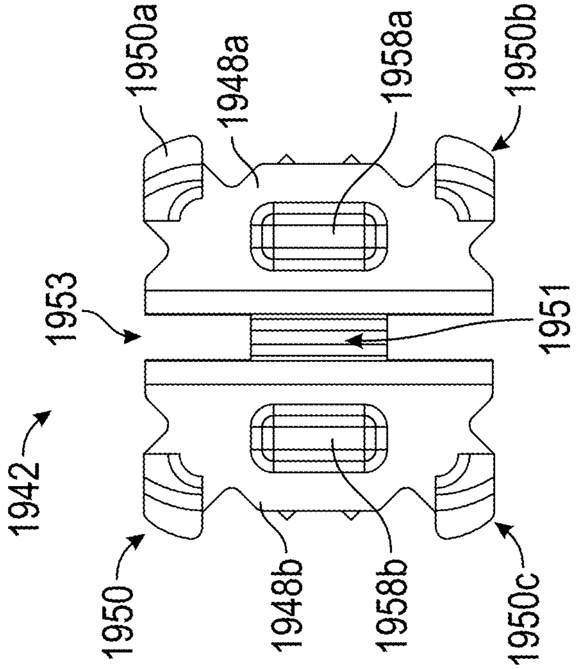
Figure 118:
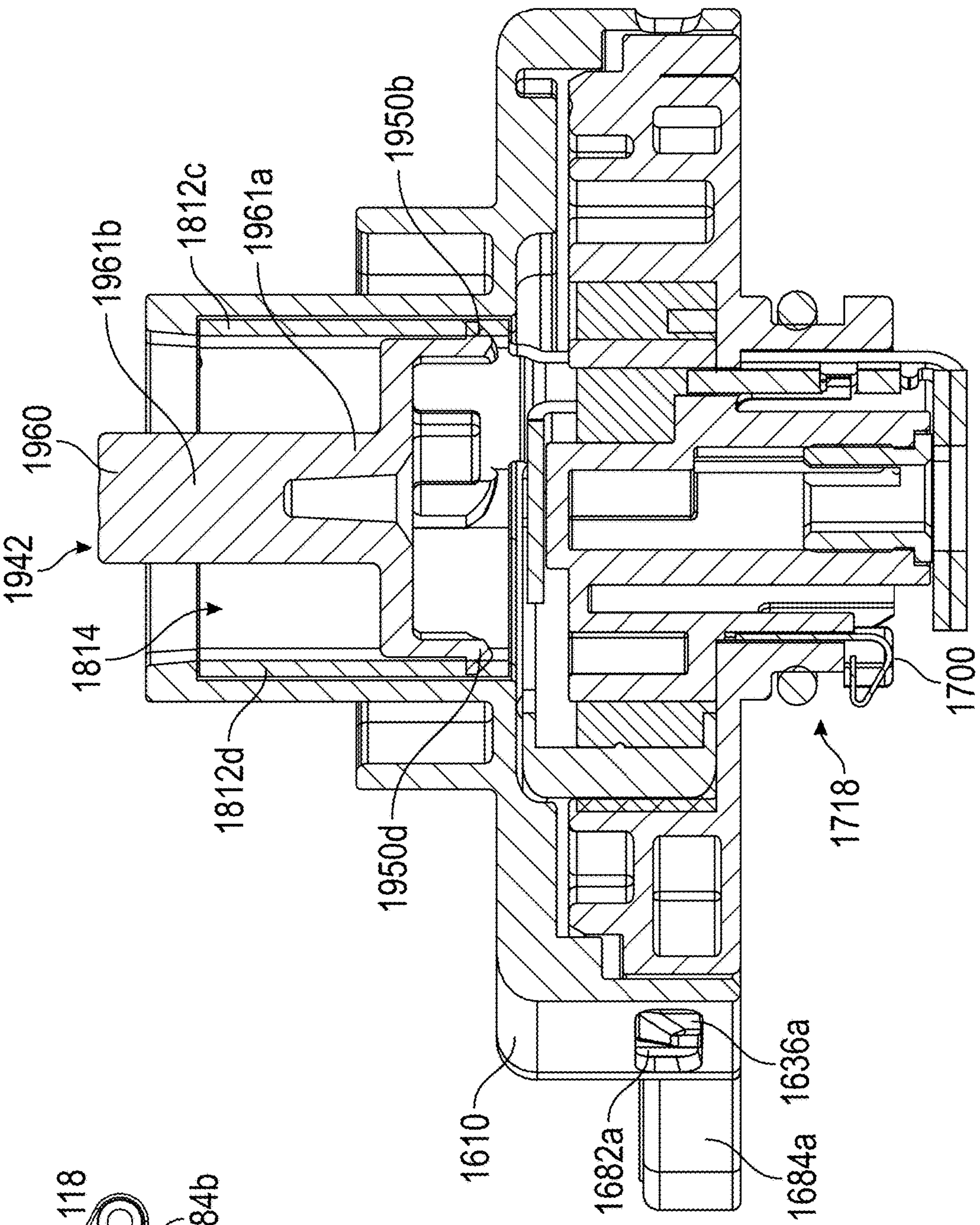
Figure 117:
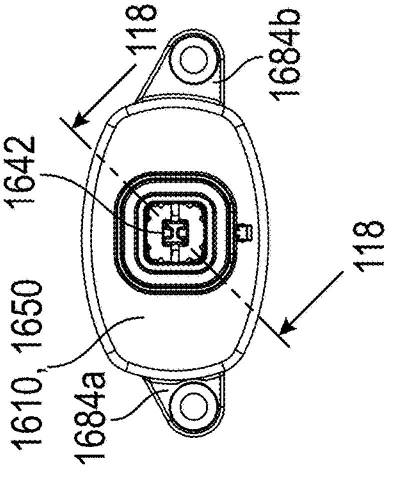
Figure 119:
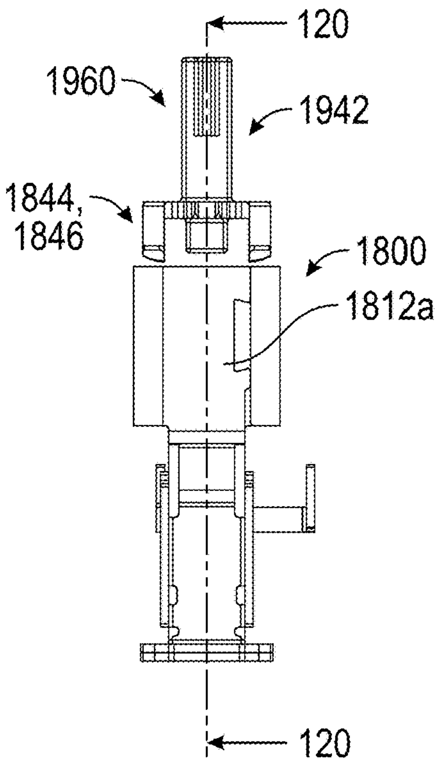
Figure 120:
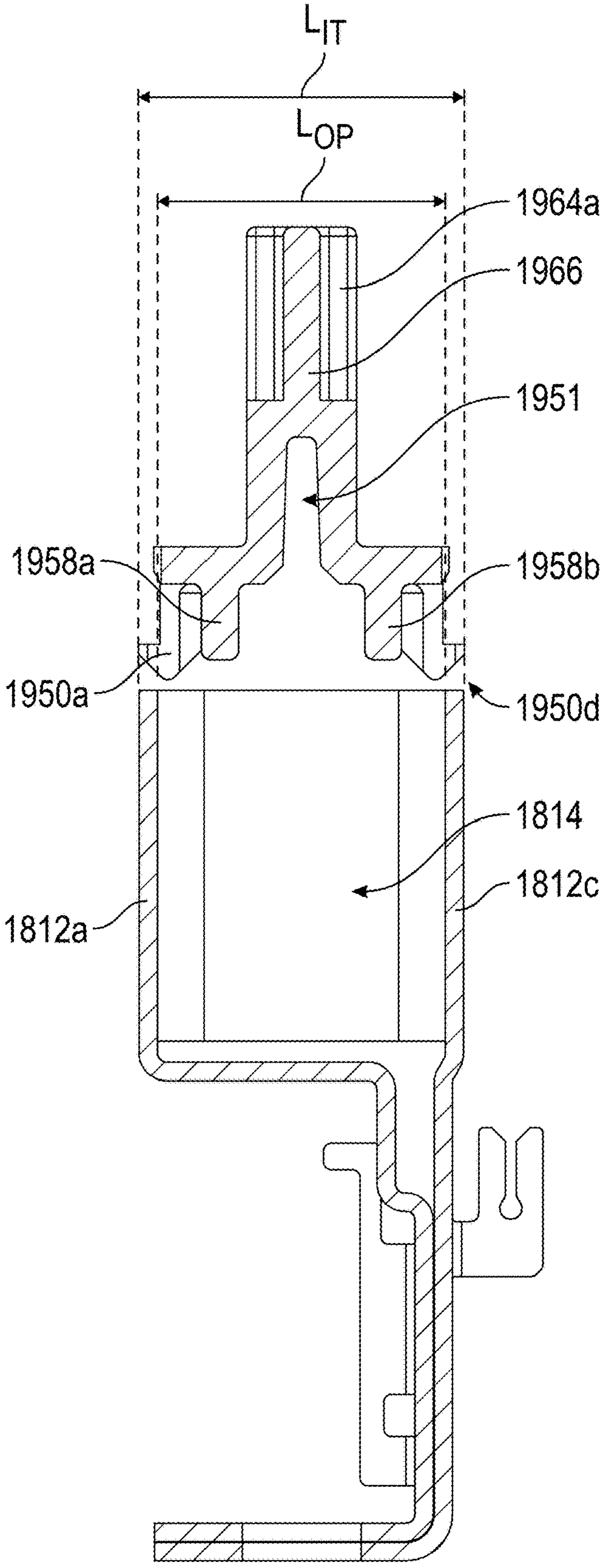

FIGS. 3-14A show a first embodiment of the male terminal assembly 430, while FIGS. 107-108 show a second embodiment of a male terminal assembly. Referring specifically to the first embodiment, the male terminal assembly 430 includes a spring member 440*d* and a male terminal 470. A first embodiment of the spring member 440*d* is shown in FIGS. 8-11, while two other embodiments 440c are shown in FIG. 108. Additional disclosure about these embodiments is contained within PCT/US2021/033446, PCT/US2021/043686, PCT/US2021/057959, each of which is incorporated herein by reference. Returning to the first embodiment of the spring member 440*d*, said spring member 440*d* includes an arrangement of spring member side walls 442*a*-442*b* and a rear spring wall 444. The arrangement of spring member side walls 442*a*-442*b* include: (i) a first or arched spring section 448*a*-448*h*, and (ii) a second spring section or spring arm 452*a*-452*h*. The arched spring sections 448*a*-448*h* extend between the rear spring wall 444 and the spring arm 452*a*-452*h* and position the spring arm 452*a*-452*h* substantially perpendicular to the rear spring wall 444. In other words, the outer surface of the spring arm 452*a*-452*h* is substantially perpendicular to the outer surface of the rear spring wall 444.

The spring arms 452*a*-452*h* extend from the arched sections 448*a*-448*h*, away from the rear spring wall 444, and terminate at the free end 446. Said spring arms 452*a*-452*h* are not connected to one another and thus are separated by spring arm gaps 455*a*-455*f*. The gaps 455*a*-455*f* aid in omnidirectional expansion of the spring arms 452*a*-452*h*, which facilitates the mechanical coupling between the male terminal 470 and the female terminal assembly 800. In other embodiments, the spring arms 452*a*-452*h* may be coupled to other structures to restrict their omnidirectional expansion. The number and width of individual spring arms 452*a*-452*h* and openings may vary. In addition, the width of the individual spring arms 452*a*-452*h* (except for the positioning and retaining means 453) is typically equal to one another; however, in other embodiments one of the spring arms 452*a*-452*h* may be wider than other spring arms.

In contrast to the embodiments 440a, 440b that are shown in PCT/US2019/036010 and (which are incorporated herein by reference), the inventive spring member 440*d* includes at least one spring arm 452 that includes a positioning and retaining means 453. Said positioning and retaining means 453 are shown as a "J-shaped" positioning projection 454*a*-454*d* extending laterally from an edge of the spring arm 452*a*, 452*d*, 452*e*, 452*h*. Preferably, the positioning projections 454*a*-454*d* extend from a free end 446 of the spring arm 452*a*, 452*d*, 452*e*, 452*h*, as opposed to an intermediate edge of the spring arm 452*a*, 452*d*, 452*e*, 452*h*. Specifically, the positioning projections 454*a*-454*d* are configured to: (i) retain the spring member 440*d* in the male terminal body 472, and (ii) center the spring member 440*d* within the contact arms 494*a*-494*h* by limiting the amount the spring member 440*d* can rotate within said body 472, and in some instances eliminate any measurable rotation of the spring member 440*d*. In the version shown in FIGS. 8-16, the spring member 440*d* includes: (i) at least two regular, planar spring arms 452*b*, 452*c*, 452*f*, 452*g* that lack the positioning projections 454*a*-454*d*, and (ii) at least two irregular, non-planar spring arms 452*a*, 452*d*, 452*e*, 452*h* that include the positioning projections 454*a*-454*d*. In the Figures, the regular, planar spring arms 452*b*, 452*c*, 452*f*, 452*g* are positioned between the irregular, non-planar spring arms 452*a*, 452*d*, 452*e*, 452*h* and as such the regular, planar spring arms 452*b*, 452*c*, 452*f*, 452*g* can be considered intermediate spring arms and the irregular, non-planar spring arms 452*a*, 452*d*, 452*e*, 452*h* can be considered peripheral or exterior spring arms.

Unlike the spring arm disclosed in FIGS. 4-8 of PCT/US2018/019787, the free end 446 of the spring arms 452*a*, 452*d*, 452*e*, 452*h* do not have an inwardly curvilinear component. Instead, the spring arms 452*a*, 452*d*, 452*e*, 452*h* have a substantially planar outer surface (except for the positioning and retaining means 453). This configuration is beneficial because it ensures that the outwardly forces exerted by the inventive spring member 440*d* are applied substantially perpendicular to the free end 488 of the male terminal body 472. In contrast, the curvilinear components of the spring arms disclosed in FIGS. 4-8 of PCT/US2018/019787 do not apply a force in this manner. When the positioning and retaining means 453 is considered, then the outer four spring arms 452*a*, 452*d*, 452*e*, 452*h* are non-planar. Under this interpretation, the spring member 440*d* includes: (i) a curvilinear component that is not bent or angled inward towards the center of the connector and instead is directed away from the center of the connector, and (ii) a limited extent of the spring member 440*d* is positioned outside of the spring receiver 486. Moreover, a single spring arm 452*a*, 452*d*, 452*e*, 452*h* may be positioned between curvilinear components 448*a*-448*h*, 454*a*-454*d* that are positioned in two different planes.

In contrast to spring member 440*c* that is disclosed in PCT/US2021/033446 and in other PCT applications that are incorporated herein, the spring member 440*d* does not include four side walls and instead only include two side walls 442*a*-442*b*. This is because the disclosed male connector assembly 430 does not include contact arms on all four sides and thus is not 360 degree compliant. In addition, spring member 440*d* does not include a base section that extends between the arched section and the spring arms. In other words, the spring arm section gaps 455*a*-455*f* extend all the way to the rear wall 444. Another difference between these spring members 440*a*-440*d* is the fact that the inclusion of the curvilinear positioning projections 454*a*-454*d* causes the spring member side walls 442*a*-442*b* to no longer be planar. Finally, due to the positioning and retaining means 453 the spring 440*d* cannot be properly used in connection with other male terminal bodies that are disclosed in other PCT applications (e.g., PCT/US2019/036010 and PCT/US2020/049870).

In other embodiments, the spring member 440*d* may include at least one spring arm 452*b*, 452*c*, 452*f*, 452*g* and only two spring arm 452*a*, 452*d*, 452*e*, 452*h* with positioning projections 454 that are arranged on opposite sides of the spring member 440*d*, either in an opposed positional relationship or a diagonal positional relationship. This configuration may be beneficial because it limits the number of spring arms that need to be bent in a second direction. In other embodiments, the spring member 440*d* may include only a single irregular, non-planar spring arm in connection with the inclusion of a front or rear wall of the male terminal body 472. In this embodiment, the front or rear wall to stop the spring member from sliding in that direction while the single irregular, non-planar spring arm will keep this embodiment of the spring member from sliding in the direction opposite of the front or rear wall. In other embodiments, the positioning and retaining means 453 may be: (i) a projection(s) or tab(s) that extends from one or more of the free ends 446 of the spring arms 452*a*-452*h* and wraps around an appreciable portion of the curvilinear lower extent of the contact arms 494*a*-494*h*, namely overlapping or wrapping-around the interior corner region 493*a*-493*d* of the exterior contact arm 494*a*, 494*d*, 494*e*, 494*h*, (ii) projection(s) that do not extend from the spring arms 452*a*-452*h*, but instead extend from the rear spring wall 444 around an extent of the top male terminal body wall 480, (iii) projection(s) that are not positioned near the free end 446 of the spring arms 452*a*-452*h*, but instead are positioned near an upper extent of the spring arms 452*a*-452*h* and wrap around the neck portion 491*a*-491*h* of the contact arms 494*a*-494*h*, (iv) projections that extend from the rear spring wall 444 and are configured to be positioned between an inner surface of the top male terminal body wall 480 and a uppermost extent of the male terminal front wall 483, (v) any combination of these projections or tabs that have similar structural and functional attributes.

The spring member 440*d* is typically formed from a single piece of material (e.g., metal). Therefore, the spring member 440*d* is a one-piece spring member 440*d* or has integrally formed features. In particular, the following features are integrally formed: (i) the rear spring wall 444, (ii) the curvilinear sections 448*a*-448*h*, (iii) the spring arms 452*a*-452*h*, and (iii) the positioning projections 454*a*-454*d*. To integrally form these features, the spring member 440*d* is typically formed using a die forming process. The die forming process mechanically forces the spring member 440*d* into shape. As discussed in greater detail below and in PCT/US2019/036010, when the spring member 440*d* is formed from a flat sheet of metal, installed within the male terminal body 472 and connected to the female terminal assembly 800, and is subjected to elevated temperatures, the spring member 440*d* applies an outwardly directed spring thermal force Sm on the contact arms 494*a*-494*h* due in part to the fact that the spring member 440*d* attempts to return to a flat sheet. However, it should be understood that other types of forming the spring member 440*d* may be utilized, such as casting or using an additive manufacturing process (e.g., 3D printing). In other embodiments, the features of the spring member 440*d* may not be formed from a one-piece or be integrally formed, but instead formed from separate pieces that are welded together.

Referring to FIGS. 4-7B, the first embodiment of the male terminal 470 includes: (i) a male terminal body 472 and (ii) a male terminal connection plate 474. The male terminal connection plate 474 is configured to receive an extent of a conductor 598, a busbar, or any other type of an electrical connector. The conductor 598 is typically welded to the connection plate 474; however, other methods of connecting the conductor 598 to the connection plate 474 are contemplated by this disclosure. Referring now to the male terminal body 472, said male terminal body 472 has: (i) a top wall 480, (ii) a first side wall 482*a*, (iii) an opposed second side wall 482*b*, (iv) a front wall 483, and (v) a rear wall 484. The combination of these walls 480, 482a-482b, 483, and 484 forms a wall arrangement 479 that defines a spring receiver 486, which has a rectangular prism shape. The arrangement of the first and second side walls 482a-482b includes: (i) contact arms 494a-494h, where each contact arm 494a-494h has a first or neck portion 491a-491h and a second or body portion 492a-492h, (ii) a base sections 490a-490b that extends between the rear wall 484 and the contact arms 494a-494h, and (iii) a plurality of contact arm openings 496a-496h, where each contact arm opening 496a-496h has a first extent or neck gap 498a-498h and a second extent or a body gap 499a-499h. This configuration of features causes: (i) the lateral edges of each contact arm 494a-494h to have a non-linear edge, (ii) the lateral edges of the neck portion 491a-491h are parallel, but are not co-planar with the lateral edges of the body portion 492a-492h, (iii) the elongated boarders of the contact arm opening 496a-496h are non-linear, (iv) the contact arms 494a-494h to have non-uniform widths, and (v) the contact arm opening 496a-496h to have non-uniform widths.

The contact arms 494a-494h extend: (i) away from the top male terminal wall 480, and (ii) across an extent of the contact arm openings 496a-496h. This configuration is beneficial over the configuration of the terminals shown in FIGS. 9-15, 18, 21-31, 32, 41-42, 45-46, 48 and 50 in PCT/US2018/019787 because it allows for: (i) can be shorter in overall length, which means less metal material is needed for formation and the male terminal 470 can be installed in narrower, restrictive spaces, (ii) has a higher current carrying capacity, (iii) is easier to assemble, and (iv) other beneficial features that are disclosed herein or can be inferred by one of ordinary skill in the art from this disclosure.

The contact arms 494a-494h extend away from the top male terminal wall 480 at an outward angle. In particular, the outward angle may be between 0.1 degree and 16 degrees between the outer surface of the base sections 490a-490b and the outer surface of the of the contact arms 494a-494h, preferably between 5 degrees and 12 degrees and most preferably between 7 degrees and 8 degrees. This configuration allows the contact arms 494a-494h to be deflected or displaced inward and towards the center of the male terminal 470 by the female terminal assembly 800, when the male terminal assembly 430 is inserted into the female terminal assembly 800. This inward deflection helps ensure that a proper mechanical and electrical connection is created by ensuring that the contact arms 494a-494h are placed in contact with the female terminal assembly 800.

The first or neck portion 491a-491h of the contact arm 494a-494h has a neck width $W_N$, while the second or body portion 492a-492h of the contact arm 494a-494h has a body width $W_B$. In the embodiment of the male terminal body 472 shown in the Figures, the neck width $W_N$ (e.g., 1.9 mm) is not equal to the body width $W_B$ (e.g., 3.2 mm). Specifically, the neck width $W_N$ is less than the body width $W_B$, preferably the neck width $W_N$ is at least 10% less than the body width $W_B$, more preferably the neck width $W_N$ is at least 20% less than the body width $W_B$, and most preferably the neck width $W_N$ is at least 40% less than the body width $W_B$. In other words, the neck width $W_N$ may be approximately 60% of the body width $W_B$. This reduction in the neck width $W_N$ in comparison to the body width $W_B$ reduces the force that is required to deflect or displace the contact arm 494a-494h inward and towards the center of the male terminal 470 when coupling the male terminal assembly 430 to the female terminal assembly 800. This is beneficial because it reduces the insertion force that is associated with the male terminal body 472, which is desirable in order to meet industry specifications (e.g., USCAR), reduce fatigue on the installer, and reduce installation times, while also reducing installation errors.

While the neck portion 491a-491h of the contact arm 494a-494h reduces the insertion force that is associated with the male terminal body 472, it also does not act as a current choke because the volume of the neck is larger than the volume of the contact arm 494a-494h that makes contact with the female terminal assembly 800. This is significant because the creation of a current choke by the neck portion 491a-491h would make this design less desirable then other designs that lacked a neck portion that created a current choke. Specifically, the volume of the neck is approximately 4.5 $mm^3$ (e.g., (length) 3 mm*(width) 1.9 mm*(thickness) 0.8 mm) and the volume of the contact area is approximately 2 $mm^3$ (e.g., (length) 0.8 mm*(width) 3.2 mm*(thickness) 0.8 mm). In other words, the volume of the contact area is 44% of the volume of the neck. Thus, the volume of the neck could be substantially reduced before creating a current choke. In other words, it may theoretically be possible to reduce the width of the neck to 0.9 mm, while keeping all other measurements the same, before the neck creates a theoretical current choke. It should be understood that in other embodiments, other measurements may be utilized and these are non-limiting.

By decreasing the insertion force associated with the male terminal body 472 of the male connector assembly 200, the designer has the ability to either: (i) maintain this reduced insertion force by using the same spring member 440d, or (ii) maintain an insertion force that is the same or similar to a male connector assembly 200 that utilizes a male terminal body that does not include contact arms that have a neck portion with a reduced width—namely, a male terminal body similar to the one disclosed in PCT/US2020/049870—by using a spring member that has a first biasing force that is larger than a second biasing force that is associated with spring member 440d. If the second option is selected where the designer desires to build a connector system 10 that has the same insertion force requirements that would be associated with a similar connector system that includes a contact arm that has linear edges, then the designer will reallocate the forces associated with the components that contribute to the insertion force such that a heaver reliance is placed on the spring member 440d and less reliance is place on the male terminal body 472. This heavier reliance on the internal spring member can be beneficial because the designer can easily change the properties of the connector system 10 without requiring alterations to the terminal body 472. For example, the designer can insert a stiffer spring member within the spring receiver 486 in order to increase the current capacity of the system 10. Or if there are specific customer requirements setting forth a target insertion force, the designer can simply select a spring member that meets these requirements without the need to redesign the male terminal body 472. This modularity and flexibility of the connector system 10 is a substantial improvement over the prior art, as reduce the number of product skus, increases the ability to meet customer requirements without retooling or redesigning the connector, and/or limits testing and other steps that would be required to utilize new/different connectors.

The first or neck portion 491a-491h of the contact arm 494a-494h has a neck length $L_N$, while the second or body portion 492a-492h of the contact arm 494a-494h has a body length $L_B$. In the embodiment of the male terminal body 472 shown in the Figures, the neck length $L_N$ (e.g., 3 mm) is not equal to the body length $L_B$ (e.g., 9.7 mm). Specifically, the neck length $L_N$ is less than the body length $L_B$, preferably the neck length $L_N$ is at least 10% less than the body length $L_B$, more preferably the neck length $L_N$ is at least 40% less than the body length $L_B$, and most preferably the neck length $L_N$ is at least 65% less than the body length $L_B$. The neck gap 498*a*-498*h* of the contact arm opening 496*a*-496*h* has a neck gap width $W_{NG}$, while the body gap 499*a*-499*h* of the contact arm opening 496*a*-496*h* has a body gap width $W_{BG}$. In the embodiment of the male terminal body 472 shown in the Figures, the neck gap width $W_{NG}$ (e.g., 1.9 mm) is not equal to the body gap width $W_{BG}$ (e.g., 0.6 mm). Specifically, the neck gap width $W_{NG}$ is greater than the body gap width $W_B$, preferably the neck gap width $W_{NG}$ is at greater 15% less than the body gap width $W_{BG}$, more preferably the neck gap width $W_{NG}$ is at least 40% greater than the body gap width $W_{BG}$, and most preferably the neck gap width $W_{NG}$ is at least 65% greater than the body gap width $W_{BG}$.

The neck gap 498*a*-498*h* of the contact arm opening 496*a*-496*h* has a neck gap length $L_{NG}$, while the body gap 499*a*-499*h* of the contact arm opening 496*a*-496*h* has a body gap legnth $L_{BG}$. In the embodiment of the male terminal body 472 shown in the Figures, the neck gap length $L_{NG}$ (e.g., 3 mm) is not equal to the body gap length $L_{BG}$ (e.g., 9.7 mm). Specifically, the neck gap length $L_{NG}$ is less than the body gap length $L_{BG}$, preferably the neck gap length $L_{NG}$ is at least 10% less than the body gap length $L_{BG}$, more preferably the neck gap length $L_{NG}$ is at least 40% less than the body gap length $L_{BG}$, and most preferably the neck gap length $L_{NG}$ is at least 65% less than the body gap length $L_{BG}$. The front wall 483 of the male terminal body 472 has a front wall length $L_F$w (e.g., 4.5 mm), which is: (i) less than the length of the body length $L_B$ or body gap length $L_{BG}$, and (ii) greater than the neck width $W_N$ or neck gap width $W_{NG}$. In fact, the front wall length $L_F$W is: (i) approximately 35% of the length of the contact arm 494*a*-494*h*, (ii) approximately 45% of the length of the contact arm body length $L_B$, and (iii) approximately 1.5 times longer than the length of the contact arm neck length $L_N$. The reduced length of the front wall 483 is beneficial because it reduces the weight, expense of manufacturing, and cost of materials utilized in the male terminal assemblies 430. These benefits are a substantial improvement over the male terminal assemblies disclosed in PCT/US2019/036010 and PCT/US2020/049870.

Unlike the male terminal bodies disclosed in PCT/US2019/036010 and PCT/US2020/049870, the male terminal body 472 disclosed herein lacks a U-shaped side wall portion that surrounds the contact arms 494*a*-494*h*. This configuration reduces weight, expense of manufacturing, and cost of materials; however, it reduces the durability of the male terminal assembly 430. This reduction in durability is not a drawback to the disclosed system 10 because of the substantial male terminal holder 230 and other non-conductive members of the connector system 10. While the male terminal body 472 disclosed herein lacks the U-shaped side wall portion of PCT/US2019/036010, the male terminal body 472 includes terminal ends 488*a*-488*h* that are: (i) positioned within the spring receiver 486, (ii) have an inner surface that is co-planar with an inner surface of the base sections 490*a*-490*b* of the contact arms 494*a*-494*h*, and (iii) configured to be placed in contact the planar outer surface of the spring arms 452*a*-452*d*, when the spring member 440*d* is inserted into the spring receiver 486. This configuration is beneficial over the configuration shown in FIGS. 3-8 in PCT/US2018/019787 because the assembler of the male terminal assembly 430 does not have to apply a significant force in order to deform a majority of the contact arms 494*a*-494*h* outward to accept the spring member 440*d*. This required deformation can best be shown in FIG. 6 of PCT/US2018/019787 due to the slope of the contact arm and the fact the outer surface of the spring arm and the inner surface of the contact arm are adjacent to one another without a gap formed there between. In contrast to FIGS. 3-8 in PCT/US2018/019787, the present application shows a gap that is formed between the outer surfaces of the spring member 440*d* and the inner surface of the contact arms 494*a*-494*h*. Accordingly, very little force is required to insert the spring member 440*d* into the spring receiver 486 due to the fact the assembler does not have to force the contact arms 494*a*-494*h* to significantly deform during the insertion of the spring 440*d*.

The male terminal 470 is typically formed from a single piece of material (e.g., metal). Therefore, the male terminal 470 is a one-piece male terminal 470 and has integrally formed features. To integrally form these features, the male terminal 470 is typically formed using a die-cutting process. However, it should be understood that other types of forming the male terminal 470 may be utilized, such as casting or using an additive manufacturing process (e.g., 3D printing). In other embodiments, the features of the male terminal 470 may not be formed from a one-piece or be integrally formed, but instead formed from separate pieces that are welded together. In forming the male terminal 470, it should be understood that any number (e.g., between 1 and 100) of contact arms 494*a*-494*h* may be formed within the male terminal 470.

Figure 10:
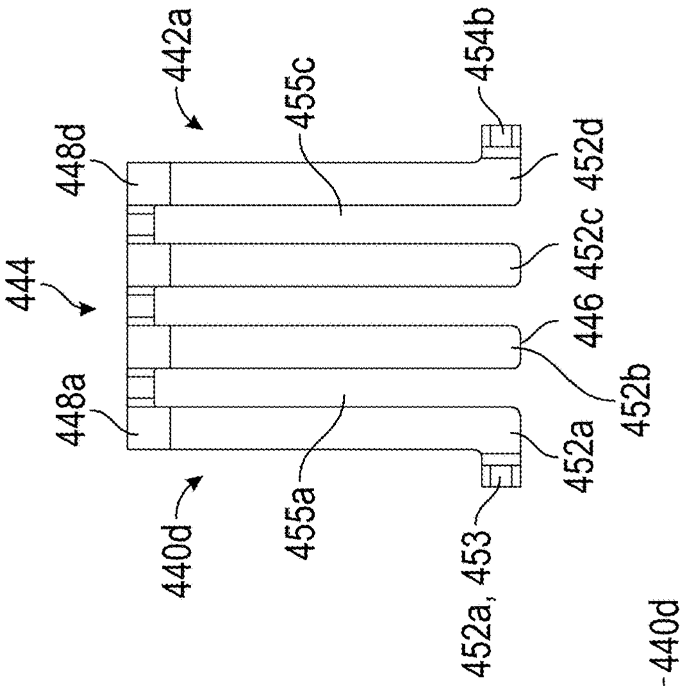
FIG. 10 is a side view of the spring member of FIG. 7.
Figure 9A:
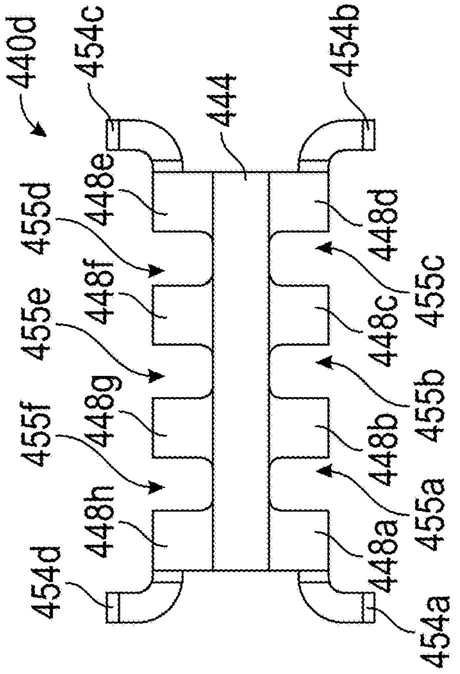
FIG. 9A is a top view of the spring member of FIG. 7.
Figure 8:
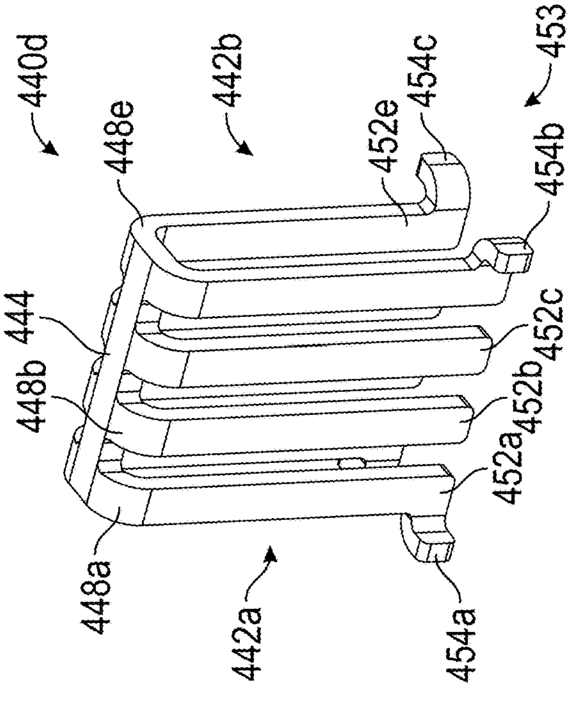
FIG. 8 is a perspective view of the spring member of FIG. 3.

The male terminal assembly 430 is assembled by moving the spring member 440*d* from an unseated state to a seated state. In particular, FIG. 10 shows the spring member 440*d* spaced away from the male terminal body 472 in an unseated state. The installer then applies an insertion force on the spring member 440*d* in order to place the spring member 440*d* in the spring receiver 486. The insertion force is applied on the spring member 440*d* until the rear spring wall 444 is positioned adjacent to the inner surface of the top male terminal wall 480, the free end 446 of the spring member 440*d* is substantially aligned with the free end 488 of the male terminal body 472, and a portion of the spring member 440*d* side walls 442*a*-442*b* is positioned adjacent to the male terminal side walls 482*a*-482*b*. In this position, the spring member 440*d* has moved from the unseated state to the seated state. In the seated state, which is best shown in FIGS. 11-16, the spring member 440*d* makes contact with three separate surfaces of the male terminal body 472, including contact between: (i) an outer surface of the spring member 440*d* and an inner surface of the male terminal body 472, (ii) an inner surface of the "J-shaped" positioning projections 454*a* and 454*d* of the spring member 440*d* and a first end surface of the contact arm 494*a*-494*h* of the male terminal body 472, which is an outer surface of contact arm 494*a* and 494*h*, and (iii) an inner surface of the "J-shaped" positioning projections 454*b* and 454*c* of the spring member 440*d* and a second end surface of the contact arm 494*a*-494*h* of the male terminal body 472, which is an outer surface of contact arm 494*d* and 494*e*. In this manner, each of the positioning projections 454*a*, 454*b*, 454*c*, 454*c* engages and wraps around an interior corner region 493*a*-493*d* (see FIGS. 12 and 13) of the exterior contact arm 494*a*, 494*d*, 494*e*, 494*h* of the male terminal body 472, but not the interior contact arms 494*b*, 494*c*, 494*f*, 494*g*. The engagement due to overlapping or wrapping-around the interior corner region 493*a*-493*d* by the positioning projections 454*a*, 454*b*, 454*c*, 454*c* ensures proper centering and retention of the spring member 440*d* within the spring receive 486 of the male terminal body 472 and is structurally and functionally different than the spring arms and male terminal assemblies disclosed in other PCT applications (e.g., PCT/US2019/036010 and PCT/US2020/049870) that are incorporated herein by reference.

Figure 11:
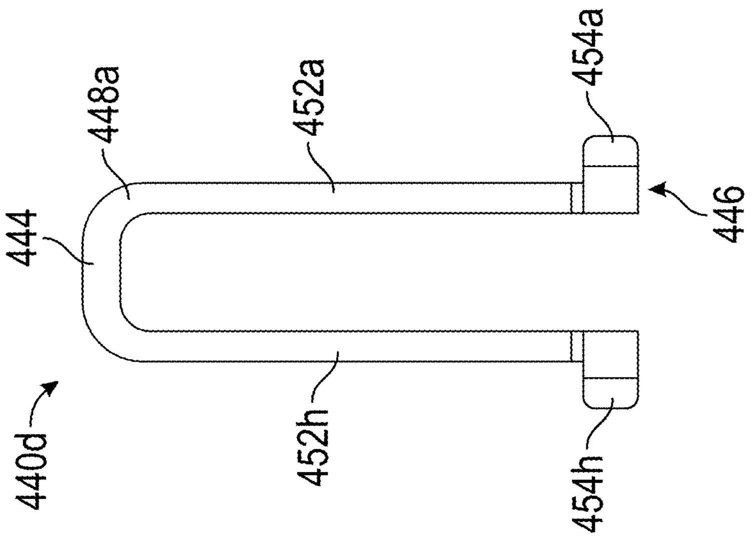
FIG. 11 is an end view of the spring member of FIG. 7.
Figure 9B:
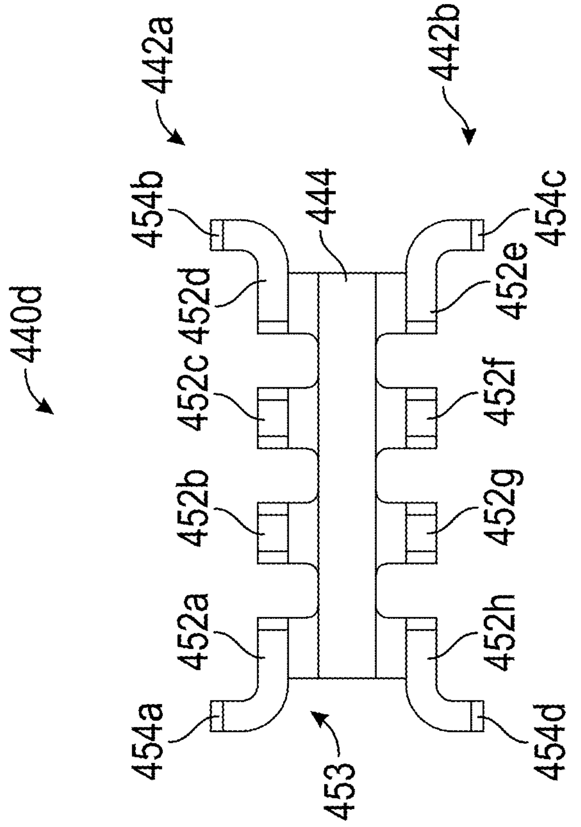
FIG. 9B is a bottom view of the spring member of FIG. 7.

As best shown in FIG. 11, a periphery of the interior lower edge of all spring arms 452*a*-452*h* are not equal and none of the peripheries of the interior lower edge of all spring arms 452*a*-452*h* are equal to the peripheries of the interior lower edge of the contact arms 494*a*-494*h*. Specifically, the periphery of the intermediate spring arms 452*b*-452*c* and 452*f*-452*g* is equal a first length (e.g., 2 mm), the periphery of the exterior spring arms 452*a*, 452*d*, 452*e*, 452*h* is equal a second length (e.g., 4.1 mm), and the periphery of the contact arms 494*a*-494*h* is equal to a third length (e.g., 5.3 mm). Here, the first length is less than the second length, and the second length is less than the third length. Unlike other male terminal assemblies, the first length (e.g., 2 mm) of the intermediate spring arms 452*b*-452*c* and 452*f*-452*g* is not equal to the third length (e.g., 5.3 mm) of the periphery of the contact arms 494*a*-494*h*. Also, the spring arm width $W_S$ (e.g., 2 mm) of the intermediate spring arms 452*b*-452*c* and 452*f*-452*g* is not equal to the body width $W_B$ (e.g., 3.2 mm) or neck width $W_N$ (e.g., 1.9 mm) of the contact arms 494*a*-494*h*. As shown here, the spring arm width $W_S$ is 62.5% of the contact arm body width $W_B$. Meanwhile, the spring arm width $W_S$ is just a little larger than the contact arm neck width $W_N$. While other widths and other ratios of widths are contemplated by this disclosure, alterations of these widths/ratios of widths will likely impact the insertion force of the connector system 10 and thus need to be closely considered when make any changes thereto.

The first embodiment of the male terminal assembly 430 shows a male terminal 470 that is not 360° compliant because the outer surface of the contact arms 494*a*-494*h* are designed to only make contact with two opposed side wall of the female terminal receiver 814 and not all four side walls of the female terminal receiver 814. As such, the spring biasing force $S_{BF}$ is only applied in two directions and not all four directions. It should be understood that some of the embodiments of the male terminal assemblies 430 may be 360 degree compliant because the outer surface of the contact arms 494*a*-494*h* are designed to make contact with all four side walls of the female terminal receiver 814.

The male terminal 470, including the contact arms 494*a*-494*h*, may be formed from a first material such as copper, a highly-conductive copper alloy (e.g., C151 or C110), aluminum, and/or another suitable electrically conductive material. The first material preferably has an electrical conductivity of more than 80% of IACS (International Annealed Copper Standard, i.e., the empirically derived standard value for the electrical conductivity of commercially available copper). For example, C151 typically has 95% of the conductivity of standard, pure copper compliant with IACS. Likewise, C110 has a conductivity of 101% IACS. In certain operating environments or technical applications, it may be preferable to select C151 because it has anti-corrosive properties desirable for high-stress and/or harsh weather applications. The first material for the male terminal 470 is C151 and is reported, per ASTM B747 standard, to have a modulus of elasticity (Young's modulus) of approximately 115-125 gigaPascals (GPa) at room temperature and a coefficient of terminal expansion (CTE) of 17.6 ppm/degree Celsius (from 20-300 degrees Celsius) and 17.0 ppm/degree Celsius (from 20-200 degrees Celsius).

The spring member 440*a*, 440*b*, 440*d* may be formed from a second material such as spring steel, stainless steel (e.g., 301SS, ¼ hard), and/or another suitable material having greater stiffness (e.g., as measured by Young's modulus) and resilience than the first material of the male terminal 470. The second material preferably has an electrical conductivity that is less than the electrical conductivity of the first material. The second material also has a Young's modulus that may be approximately 193 GPa at room temperature and a coefficient of terminal expansion (CTE) of approximately 17.8 ppm/degree Celsius (from 0-315 degrees Celsius) and 16.9 ppm/degree Celsius (from 0-100 degrees Celsius).

Based on the above exemplary embodiment, the Young's modulus and the CTE of the spring member 440*d* is greater than the Young's modulus and the CTE of the male terminal 470. Thus, when the male terminal 470 is used in a high power application that subjects the system 10 to repeated thermal cycling with elevated temperatures (e.g., approximately 150° Celsius) then: (i) the male terminal 470 become malleable and loses some mechanical resilience, i.e., the copper material in the male terminal 470 softens and (ii) the spring member 440*d* does not become as malleable or lose as much mechanical stiffness in comparison to the male terminal 470. Thus, when utilizing a spring member 440*d* that is mechanically cold forced into shape (e.g., utilizing a die forming process) and the spring member 440*d* is subjected to elevated temperatures, the spring member 440*d* will attempt to at least return to its uncompressed state, which occurs prior to insertion of the male terminals assembly 430 within the female terminal assembly 800, and preferably to its original flat state, which occurs prior to the formation of the spring member 440*d*. In doing so, the spring member 440*d* will apply a generally outward directed thermal spring force $S_{TF}$ on the free end 488 of the male terminal 470. This thermal spring force $S_{TF}$ is dependent upon local temperature conditions, including high and/or low temperatures, in the environment where the system 10 is installed. Accordingly, the combination of the spring biasing force $S_{BF}$ and the thermal spring force $S_{TF}$ provides a resultant biasing force $S_{RBF}$ that ensures that the outer surface of the contact arms 494*a*-494*h* are forced into contact with the inner surface of the female terminal assembly 800 when the male terminal 470 is inserted into the female terminal assembly 800 and during operation of the system 10 to ensure an electrical and mechanical connection. Additionally, with repeated thermal cycling events, the male terminal assembly 430 will not decrease the outwardly directed resultant spring forces $S_{RBF}$ that are applied to the female terminal assembly 800 during repeated operation of the system 10. It should be understood that additional details about the male terminal 470 and the spring 440*d* are discussed within PCT/US2019/036010, PCT/US2019/036070, PCT/US2019/036127, PCT/US2021/043686, PCT/US2021/043788, and PCT/US2021/057959, each of which is incorporated herein by reference.

C. Male Shielding Assembly

As best shown in FIGS. 17-18 and 97-99B, the shielding assembly 60 includes male shielding assembly 530 that resides within the male housing assembly 220 and is designed to interact with the female shielding assembly 930 in order to reduce the electromagnetic interference ("EMI") noise emitted by the male connector assembly 200. The male shielding assembly 530 is comprised of: (i) a male terminal body shield 532, (ii) a male connection plate shield 538, (iii) a bottom shield 542, (vi) a shielding cap 546, and (v) a shielding connector 556. Each of these components are coupled together to form an electrical path that is connected to the cable shields and partially surround the male terminal assembly 430. The male terminal body shield 532 is configured to be positioned adjacent to the exterior wall arrangement 244 of the male terminal holder 230 and the cap 262 of the shield insulator 260 and interact with male connection plate shield 538 and the bottom shield 542. The male terminal body shield 532 has: (i) two opposed side walls 534*a*, 534*b*, where three deformable coupling members 536*a*-536*c* are formed in one side wall 534*a*, three deformable coupling member 536*d*-536*f* are formed in the opposed side wall 534*b*, (ii) a front wall 534*c*, with two deformable coupling members 536*g*-536*h* are formed in the front wall 534*c*, and (iii) a top wall 534*d* with divot that matches the securing recess 268 formed in the cap 262. The bottom shield 542 has an arrangement of walls 544 that form a bowl shaped receiver that is configured to partially surround male connector plate 474, be positioned adjacent to an extent of the male terminal holder 230, and interact with the male terminal body shield 532 and the male connection plate shield 538. The bottom shield 542 includes one deformable coupling member 536*i* which extend from the bottom wall of the arrangement of walls 544. The combination of the male terminal body shield 532 and bottom shield 542 provide nine deformable coupling member 536*d*-536*i* (e.g., six on the sides of the terminal assemblies 430, two in front of the terminal assemblies 430, and one in the rear of the of the terminal assemblies 430). It should be understood that other numbers of shield coupling member 536*a*-536*i*, which form the shield coupling assembly 535, are contemplated by this disclosure included between one shield coupling member and fifty shield coupling members.

The male connection plate shield 538 includes an arrangement of walls 540 that form a rectangular receiver that is designed to surround the male connection plate 474 and interact with the bottom shield 542, male terminal body shield 532, and shielding cap 546. To facilitate these interactions, the male connection plate shield 538 includes forward connection elements 542*a* and rear connection elements 542*b*. The shielding cap 546 also includes an arrangement of walls 548 that form a rectangular receiver that is designed to surround an extent of the male connection plate 474 and the conductor 598. Additionally, shielding cap 546 is designed to interact with the male connection plate shield 538 and the shielding connector 556. Finally, the shielding connector 556 is designed to surround an extent of the conductor 598 and interact with the shielding cap 546 and the shield that is integrated into the conductor 598. It should be understood that other configurations, elements, and components are contemplated by this disclosure, which function together to connect the integrated conductor shield to a structure that surrounds a majority of the male terminal assembly 430. Further, it should be understood that inclusion of the male shielding assembly 530 is optional and can be omitted, if desired. The male shielding assembly 530 is formed from a conductive material, such as metal. Other conductive materials (e.g., conductive plastics) that may be utilized are disclosed within PCT/US2020/013757, which is incorporated herein by reference.

As shown in FIGS. 14A and 14B, a force is applied on the male terminal assemblies 430 to position said male terminal assemblies 430 in the male terminal holders 230 in order to move the combination of components from the uncoupled state to the coupled state. Once the male terminal assemblies 430 are positioned within the male terminal holders 230, a force can be applied on the cap 262 of the shield insulator 260 to couple the caps 262 to the male terminal holders 230 and secure the male terminal assemblies 430. Next, an upwardly force is applied to the bottom shield 542 in order to position said bottom shield 542 around a lower extent of the male terminal holder 230. After the bottom shield 542 is installed, then a downwardly directed force is applied on the male terminal body shield 532 to position said male terminal body shield 532 in contact with: (i) an extent of the male terminal holder 230, (ii) an extent of the cap 262, (iii) an extent of the bottom shield 542. In this configuration, the shield coupling member 536*a*-536*i* form nine contact points (e.g., six on the sides of the terminal assemblies 430, two in front of the terminal assemblies 430, and one in the rear of the of the terminal assemblies 430) that are designed to make contact with the female shielding assembly 930, when the system 10 is in the ready to use state.

Once the bottom shield 542 and the male terminal body shield 532 are properly positioned around the male terminal assembly 430, a force is applied to the male connection plate shield 538 in order to cause the forward and rear connection elements 542*a*, 542*b* to make contact with the bottom shield 542 and the male terminal body shield 532. Next, a conductor 598 is welded to the male connection plate 474 and then the shielding cap 546 is coupled to the bottom shield 542 and the male terminal body shield 532. Finally, the shielding cap 546 is connected to the shielding connector 556, which is crimped to conductor's shield.

D. Male Interlock Assembly

As shown and discussed in greater detail in PCT/US2021/043686, the male interlock or MIL 590, which is a part of the IL assembly 100, is design help prevent arcing from occurring during the mating of the connector assembly 200, 600. To achieve this, the IL assembly 100 prevents electrical current from being applied to a portion of the connector system 10, namely—the female connector assembly 600—prior to the connector system being placed in the connected state. This functionality is achieved using an interlock circuitry, which may include: (i) components of a battery distribution system, which include a sense module and a disconnect controller, and (ii) a disconnect switch. The sense module is coupled to the FIL receiver 982 and detects when the circuit is closed by the insertion of the MIL jumper 592. When the circuit is closed, the sense module sends a signal to the disconnect controller to close the disconnect switch. When the disconnect switch is closed, electrical current can flow from the power supply through the switch to the connector system 10. Alternatively, when the MIL jumper 592 is not inserted into the FIL receiver 982, the sense module sends a signal to the disconnect controller to open the disconnect switch. When the disconnect switch is open, electrical current cannot flow from the power supply through the switch to the connector system 10. For sake of clarity, a chart showing the operation of these components is shown in FIG. 74B of PCT/US2021/043686 and other examples of interlock circuits are disclosed in U.S. Pat. Nos. 7,084,361, 7,508,097, 7,586,722, 8,466,586, 9,327,601, 9,533,639 or 9,851,387, each of which is fully incorporated herein by reference.

As shown in the Figures, the MIL 590 includes a jumper 592 having two connecting elements 594*a*, 594*b* that are connected to each other. Said jumper is positioned between the male terminal assemblies 430. These connecting elements 594*a*, 594*b* are designed to short and connect the wires that are contained in the IL circuit and are connect to the FIL receiver 982, when the connecting elements 594*a*, 594*b* are received by the FIL receiver 982. It should be understood that the MIL 590 can be either molded into the male housing assembly 220 or can be added after the connector assembly 200 has been fully assembled. It should also be understood that other structures that are designed to short the wires contained in the FIL 980 are contemplated by this disclosure.

E. Assembly of the Male Connector Assembly

Figure 3:
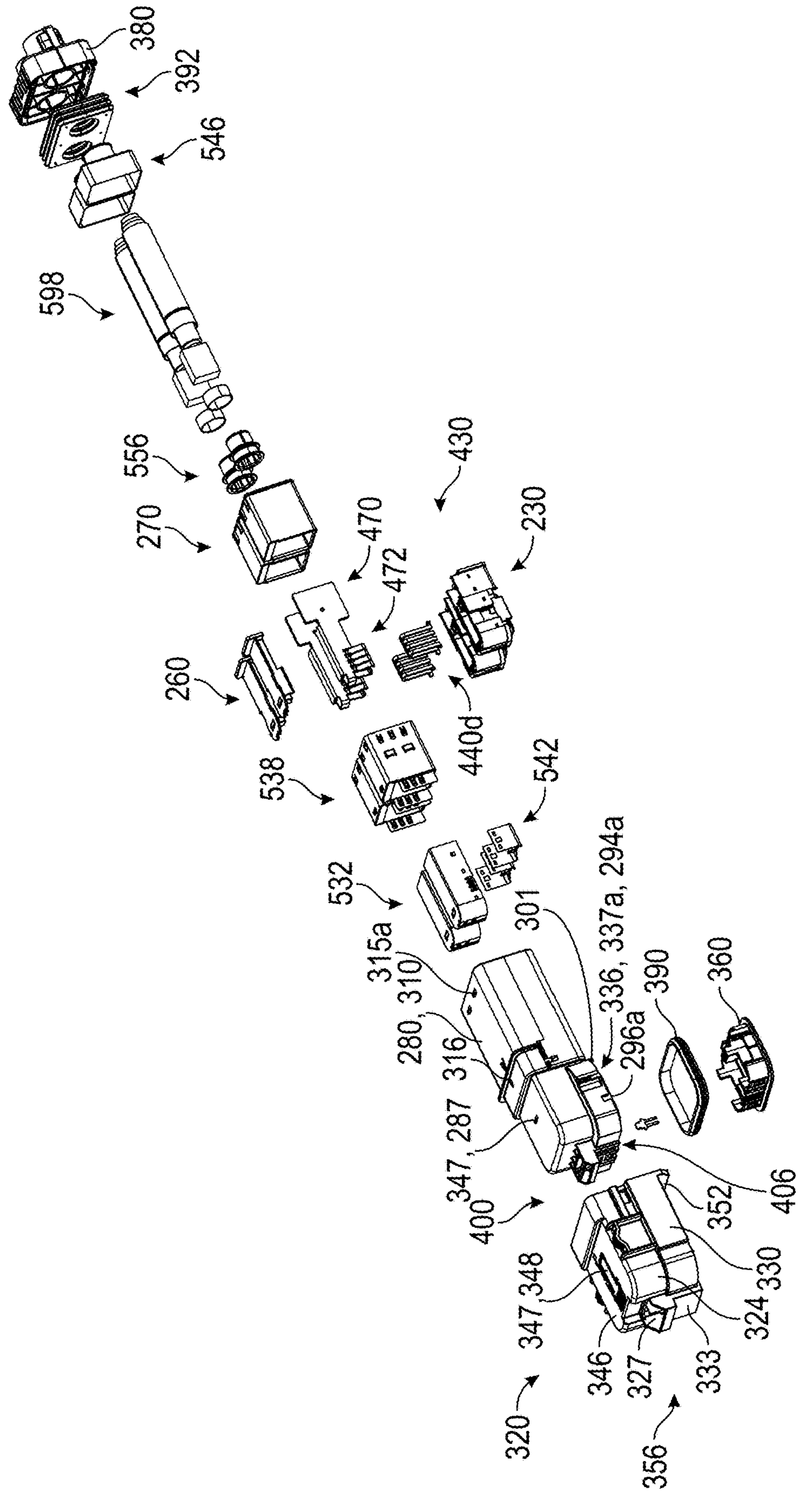
FIG. 3 is a perspective view of the male connector assembly of FIG. 2 in a disassembled state, where the male connector assembly includes: (i) a male housing assembly, (ii) male terminal assemblies, each having a male terminal and a spring member, (iii) male shielding assemblies, and (vi) a male interlock ("MIL")
Figure 4:
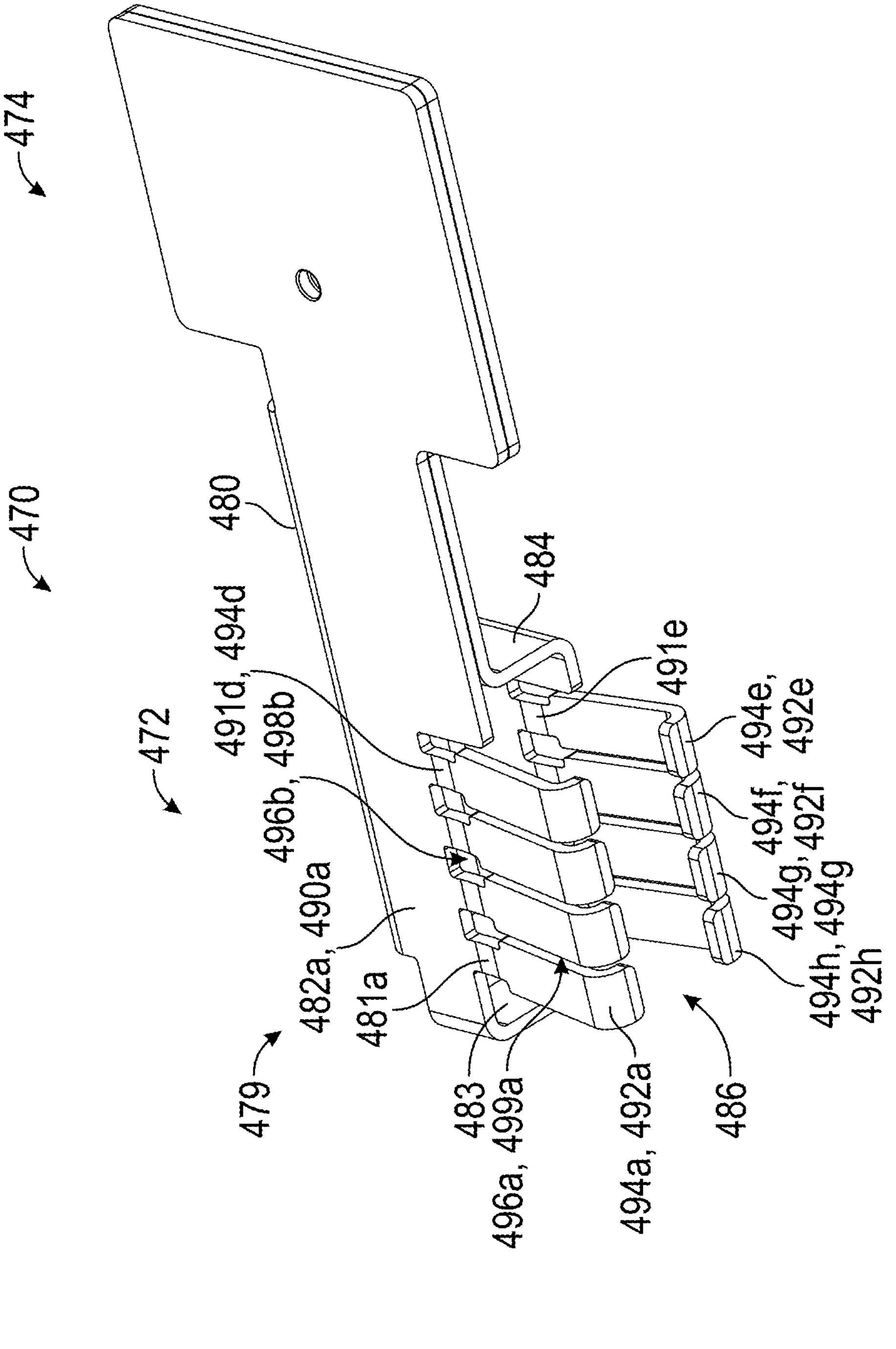
FIG. 4 is a bottom perspective view of one of the male terminals of FIG. 3.
Figure 5A:
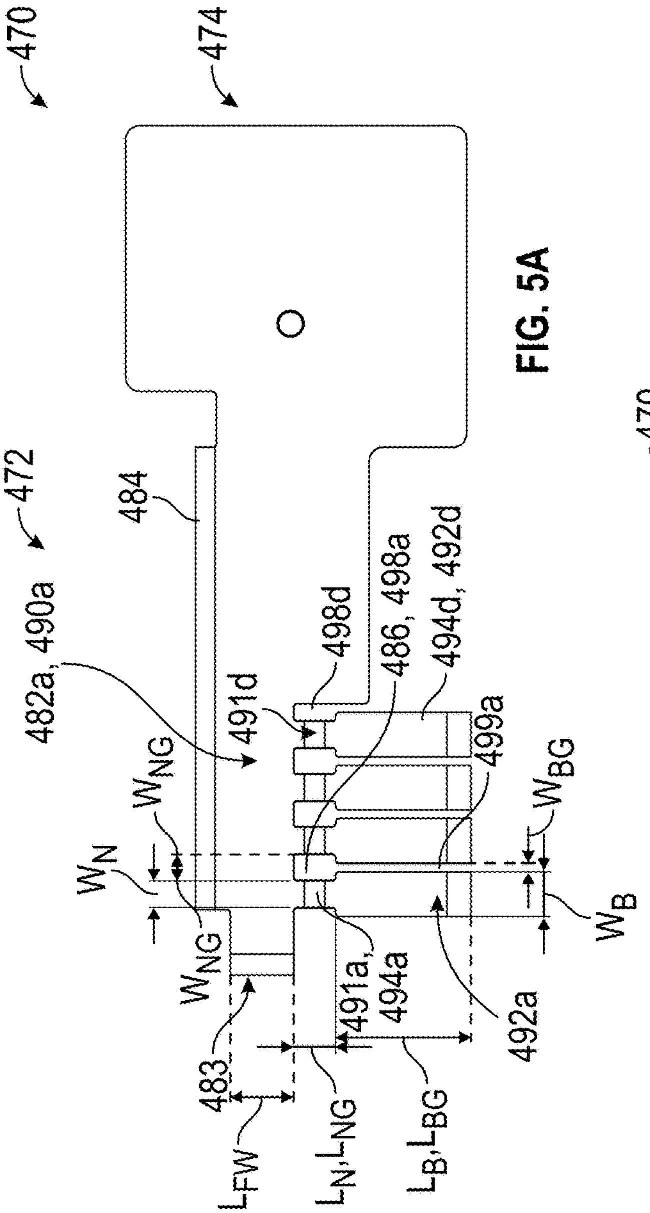
FIG. 5A is a first side view of the male terminal of FIG. 4.
Figure 6A:
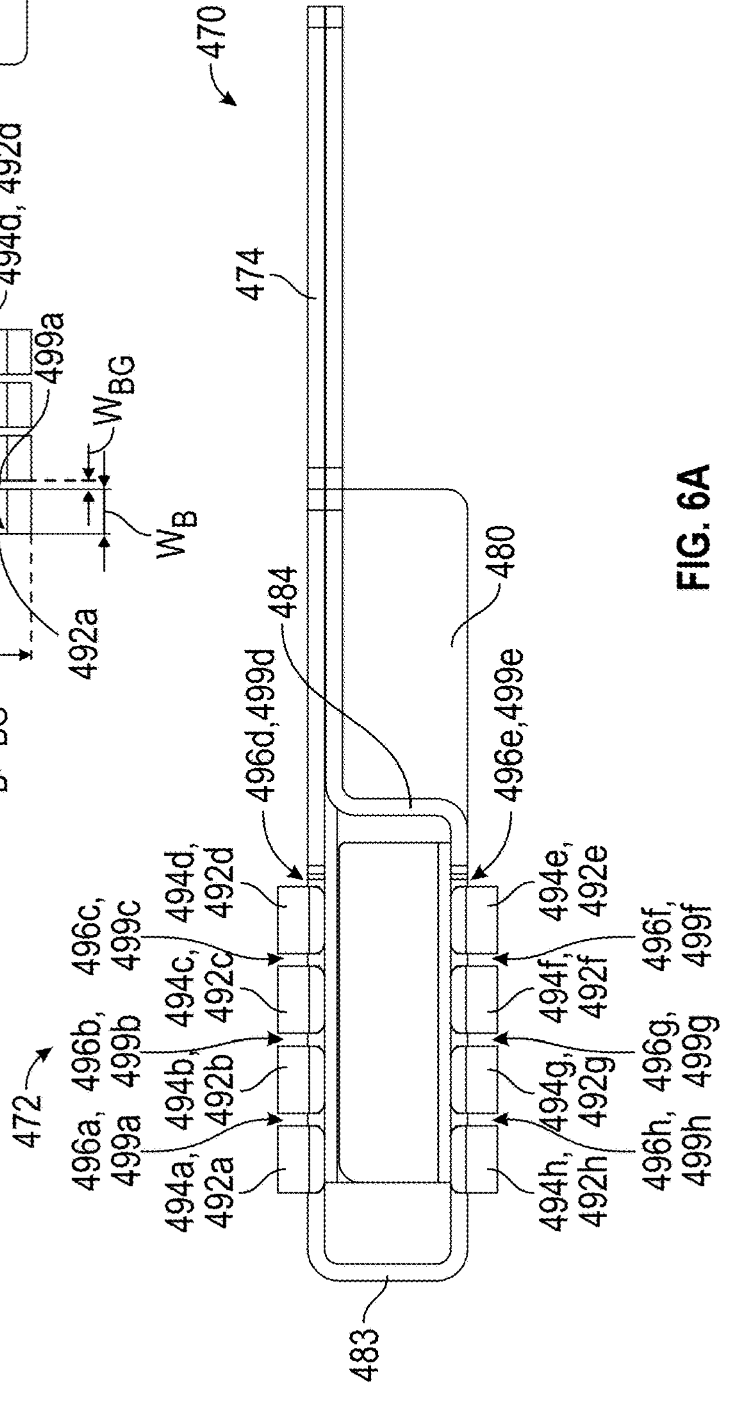
FIG. 6A is a bottom view of the male terminal of FIG. 4.
Figure 5B:
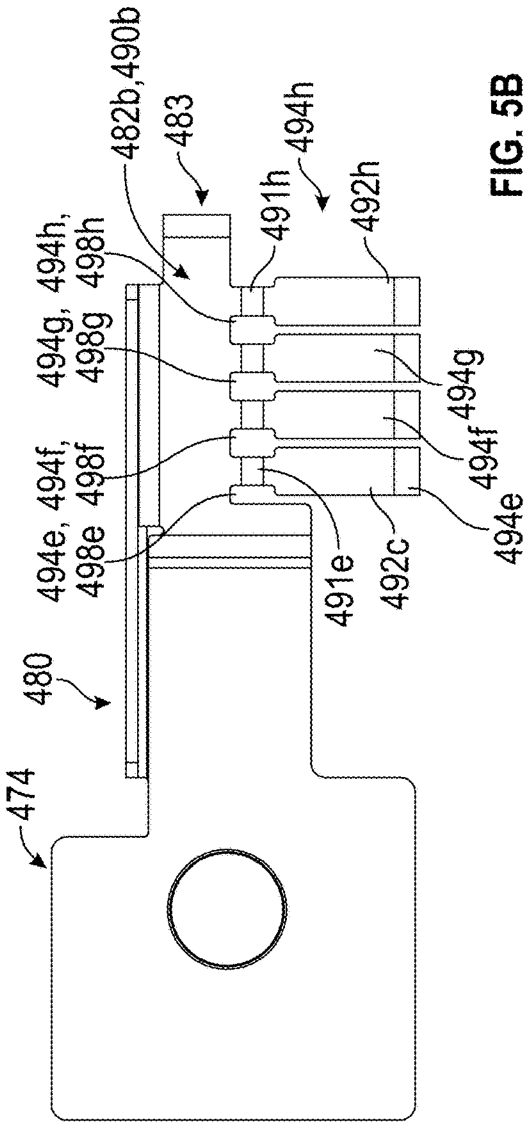
FIG. 5B is a opposed second side view of the male terminal of FIG. 4.
Figure 7B:
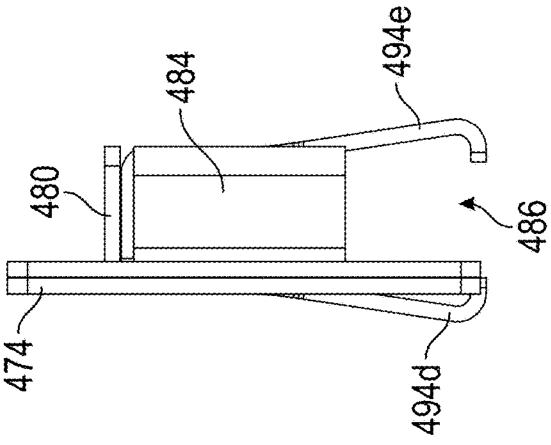
FIG. 7B is a rear view of the male terminal of FIG. 4.
Figure 7A:
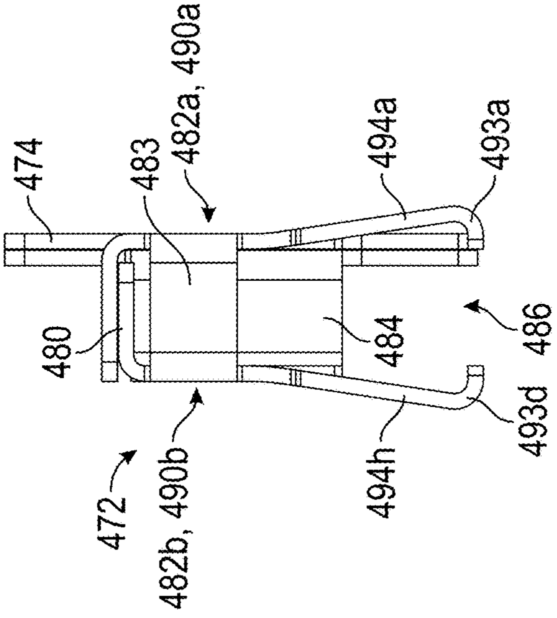
FIG. 7A is a front view of the male terminal of FIG. 4.
Figure 6B:
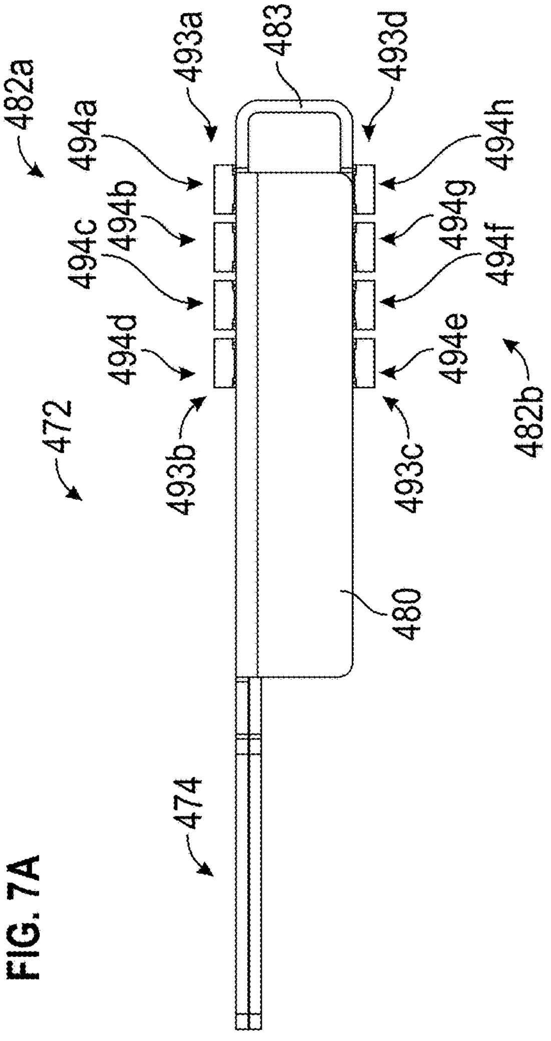
FIG. 6B is a top view of the male terminal of FIG. 4.

As shown in FIG. 3, the male connector assembly 200 is in a disassembled state. As described above and shown in FIGS. 12-13B, the first step in assembling the male connector assembly 200 is moving the male terminal assembly 430 from an unseated state to a seated state by positioning the spring member 440*d* in the spring receiver 486 of the male terminal body 472. As shown in FIG. 14A, the second step in assembling the male connector assembly 200 is moving the male terminal assembly 430 from an uncoupled state to a coupled state by positioning the male terminal assembly 430 in the male terminal holder 230. As shown in FIGS. 14B-17, the next step in assembling the male connector assembly 200 is finishing the assembling the non-conductive elements that surround the male terminal assembly 430. In particular, this step involves coupling the shield insulator 260 to the male terminal holder 230. Once this step is complete, the male connector assembly 200 is in the first partially assembled state.

Figure 21:
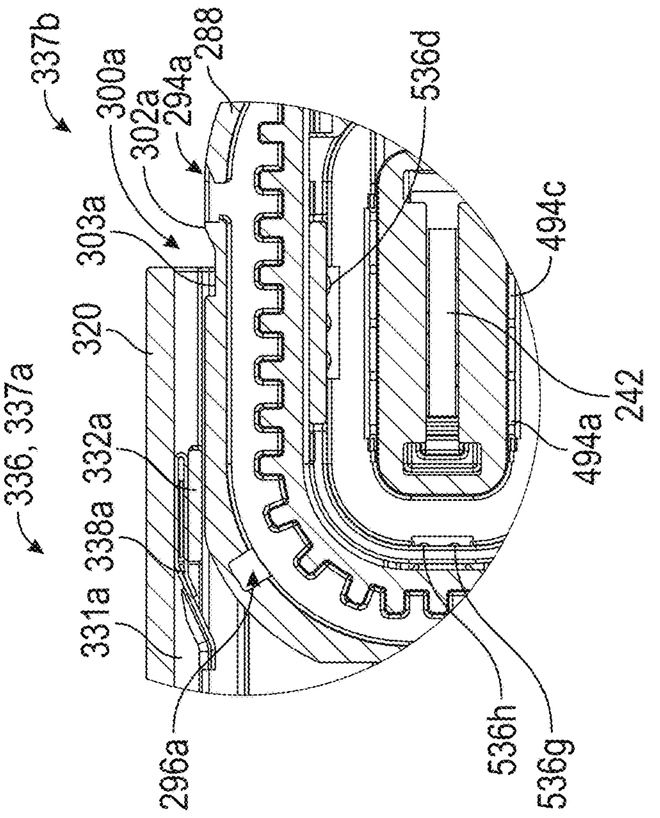
FIG. 21 is a zoomed-in view of area A of the male connector assembly of FIG. 20 showing the accidental engagement assembly.
Figure 19:
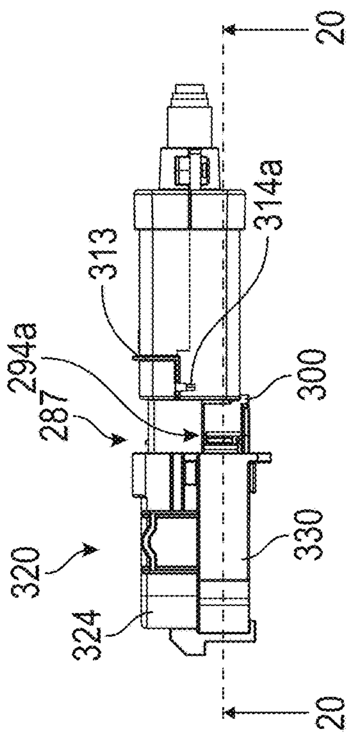
FIG. 19 is a side view of the male connector assembly in a second partially assembled state, where a primary locking member is partially coupled to the main housing member and a secondary locking member has been omitted.
Figure 20:
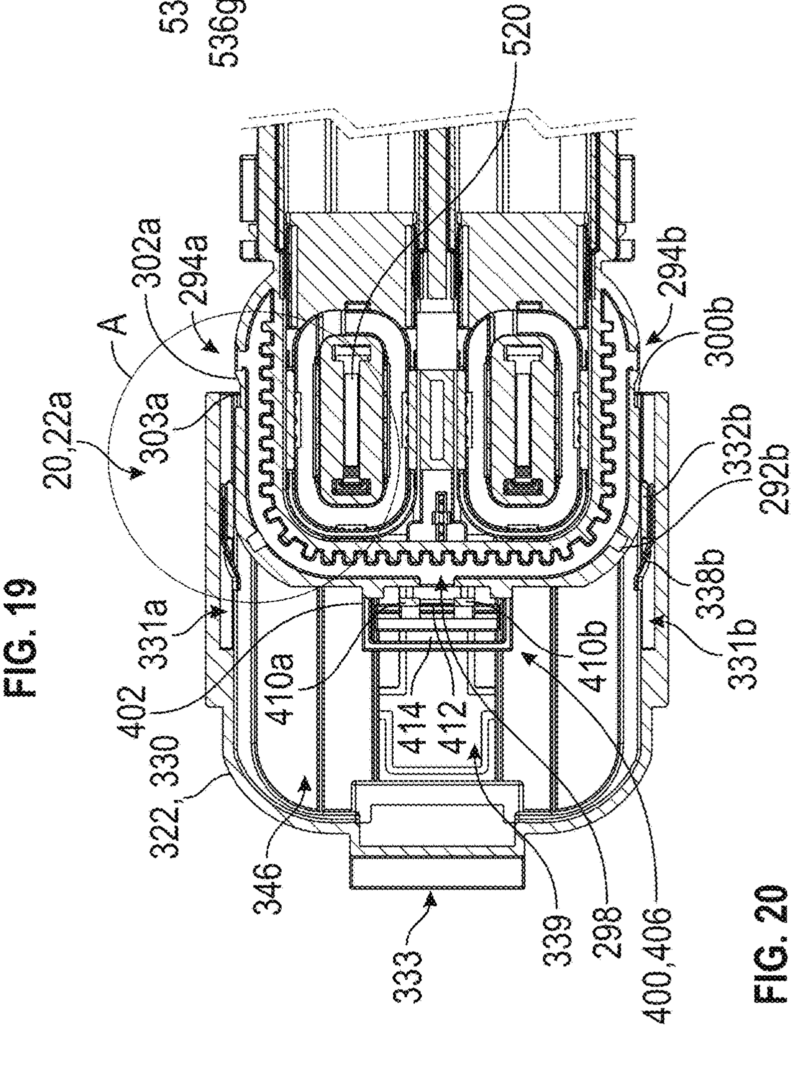
FIG. 20 is a cross-sectional view of the male connector assembly taken along line 20-20 of FIG. 19.
Figure 22:
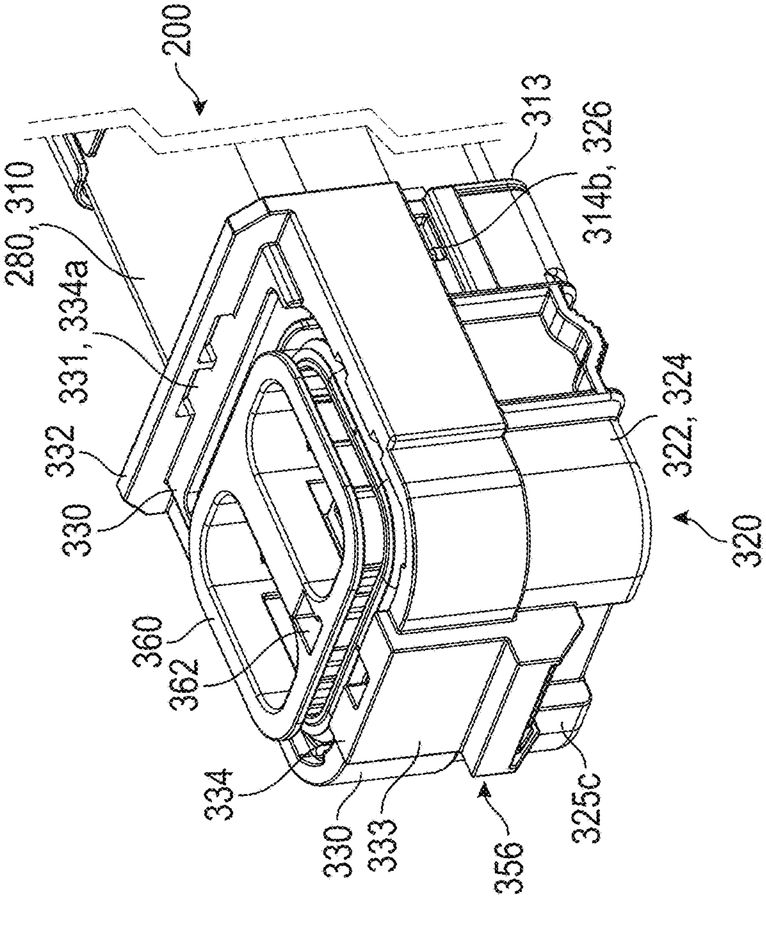
FIG. 22 is a bottom perspective view of the male connector assembly of FIG. 3 in a third partially assembled state, where the primary locking member is coupled to the main housing and a secondary locking member is in an unreceived state.
Figure 23:
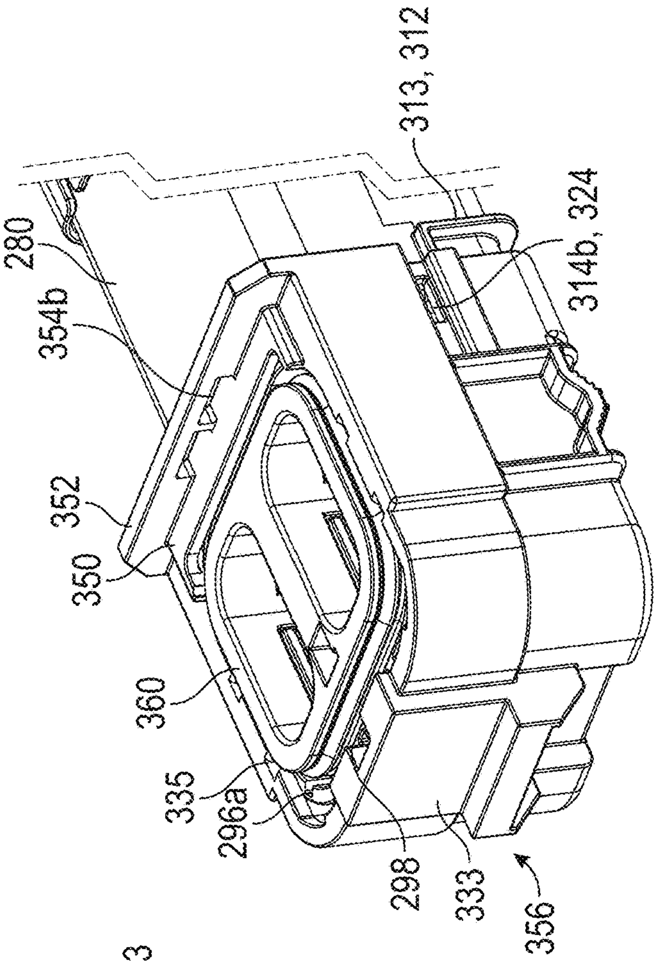
FIG. 23 is a bottom perspective view of the male connector assembly of FIG. 3 in an assembled state, where the primary locking member is coupled to the main housing member and a secondary locking member is in a received state.

To move the male connector assembly 200 from the first partially assembled state to the second partially assembled state: (i) the male shielding assembly 530 is installed around the non-conductive elements of the male terminal assembly 430 in the manner described above, (ii) the combination of the male terminal assembly 430, housing members 230, 260, and shielding assembly 530 are inserted into the main housing 280, and (iii) the primary locking member 320 is partially coupled to the main housing 280 by applying a rearwardly directed force on said primary locking member 320, as shown in FIGS. 19-21.

The application of the rearwardly directed force on said primary locking member 320 will cause the primary locking member 320 to default into the locked state or forward state. In order to move the primary locking member 320 from this locked state, the installer applies a downward directed pivoting force $F_P$ on the forward or unlocking cantilever segment 340*a* in order to cause the rear or locking cantilever segment 340*a* to pivot around the pivot strip 339 in order to move a lowermost extent of the second disengagement projection 342 above the uppermost extent of the first disengagement projection 287. While applying the downward directed force on the forward or unlocking cantilever segment 340*a*, the installer also applies a rearwardly directed unlocking force $F_{UL}$ on the primary locking member 320 in order to move the second disengagement projection 342 rearward of the first disengagement projection 287. In this state, the locking member 320 is in the rearward state or unlocked state. The required downward directed pivoting force $F_P$ is less than 25 Newtons of force, while the required unlocking force $F_{UL}$ is less than 25 Newtons of force. To move the male connector assembly 200 from the second partially assembled state to the third partially assembled state, the secondary locking member 360 is positioned in the main housing 280, but is not coupled thereto (i.e., the secondary locking member 360 is in the unreceived state). To move the male connector assembly 200 from the third partially assembled state to the assembled state, an upwardly directed force is applied to the secondary locking member 360 to move it from the unreceived state to the received state (see FIGS. 22-23).

2. Female Connector Assembly

FIGS. 28-31 and 38-99B provide various views of the female connector assembly 600. The female connector assembly 600 includes: (i) a female housing 620 with a female CPA assembly 700, (ii) a female touch-proof member 720, (iii) a female terminal assembly 800, (iv) female shielding assembly 930, and (v) a female IL assembly 980.

A. Female Housing Assembly

Figure 28:
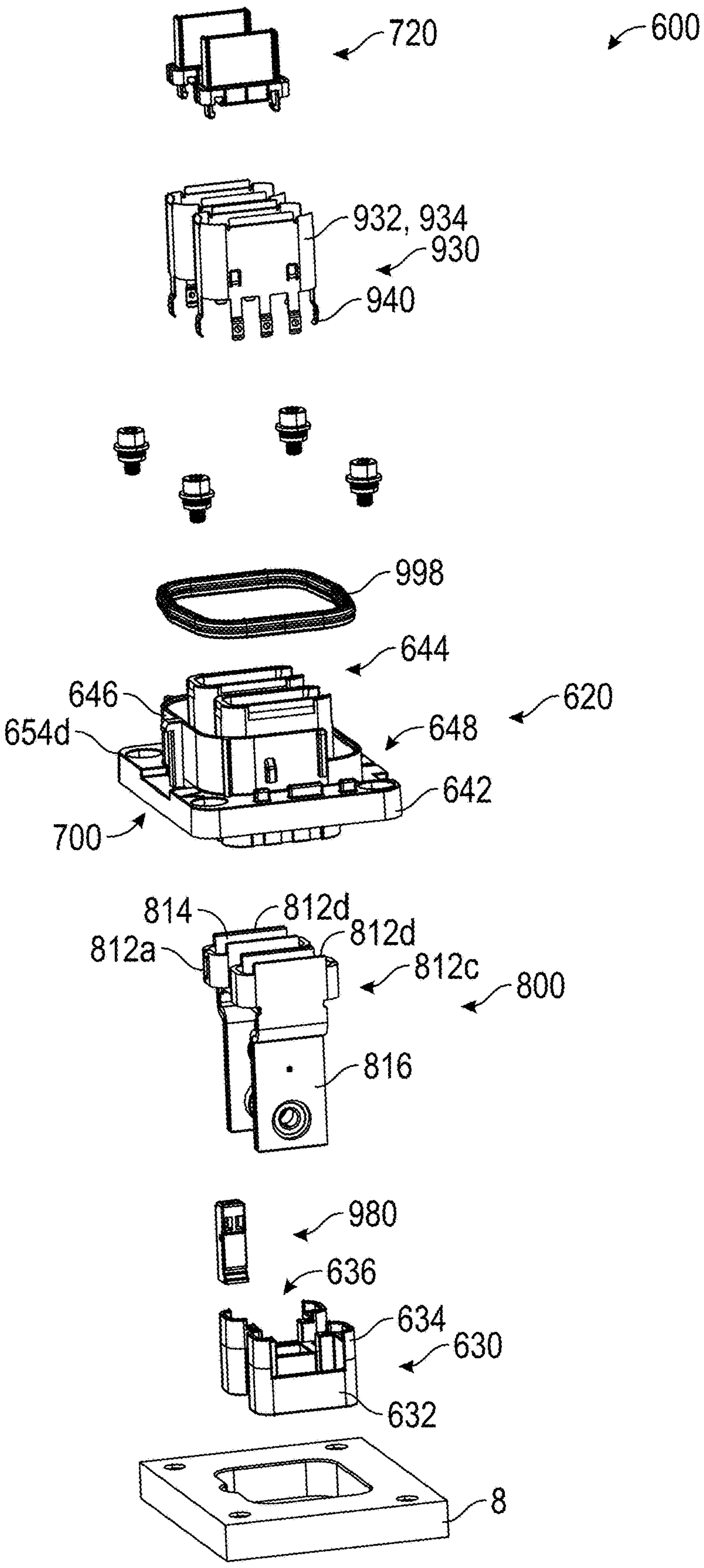
FIG. 28 is a perspective view of the female connector assembly of FIG. 2 in a disassembled state, where the female connector assembly includes: (i) a female housing assembly, (ii) a touch-proof member, (iii) a female terminal assemblies, (iv) female shielding assemblies, and (v) a female interlock ("FIL")
Figure 29:
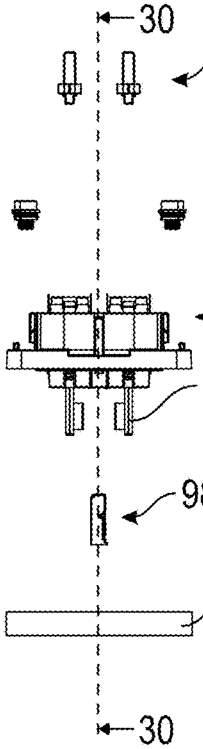
FIG. 29 is an end view of the female connector assembly of FIG. 28 in a first partially assembled state, where the FIL is in an un-received position and the touch-proof assembly is in an uninstalled position.

As best shown in FIG. 28, the female housing assembly 620 includes: (i) female terminal holder 630, (ii) main housing 640, and (vii) a seals 998. The female terminal holder 630 is configured to receive the 630 terminal assembly 800, isolate the female shielding assembly 930 from the female terminal assembly 800, facilitate positioning and retaining the female terminal assembly 800 in the female connector assembly 600, and other functions that are obvious to one of skill in the art based on the below disclosure and figures. The female terminal holder 630 has an arrangement of walls 632 with terminal holding projections 634 and terminal holding recesses 636, where the outer surface of the projections substantially match the outer surface of the end walls of the female terminal assemblies 800 and the terminal holding recesses 636 receive an extent of the side walls of the female terminal assemblies 800. The female terminal holder 630 is configured to be placed in contact with both the shielding assembly 60 and the female terminal assembly 800; thus, it is desirable to form the female terminal holder 630 from a non-conductive material. It should be understood that the non-conductive material that is chosen should be able to sufficiently isolate the female terminal assembly 800, even when a high current load is flowing through the terminal assembly 800. As discussed in other parts of this application, the female terminal holder 630 may be formed using any suitable method, such as injection molding techniques, 3D printing, cast, thermoformed, or any other similar technique.

The female main housing 640 includes: (i) a base wall 642, (ii) an arrangement of internal walls 644, (iii) an arrangement of external walls 646, (iv) female bracing assembly 648, (v) an arrangement of terminal securing projections 670, (vi) a FIL retainer 674, and (vii) the female CPA assembly 700. As shown in FIGS. 28-31, the base wall 642 is designed to be positioned adjacent to an extent of a component 8 contained in the power distribution system and facilitate the coupling of the female terminal assemblies 800 to said component. As such, the base wall 642 has a substantial thickness to help ensure proper mounting and has four connector openings 654*a*-654*d* formed therethrough. Said connector openings 654*a*-654*d* are designed to receive an extent of elongated couplers that are configured to secure the female connector assembly 200 to the component.

The arrangement of internal walls 644 extend upward from the base wall 642 and include a first and second arrangement of housing receiving walls 658*a*, 658*b*. Each of the arrangements of housing receiving walls 658*a*, 658*b* include: (i) two side walls 660*a*, 660*b*, and (ii) two end walls 660*c*, 660*d*. The combination of the side walls 660*a*, 660*b* and the end walls 660*c*, 660*d* form a rectangular receiver 662 that is designed to receive an extent of the female terminal assembly 800. In particular, the side walls 660*a*, 660*b* have an upper portion that: (i) extends above the female terminal assembly 800, and (ii) includes a contact arm displacement means 663 for displacing the contact arms 494*a*-494*h* during insertion of the male terminal assembly 430. Here, the contact arm displacement means 663 is an internal segment 664 of the upper portion of the side walls 660*a*, 660*b*, which has a sloped surface that is designed to slidingly engage with an extent of the contact arms 494*a*-494*h* of the male terminal assembly 430 during insertion of the male terminal assembly 430 into the receptacle 653 of the female housing 620. The internal segment 664 is angled or sloped relative to the outer surface of the side walls 660*a*, 660*b* at an internal angle. In this exemplary embodiment, the internal angle α is between 0.01 degrees and 15 degrees, preferably between 1 degree and 7 degrees and most preferably 5 degrees. Also, the internal angle α is substantially constant. This angled internal segment 664 is designed to gently compress contact arms 494*a*-494*h* inward as these two components slidingly engage while the operator (e.g., a worker or a robot) inserts the male connector assembly 200 into the receptacle of the female connector assembly 600.

It should be understood that in other embodiments, the sloped or angled configuration of the internal segment 664 may not be constant, the dimensions may be different, and the internal segment 664 may be continuous within the housing 620. It should also be understood that the internal segment 664 is typically formed from the same material that the rest of the female housing 640 is formed from, such as polymer (e.g., nylon or plastic). Utilizing a polymer material is beneficial because there is less friction between the metal contact arms 494*a*-494*h* and the polymer material of the internal segment 664 in comparison to the friction between either: (i) the metal contact arms 494*a*-494*h* and an alternative internal segment 664 made from metal, or (ii) the metal contact arms 494*a*-494*h* and the metal female terminal assembly 800. In alternative embodiments, a coating, liner or other materials may be used to line or coat the internal segment 664 to reduce the friction with the contact arms 494*a*-494*h*.

The arrangement of external walls 646 also extend upward from the base wall 642 and surrounds the arrangement of internal walls 644. The arrangement of external walls 646 includes two side walls 650*a*, 650*b* that include: (i) the female accidental engagement assembly 652 with an accidental engagement projections 654*a*, 654*b*, (ii) positioning structures 656*a*, 656*b*, and (iii) stabilization projections 658*a*, 658*b*. As discussed in greater detail below and when the male connector assembly 800 is connected to the female connector assembly 600, the accidental engagement projections 654*a*, 654*b* are configured to be received by the accidental engagement slots 294*a*, 294*b*, the positioning structures 656*a*, 656*b* are configured to be received by the positioning slots 296*a*, 296*b*, and (iii) the stabilization projection 658*a*, 658*b* are configured to be received by the stabilization slots 297*a*, 297*b*. The female bracing assembly 648 extend rearward from the base wall 642 and include two bracing projections 649*a*, 649*b*. The bracing projections 649*a*, 649*b* are configured to fit within the two bracing apertures 354, when the primary locking member 320 is in a locked state.

The arrangement of terminal securing projections 670 includes a plurality of terminal securing projections 672*a*-672*c*, which are configured to be positioned under an extent of the female terminal assembly 800 to secure said female terminal assembly 800 within the female main housing 640. Also formed on a bottom extent of the base wall 642 is the FIL retainer 674. Said FIL retainer 674 is a deformable FIL projection 676 that allows the FIL to optionally be added to the system 10. This is beneficial over other disclosed system because: (i) it does not add weight to the system, if this component is not desired, (ii) reduces part numbers/SKUs that a manufacture maintains, and (iii) other benefits that are obvious to one of skill in the art based on the below disclosure and figures. The female CPA assembly 700 includes a female coupling member 702 that is coupled to the external walls 646 of the main housing 640 and includes a CPA body 704 and a CPA retaining member 706 that extends from the CPA body 704. The CPA body 704 and CPA retaining member 706 are configured to be positioned in the CPA slot 298 formed in the male connector assembly 200, when the male connector assembly 800 is connected to the female connector assembly 600.

As described above, the optional touch-proof assembly 40 includes a male touch-proof element opening 242 and a female touch-proof member 720. Said touch-proof assembly 40 is designed to: (i) help ensure that foreign objects cannot come into contact with the female terminal assembly 800 when the female connection assembly 600 is not coupled to the male connector assembly 200 and (ii) stabilize the connection between the male terminal assembly 430 and the female terminal assembly 800. To accomplish both of these tasks, the female touch-proof member 720 includes: (i) the touch-proof securing assembly 762 and (ii) the touch-proof element 780. The touch-proof securing assembly 762 is best shown in FIGS. 28-45 and includes: (i) an arrangement of deformable retaining members 764 with a first end deformable retaining member 768*a* and a second end deformable retaining member 768*b*, and (ii) a base portion 776. The first and second end deformable retaining members 768*a*, 768*b* extend downward from the base portion 776 and include a body 770*a*, 770*b*, a protrusion 772*a*, 772*b*, and a sloped rear wall 774*a*, 774*b*. It should be understood that each of these structures aid in allowing the female touch-proof member 720 to be installed after the female connector system 600 is coupled to the component.

As will be described in greater detail below, the arrangement of deformable retaining members 764 have: (i) an original state or undeformed state when the touch-proof member 720 is in an uninstalled or installed state, and (ii) an unoriginal state or deformed state when the touch-proof member 720 is in a partially installed. Because the arrangement of deformable retaining members 764 are a part of the touch-proof securing assembly 762 and the touch-proof securing assembly 762 is a part of the touch-proof member 720, the states from the arrangement of deformable retaining members 764 apply to the touch-proof securing assembly 762 and touch-proof member 720. In other words, the when the arrangement of deformable retaining members 764: (i) is in the original state, the touch-proof securing assembly 762 and touch-proof member 720 are also in the original state, and (ii) is in the deformed state, the touch-proof securing assembly 762 and touch-proof member 72 are also in the deformed state. The base portion 776 has a substantially rectangular shape that substantially matches the shape of the female terminal receiver and includes: (i) openings formed therethrough to allow for the coupling of said member 720 and reduce weight, (ii) downwardly depending projections that are designed to support the base portion 776 and ensure that said base portion 776 is offset from the lowermost extent of the receiver.

The touch-proof element 780 includes three integrally formed walls 782 that extend upward from the base portion 776, where said walls 782 include: (i) a first end wall 784*a*, (ii) a second end wall 784*b*, and (iii) a connecting wall or paddle wall 786 that is positioned between the end walls 748*a*, 748*b*. The combination of end walls 748*a*, 748*b* and connecting wall 786 form an "I-shaped" projection. In other words, the touch-proof element 780 has a I-shaped cross-sectional configuration. Said "I-shaped" projection provides substantial benefits over previous versions of the touch-proof post that is disclosed in PCT applications that are incorporated herein because the end walls 748*a*, 748*b* provide additional rigidity to the connecting wall or paddle wall 786. Without this additional rigidity, a foreign object can displace the connecting wall or paddle wall 786 and thus the touch-proof post fails to provide the desired functionality and in turn causes the connector system to fail various industry regulations. Alternative ways of adding additional rigidity to the connecting wall or paddle 786 have been contemplated, but each alternative has issues that makes it less desirable to utilize. For example, one way of providing additional rigidity would be to increase the thickness of the connecting wall or paddle wall 786. However, increasing the thickness of the connecting wall or paddle wall 786 is not desirable because it can interfere with the compression of the spring member 440*d*, when the connector system 10 is in the connected state or the ready to use state. Another way of providing additional rigidity would be to use a different material that has a higher stiffness. However, this is not desirable because it increases the cost of the touch-proof post and complexity associated with manufacturing said touch-proof post. Another way of providing additional rigidity would be to use include supporting walls that help couple the connecting wall or paddle wall 786 to the base portion 776. However, this is not desirable because said additional support walls will likely interfere with the connecting of the male connector assembly 200 with the female connector assembly 600. In addition to the above examples, it should be understood that the "I-shaped" design of the touch-proof element 780 may be replaced with other shapes such as a triangular prism, a pentagonal prism, a hexagonal prism, octagonal prism, sphere, a cone, a tetrahedron, a cuboid, a dodecahedron, an icosahedron, an octahedron, or an ellipsoid.

B. Female Terminal Assembly

FIGS. 28, 41-45, 49-53, 55B, 56B58, 61, 68, 71, 78, 81, 91-99B depict various views of the female terminal assemblies 800. The female terminal assemblies 800 includes: (i) a female terminal body 810 and (ii) a female terminal connection plate 816. The connection plate 816 is directly connected to the female terminal body 810 and is configured to be coupled to a structure (e.g., a radiator fan) outside of the connector system 10. The female terminal body 810 is comprised of: (i) an arrangement of female terminal walls 812*a*-812*d* that are coupled to one another to form a substantially rectangular shape, and (ii) a rear wall 813 that is positioned substantially perpendicular to the walls 812*a*-812*d*. Specifically, one female terminal side wall 812*a* of the arrangement of female terminal walls 812*a*-812*d* is: (i) substantially parallel with another one female terminal side wall 812*c* of the arrangement of female terminal walls 812*a*-812*d* and (ii) substantially perpendicular to two female terminal end wall 812*b*, 812*d* of the arrangement of female terminal walls 812*a*-812*d*. The female terminal body 810 defines a female terminal receiver 814. The female terminal receiver 814 is designed and configured to be coupled, both electrically and mechanically, to an extent of the male terminal 470, when the male terminal 470 is inserted into the female terminal receiver 814.

The female terminal assembly 800 is typically formed for a single piece of material (e.g., metal). Therefore, the female terminal assembly 800 is a one-piece female terminal assembly 800 and has integrally formed features. In particular, the connection plate 816 is integrally formed with female terminal body 810 and specifically is integrally formed with the one female terminal side wall 812*c*. To integrally form these features, the female terminal assembly 800 is typically formed using a die cutting process. However, it should be understood that other types of forming the female terminal assembly 800 may be utilized, such as casting or using an additive manufacturing process (e.g., 3D printing). In other embodiments, the features of the female terminal assembly 800 may not be formed from one-piece or be integrally formed, but instead formed from separate pieces that are welded together.

C. Female Shielding Assembly

The shielding assembly 60 also includes female shielding assembly 930 that resides within the female housing assembly 620 and is designed to interact with the male shielding assembly 530 in order to reduce the electromagnetic interference ("EMI") noise emitted by the male connector assembly 200. The female shielding assembly 930 is comprised of a female terminal body shield 932 with component coupling elements 940 that are designed to interact with an extent of a component 8 contained in the power distribution system. The female terminal body shield 932 is formed from an arrangement of side walls 934 that form a substantially rectangular tubular component. Said component coupling elements 940 extend downward from the lower edge of the an arrangement of side walls 934 are deformable, such that they can be deformed inward when the female connector assembly 600 is coupled to the component in order to make sufficient contact with the extent of a component 8. It should be understood that other configurations, elements, and components are contemplated by this disclosure, which function together to connect the integrated conductor shield to a structure that surrounds a majority of the female terminal assembly 800. Further, it should be understood that inclusion of the female shielding assembly 930 is optional and can be omitted, if desired. The female shielding assembly 930 is formed from a conductive material, such as metal. Other conductive materials (e.g., conductive plastics) that may be utilized are disclosed within PCT/US2020/013757, which is incorporated herein by reference.

D. Female Interlock Assembly

As discussed above and disclosed in PCT/US2021/043686, the female interlock or FIL 980, which is a part of the IL assembly 100, is design help prevent arcing from occurring during the mating of the connector assembly 200, 600. As shown in the Figures, the FIL 980 is a receiving structure 982 formed in a non-conductive housing 984. In particular, the receiving structure 982 includes two receivers 986*a*, 986*b*. Said housing 984 can be optionally added to the system 10 by securing it to the housing assembly 620 via the deformable FIL projection 676. Said receivers 986*a*, 986*b* include conductive elements 988*a*, 988*b* that are coupled to the IL circuit, which was described above. The conductive elements 988*a*, 988*b* are designed to receive the connecting elements 594*a*, 594*b* of the MIL 590 during certain operating conditions, which thereby to short and connect the wires that connect to the FIL 980 and closes the circuit to allow current to flow between the male and female terminal assemblies 430, 800.

E. Assembly of the Female Connector Assembly

Figure 30:
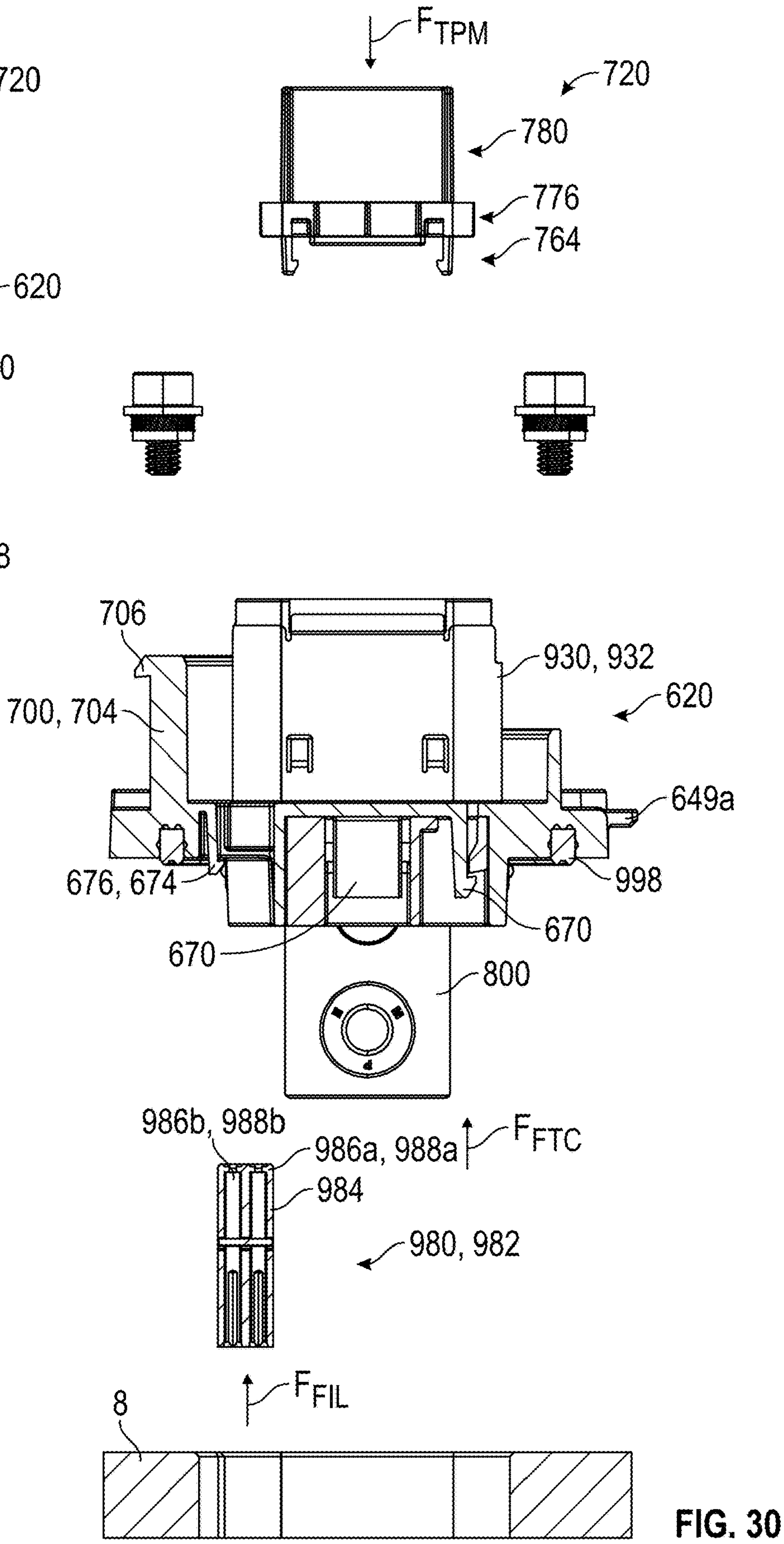
FIG. 30 is a cross-sectional view of the female connector assembly taken along line 30-30 of FIG. 29.
Figure 31:
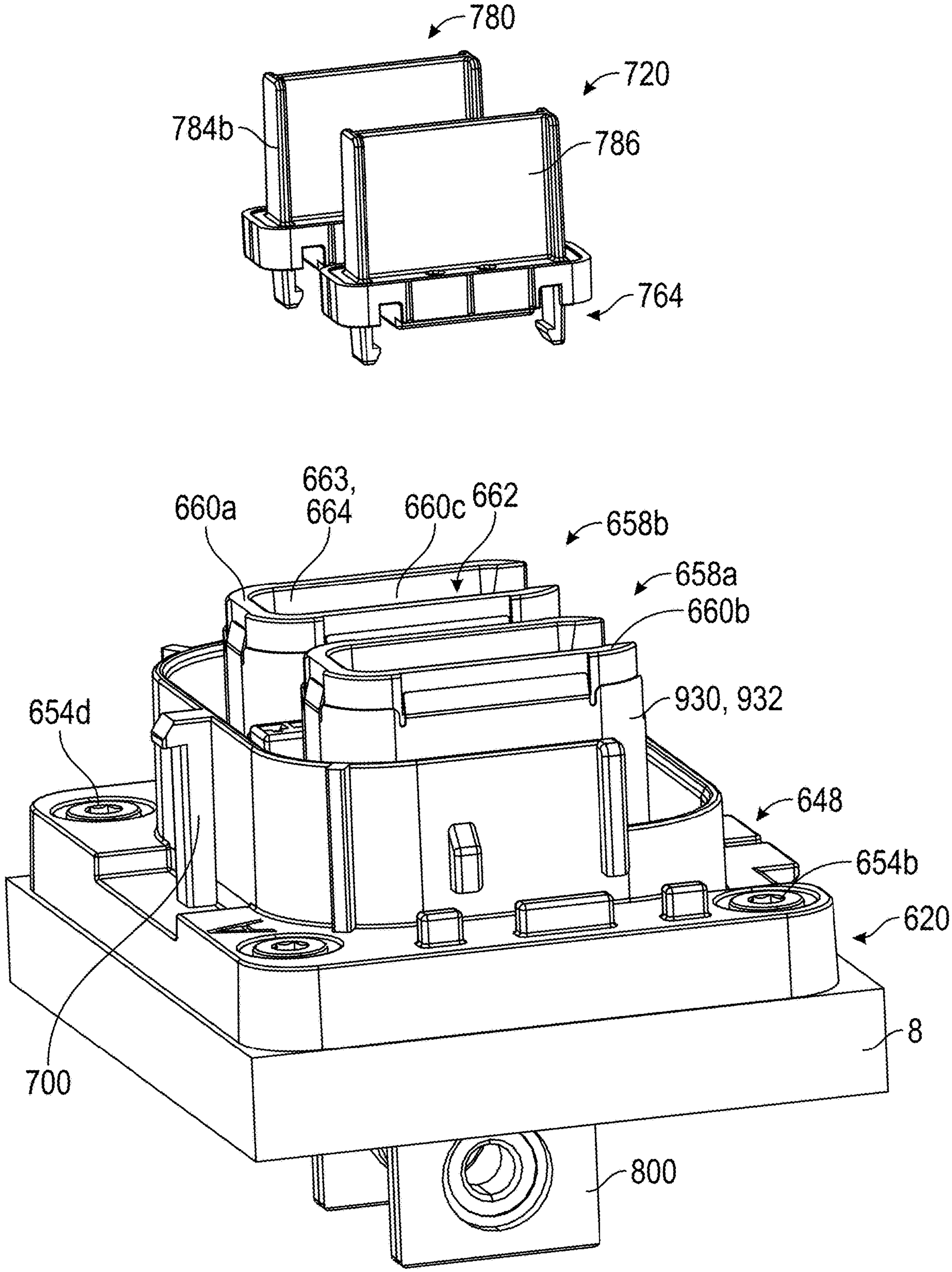
FIG. 31 is a perspective view of the female connector assembly of FIG. 28 in a second partially assembled state, where the FIL is in a received position and the touch-proof assembly is in the uninstalled position.
Figure 33:
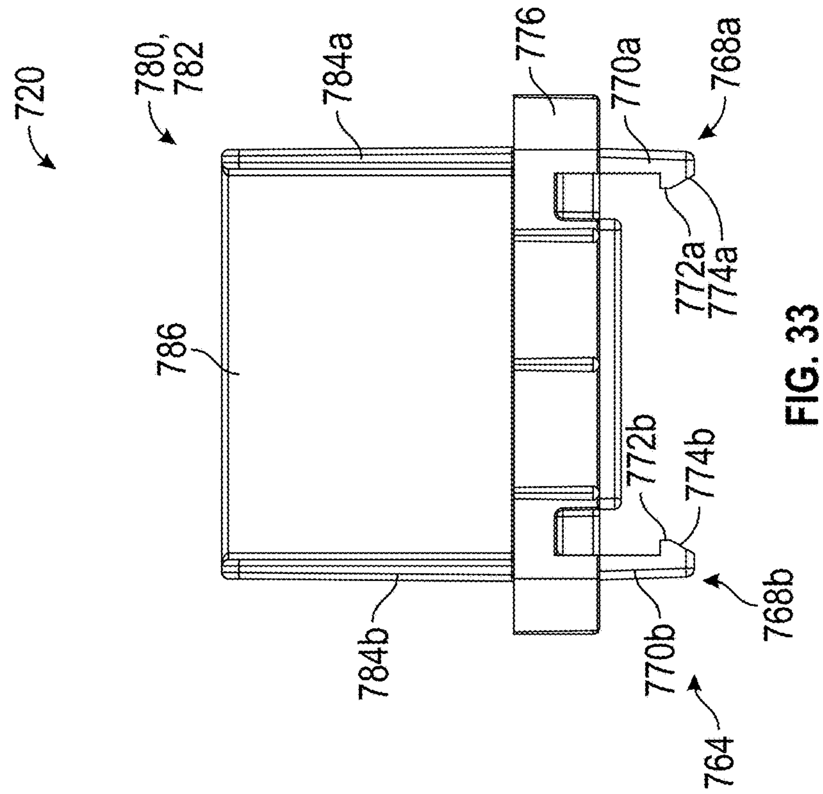
FIG. 33 is a side view of the touch-proof assembly of FIG. 32.
Figure 32:
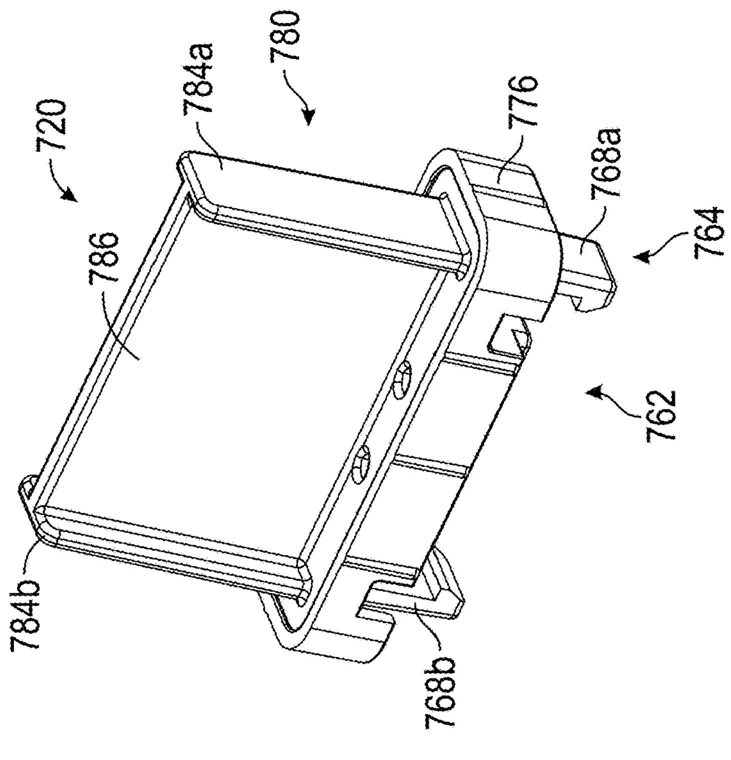
FIG. 32 is a perspective view of the touch-proof assembly of FIG. 28.
Figure 35:
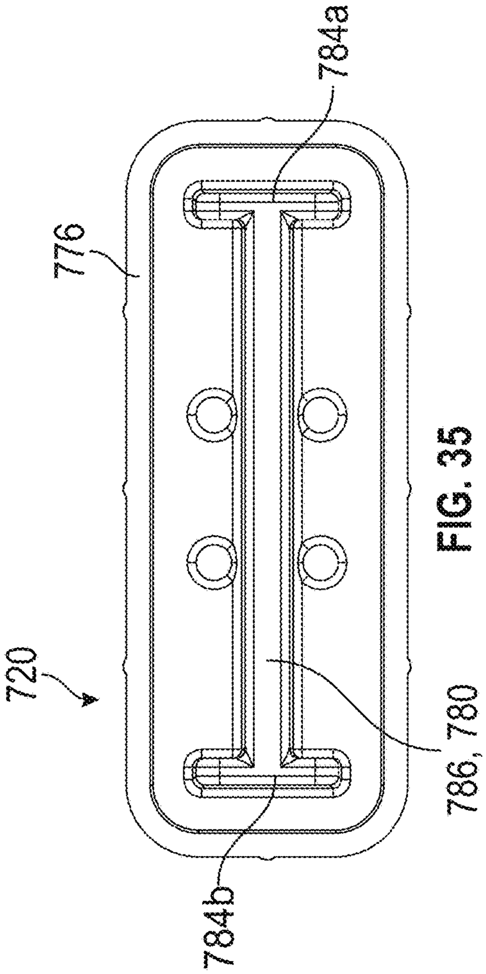
FIG. 35 is a top view of the touch-proof assembly of FIG. 32.
Figure 34:
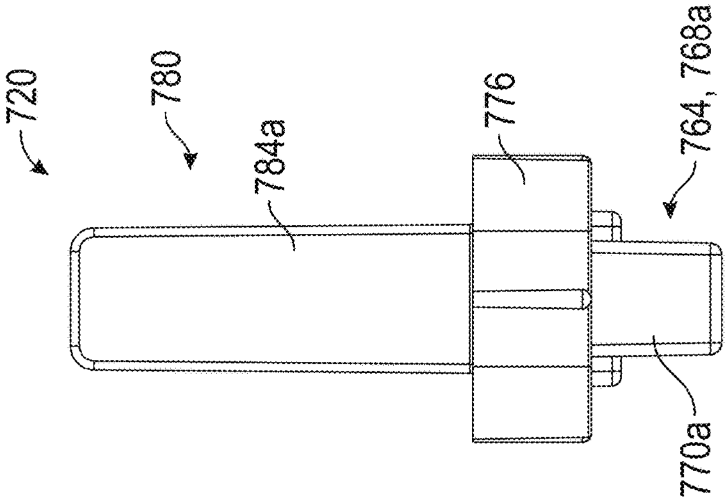
FIG. 34 is an end view of the touch-proof assembly of FIG. 32.
Figure 37:
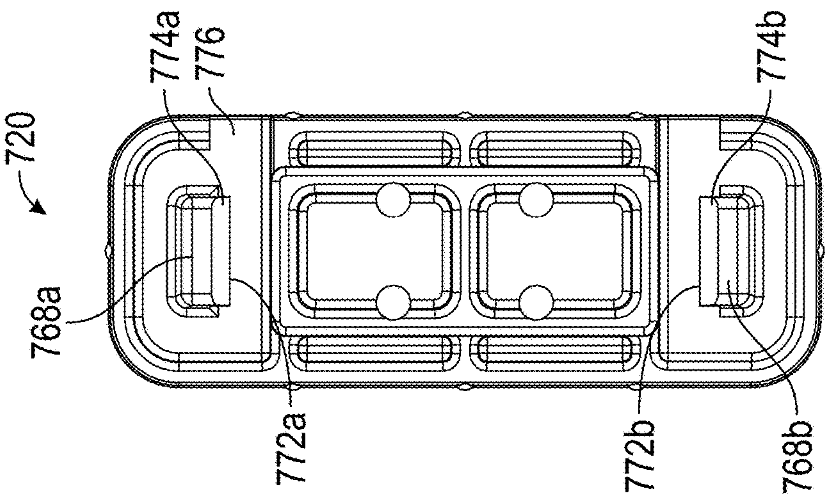
FIG. 37 is a bottom view of the touch-proof assembly of FIG. 32.
Figure 36:
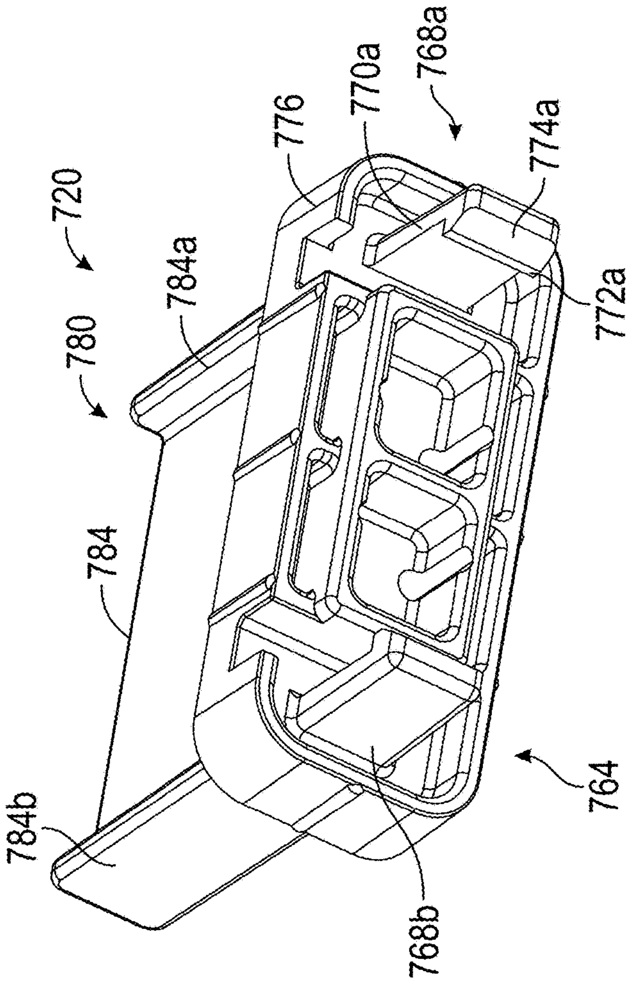
FIG. 36 is a bottom perspective view of the touch-proof assembly of FIG. 32.
Figure 39:
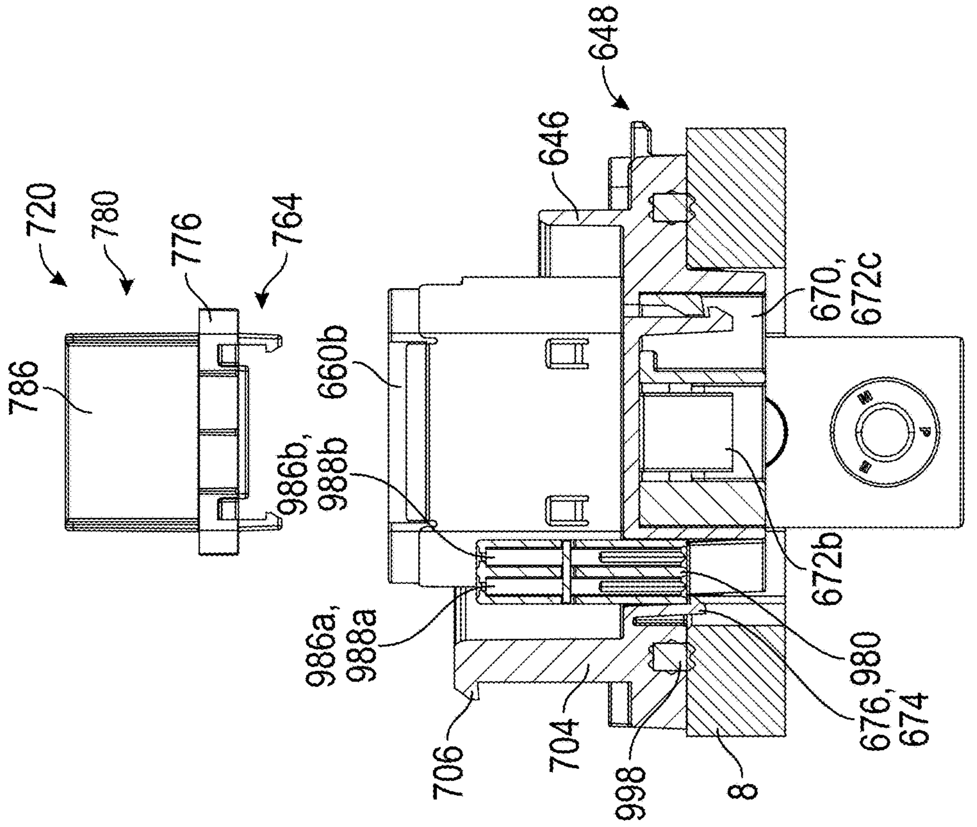
FIG. 39 is a cross-sectional view of the female connector assembly taken along line 39-39 of FIG. 38.
Figure 38:
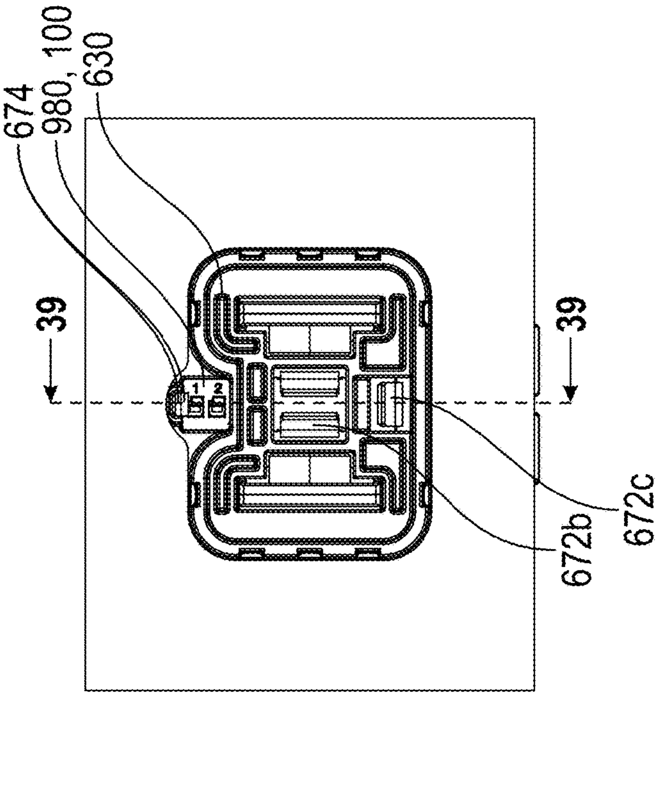
FIG. 38 is a bottom view of the female connector assembly of FIG. 28 in the second partially assembled state.
Figure 41:
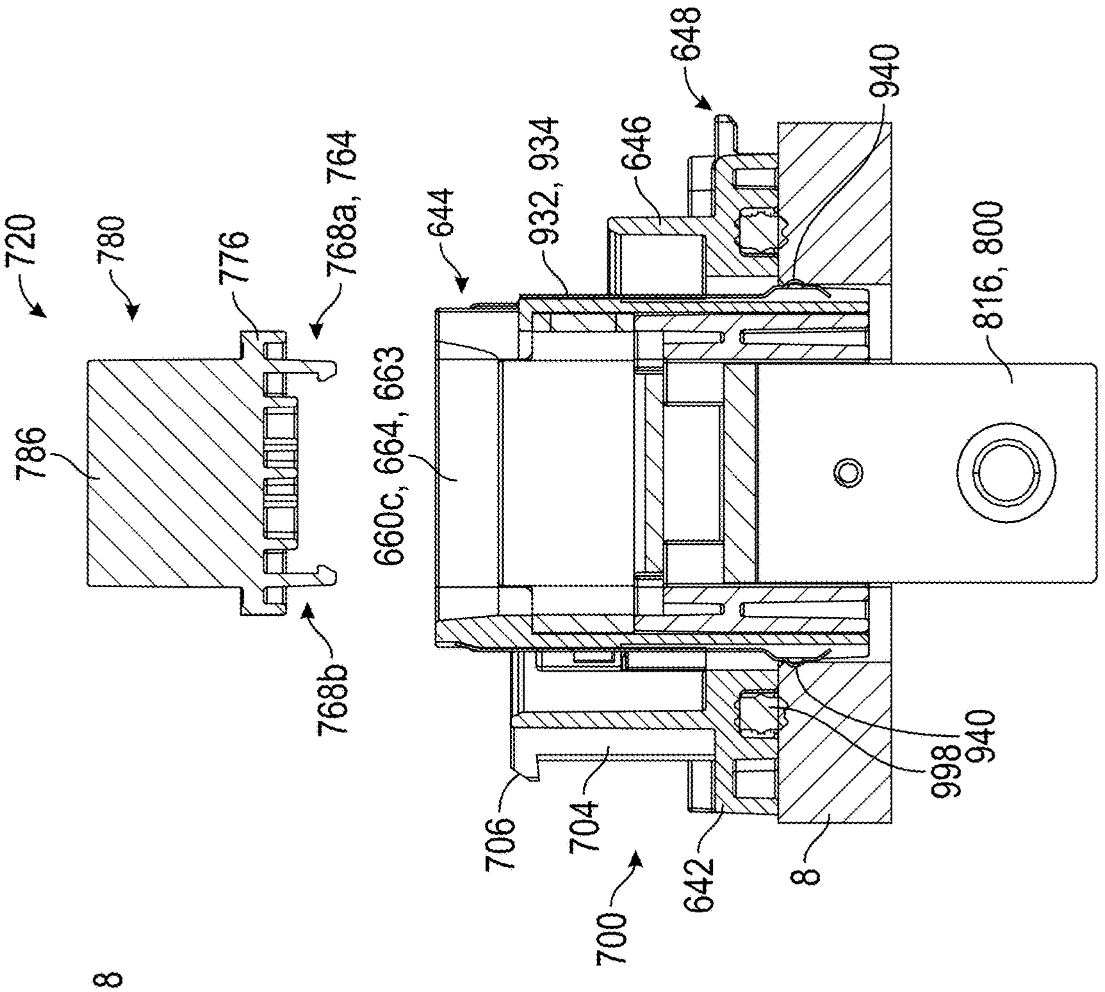
FIG. 41 is a cross-sectional view of the female connector assembly taken along line 41-41 of FIG. 40.
Figure 40:
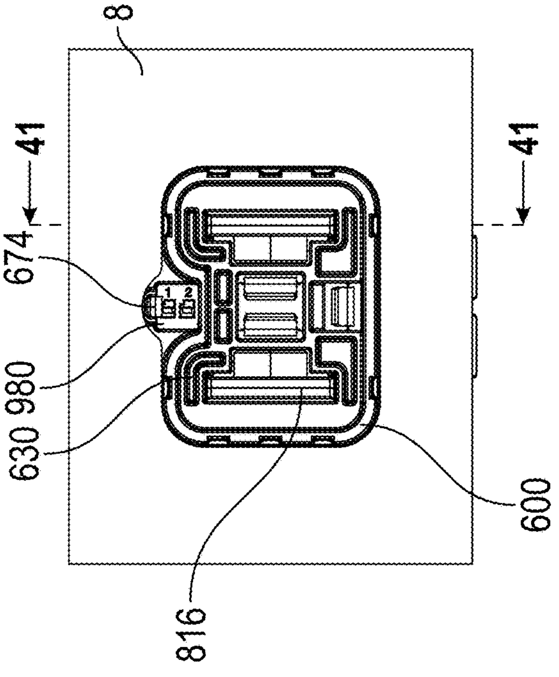
FIG. 40 is a bottom view of the female connector assembly of FIG. 28 in the second partially assembled state.
Figure 42:
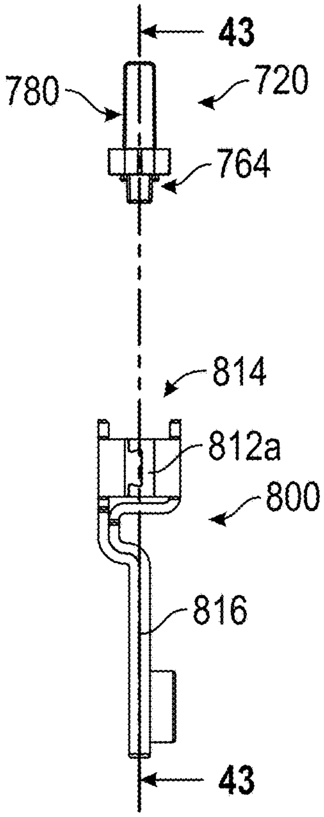
FIG. 42 is an end view of the female terminal assembly and touch-proof assembly of FIG. 1, where the touch-proof assembly is in the uninstalled position.
Figure 43:
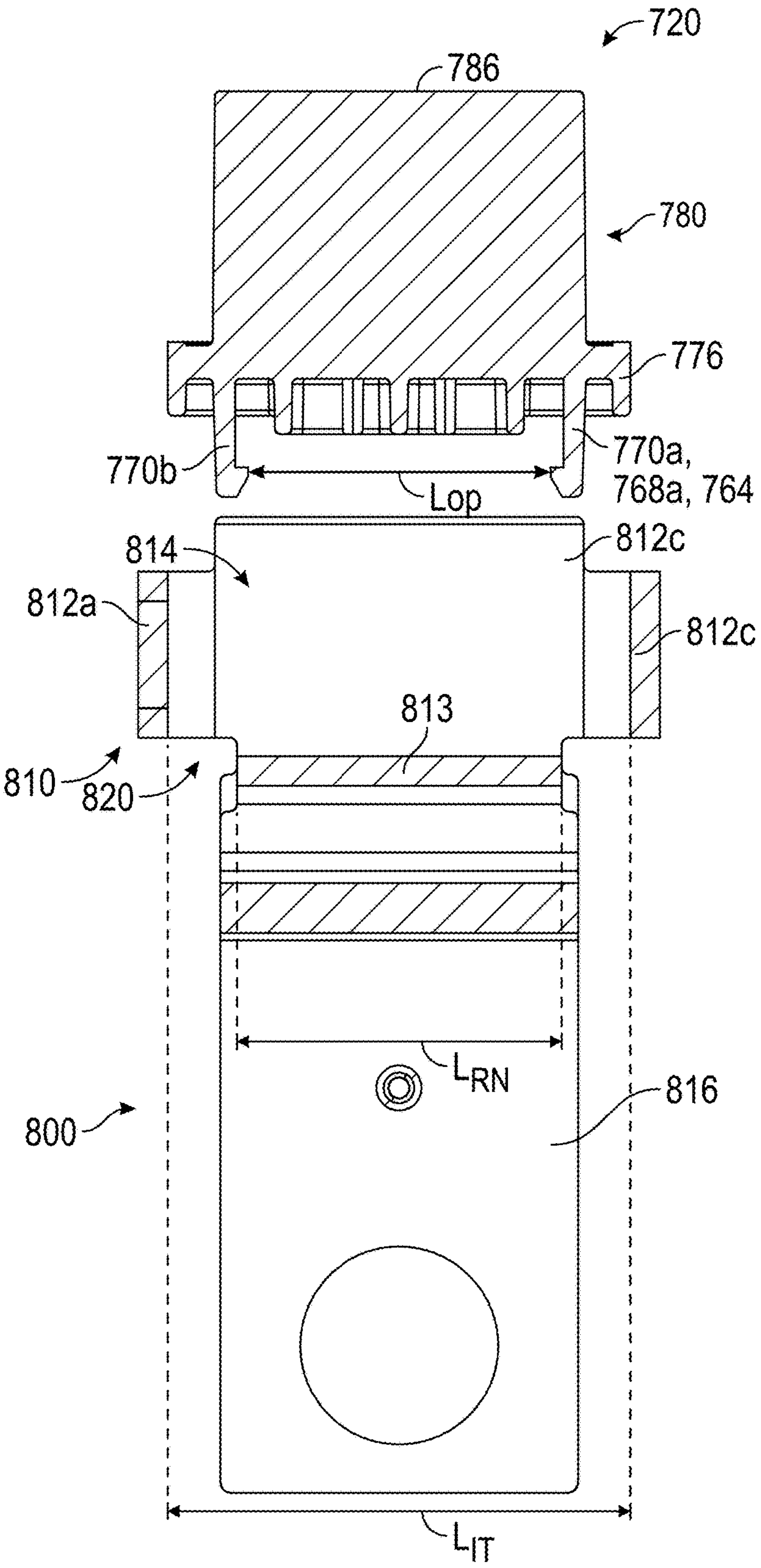
FIG. 43 is a cross-sectional view of the female terminal assembly and touch-proof assembly taken along line 43-43 of FIG. 42.
Figure 44:
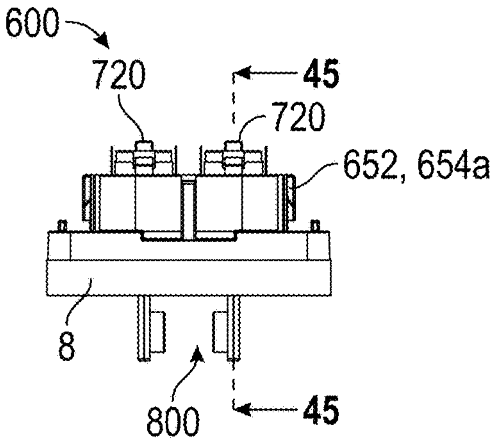
FIG. 44 is an end view of the female connector assembly of FIG. 28 in the third partially assembled state, where the touch-proof assembly is in a partially installed position.
Figure 45:
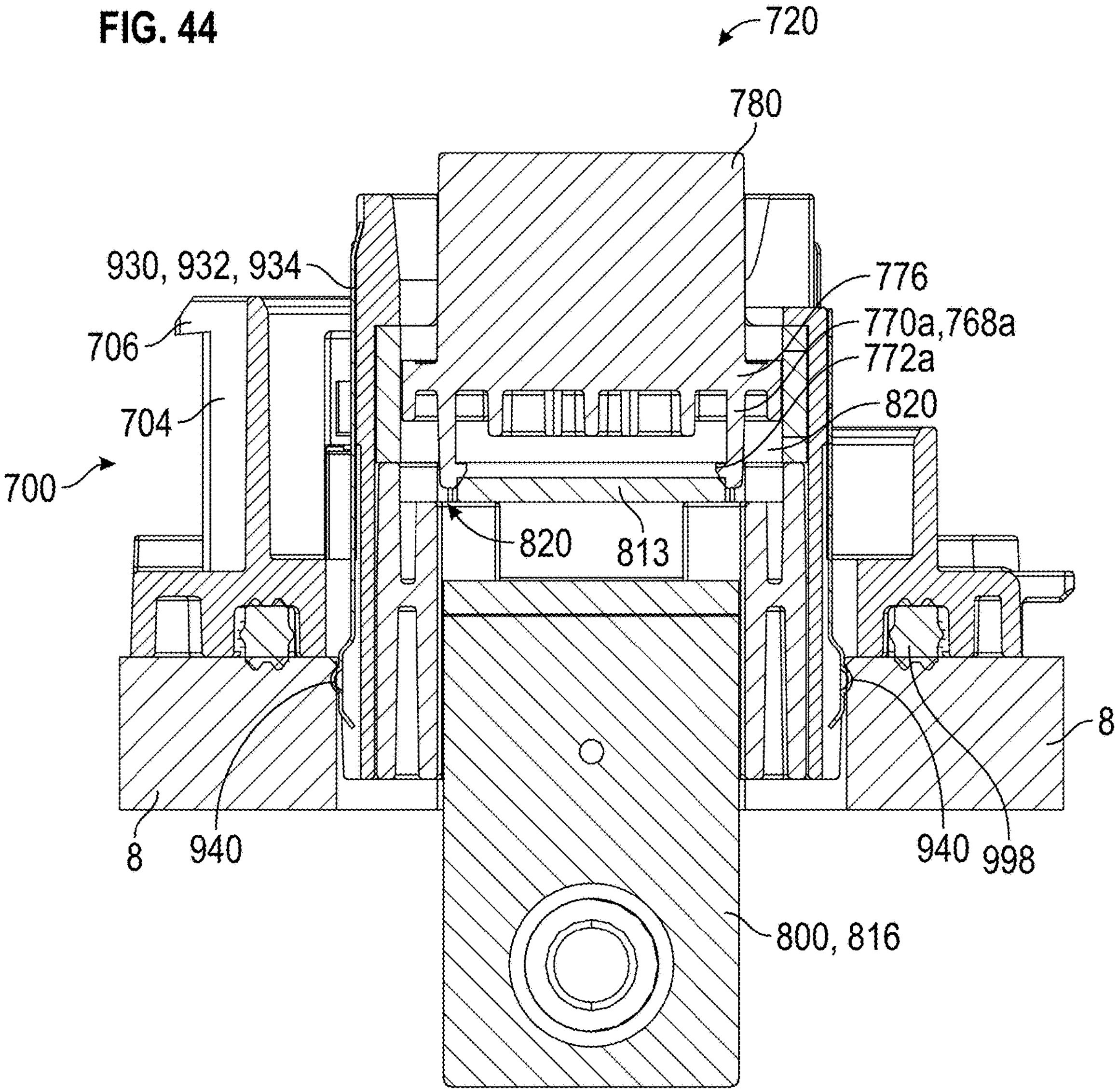
FIG. 45 is a cross-sectional view of the female connector assembly taken along line 45-45 of FIG. 44.
Figure 47:
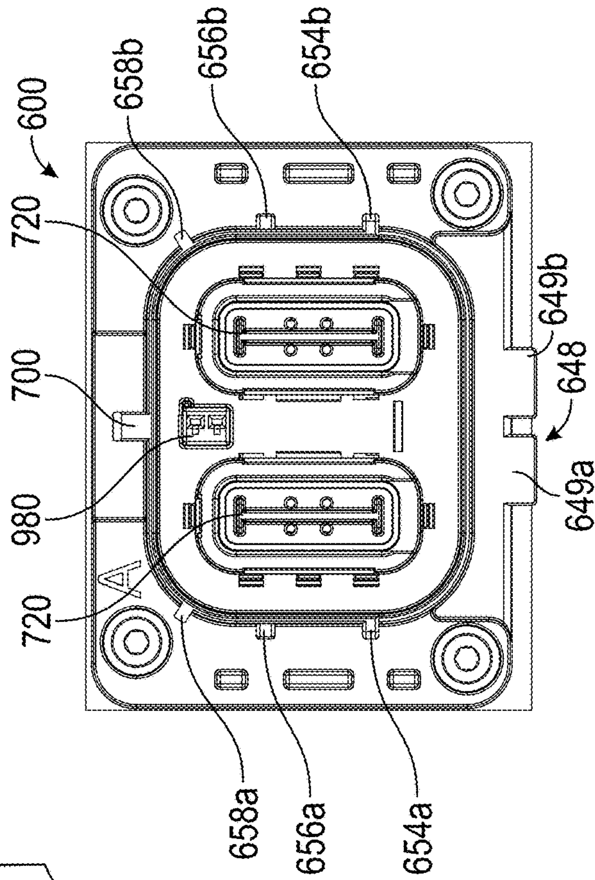
FIG. 47 is a top view of the female connector assembly of FIG. 46.
Figure 46:
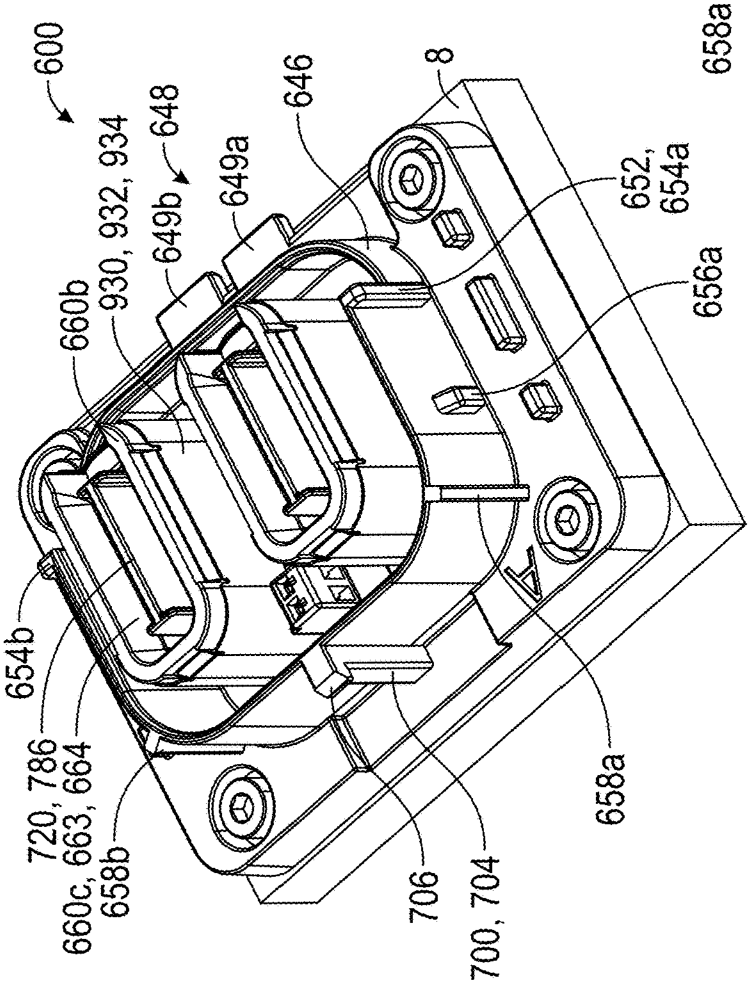
FIG. 46 is a perspective view of the female connector assembly of FIG. 28 in the assembled state.
Figure 49:
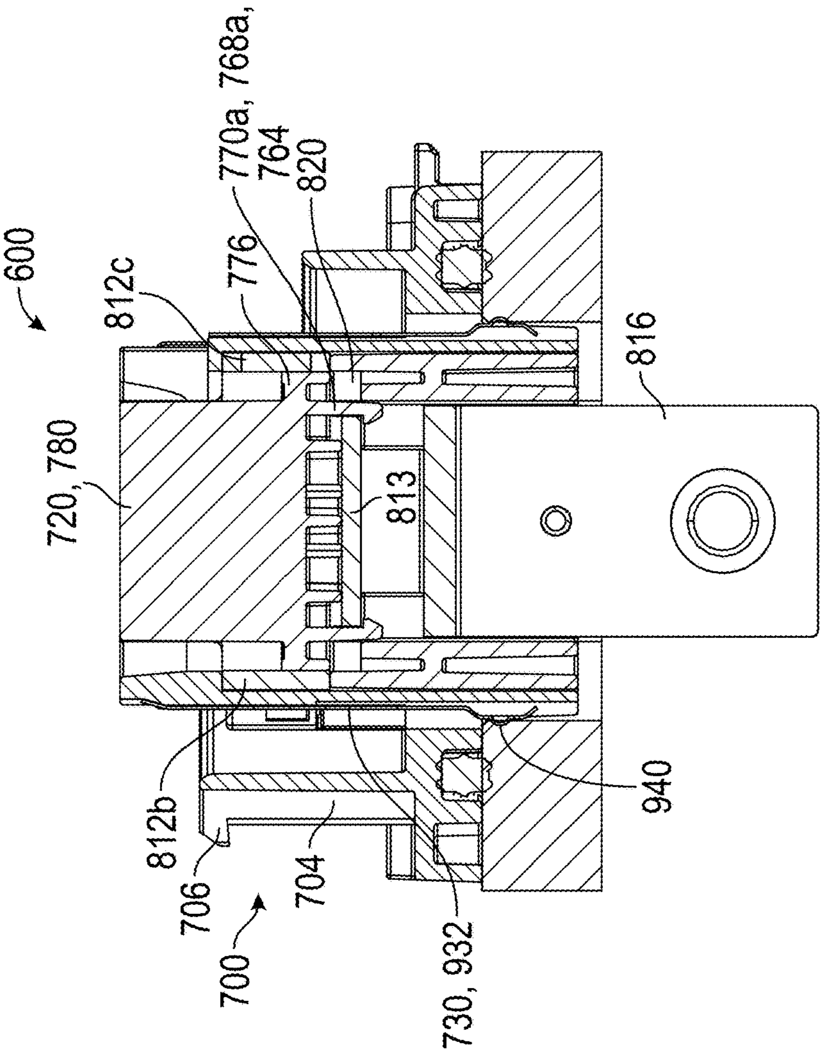
FIG. 49 is a cross-sectional view of the female connector assembly taken along line 49-49 of FIG. 48.
Figure 48:
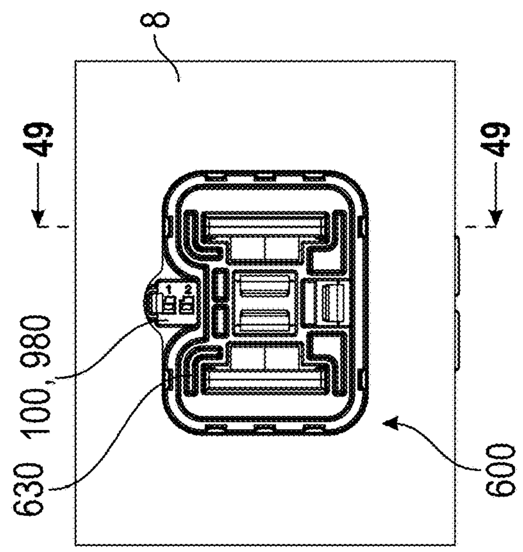
FIG. 48 is a bottom view of the female connector assembly of FIG. 46.
Figure 51:
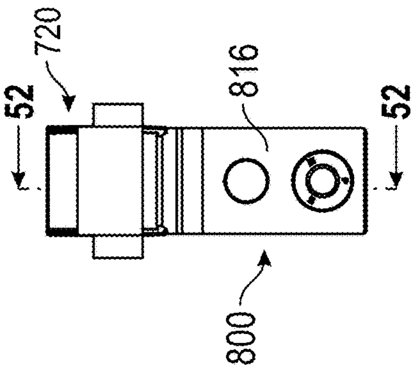
FIG. 51 is a side view of the female terminal assembly and touch-proof assembly of FIG. 50.
Figure 52:
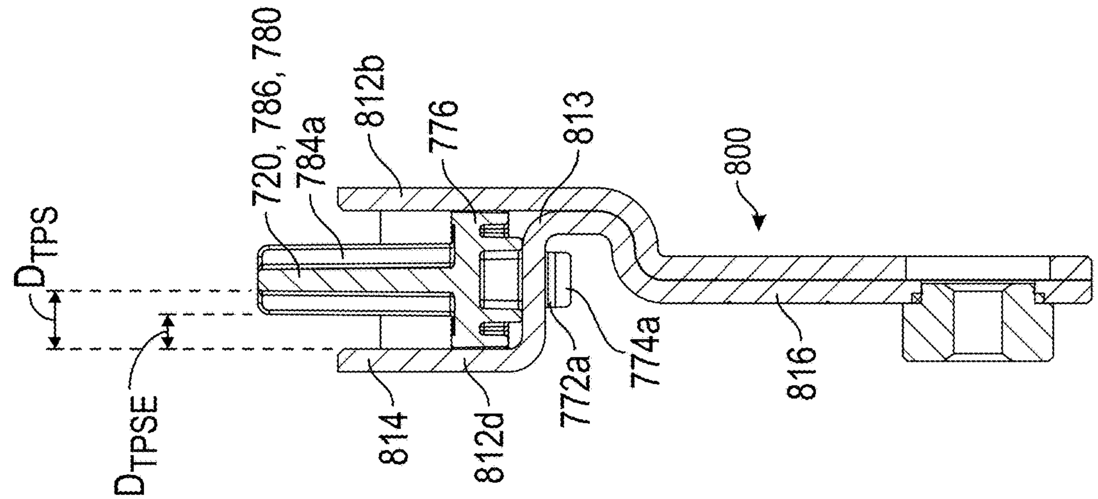
FIG. 52 is a cross-sectional view of the female terminal assembly and touch-proof assembly taken along line 52-52 of FIG. 51.
Figure 50:
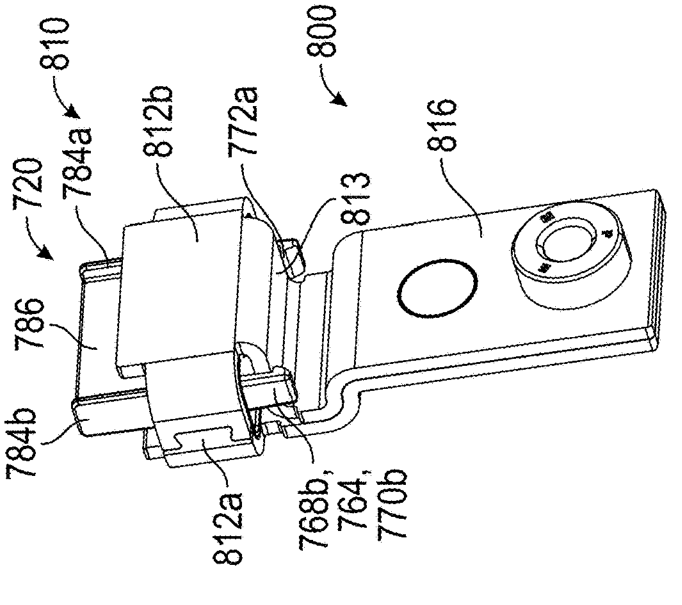
FIG. 50 is a bottom perspective view of the female terminal assembly and touch-proof assembly in the installed position.
Figure 53:
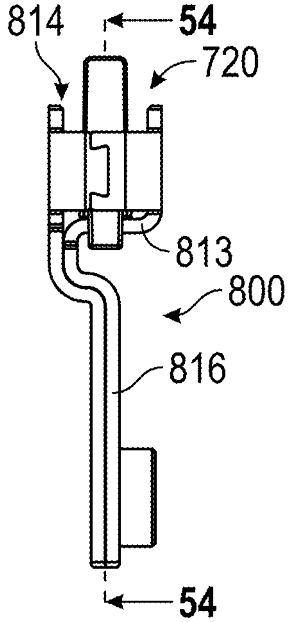
FIG. 53 is an end view of the female terminal assembly and touch-proof assembly of FIG. 50.

As shown in FIG. 28, the female connector assembly 600 is in a disassembled state. As shown in FIGS. 30, the first step in assembling the female connector assembly 600 accomplished by: (i) assembling the female terminal assembly 800 with the female terminal holder 630, (ii) applying a female terminal coupling force FFTC in a first or upwardly direction on the combination of the female terminal holder 630 and the female terminal assembly 800 in a first direction in order to cause the arrangement of terminal securing projections 670 to secure said combination (i.e., 630, 800) to the female housing assembly 620, and (iii) coupling the female shielding assembly 930 to the female housing assembly 620. Once the above steps are completed, the connector assembly 600 is in the first partially assembled state. In this first partially assembled state, all major components of the connector assembly 600 are installed except for the FIL 980 and the female touch-proof member 720, where (i) the FIL 980 is spaced a part from the housing 620 and in the un-received positon, and (ii) the female touch-proof member 720 is spaced a part from the housing 620 and in the uninstalled positon. At this point, the installer can decide whether they include the FIL 980 or omit it from the system 10. If the installer can decides to omit the FIL 980, then the connector assembly 600 skips the second partially assembled state and moves directly to the third partially assembled state.

If the installer decides to include the FIL 980, then an FIL force $F_{FIL}$ in the first or upwardly direction is applied to the FIL 980 in order to insert said FIL 980 into the FIL opening in the main body 640 and secure the FIL 980 in said opening using the FIL retainer 674. Once the FIL 980 is coupled to the main body 640, the connector assembly 600 has moved from the first partially assembled state to the second partially assembled state. In this state, the FIL 980 is coupled to the main body 640 via the FIL retainer 674 and as such the FIL 980 is in the received position. To move the connector assembly 600 to the third partially assembled state, a TPM force $F_{TPM}$ in a second or downwardly direction is applied on the female touch-proof member 720 to move said female touch-proof member 720 from a separated and uninstalled state to a partially installed position. In this position, the sloped rear wall 774*a*, 774*b* of the first and second end deformable retaining members 768*a*, 768*b* are engaged with the rear wall 813 of the terminal assembly 800. The continued application of the downwardly directed force on the female touch-proof member 720 causes the first and second end deformable retaining members 768*a*, 768*b* to continue to elastically deform outward or away from the center of the female touch-proof member 720.

Once the first and second end deformable retaining members 768*a*, 768*b* have elastically deformed enough (e.g., each member has deformed more than predetermined amount −0.7 mm) to allow the protrusion 772*a*, 772*b* to pass by the rear wall 813 of the terminal assembly 800, the first and second end deformable retaining members 768*a*, 768*b* can return to their non-deformed or original state; thereby coupling the touch-proof member 720 within the female terminal assembly 800. In other words, the touch-proof member 720 is coupled to the female terminal assembly 800 when the first and second end deformable retaining members 768*a*, 768*b* are in their non-deformed or original state and the protrusion 772*a*, 772*b* are positioned below the rear wall of the terminal assembly 800. When the components are in this positional relationship, the female connector assembly 600 is in assembled state. As discussed above, the female terminal coupling force FFTC and the FIL force $F_{FIL}$ are in the first direction, while the TPM force $F_{TPM}$ is in a second and opposite direction. In other words, the female terminal assembly 800 is configured to be inserted within the female housing 620 using a force (e.g., female terminal coupling force) that is directed in a first direction (e.g., upward) and touch-proof member 720 is configured to be inserted within the female terminal assembly 800 using a force (e.g., TPM force) that is directed in a second direction (e.g., downward), and wherein said first direction (e.g., upward) is opposite of the second direction (e.g., downward). The above method is beneficial because it can be added to the system 10 after the system 10 is use. The directional insertion of the touch-proof member 720 disclosed herein provides substantial benefits over previous designs of elements that: (i) are designed to restrict the insertion of foreign objects into the female terminal assembly 800, and (ii) are inserted into the housing assembly 220 in the same direction as the female terminal assembly 800. In particular, the directional insertion of the disclosed the touch-proof member 720 enables this component to be an optional component that can be added after the component side connector assembly 600 is installed in the component or part (i.e., post-installation). In contrast, the FIL 980 is an optional component that can only be added pre-installation of the component side connector assembly 600. Other structures to allow for the post-installation of the touch-proof member 720 are contemplated by this disclosure.

As discussed above, rear wall 813 of the female terminal assembly 800 has: (i) an internal terminal length $L_{IT}$ of (e.g., 25 mm) that spans the inner distance between opposed end walls 812*b*, 812*d*, (ii) a rear wall length $L_R$w (e.g., 17.5 mm) that spans the distance between the outermost edges of the rear wall 813, (iii) an original protrusion length Lop (e.g., 16.5 mm) that extends between the first and second protrusions 772*a*, 772*b* of the arrangement of deformable retaining members 764, when the female touch-proof member 720 is in the original state, and (iv) an deformed protrusion length $L_{DP}$ (e.g., 17.6 mm) that extends between the first and second protrusions 772*a*, 772*b* of the arrangement of deformable retaining members 764, when the female touch-proof member 720 is in the deformed state. It should be understood that: (i) the original protrusion length is less than the deformed protrusion length, (ii) the deformed protrusion length is greater than the rear wall length, and (iii) the deformed protrusion length is less than the internal terminal length. Specifically, the deformed protrusion length is about: (i) 0.5% larger than the original protrusion length, (ii) approximately the same or just larger than the rear wall length, and (iii) is approximately 30% smaller than the internal terminal length.

As such, a securement gap 820 is formed between the outer edge of the rear wall 813 and the inner surface if the end wall 812*b*, 812*d*. When the touch-proof member 720 is inserted into the female terminal receiver 814, the original protrusion length of the first and second protrusions 772*a*, 772*b* expanse to the deformed protrusion length in order to allow the first and second protrusions 772*a*, 772*b* to clear the rear wall length. Once the first and second protrusions 772*a*, 772*b* clear the rear wall length and are inserted into the securement gap 820 of the female terminal assembly 800, the deformed protrusion length of the first and second protrusions 772*a*, 772*b* is reduced to the original protrusion length; whereby positioning an extent of the first and second protrusions 772*a*, 772*b* below the rear wall 813 of the female terminal assembly 800.

Figure 54:
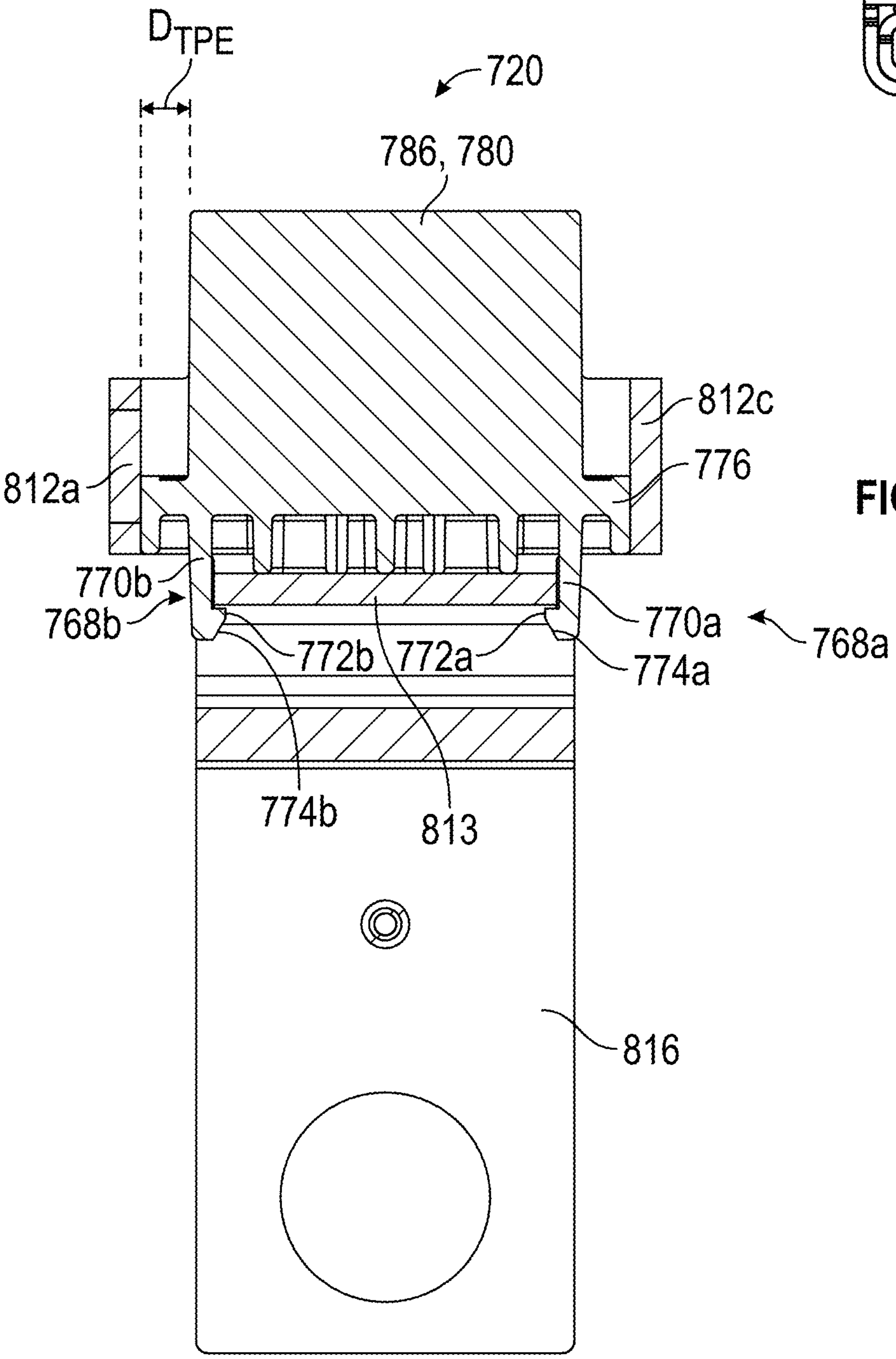
FIG. 54 is a cross-sectional view of the female terminal assembly and touch-proof assembly taken along line 54-54 of FIG. 53.

Once the female touch-proof member 720 is in the installed state, the distance between the inner surface of the female terminal assembly 800 and the outer surface of the female touch-proof member 720 varies due to the configuration of the female touch-proof member 720. For example, the distance between the end surface of the end walls 748*a*, 748*b* of the touch-proof element 780 and the inner surface of the end walls 812*b*, 812*d* is approximately a $D_{TPE}$ end distance (e.g., 2.5 mm in FIG. 54), the distance between the outer surface of the connecting wall 786 of the touch-proof element 780 and the inner surface of the side walls 812*a*, 812*b* is approximately a $D_{TPS}$ side distance (e.g., 4.1 mm in FIG. 52), and the distance between the side surface of the end walls 748*a*, 748*b* of the touch-proof element 780 and the inner surface of the side walls 812*a*, 812*b* is approximately a $D_{TPSE}$ edge distance (e.g., 3.5 mm in FIG. 52). While these distances vary, each of the above distances are below the distances provided in various industry regulations (e.g., ISO 20076:2019, ISO 20653:2013, USCAR 12, Revision 5, and IEC 60529-2020). Thus, the inclusion of the touch-proof member 720 allows the female connector assembly 600 to pass or be compliant with each of these standards (e.g., ISO 20076:2019, ISO 20653:2013, USCAR 12, Revision 5, and IEC 60529-2020).

3. Assembly of the Connector System

Figure 55B:
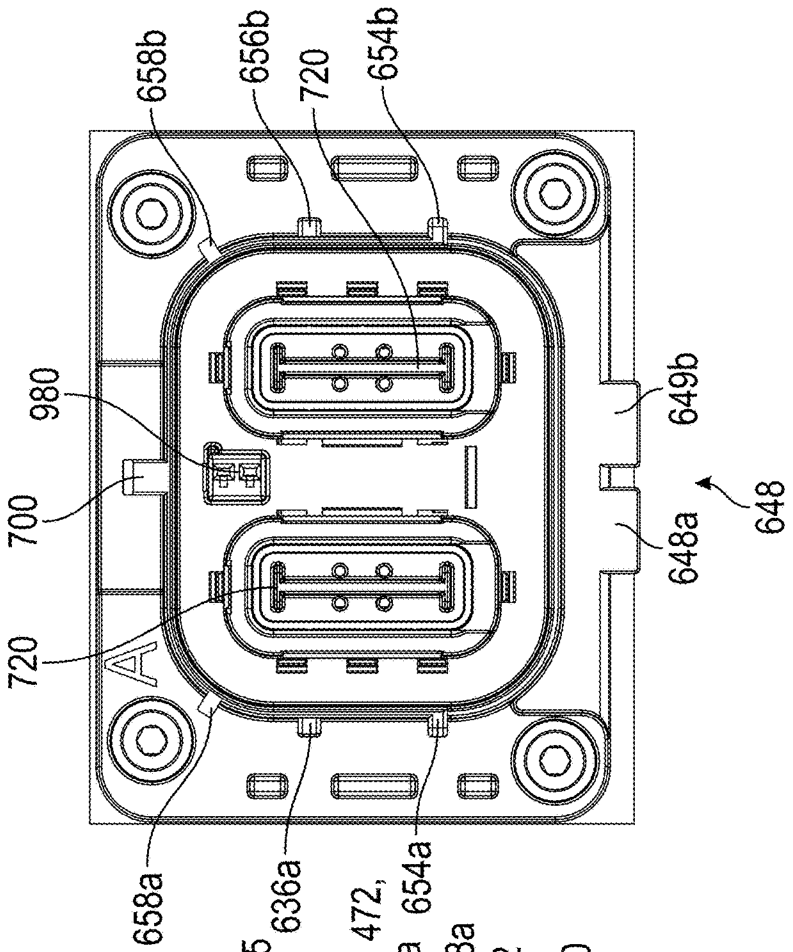
FIG. 55B is a top view of the female connector assembly of FIG. 28 in the assembled state.
Figure 55A:
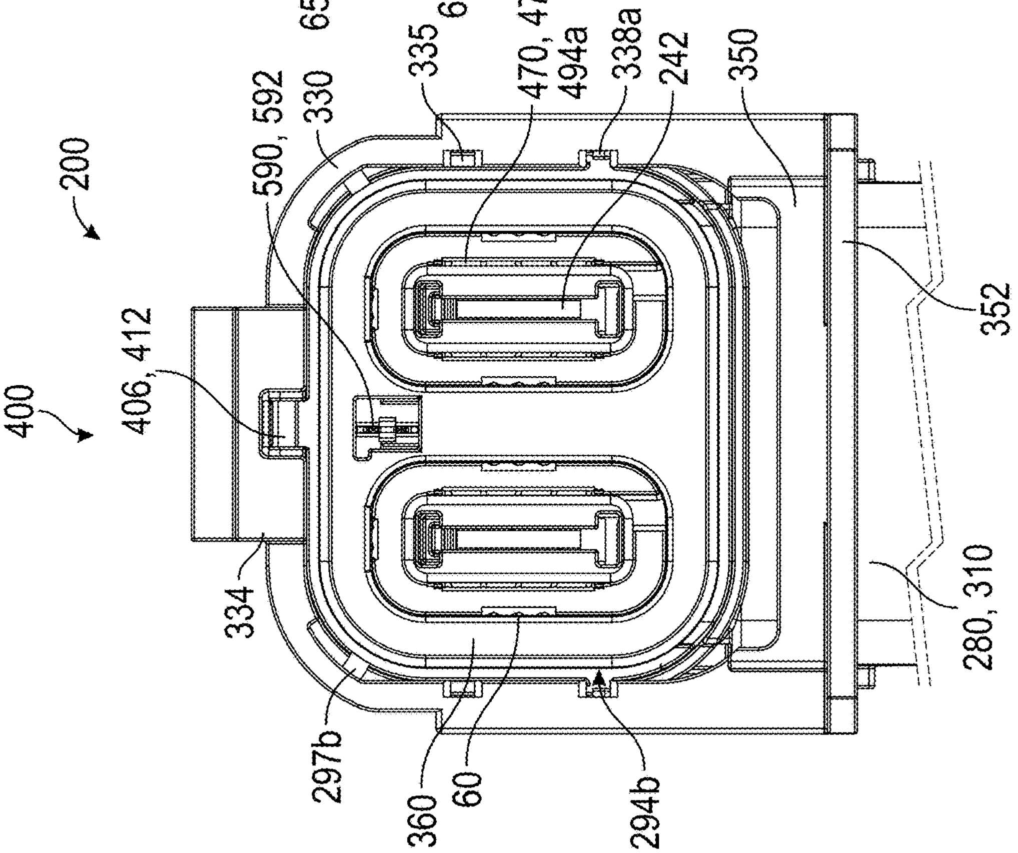
FIG. 55A is a bottom perspective view of the male connector assembly of FIG. 1 in the ready to engage/disengage state where the primary locking member is in a unlocked state.
Figure 56B:
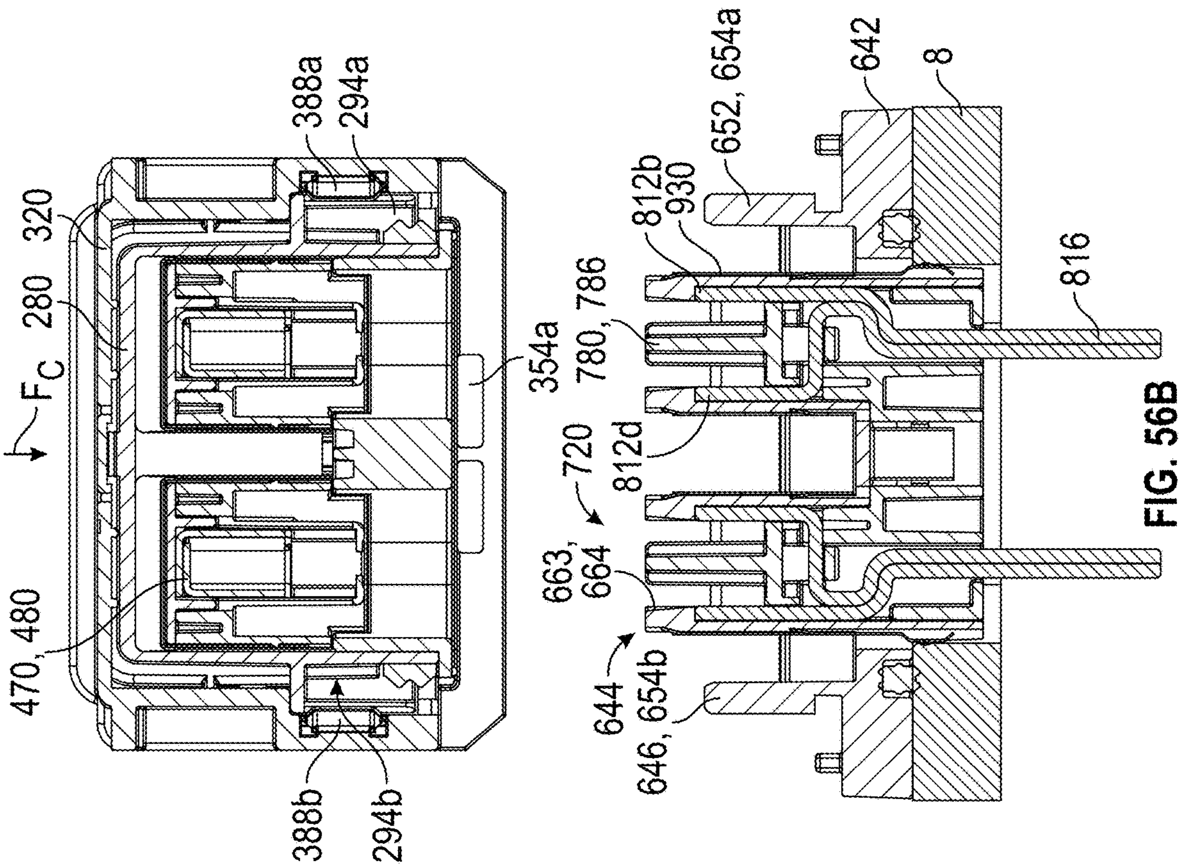
FIG. 56B is a cross-sectional view of the connector system taken along line 56B-56B of FIG. 56A.
Figure 56A:
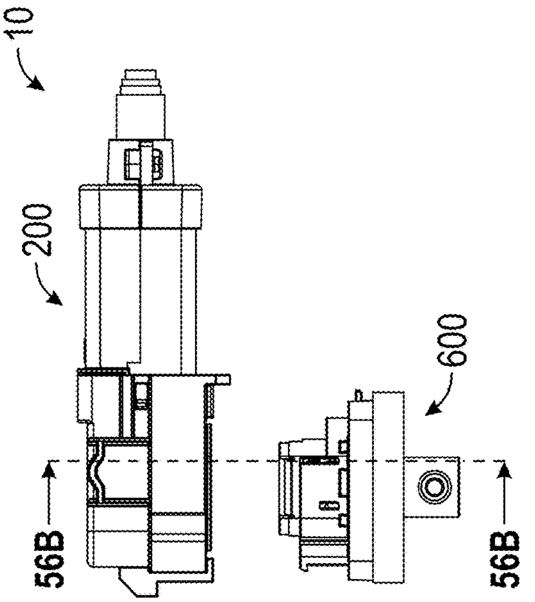
FIG. 56A is a side view of the connector system of FIG. 1 in a disconnected connected state, where the male connector assembly is in a ready to engage state and the male connector assembly is spaced away from the female connector assembly.
Figure 58:
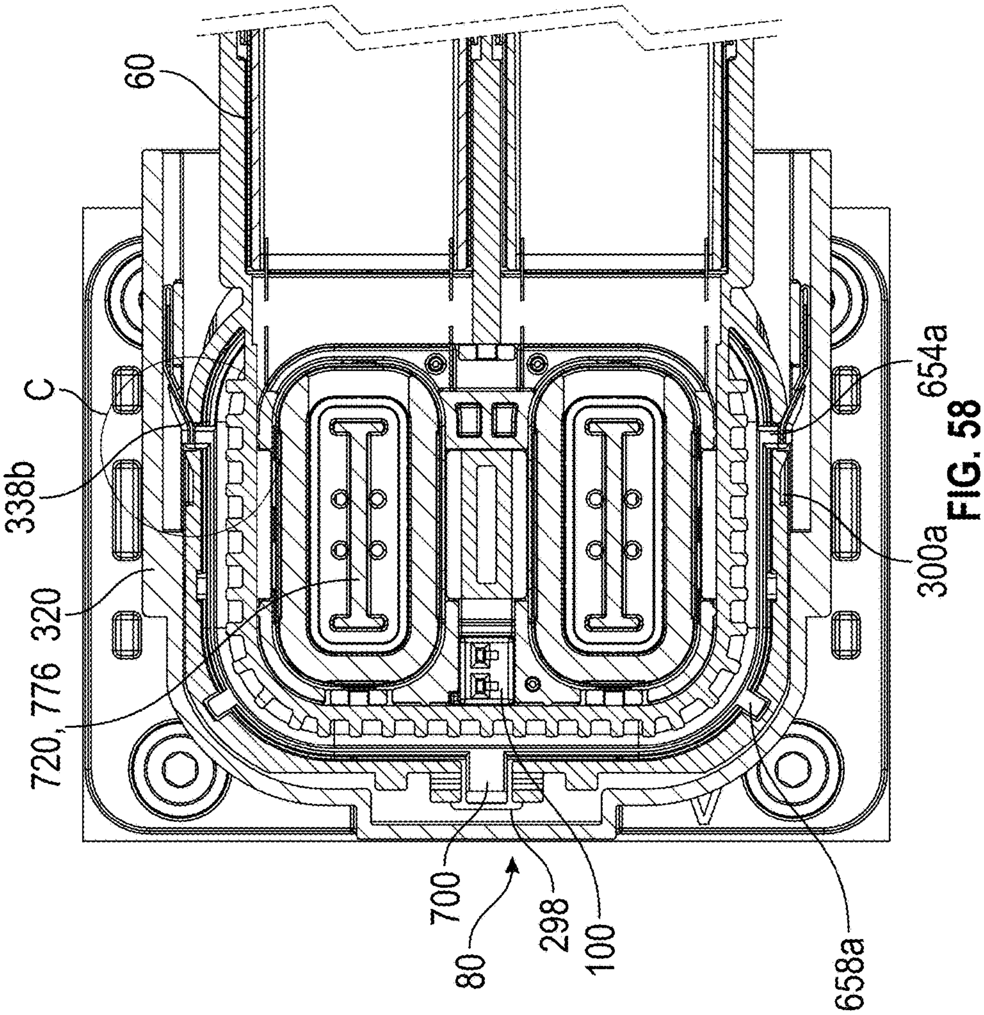
FIG. 58 is a cross-sectional view of the connector system taken along line 58-58 of FIG. 57.
Figure 57:
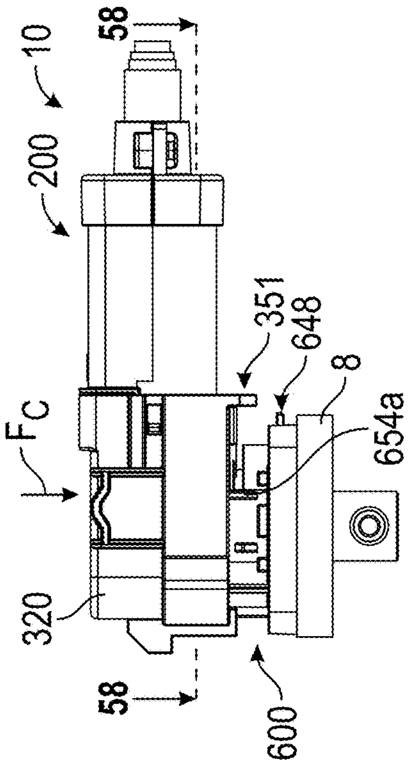
FIG. 57 is a side view of the connector system of FIG. 1 in a partially connected state, where the male connector assembly is in a ready to engage state and the male connector assemblies are not fully seated within the female connector assemblies.
Figure 69:
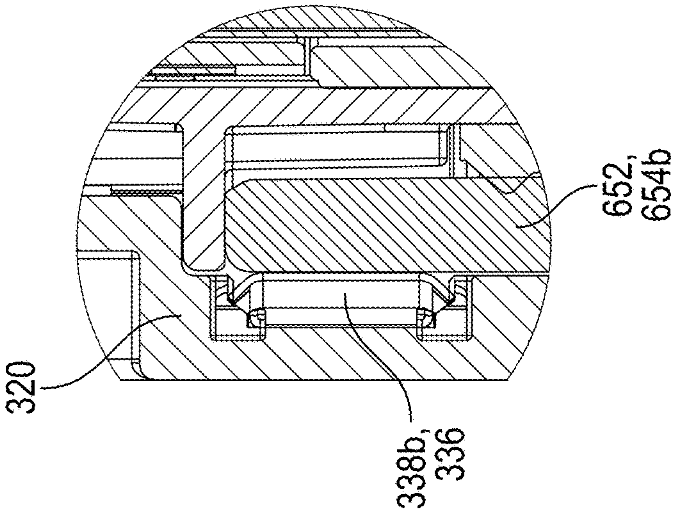
FIG. 69 is a zoomed-in view of area G of the connector system of FIG. 68 showing the accidental engagement assembly.
Figure 79:
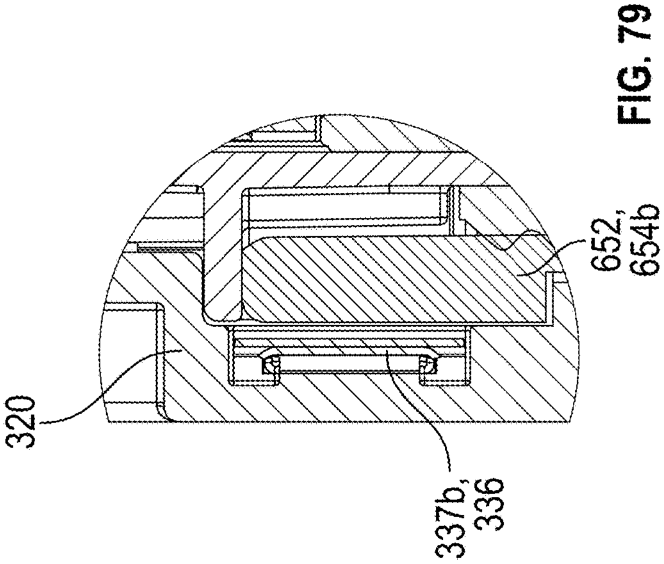
FIG. 79 is a zoomed-in view of area K of the connector system of FIG. 68 showing the accidental engagement assembly.
Figure 59:
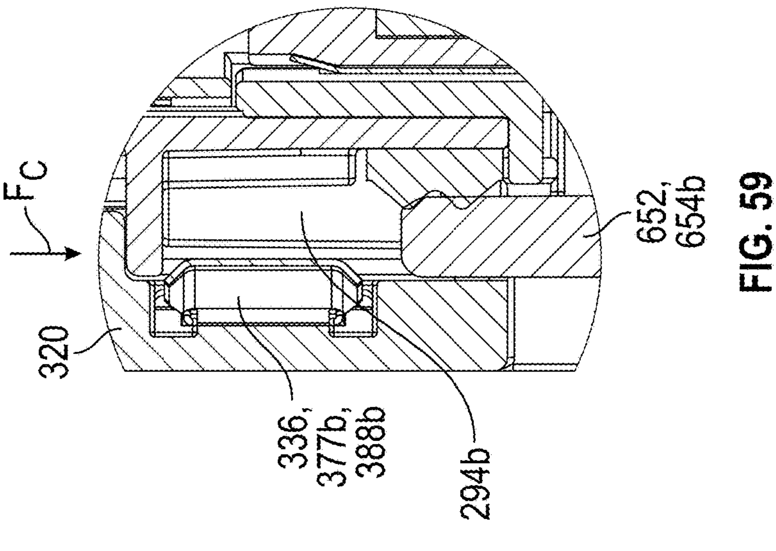
FIG. 59 is a zoomed-in view of area C of the connector system of FIG. 58 showing the accidental engagement assembly.
Figure 61:
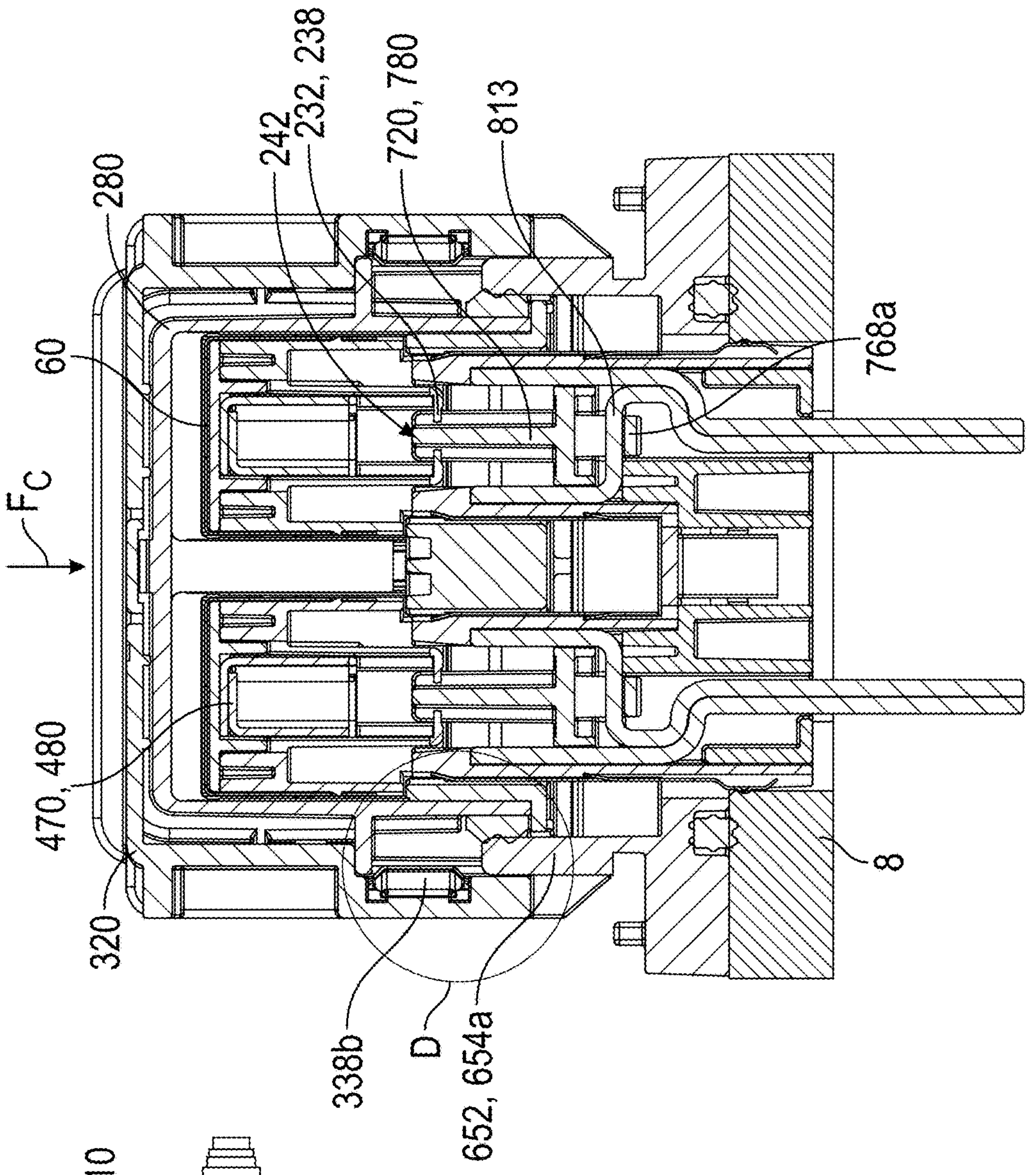
FIG. 61 is a cross-sectional view of the connector system taken along line 61-61 of FIG. 60.
Figure 60:
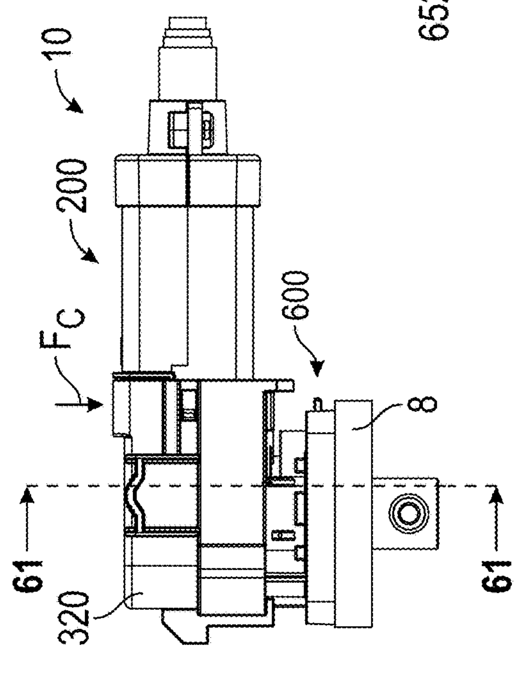
FIG. 60 is a side view of the connector system of FIG. 1 in the partially connected state.
Figure 72:
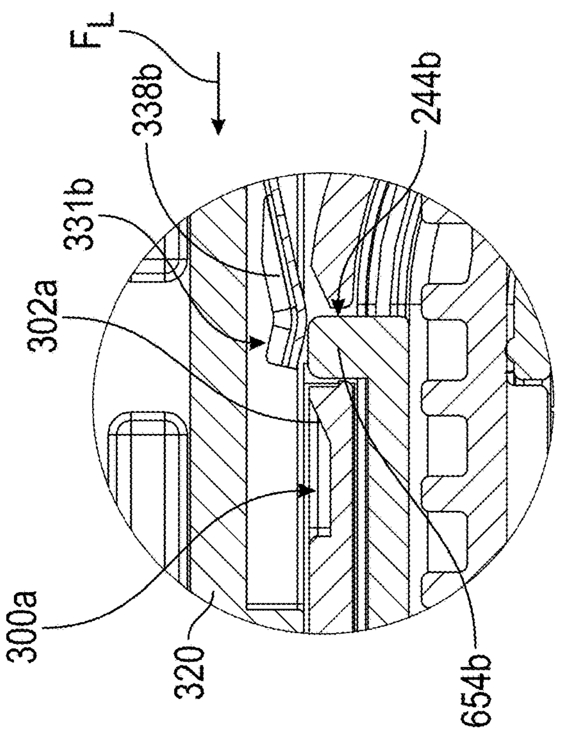
FIG. 72 is a zoomed-in view of area H of the connector system of FIG. 71 showing the accidental engagement assembly.
Figure 62:
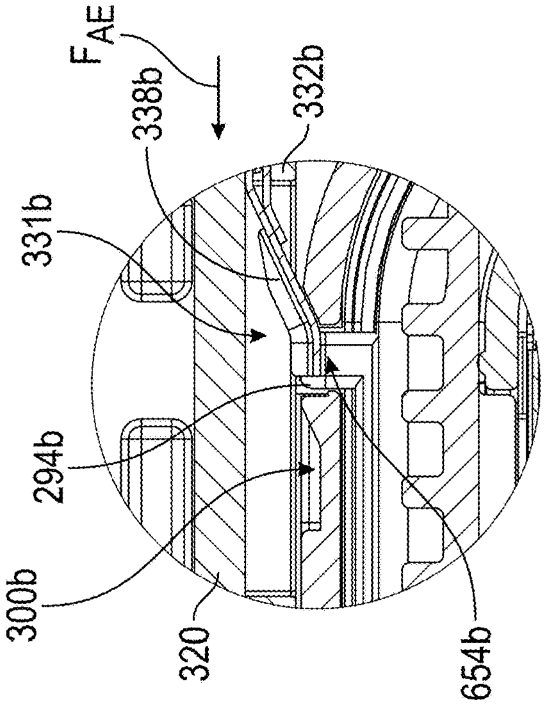
FIG. 62 is a zoomed-in view of area D of the connector system of FIG. 61 showing the accidental engagement assembly.
Figure 82:
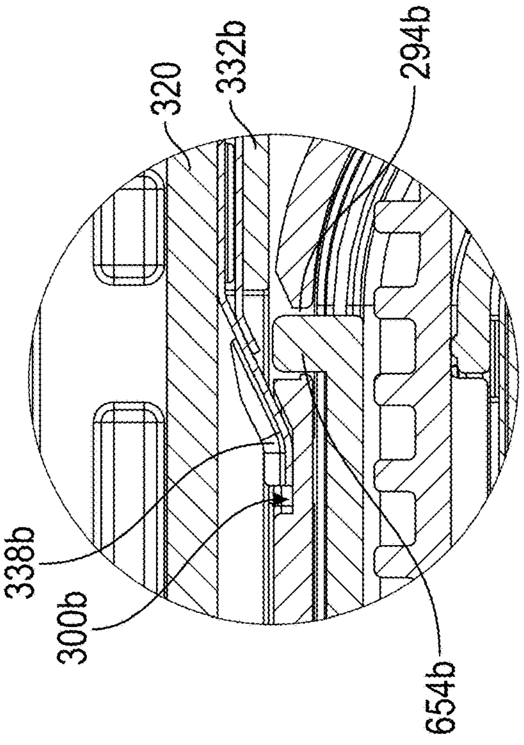
FIG. 82 is a zoomed-in view of area L of the connector system of FIG. 81 showing the accidental engagement assembly.
Figure 64:
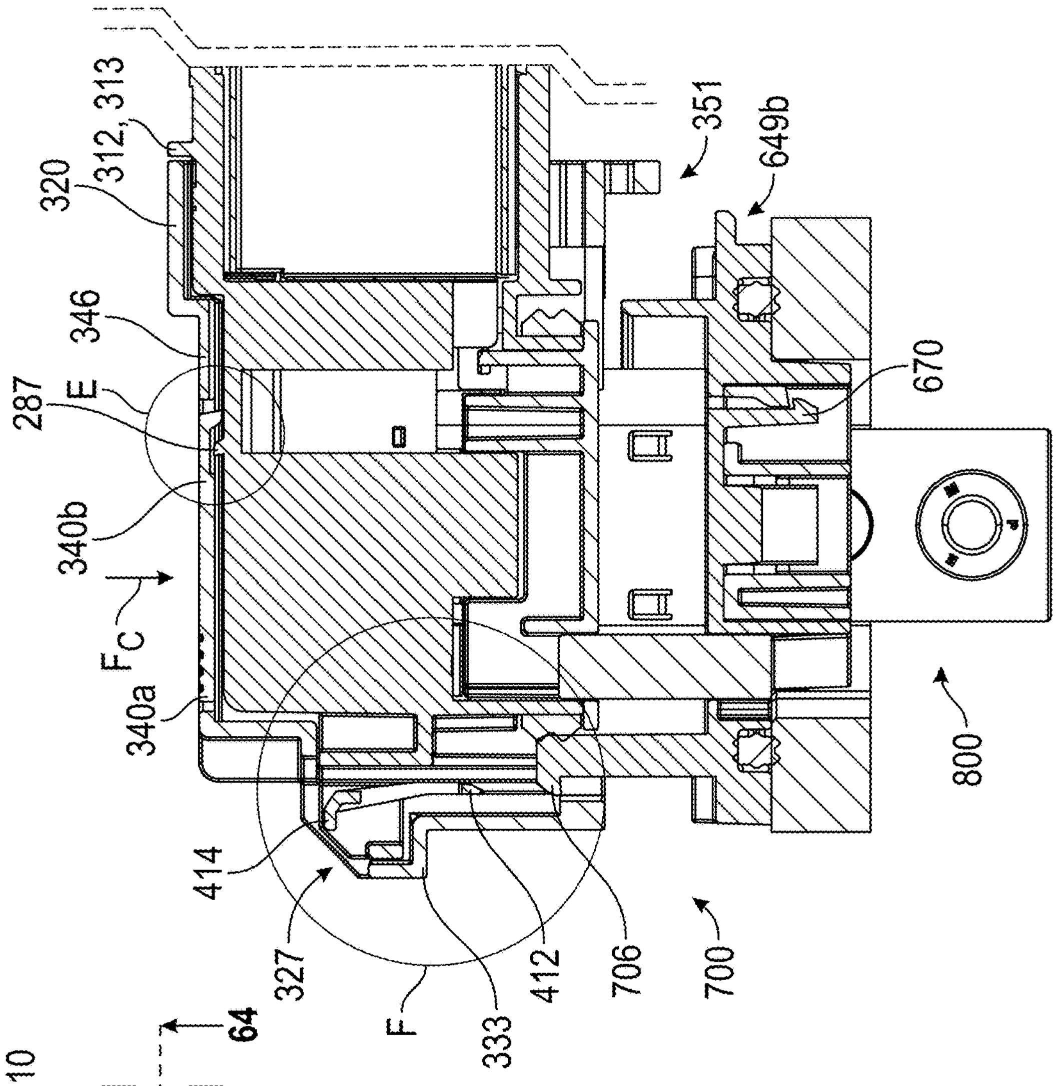
FIG. 64 is a cross-sectional view of the connector system taken along line 64-64 of FIG. 63.
Figure 63:
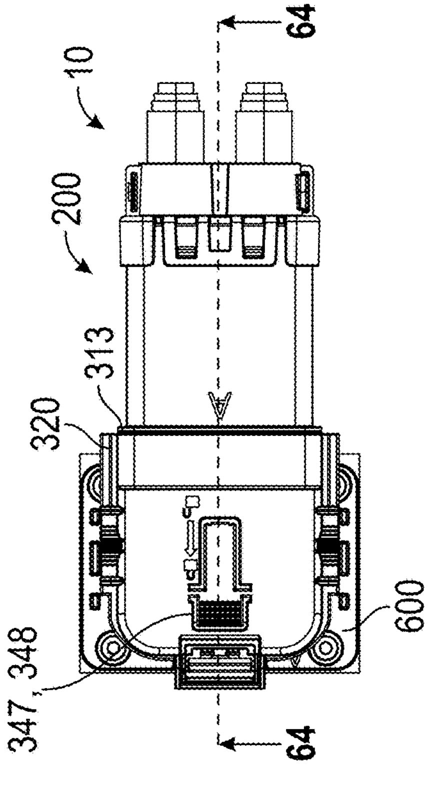
FIG. 63 is a top view of the connector system of FIG. 1 in the partially connected state.

Once the male and female connector assemblies 200, 600 are in their assembled states (as shown in FIGS. 55A and 55B), the system 10 can move from a disassembled state (FIGS. 56A-56B) to a partially connected state (FIGS. 57-64) to a connected state (FIGS. 67-74) to a ready to use state (FIGS. 77-84, 88-91). In the disconnected state, the male connector assembly 200 is spaced a part of the female connector assembly 600. In this disconnected state, the male connector assembly 200 has been assembled and can be in either: (i) ready to engage state or (ii) restrictive engagement state.

Figure 26:
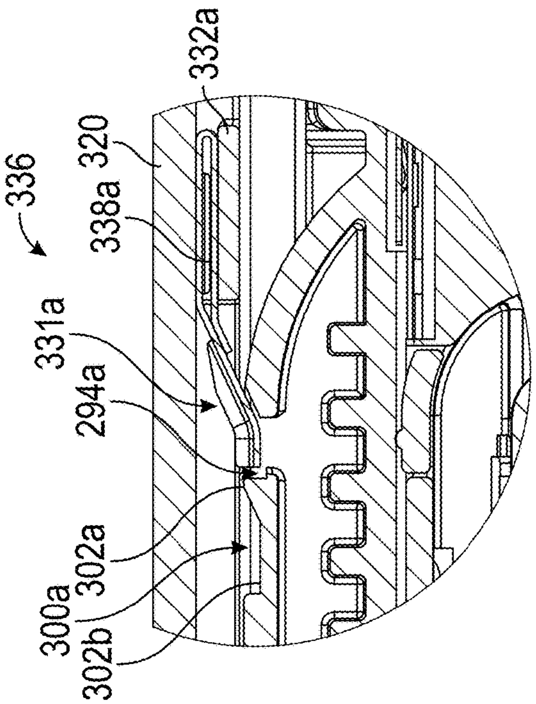
FIG. 26 is a zoomed-in view of area B of the male connector assembly of FIG. 25 showing the accidental engagement assembly.
Figure 24:
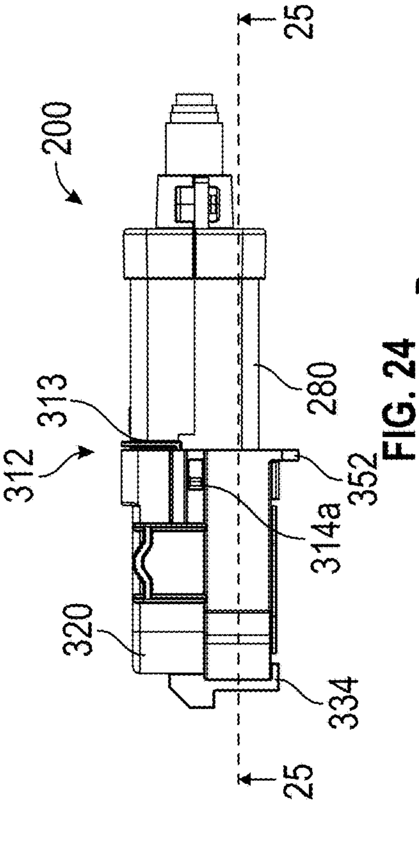
FIG. 24 is a side view of the male connector assembly in the ready to engage/disengage state where the primary locking member is in an unlocked state.
Figure 25:
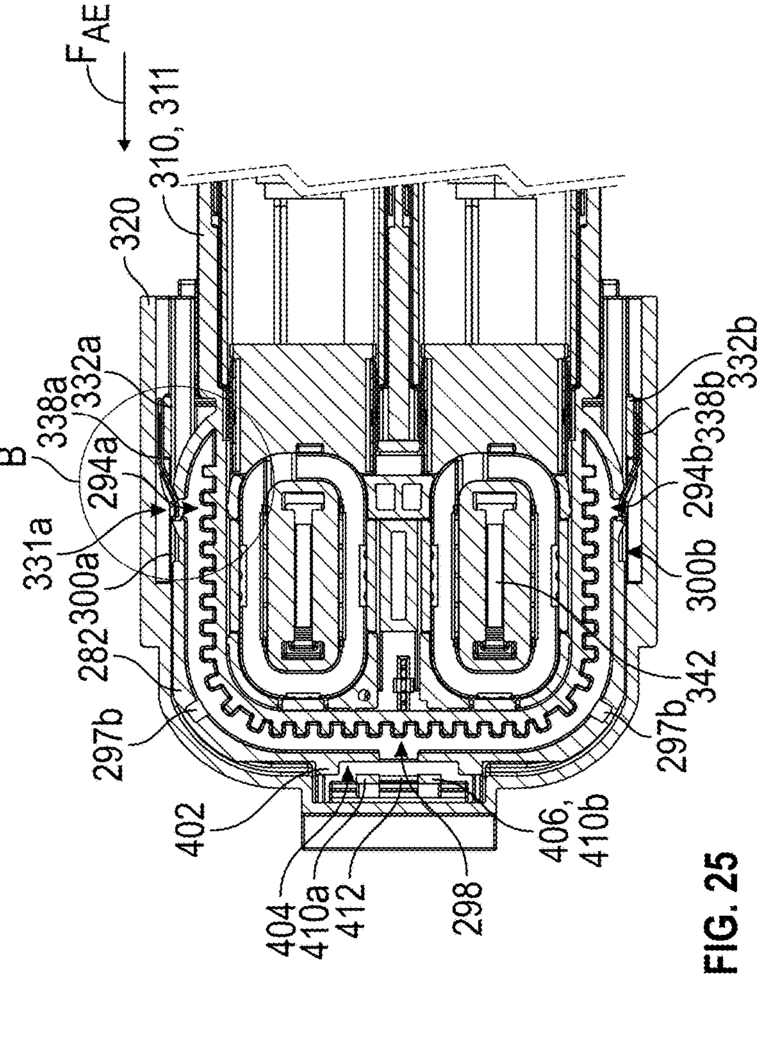
FIG. 25 is a cross-sectional view of the male connector assembly taken along line 25-25 of FIG. 24.
Figure 27:
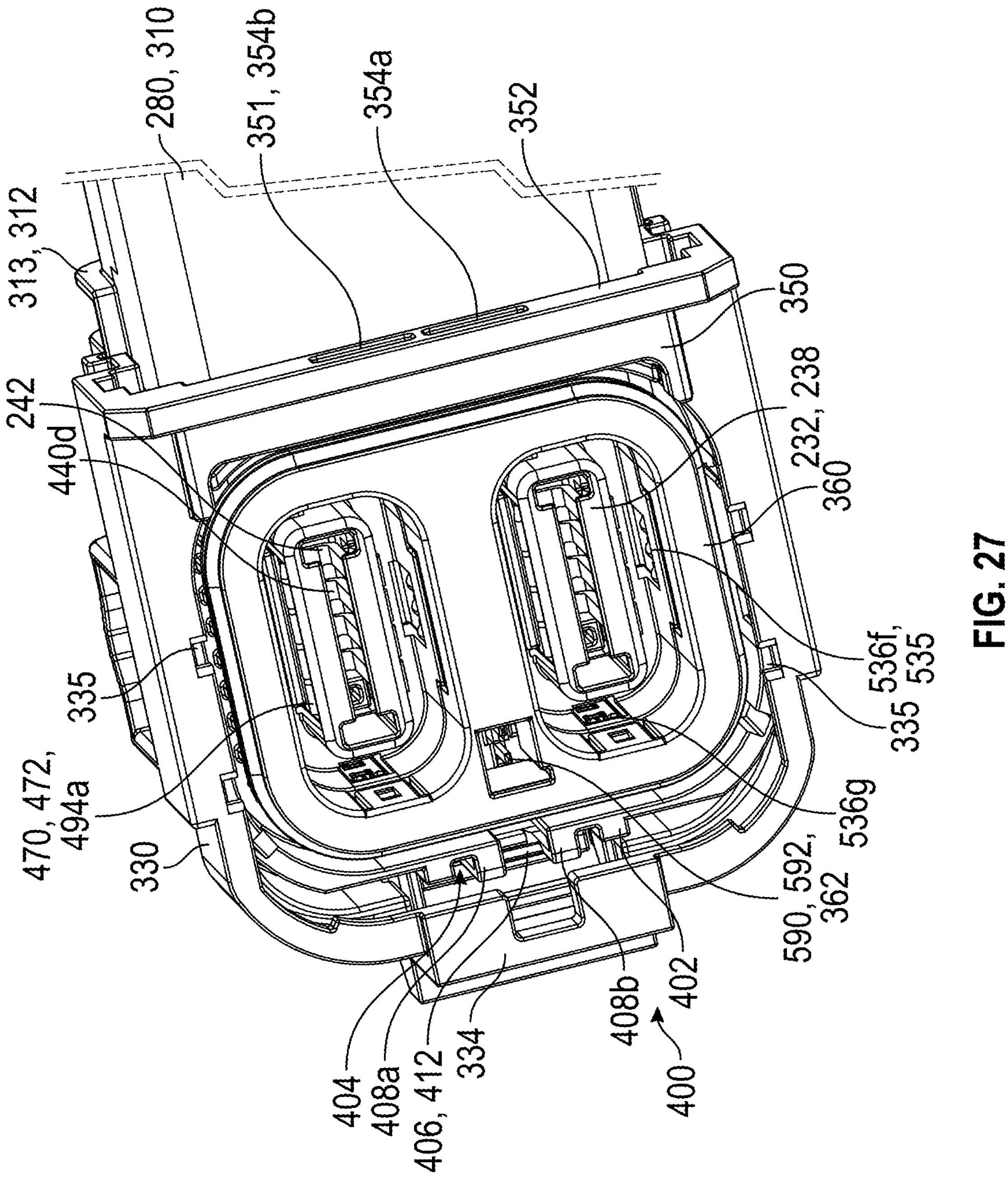
FIG. 27 is a bottom perspective view of the male connector assembly in an restrictive engagement state where the primary locking member is in a locked state.

In the ready to engage state, the primary locking member 320 is moved rearward until: (i) the accidental engagement members 338*a*, 338*b* are positioned in the accidental engagement slots 294*a*, 294*b*, as shown in FIGS. 24-26, and (ii) the second disengagement projection 342 is positioned rearward of the first disengagement projection 287. Once the male connector assembly 200 is placed in the ready to engage state, an accidental engagement force $F_{AE}$ that is over a predefined accidental engagement amount (e.g., 500 Newtons of force) would need to be applied on the primary locking member 320 to move the primary locking member 320 from the unlocked state or rearward state to the locked state or forward state. In particular, this accidental engagement force $F_{AE}$ would have to be significant enough to force the accidental engagement members 338*a*, 338*b* from their positon in the accidental engagement slots 294*a*, 294*b*. The locking force $F_L$ (which will be described below) is less than the accidental engagement force $F_{AE}$, preferable locking force $F_L$ is at least 10 times less than the accidental engagement force $F_{AE}$, and most preferable locking force $F_L$ is twenty times less than the accidental engagement force $F_{AE}$. The predefined accidental engagement amount is large to help ensure that the primary locking member 320 is not accidently engaged prior to installation. This helps reduce installation times, but the installer does not have to trouble shoot why the connector may not be able to mate due to the positional relationship of the primary locking member 320.

If the accidental engagement force $F_{AE}$ is applied to the primary locking member 320 in an amount that is over a predefined accidental engagement amount, then accidental engagement members 338*a*, 338*b* would be forced from their positon in the accidental engagement slots 294*a*, 294*b* and the male connector assembly 200 would be moved from the ready to engage/disengage state to the restrictive engagement state (i.e., the primary locking member 320 would be in the locked state). In this restrictive engagement state, the accidental engagement members 338*a*, 338*b* are positioned forward of the edge of the accidental engagement slots 294*a*, 294*b* and the second disengagement projection 342 is positioned forward of the first disengagement projection 287. The male connector assembly 200 that is shown in FIG. 14 is in this restrictive engagement state, wherein the male connector assembly 200 cannot be mated with the female connector assembly 600 due to the positional relationship of the primary locking member 320. For example, the male bracing assembly 351 and female bracing assembly 648, which together form the bracing assembly 349 would prevent the connector assemblies 200, 600 from mating with one another.

If the male connector assembly 200 is moved from the ready to engage state to the restrictive engagement state, it is possible to return the connector to the ready to engage state by applying a downward directed pivoting force $F_P$ on the forward or unlocking cantilever segment 340*a* in order to cause the rear or locking cantilever segment 340*a* to pivot around the pivot strip 339 in order to move a lowermost extent of the second disengagement projection 342 above the uppermost extent of the first disengagement projection 287. While applying the downward directed force on the forward or unlocking cantilever segment 340*a*, the installer also applies a rearwardly directed unlocking force $F_{UL}$ on the primary locking member 320 in order to move the second disengagement projection 342 rearward of the first disengagement projection 287. As stated above, the required downward directed pivoting force $F_P$ is less than 25 Newtons of force, while the required unlocking force $F_{UL}$ is less than 25 Newtons of force. However, due to the accidental engagement of the primary locking member 320, the connector assembly 200 should be inspected prior to its use.

A. Partially Connected State

Assuming that the male connector assembly 200 is in the ready to engage/disengage state, the installer can start to apply a downwardly directed connecting force $F_C$ on the male connector assembly 200 in order to move the system 10 from the disconnected state to the partially connected state. In this partially connected state, the following structures are in the positions: (i) the accidental engagement projections 654*a*, 654*b* are aligned with and are partially received by the accidental engagement slots 294*a*, 294*b*, (ii) the stabilization projections 658*a*, 658*b* are aligned with and are partially received by the stabilization slots 297*a*, 297*b*, (iii) touch-proof element 780 is aligned with and partially received by touch-proof element opening 242, (iv) the CPA body 704 is aligned with and are partially received by the CPA slot 298 and the horizontal engaging member 412 of the male deformable male CPA member 406 is positioned above the CPA retaining member 706, (v) MIL 590 is not electrically connected to FIL 980 or in other words the male IL jumper 592 is not received by the female IL receiver 982, whereby allowing current cannot flow between the male and female terminal assemblies 200, 600, (vi) the contact arms 494*a*-494*h* are starting to engage with contact arm displacement means 663 (i.e., internal segment 664 of the upper portion of the side walls 660*a*, 660*b*).

To move the system 10 from the partially connected state towards the connected state, the installer continues to apply the downwardly directed connecting force $F_C$. This downwardly directed connecting force $F_C$: (i) causes the accidental engagement projections 654*a*, 654*b* to be substantially received by the accidental engagement slots 294*a*, 294*b*, whereby said accidental engagement projections 654*a*, 654*b* displace the accidental engagement members 338*a*, 338*b* out of the accidental engagement slots 294*a*, 294*b* and into the accidental engagement recesses 331*a*, 331*b* formed in the lower wall arrangement 330 of the primary locking member 320, (ii) the stabilization projections 658*a*, 658*b* are substantially received by the stabilization slots 297*a*, 297*b*, (iii) the positioning structures 656*a*, 656*b* are substantially received by the positioning slots 296*a*, 296*b*, (iv) the CPA body 704 is substantially received by the CPA slot 298 and the CPA retaining member 706 elastically displaces the male deformable male CPA member 406 into a deformed positon, where: (a) the horizontal engaging member 412 of the male deformable male CPA member 406 is displaced towards the front of the system 10, and (b) the user interaction structure 414 of the male deformable male CPA member 406 is displaced towards the rear of the system 10, (v) touch-proof element 780 is received by touch-proof element opening 242, (vi) MIL 590 is not electrically connected to FIL 980 or in other words the male IL jumper 592 is not received by the female IL receiver 982, whereby allowing current cannot flow between the male and female terminal assemblies 200, 600, and (vii) the contact arms 494*a*-494*h* are displace towards the center of each terminal assembly 430 by the contact arm displacement means 662 (i.e., internal segment 664 of the upper portion of the side walls 660*a*, 660*b*).

B. Connected State

The system 10 is in the connected state when the male terminal assemblies 430 are received in the female terminal receivers 814 and thus the installer can stop applying the downwardly directed connecting force $F_C$. In the connected state: (i) the accidental engagement projections 654*a*, 654*b* are received by the accidental engagement slots 294*a*, 294*b*, whereby said accidental engagement projections 654*a*, 654*b* displace the accidental engagement members 338*a*, 338*b* out of the accidental engagement slots 294*a*, 294*b* and into the accidental engagement recesses 331*a*, 331*b* formed in the lower wall arrangement 330 of the primary locking member 320, (ii) the stabilization projections 658*a*, 658*b* are received by the stabilization slots 297*a*, 297*b*, (iii) the positioning structures 656*a*, 656*b* are received by the positioning slots 296*a*, 296*b*, (iv) the CPA body 704 is received by the CPA slot 298, male deformable male CPA member 406 has returned to its original position, and the horizontal engaging member 412 of the male deformable male CPA member 406 is positioned below the CPA retaining member 706, (v) touch-proof element 780 is received by touch-proof element opening 242, (vi) MIL 590 is electrically connected to FIL 980 or in other words the male IL jumper 592 is received by the female IL receiver 982, whereby allowing current to flow between the male and female terminal assemblies 200, 600, and (vii) the contact arms 494*a*-494*h* are displace towards the center of each terminal assembly 430 and in contact with the inner surface of the side walls 812*a*, 812*c* of the female terminal assembly 800.

Referring specifically to the male and female terminal assemblies 430, 800, the combination of outer surfaces of the contact arms 494*a*-494*h* form a rectangle that has a width that is slightly larger (e.g., between 0.1% and 15%) than the width of the rectangle that is associated with the female terminal assembly 800. When the slightly larger male terminal assembly 430 is inserted into the slightly smaller female terminal receiver 814, the outer surface of the contact arms 494*a*-494*h* are forced towards the center of the male terminal assembly 430. Because the outer surface of the contact arms 494*a*-494*h* is forced towards the center of the male terminal assembly 430, the free end 446 of the spring member 440*d* are also forced towards the center of the male terminal assembly 430. The spring 440*d* resists this inward displacement by providing a spring biasing force $S_{BF}$. This spring biasing force $S_{BF}$ is generally directed outward against the free ends 488 of the male terminal 470. In other words, this spring biasing force $S_{BF}$ provides an outwardly directed biasing force, a wedging function, or shimmering effect against the contact arms 494*a*-494*h* thereby holding the outer surfaces of the contact arms 494*a*-494*h* in engagement with the female terminal assembly 800.

In this connected state, the primary locking member 230 remains in the unlocked position, whereby the second disengagement projection 342 is positioned rearward of the first disengagement projection 287 and bracing projections 649*a*, 649*b* are not positioned in the bracing apertures 354. To note, said downwardly directed connecting force $F_C$ requires less than 100 Newtons of force, preferably less than 76 Newtons of force to meet class 3 of USCAR 25, and more preferably less than 46 Newtons of force to meet class 2 of USCAR 25. Also, it should be noted that this system 10 provides substantial benefits over prior connector systems due to is large current carry capacity without requiring a lever assist that aids in the mating of the male and female connector assemblies 200, 600.

To move the system 10 from the connected state towards the ready to use state, the installer starts to apply the forwardly directed locking force $F_L$ on the primary locking member 320. This forwardly directed locking force $F_L$ (which is substantially perpendicular to the downwardly directed coupling force $F_C$) causes the primary locking member 320 to move forward, whereby: (i) the accidental engagement members 338*a*, 338*b* are substantially displaced into the accidental engagement depression 300*a*, 300*b*, (ii) the bracing projections 649*a*, 649*b* are substantially positioned in the bracing apertures 354, (iii) the ramped or sloped curvilinear surface 344*a* of the second disengagement projection 342 interacts with the ramped or sloped curvilinear surface 290*a* first disengagement projection 287 in order to: (a) upwardly displace via an engagement force FE the rear or locking cantilever segment 340*a* about the pivot strip 339 to cause the lowermost extent of the second disengagement projection 342 to be positioned above the uppermost extent of the first disengagement projection 287, and (b) downwardly displace the forward or unlocking cantilever segment 340*a* about the pivot strip 339.

C. Ready To Use State

The system 10 is in the ready to use state when the primary locking member 320 is in the locked state and thus the installer can stop applying the forwardly directed locking force $F_L$. In the ready to use state: (i) the accidental engagement members 338*a*, 338*b* are displaced from the accidental engagement recesses 331*a*, 331*b* and positioned in the accidental engagement depression 300*a*, 300*b*, (ii) the bracing projections 649*a*, 649*b* are positioned in the bracing apertures 354, (iii) an extent of the primary locking member 320 is positioned adjacent to the user interaction structure 414 of the male deformable male CPA member 406 in order to prevent said male deformable male CPA member 406 from elastically deforming, (iv) the second disengagement projection 342 is positioned forward of the first disengagement projection 287, whereby the forward angled flat surface 344*b* of the second disengagement projection 342 is positioned forward of the forward angled flat surface 290*b* of the first disengagement projection 287, and (v) the indicia 316 that is disposed on the main housing 280 is viewable/readable by an installer and/or a machine.

To read the indicia 316, the installer positions the indicia reading device above the connector system 10 and points the indicia reading device 4 downwards such that it scans the top portion of the connector system 10. This downwards scanning direction is: (i) in the same general direction as the connecting force $F_C$ that is applied to the male connector assembly 200 in order to connect the male connector assembly 200 to the female connector assembly 600, and/or (ii) is substantially perpendicular to the spring biasing force $F_{SB}$ that is applied by the spring member 440*d* on the contact arm 494*a*-494*h* of the male terminal body 472. The information that is obtained from the indicia (i.e., QR code) 316 includes: (i) connector type, (ii) materials contained within the connector, (iii) company that manufactured the connector, (iv) when the connector was manufactured, and (v) where the connector was manufactured. Once the indicia 316 is read, the indicia reading device informs the installer that the connector system 10 is in the ready to use and thus the primary locking member 320 is in the locked position.

Once the system 10 is placed in the ready to use state, an accidental disengagement force $F_{AD}$ that is over a predefined accidental disengagement amount (e.g., 500 Newtons of force) would need to be applied on the primary locking member 320 to move the primary locking member 320 from the locked state or forward state to the unlocked state or rearward state. In particular, this accidental disengagement force $F_{AD}$ would have to be significant enough to force the second disengagement projection 342 rearward of the first disengagement projection 287, which is prevented by the interaction between the forward angled flat surface 344*b* of the second disengagement projection 342 and the forward angled flat surface 290*b* of the first disengagement projection 287. The predefined accidental disengagement amount is large to help ensure that the primary locking member 320 is not accidently disengaged after installation, which helps reduce possible connection failures. If the accidental disengagement force $F_{AD}$ is applied to the primary locking member 320 in an amount that is over a predefined accidental disengagement amount, then the connector system 10 would be moved from the ready to use state to the connected state and the male connector assembly 200 would be moved to the ready to disengage state (i.e., the primary locking member 320 would be in the unlocked state).

D. Connected State

Once the system 10 is placed in the ready to use state, the system 10 can be moved to the connected state by applying a downward directed pivoting force $F_P$ on the forward or unlocking cantilever segment 340*a* in order to cause the rear or locking cantilever segment 340*a* to pivot around the pivot strip 339 in order to move a lowermost extent of the second disengagement projection 342 above the uppermost extent of the first disengagement projection 287. While applying the downward directed pivoting force $F_P$ on the forward or unlocking cantilever segment 340*a*, the installer also applies a rearwardly directed unlocking force $F_{UL}$ on the primary locking member 320 in order to move the second disengagement projection 342 rearward of the first disengagement projection 287. Said rearwardly directed unlocking force $F_{UL}$ causes: (i) the accidental engagement members 338*a*, 338*b* to be: (a) displaced from the accidental engagement depression 300*a*, 300*b* due to the interaction between said accidental engagement members 338*a*, 338*b* and the sloped wall 302*a*, 302*b*, and (b) positioned within the accidental engagement recesses 331*a*, 331*b*, (ii) removes the bracing projections 649*a*, 649*b* from the bracing apertures 354, and (iii) removes the extent of the primary locking member 320 from being positioned adjacent to the user interaction structure 414 of the male deformable male CPA member 406. As stated above, the required downward directed pivoting force $F_P$ is less than 25 Newtons of force, while the required unlocking force $F_{UL}$ is less than 25 Newtons of force. It should be noted that if installer does not properly apply the downward directed pivoting force $F_P$, then the second disengagement projection 342 will interact with the first disengagement projection 287; whereby preventing the unlocking of the primary locking member 320 unless the installer applies the accidental disengagement force $F_{AD}$ in an amount that is greater than 500 Newtons. As such, the unlocking force $F_{UL}$ is less than the accidental disengagement force $F_{AD}$, preferable unlocking force $F_{UL}$ is at least 10 times less than the accidental disengagement force $F_{AD}$, and most preferable unlocking force $F_{UL}$ is twenty times less than the accidental disengagement force $F_{AD}$.

E. Disconnected State

Once the system 10 is placed in the connected state, system 10 can be moved to the disconnected state by applying: (i) a rearward CPA force $F_{CPA}$ on the user interaction structure 414 of the male deformable male CPA member 406 is displaced towards the rear of the system 10, whereby causing the horizontal engaging member 412 of the male deformable male CPA member 406 is displaced towards the front of the system 10, and (ii) a upwardly directed disconnecting force $F_{DIS}$ on the male connector assembly 200.

Second Embodiment

As shown in FIGS. 106-135, the second embodiment of the connector system 1010 includes multiple components that are designed to electrically and mechanically connect one device or component to another device or component within a power distribution system 5. For sake of brevity, the above disclosure in connection with connector assembly 10 will not be repeated below. However, it should be understood that the disclosure related to the male terminal assembly 430 and the female terminal assembly 800 applies in equal force to male terminal assembly 1430 and the female terminal assembly 1800. Additionally, all other structures (e.g., busbar 1700 and capacitor assembly 1750) that are not disclosed in this application are fully disclosed in PCT/US2021/033446, which is incorporated herein by reference. It should be understood that like numbers like numbers represent like structures. For example, the disclosure from PCT/US2021/033446 that relates to busbar 700 applies in equal force to busbar 1700 disclosed herein. Moreover, it is to be understood that any one or more features of the connector assembly 10 can be used in conjunction with those disclosed regarding the connector assembly 1010, and that any one or more features of the connector assembly 1010 can be used in conjunction with those disclosed regarding the connector assembly 10. For example, any features of the touch-proof member 720 or touch-proof member 2942 can be used in conjunction with those disclosed regarding the touch-proof member 1942, and any features of the touch-proof member 1942 can be used in conjunction with those disclosed regarding the touch-proof member 720 or touch-proof member 2942.

The second embodiment of the connector system 1010 includes: (i) male connector assembly 1200 and a female connector assembly 1600. The male connector assembly 1200 includes: (i) a male housing assembly 1220 and, (ii) a male terminal assembly 1430 with a male terminal 1470 and a spring member 1440*c*. The male housing assembly 1220 includes: (i) an external housing 1222, and (ii) a terminal holder 1246 that removably couples the male terminal assembly 1430 within the external housing 1222. The female connector assembly 1600 includes: (i) female housing 1610, (ii) busbar 1700, (iii) capacitor assembly 1750, and (iv) a female terminal assembly 1800. The female housing 1610 is designed to at least: (i) protect the female terminal assembly 1800 from external objects by encapsulating a majority of the female terminal assembly 1800, (ii) aid in the coupling of the male terminal assembly 1430 to the female terminal assembly 1800, (iii) provide a sealed environment to house the capacitor assembly 1750, (iv) support the coupling of the capacitor assembly 1750 with the female terminal assembly 1800, and (v) provide a sealed between the male connector assembly 1200 and the component 8 of the power distribution system 5 through a pair of capacitors 1754, 1758. To achieve these design objectives, the female housing 1610 is comprised of a lower female housing 1612 and an upper female housing 1650.

The primary differences between the connector system disclosed in PCT/US2021/033446 and the connector system 1010 disclosed herein is the alteration of: (i) the female housing 1610 (e.g., the lower female housing 1612 and an upper female housing 1650), and (ii) a second embodiment of the touch-proof member 1942. Specifically, the lower housing member has been altered to: (i) fit within the upper female housing 1650, (ii) include an arrangement of coupling projections 1634 that extend from an outer surface of the lower arrangement of side walls 1626, and (iii) omits the two mounting areas 1646*a*, 1646*b* and openings 1647*a*, 1647*b* formed there through. The arrangement of coupling projections 1634 includes a plurality of pyramidal shaped structures 1636*a*-1636*f*. Said pyramidal shaped structures 1636*a*-1636*f* are configured to be received by the arrangement of apertures 1680 formed in the upper wall 1678 of the upper adaptor housing 1650. In particular, said arrangement of apertures 1680 includes a plurality of oval shaped openings 1682*a*-1682*f* that are configured to receive the pyramidal shaped structures 1636*a*-1636*f*, when the lower female housing 1612 is coupled to the upper female housing 1650. In addition to the arrangements of apertures 1680, the upper female housing 1650 has been modified to include the mounting areas 1684*a*, 1684*b*. Said mounting areas 1684*a*, 1684*b* include openings 1686*a*, 1686*b* formed there through that are designed to receive elongated fasteners that secure the housing 1610 (and the female connector assembly 600) to the component 8.

The alterations to the housing 1610 that are shown and described above provide improvements over the housing 610 that is disclosed in PCT/US2021/033446 because the housing 1610 disclosed herein: (i) does not rely only on ultrasonic welding of the lower female housing 1612 and an upper female housing 1650 in order to maintain a sealed connector 600; instead, the disclosed housing 1610: (a) utilizes a mechanical method (i.e., the arrangement of coupling projections 1634 and arrangements of apertures 1680) of securing the upper female housing 1650 to the lower female housing 1612, and (b) utilizes a mechanical method (i.e., the elongated fasteners through the mounting areas 1684*a*, 1684*b* of the upper female housing 1650) of directly securing the upper female housing 1650 to the component 8, which seals the lower female housing 1612 within the upper female housing 1650, and (ii) increases the thickness of the bottom wall to prevent bowing or separation from the component 8. Other alterations between these housing designs may be obvious to one of skill in the art and said alterations may provide additional benefits that may also be obvious to one of skill in the art.

The touch-proof member 1942 shown in FIGS. 106-135 provide substantial improvements over a third embodiment of the touch-proof member 2942, which is disclosed in FIGS. 136-140. In particular, these improvements include better securement of the member 1942 in the female terminal assembly 1800, and less force being required to insert said touch-proof member 1942 into the female terminal assembly 1800. The optional touch-proof assembly 1040 includes a male touch-proof element opening 1242 and a female touch-proof member 1942. Said touch-proof assembly 1040 is designed to: (i) help ensure that foreign objects cannot come into contact with the female terminal assembly 1800 when the female connection assembly 1600 is not coupled to the male connector assembly 1200 and (ii) stabilize the connection between the male terminal assembly 1430 and the female terminal assembly 1800. To accomplish both of these tasks, the female touch-proof member 1942 includes: (i) the touch-proof securing assembly 1944 and (ii) the touch-proof element 1960. The touch-proof securing assembly 1944 and includes an arrangement of deformable retaining members 1946 with: (i) a first base portion 1948*a* having a first retaining member 1950*a*, and a second retaining member 1950*b*, (ii) a second base portion 1948*b* having a third retaining member 1950*c*, and a fourth retaining member 1950*d*, and (iii) a touch-proof recess 1951 that extends between the first base portion 1948*a* and the second base portion 1948*b*. The retaining members 1950*a*-1950*d* depend or extend downward from their base portion 1948*a*, 1948*b* and include a body 1952*a*-1952*d*, a protrusion 1954*a*-1954*d*, and a sloped rear wall 1956*a*-1956*d*. It should be understood that each of these structures aid in allowing the female touch-proof member 1942 to be installed after the female connector system 600 is coupled to the component.

The arrangement of deformable retaining members 1946 have: (i) an original state or undeformed state when the touch-proof member 1942 is in an uninstalled or installed state, and (ii) an unoriginal state or deformed state when the touch-proof member 1942 is in a partially installed. In the an original state or undeformed state, the touch-proof recess 1951 has a first original width and in the unoriginal state or deformed state the touch-proof recess 1951 has a second compressed width, wherein the first original width is greater than the second compressed width. Because the arrangement of deformable retaining members 1946 are a part of the touch-proof securing assembly 1944 and the touch-proof securing assembly 1944 is a part of the touch-proof member 1942, the states from the arrangement of deformable retaining members 1946 apply to the touch-proof securing assembly 1944 and touch-proof member 1942. In other words, the when the arrangement of deformable retaining members 1946: (i) is in the original state, the touch-proof securing assembly 1944 and touch-proof member 1942 are also in the original state, and (ii) is in the deformed state, the touch-proof securing assembly 1944 and touch-proof member 1942 are also in the deformed state.

The first and second base portion 1948*a*, 1948*b* have a substantially rectangular shape, wherein the combined outer periphery of the base portions 1948*a*, 1948*b* and the touch-proof recess 1951 substantially match the shape of the female terminal receiver 1814. In addition to the arrangement of deformable retaining members 1946 that depend downward from the base portions 1948*a*, 1948*b*, the touch-proof member 1942 also includes downwardly depending support projections 1958*a*, 1958*b* that are designed to support the base portions 1948*a*, 1948*b* and ensure that said base portions 1948*a*, 1948*a* are offset from the lowermost extent of the female terminal receiver 1814. Extending upward (i.e., opposite from the arrangement of deformable retaining members 1946 and support projections 1958*a*, 1958*b*) from the base portions 1948*a*, 1948*b* is the touch-proof element 1960 that includes a first extent 1961*a* and a second extent 1962*b*. The first extent 1961*a* extends from both of the base portions 1948*a*, 1948*b* and has a substantially solid perimeter except for the slot 1953 formed through the first extent 1961*a*. The slot 1953 reduces the rigidity of the first extent 1961*a* and is cooperatively positioned or aligned with the recess 1951. The slot 1953 and the recess 1951 permit the first extent 1961*a* to act as a living hinge to facilitate elastic deformation of the first and second base portion 1948*a*, 1948*b* during insertion of the touch-proof member 1942 within the female terminal assembly 1800.

The second extent 1961*b* extends from the first extent 1961*a* and includes three integrally formed walls 1962, where said walls 1962 include: (i) a first end wall 1964*a*, (ii) a second end wall 1964*b*, and (iii) a connecting wall 1966 that is positioned between the end walls 1964*a*, 1964*b*, defines grooves between the end walls 1964*a*, 1964*b*, and is aligned with the recess 1951 and slot 1953. The combination of end walls 1964*a*, 1964*b* and connecting wall 1966 provide the second extent 1961*b* with "I-shaped" sectional configuration. In this configuration, the slot 1953 does not extend into second extent 1961*b* of the element 1960 that is formed from walls 1962 to help ensure that the touch-proof element 1960 is rigid enough to meet the required industry standards. It should be understood that in other embodiments the touch-proof member 1942 may replace the recess 1951 and slot 1953 with: (i) two recesses that are perpendicular to one another, whereby the base portion is formed in quarters, (ii) two slots that are perpendicular to one another, whereby the touch-proof element is formed in quarters, (iii) a combination of the above, where both the base portion and touch-proof element are formed in quarters, or (iv) forming the base portion and/or the touch-proof element into any number (e.g., one to ten) different segments or portions in order to: (i) increase or decrease the force need to insert the touch-proof member 1942 in the female terminal receiver 1814, and (ii) increase or decrease the force need displace the touch-proof element 1960 using a foreign object.

The female terminal assembly 1800 and the touch-proof member 1942 have: (i) an internal terminal length $L_{IT}$ of (e.g., 20 mm) that spans the inner distance between opposed end walls 1812*b*, 1812*d*, (ii) an original protrusion length Lop (e.g., 22 mm) that extends between the first and third retaining members 1950*a*, 1950*c* of the arrangement of deformable retaining members 1946, when the female touch-proof member 1942 is in the original state, and (iv) an deformed protrusion length $L_{DP}$ (e.g., less than 20 mm) that extends between the first and third retaining members 1950*a*, 1950*c* of the arrangement of deformable retaining members 764, when the female touch-proof member 1942 is in the deformed state. It should be understood that: (i) the original protrusion length is greater than the deformed protrusion length, and (ii) the deformed protrusion length is greater than the internal terminal length. While the first and second deformable retaining member 768*a* of the first embodiment of the female touch-proof member 720 are expanded away from one another in their deformed state, the first and third retaining members 1950*a*, 1950*c* are compressed towards one another in their deformed state. When the female touch-proof member 1942 is inserted into the female terminal receiver 1814, the original protrusion length of the first and third retaining members 1950*a*, 1950*c* compresses to the deformed protrusion length in order to allow the first and third retaining members 1950*a*, 1950*c* to be inserted to the female terminal receiver 1814. Once the first and third retaining members 1950*a*, 1950*c* clear the length of the side wall 1812*a*-1812*d* and are inserted into the securement openings 1970 of the female terminal assembly 1800, the deformed protrusion length of the first and third retaining members 1950*a*, 1950*c* is expanded to the original protrusion length; whereby positioning an extent of the protrusions 1954*a*-1954*d* below the ide wall 1812*a*-1812*d* of the female terminal assembly 1800.

Once the female touch-proof member 1942 is in the installed state, the distance between the inner surface of the female terminal assembly 1800 and the outer surface of the female touch-proof member 1942 varies due to the configuration of the female touch-proof member 1942. For example, the distance between the end surface of the end wall 1964*a*, 1964*b* of the touch-proof element 1942 and the inner surface of the end walls 1812*b*, 1812*d* is approximately a $D_{TPE}$ end distance (e.g., 4.85 mm), the distance between the outer surface of the connecting wall 1966 of the touch-proof element 1942 and the inner surface of the side walls 1812*a*, 1812*b* is approximately a $D_{TPS}$ side distance (e.g., 6.85 mm). While these distances vary, each of the above distances are below the distances provided in various industry regulations (e.g., ISO 20076:2019, ISO 20653:2013, USCAR 12, Revision 5, and IEC 60529-2020). Thus, the inclusion of the touch-proof member 1942 allows the female connector assembly 1600 to pass or be compliant with each of these standards (e.g., ISO 20076:2019, ISO 20653:2013, USCAR 12, Revision 5, and IEC 60529-2020).

Third Embodiment

FIGS. 136-140 show a third embodiment of a touch-proof member 2942. It should be understood that this third embodiment of the touch-proof member 2942 is configured to be utilized with the second embodiment of the connector system 1010. As such, the figures and associated disclosure related to the second embodiment 1010 are not repeated for this third embodiment of the touch-proof member 2942. The omission of these figures and associated disclosure should not limit this third embodiment in any way and instead a reader should refer back to the figures and disclosure set forth above in connection with the second embodiment of the connector system 1010. Additionally, it should also be understood that certain disclosure related to the second embodiment of a touch-proof member 1942 has not been repeated here for the third embodiment of a touch-proof member 2942. Instead, it should be understood that like numbers like numbers represent like structures. For example, the disclosure from retaining member 1950*a* applies in equal force to retaining member 2950*a*. Moreover, it is to be understood that any one or more features of the touch-proof member 720 or touch-proof member 1942 can be used in conjunction with those disclosed regarding the touch-proof member 2942, and that any one or more features of the touch-proof member 2942 can be used in conjunction with those disclosed regarding the touch-proof member 720 or touch-proof member 1942. The primary difference between the second embodiment of the touch-proof member 1942 and the third embodiment of the touch-proof member 2942 is: (i) the touch-proof recess is omitted, and (ii) first extent of the touch-proof element 2960 is also omitted. As such, the walls 2962 extend directed from the base portion 2948. Because this embodiment cannot rely on collapsing the touch-proof recess 1951 in order to allow the touch-proof member 2942 to move from the original state or undeformed state to the unoriginal state or deformed state, this functionality is provided by retaining members 2950*a*-2950*d*. Nevertheless, this third embodiment of the touch-proof member 2942 provides the same overall functions as described above in the second embodiment of the touch-proof member 1942.

The system 10, 1010 is a T4/V4/S3/D2/M2, wherein the system 10, 1010 meets and exceeds: (i) T4 is exposure of the system 100 to 150° C., (ii) V4 is severe vibration, (iii) S1 is sealed high-pressure spray, (iv) D2 is 200 k mile durability, and (v) M2 is less than 45 Newtons of force is required to connect the male terminal assembly 430, 1430 to the female terminal assembly 800, 1800. The terminal assemblies 430, 1430 shown in the following figures are rated to carry at 55°

C. rise over ambient (RoA) or 80° C. with a derating of 80%, where FIGS. 1-99B can carry 365 amps with a 100 $mm^2$ conductor, while FIGS. 106-135 can carry 245 amps with a 50 $mm^2$ conductor, 280 amps with a 75 $mm^2$ conductor, 330 amps with a 100 $mm^2$ conductor. Additionally, other performance specifications of the system 10 disclosed herein will be obvious to one of skill in the art.

While the figures and disclosure contained herein discuss two different embodiments of the connector system 10, 1010 it should be understood that these are only exemplary embodiments and that other embodiments are possible. For example, any number of male terminal assemblies 430, 1430 may be positioned within a single male housing assembly 220, 1220. Specifically, the male housing assembly 220, 1220 may be configured to contain multiple (e.g., between 3-30, preferably between 3-8, and most preferably between 3-4) male terminal assemblies 430, 1430. The female terminal assembly 800, 1800 may be reconfigured to accept these multiple male terminal assemblies into a single female terminal assembly 800, 1800. Alternatively, the female terminal assembly 800, 1800 may be reconfigured to include multiple female terminal assemblies 800, 1800, where each female terminal assembly 800, 1800 receives a single male terminal assemblies 430, 1430. In other words, the system disclosed herein may include: (i) any number of male terminal assemblies 430, 1430 and (ii) a number of female terminal assemblies 800, 1800 that is equal to or less than the number of male terminal assemblies 430, 1430. Also, it should be understood that, if multiple male terminal assemblies 430, 1430 are utilized, the male terminal assemblies 430, 1430 may have the same shape, similar shapes, or different shapes.

Moreover, it should also be understood that the male terminal assemblies 430, 1430 may have any number of contact arms 494, 1494 (e.g., between 2-100, preferably between 2-50, and most preferably between 2-8) and any number of spring arms 452, 1452 (e.g., between 2-100, preferably between 2-50, and most preferably between 2-8). As discussed above, the number of contact arms 494, 1494 may not equal the number of spring arms 452, 1452, the width of the spring arms 452, 1452 may be equal to or larger than the width of the contact arms 494, 1494, or the width of each spring arms 452, 1452 or each contact arms 494, 1494 may vary from the width of other spring arms 452, 1452 or contact arms 494, 1494 contained in the same terminal assembly 430, 1430. For example, there may be more contact arms 494, 1494 then spring arms 452, 1452. Alternatively, there may be less contact arms 494, 1494 then spring arms 452, 1452.

MATERIALS AND DISCLOSURE THAT ARE INCORPORATED BY REFERENCE

PCT Application Nos. PCT/US2021/057959, PCT/US2021/047180, PCT/US2021/043788, PCT/US2021/043686, PCT/US2021/033446, PCT/US2020/049870, PCT/US2020/050018, PCT/US2020/014484, PCT/US2020/013757, PCT/US2019/036127, PCT/US2019/036070, PCT/US2019/036010, and PCT/US2018/019787, U.S. patent application Ser. No. 16/194,891 and U.S. Provisional Application 63/222,859, each of which is fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

ISO Specifications, including Road vehicles—Test methods and performance requirements for voltage class B connectors (ISO 20076:2019) and Road Vehicles—Degrees Of Protection (IP Code)—Protection Of Electrical Equipment Against Foreign Objects, Water And Access (ISO 20653:2013)

IEC Specifications, including Degrees of Protection Provided by Enclosures (IP Code) (IEC 60529-2020), each of which is fully incorporated herein by reference and made a part hereof.

SAE Specifications, including: J1742_201003 entitled, "Connections for High Voltage On-Board Vehicle Electrical Wiring Harnesses—Test Methods and General Performance Requirements," last revised in March 2010, each of which is fully incorporated herein by reference and made a part hereof.

ASTM Specifications, including: (i) D4935-18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

DIN Specification, including Connectors for electronic equipment—Tests and measurements—Part 5-2: Current-carrying capacity tests; Test 5*b*: Current-temperature derating (IEC 60512-5-2:2002), each of which are fully incorporated herein by reference and made a part hereof.

ESD Specifications, including Surface Resistance Measurements of Static Dissipative Planar Materials (ANSI/ESD STM11.11), each of which is fully incorporated herein by reference and made a part hereof.

Other standards, including American National Standards Institute standards that correspond or have counterparts to the above listed standards, and Federal Test Standard 101C and 4046, each of which is fully incorporated herein by reference and made a part hereof.

While some implementations have been illustrated and described, numerous modifications come to mind without significantly departing from the spirit of the disclosure; and the scope of protection is only limited by the scope of the accompanying claims. For example, the overall shape of the of the components described above may be changed to: a triangular prism, a pentagonal prism, a hexagonal prism, octagonal prism, sphere, a cone, a tetrahedron, a cuboid, a dodecahedron, an icosahedron, an octahedron, a ellipsoid, or any other similar shape.

It should be understood that the following terms used herein shall generally mean the following: "High power" shall mean (i) voltage between 20 volts to 600 volts regardless of current or (ii) at any current greater than or equal to 80 amps regardless of voltage. "High current" shall mean current greater than or equal to 80 amps regardless of voltage. "High voltage" shall mean a voltage between 20 volts to 600 volts regardless of current.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A connector system for use in a power distribution system, the connector system comprising:

a male terminal assembly having:

a male terminal body including a first contact arm, a second contact arm and a spring receiver;

a spring member including (i) a first spring arm with a positioning projection extending from a free end of the first spring arm and (ii) a second spring arm;

wherein the spring member resides within the spring receiver to define a seated state whereby the positioning projection wraps around an interior corner region of the first contact arm, wherein during operation of the power distribution system, the first and second spring arms apply an outwardly directed biasing force on the first and second contact arms.

2. The connector system of claim 1, wherein the second spring arm has a planar configuration and lacks a positioning projection.

3. The connector system of claim 2, wherein the spring member further includes a third spring arm with a positioning projection extending from a free end of the third spring arm, and wherein in the seated state, the positioning projection of the third spring arm wraps around an interior corner region of a third contact arm of the male terminal body.

4. The connector system of claim 3, wherein the first and third spring arms extend from opposite sides of a rear wall of the spring member.

5. The connector system of claim 1, further comprising:

a female housing formed from a non-conductive material;

a female terminal assembly formed from a conductive material, wherein the female terminal assembly is configured to be inserted within the female housing using a first force that is directed in a first direction;

a touch-proof member formed from a non-conductive material, wherein the touch- proof member is configured to be inserted within the female terminal assembly using a second force that is directed in a second direction that is opposite the first direction; and, wherein when the touch-proof member is inserted within the female terminal assembly, the touch-proof member prevents insertion of a foreign object into the female terminal assembly.

6. The connector system of claim 5, wherein the touch-proof member has a base and a touch-proof securing assembly with an arrangement of deformable retaining members that elastically deform during insertion of the touch-proof member within the female terminal assembly.

7. The connector system of claim 6, wherein the deformable retaining members elastically deform from an original state to a deformed state during insertion of the touch-proof member within the female terminal assembly; and, wherein the deformable retaining members elastically deform from the deformed state back to the original state after the touch-proof member is fully inserted in the female terminal assembly to reach an installed state.

8. The connector system of claim 5, wherein the touch-proof member has a touch-proof element with a first end wall, a second end wall, and a connecting wall extending between said first and second end walls.

9. The connector system of claim 8, wherein when the touch-proof member is inserted within the female terminal assembly, a foreign object distance of 5 mm or less is defined between the touch-proof element and a first wall of the female terminal assembly.

10. The connector system of claim 5, wherein the touch-proof member includes an elastically deformable base having a first base portion and a second base portion that are separated by a recess, wherein the first base portion includes at least one retaining member that depends from said first base portion and wherein the second base portion includes at least one retaining member that depends from said second base portion.

11. The connector system of claim 10, wherein the touch-proof member further includes a touch-proof element that extends from the elastically deformable base, the touch-proof element having a first extent with a slot that is aligned with the recess that separates the first and second base portions.

12. The connector system of claim 11, wherein the slot and the recess combine to facilitate the first extent to function as a living hinge to facilitate elastic deformation of the first and second base portions during insertion of the touch-proof member into the female terminal assembly.

13. The connector system of claim 12, wherein the touch-proof element has a second extent adjacent to the first extent, the second extent having a pair of end walls and connecting wall that provide the second extent with an I-shaped cross-sectional configuration.

14. A connector system for use in a power distribution system, the connector system comprising:

a male terminal assembly having:

a male terminal body including a first contact arm, a second contact arm and a spring receiver;

a spring member including a first spring arm with a positioning and retaining means and a second spring arm;

wherein the spring member resides within the spring receiver to define a seated state whereby the positioning and retaining means of the first spring arm wraps around a portion of the first contact arm and resides adjacent to at least an end surface of the first contact arm, wherein during operation of the power distribution system, the first and second spring arms apply an outwardly directed biasing force on the first and second contact arms.

15. The connector system of claim 14, wherein the second spring arm includes a positioning and retaining means, and wherein in the seated state, the positioning and retaining means of the second spring arm wraps around a portion of a second contact arm of the male terminal body and resides adjacent to at least an end surface of a second contact arm.

16. The connector system of claim 15, wherein in the seated state, the positioning and retaining means of the second spring arm wraps around an interior corner region of the second contact arm.

17. The connector system of claim 15, wherein the first and second spring arms extend from opposite sides of a rear wall of the spring member, wherein the first and second spring arms are in a diagonal positional relationship.

18. The connector system of claim 15, wherein the first and second spring arms extend from opposite sides of a rear wall of the spring member, wherein the first and second spring arms are in an opposed positional relationship.

19. The connector system of claim 14, wherein the spring receiver is formed by a wall arrangement of the male terminal body, and wherein at least one of the first and second contact arms have (i) a neck portion with a neck width and (ii) a body portion with a body width that is greater than the neck width.

20. The connector system of claim 19, wherein the male terminal assembly includes a top wall and at least one of the first and second contact arms extends from the top wall at an outward angle that is between 5 and 12 degrees.

21. The connector system of claim 19, wherein the neck width is at least 10% less than the body width, wherein this reduction in the neck width in comparison to the body width reduces a force that is required to deflect or displace at least one of the first and second contact arms inward and towards a center of the male terminal when coupling the male terminal assembly to a female terminal assembly.

* * * * *